(12) United States Patent
Jerram et al.

(10) Patent No.: US 8,751,428 B2
(45) Date of Patent: *Jun. 10, 2014

(54) APPARATUSES, METHODS AND SYSTEMS FOR A DIGITAL CONVERSATION MANAGEMENT PLATFORM

(71) Applicant: NewValueExchange Global AI LLP, Reading (GB)

(72) Inventors: Andrew Peter Nelson Jerram, Windsor (GB); Frederick Francis McMahon, Maldon (GB)

(73) Assignee: Newvaluexchange Global AI LLP, Reading (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/887,115

(22) Filed: May 3, 2013

(65) Prior Publication Data

US 2013/0317826 A1 Nov. 28, 2013

Related U.S. Application Data

(63) Continuation of application No. 13/013,158, filed on Jan. 25, 2011, which is a continuation of application No. 13/558,914, filed on Jul. 26, 2012, now Pat. No. 8,463,726.

(60) Provisional application No. 61/298,130, filed on Jan. 25, 2010, provisional application No. 61/360,434, filed on Jun. 30, 2010.

(51) Int. Cl.
*G06N 5/02* (2006.01)

(52) U.S. Cl.
USPC .......................... 706/46; 705/14.54

(58) Field of Classification Search
USPC .......................... 706/46; 705/14.54
See application file for complete search history.

(56) References Cited

U.S. PATENT DOCUMENTS

| 6,131,085 | A | 10/2000 | Rossides |
| 6,904,408 | B1 | 6/2005 | McCarthy et al. |
| 7,242,752 | B2 | 7/2007 | Chiu |
| 7,319,992 | B2 | 1/2008 | Gaos |
| 7,539,484 | B2 | 5/2009 | Roundtree |

(Continued)

FOREIGN PATENT DOCUMENTS

| WO | WO/02/11037 | 2/2002 |
| WO | WO/2005/006116 | 1/2005 |

(Continued)

OTHER PUBLICATIONS

Serrano et al ("Dialogue-based interaction with a web assistant: The ADVICE approach" 2004).
Hube Et al ("Towards Automating Social Engineering Using Social Networking Sites" 2009).

(Continued)

*Primary Examiner* — Lut Wong
(74) *Attorney, Agent, or Firm* — Cooley LLP; Walter G. Hanchuk

(57) ABSTRACT

The APPARATUSES, METHODS AND SYSTEMS FOR A DIGITAL CONVERSATION MANAGEMENT PLATFORM ("DCM-Platform") transforms digital dialogue from consumers, client demands and, Internet search inputs via DCM-Platform components into tradable digital assets, and client needs based artificial intelligence campaign plan outputs. In one implementation, The DCM-Platform may capture and examine conversations between individuals and artificial intelligence conversation agents. These agents may be viewed as assets. One can measure the value and performance of these agents by assessing their performance and ability to generate revenue from prolonging conversations and/or ability to effect sales through conversations with individuals.

22 Claims, 62 Drawing Sheets

(56) References Cited

U.S. PATENT DOCUMENTS

| | | |
|---|---|---|
| 7,596,498 B2 | 9/2009 | Basu et al. |
| 7,609,829 B2 | 10/2009 | Wang et al. |
| 7,653,627 B2 | 1/2010 | Li et al. |
| 2002/0035474 A1 | 3/2002 | Alpdemir |
| 2003/0014489 A1 | 1/2003 | Inala et al. |
| 2003/0018476 A1 | 1/2003 | Yuen et al. |
| 2003/0125958 A1 | 7/2003 | Alpdemir et al. |
| 2003/0171925 A1 | 9/2003 | Werner |
| 2004/0006478 A1 | 1/2004 | Alpdemir et al. |
| 2005/0234727 A1 | 10/2005 | Chiu |
| 2007/0173237 A1 | 7/2007 | Roundtree |
| 2008/0015865 A1 | 1/2008 | Chiu |
| 2008/0184164 A1 | 7/2008 | Di Fabbrizio et al. |
| 2008/0306743 A1 | 12/2008 | Di Fabbrizio et al. |
| 2009/0070129 A1 | 3/2009 | Inbar et al. |
| 2009/0081995 A1 | 3/2009 | Basson et al. |
| 2009/0083249 A1 | 3/2009 | Basson et al. |
| 2009/0125397 A1 | 5/2009 | Gomaa et al. |
| 2009/0157749 A1 | 6/2009 | Lessing et al. |
| 2010/0017260 A1 | 1/2010 | Hamilton, II et al. |

FOREIGN PATENT DOCUMENTS

| | | |
|---|---|---|
| WO | WO/2006/043925 | 4/2006 |
| WO | WO/2006/124243 | 11/2006 |
| WO | WO/2008/000046 | 1/2008 |
| WO | WO/2008/076958 | 6/2008 |

OTHER PUBLICATIONS

Chatbots.org (archived on Jan. 17, 2010).
Ferreira et al ("Intelligent Search Agents Using Web-Driven Natural-Language Explanatory Dialogs" 2005).
"BzzAgent WOM Media Platform," Aug. 2008.
"ChatThreads to measure WOM value in dollars," May 8, 2008.
"Is Talking Getting you Anywhere? Measuring WoM Marketing," Apr. 2009.
"Quantify and Track Conversation Value," ChatThreadscorp.com, Jan. 16, 2010.
"Study: How Profitable Is Word-of-Mouth?" Oct. 10, 2008.
"Understanding a consumer's path to conversion," May 2009.
BzzAgent Whitepaper: "Valuing Advertising's Original Medium: The Conversation," Mar. 8.
ChatThread Conversation Value Model and Cost Per Conversion "Measuring the Value of Word of Mouth," Jun. 24-25, 2008.
PCT international search report of international application No. PCT/GB2011/050119 mailed on Dec. 8, 2011.
PCT international preliminary report on patentability of international application No. PCT/GB2011/050119 mailed on Jul. 31, 2012.
Mumme et al ("Design and Implementation of a Virtual Salesclerk" IVA 2009).
Stuart Barnes ("Virtual Worlds as a Medium for Advertising" Nov. 2007).
Weusijana et al ("Multitalker: Building Conversational Agents in Second Life Using Basilica" 2008).
Nguyen et al ("An Agent-Based Approach to Dialogue Management in Personal Assistants" Jan. 2005).

Continue with Fig. 4C

Continue with Fig. 4D

Continue with Fig. 6B

Continue with Fig. 7B

Initialize Dialogue Agent based on Client Needs 10 05
10 36
Dialogue Script
Dialogue Agent: Natalie
Subject: Health & Beauty
Key Words: Hairdresser, Greeting, Appointment
Key Words: Avatar message to remind client of appointment for the next day.
10 35
Dialogue Tree
Figure 10B

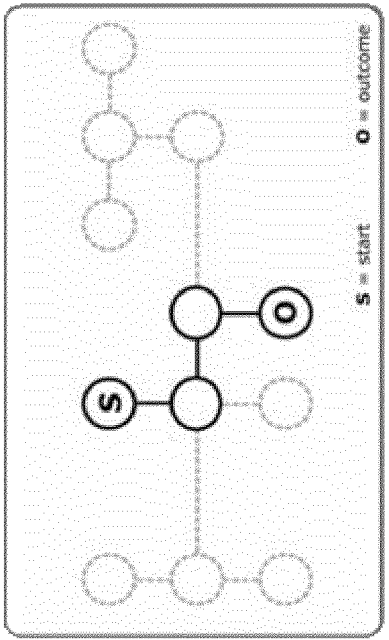
Figure 12B.(a)
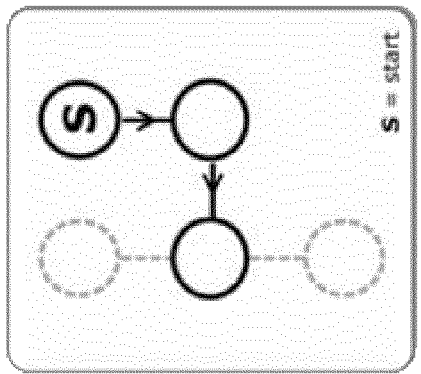
Figure 12B.(b)
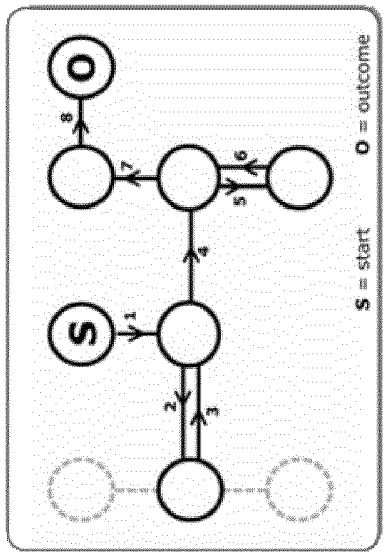
Figure 12B.(c)
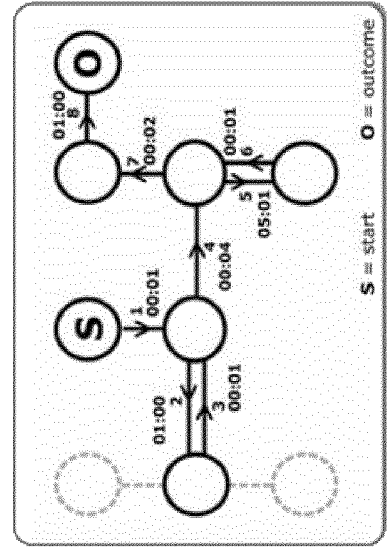
Figure 12B.(d)
Figure 12B

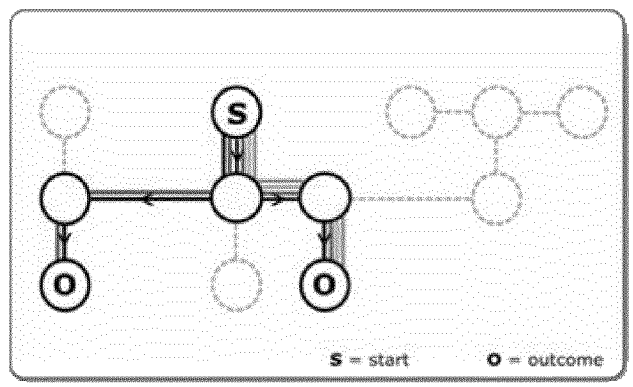
Figure 12C.(a)
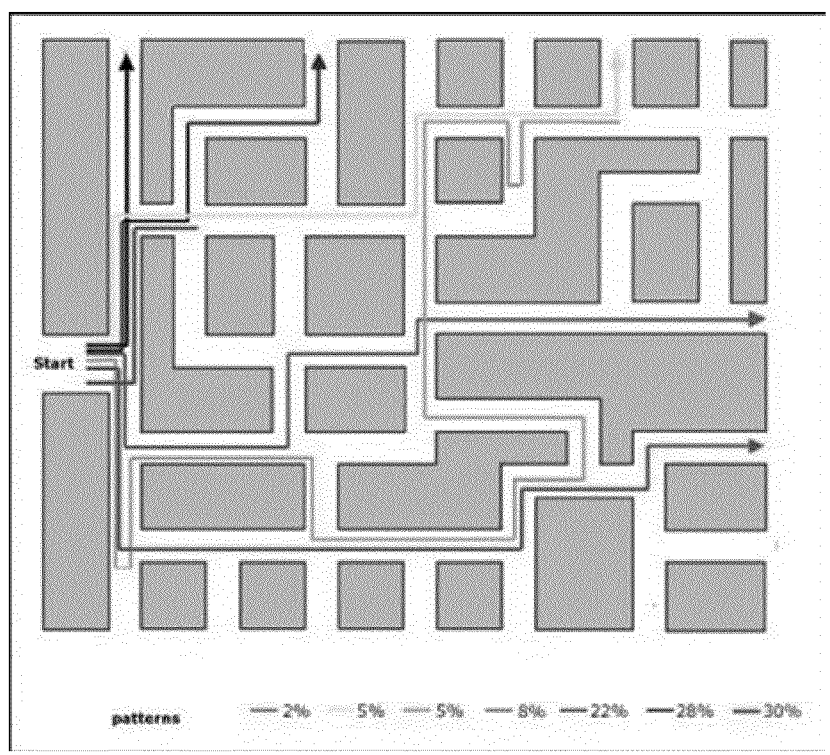
Figure 12C.(b)
Figure 12C

Automatically Capture and Request for Client Update 9 20

Dialogue
Wiki

Natalie,   13 10

I noticed you were advertising Matrix products – it would be great if you could extend your dialogue to help me understand these products more.

Kathy

Sponsored links

Professional Hairdresser
Windle - Winner of Best Hair Salon
In Time Out's Shopping Awards
www.WindleHair.com/
London davidpophamsalon
Oxford's premier hair salon
discover the difference today
www.davidpopham.com
England

London's Hairdresser
Get Your Hair dressed for 90% less.
Feel & look good with Groupon !
www.Groupon.co.uk/London Redken Flagship Salon
Experience The Professional Edge
at Eleven Hair Mayfair London
www.eleven-hair.com
Mayfair, 11 Blenheim Street, London

Wimbledon Hairdressers
Find Hairdressers & Barbers in &
Around Wimbledon Now
WimbledonPeople.co.uk 13 05

Artificial Artificial Intelligence (AAI) is a term coined by Jeff Bezos with reference to Artificial Intelligence (AI).

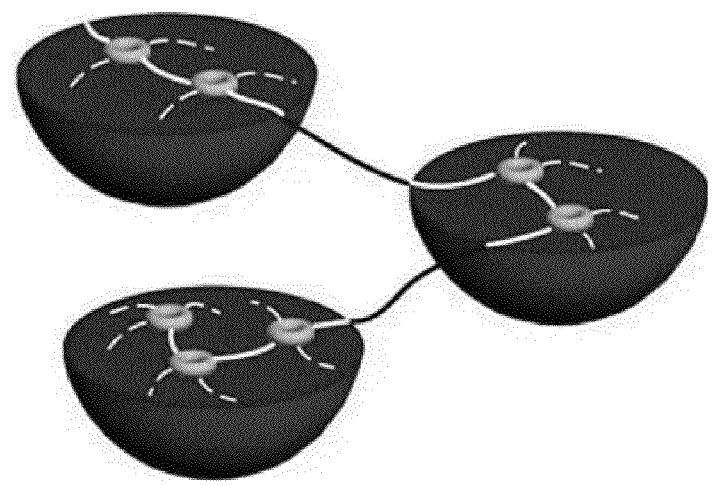
(a). Dynamically Linked Virtual Agent Apps with Dialogue-Pathway chosen by the Consumer
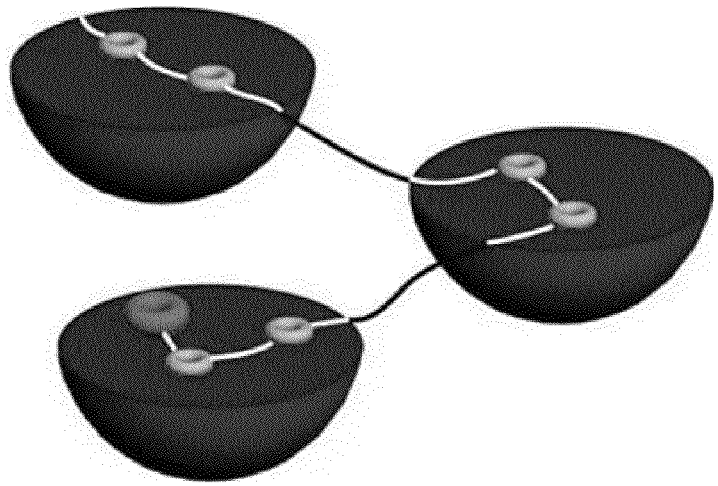
(b). Dynamically Linked Virtual Agent Apps with a Decision-String resulting with a Decision-Outcome
Figure 16B

APPARATUSES, METHODS AND SYSTEMS FOR A DIGITAL CONVERSATION MANAGEMENT PLATFORM

RELATED APPLICATIONS

This application is a continuation of and hereby claims priority under 35 USC §120 to U.S. non-provisional patent application Ser. No. 13/558,914, filed on Jul. 26, 2012, entitled "Apparatuses, Methods And Systems For A Digital Conversation Management Platform", and is a continuation of U.S. non-provisional patent application Ser. No. 13/013,158, filed on Jan. 25, 2011, entitled "Apparatuses, Methods And Systems For A Digital Conversation Management Platform", which in turn claims priority under 35 USC §119 for U.S. provisional patent application Ser. No. 61/298,130, filed Jan. 25, 2010, and U.S. provisional patent application Ser. No. 61/360,434, filed Jun. 30, 2010, both entitled "Apparatuses, Methods And Systems For A Digital Conversation Value Exchange Tool."

This application is related to Patent Cooperation Treaty Application Serial No. PCT/GB2011/050119, entitled "Apparatuses, Methods And Systems For A Digital Conversation Management Platform," filed on Jan. 25, 2011.

The entire contents of the aforementioned applications are herein expressly incorporated by reference.

This patent application disclosure document (hereinafter "description" and/or "descriptions") describes inventive aspects directed at various novel innovations (hereinafter "innovation," "innovations," and/or "innovation(s)") and contains material that is subject to copyright, mask work, and/or other intellectual property protection. The respective owners of such intellectual property have no objection to the facsimile reproduction of the patent disclosure document by anyone as it appears in published Patent Office file/records, but otherwise reserve all rights.

FIELD

The present invention is directed generally to an apparatuses, methods, and systems of virtual asset management, and more particularly, to APPARATUSES, METHODS AND SYSTEMS FOR A DIGITAL CONVERSATION VALUE EXCHANGE PLATFORM.

BACKGROUND

Traditionally, advertising and marketing industries have conducted marketing surveys to learn about consumer preferences and behaviors. Such information may be obtained in various ways, for example, with face-to-face interviews, user filled questionnaires, and/or the like.

SUMMARY

The APPARATUSES, METHODS AND SYSTEMS FOR A DIGITAL CONVERSATION MANAGEMENT PLATFORM ("DCM-Platform") transforms digital dialogue from consumers, client demands and, Internet search inputs via DCM-Platform components into tradable digital assets, and client needs based artificial intelligence campaign plan outputs.

In one embodiment, a method is disclosed, comprising: receiving information indicating a demand for a digital conversation asset; determining a type of the demanded digital conversation asset; initializing an exchange procedure for the determined type of the demanded digital conversation asset; obtaining information required by the exchange procedure for the determined type of the demanded digital conversation asset; and determining an index of the demanded digital conversation asset at least based on the obtained information for the determined type of the demanded digital conversation asset.

In one embodiment, a method is disclosed, comprising: instantiating a conversational artificial-intelligence agent; identifying an individual target for conversation; initiating a conversation with the individual target by the artificial-intelligence agent by providing a first portion of a conversational dialogue to the individual target; recording a response from the individual target to the first portion of the conversational dialogue; and responding to the response from the individual target with a next contextual portion of the conversational dialogue.

BRIEF DESCRIPTION OF THE DRAWINGS

The accompanying appendices and/or drawings illustrate various non-limiting, example, innovative aspects in accordance with the present descriptions:

FIGS. 10A-10F-3 show logic flow diagrams illustrating creating a dialogue agent within embodiments of the DCM-Platform;

FIGS. 11A-11L show logic flow diagrams illustrating generating an interactive dialogue within embodiments of the DCM-Platform;

FIGS. 12A-12D show logic flow diagrams illustrating dialogue analytics within embodiments of the DCM-Platform;

FIGS. 13, 14A-14B show exemplar screen shots illustrating embodiments of the DCM-Platform;

FIGS. 15A-15F show diagrams illustrating dialogue agents marketing within embodiments of the DCM-Platform;

FIGS. 16A-16D show diagrams illustrating dialogue knowledge flows within embodiments of the DCM-Platform;

Figure 1:
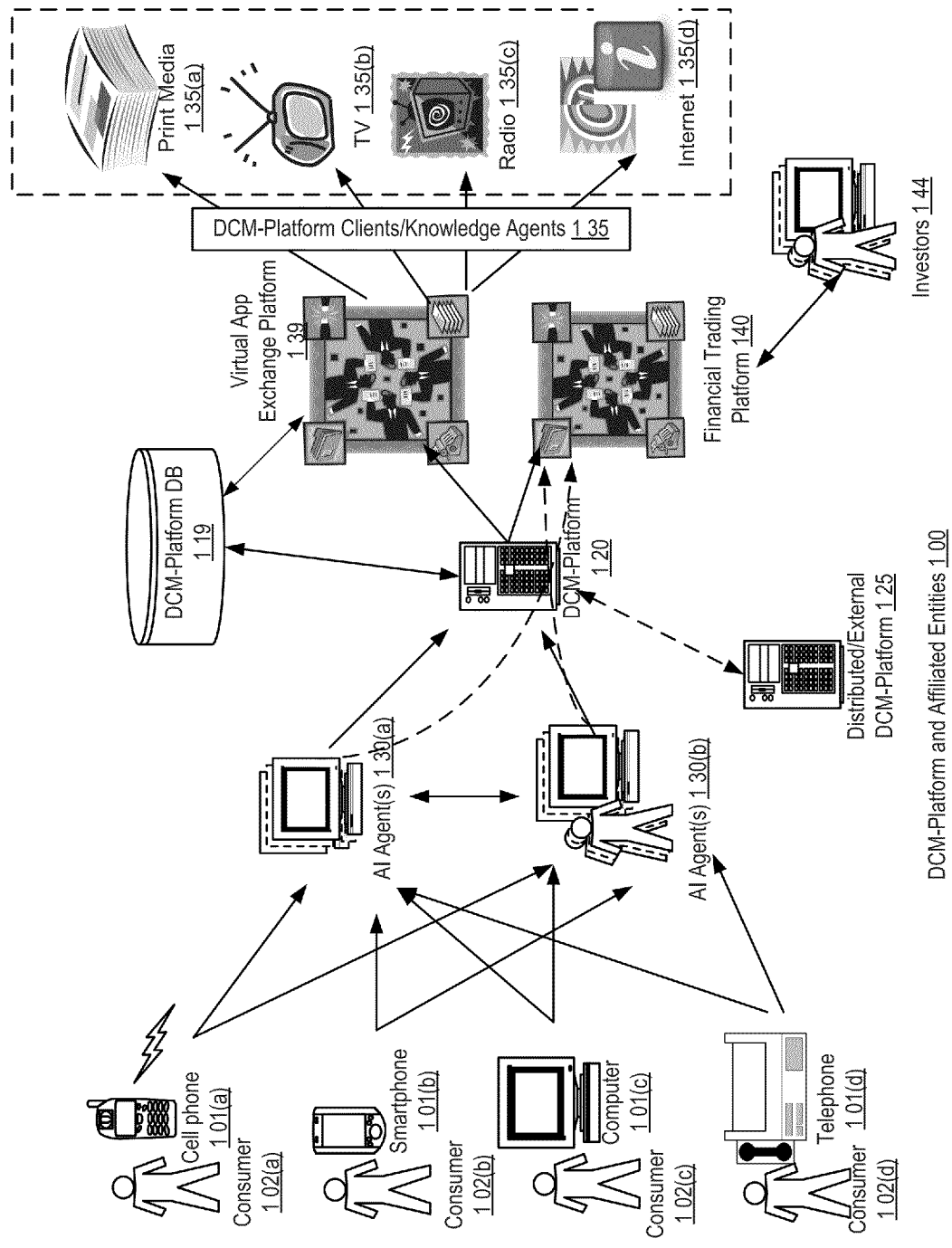
FIG. 1 shows a block diagram illustrating DCM-Platform and affiliated entities 100 within embodiments of the DCM-Platform.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

This disclosure details an implementation of apparatuses, methods, and systems for a digital conversation value exchange platform (hereinafter, "DCM-Platform"). The DCM-Platform implements an application whereby virtual commodities such as digital conversation assets are created, evaluated and traded. In one embodiment, the DCM-Platform may capture and examine conversations between individuals and artificial intelligence conversation agents. These agents may be viewed as assets. One can measure the value and performance of these agents by assessing their performance and ability to generate revenue from prolonging conversations and/or ability to effect sales through conversations with individuals. In one implementation, the DCM-Platform may initiate an exchange procedure by collecting required information for the exchange, and determine a pricing index for the digital conversation asset to be traded.

In one embodiment, a Robot Operating System (ROS) may be employed for both consumer robots and other intelligent devices. For example, in one implementation, the DCM-Platform may employ ROS as a platform to manage intelligence hardware abstraction, consumer interfacing, low-level device control, implementation of controlling and recording consumer conversations, message-passing between processes, application package management, and/or the like.

In one embodiment, the DCM-Platform may specify, store and manage interactive voice dialogue between a consumer and an artificial intelligence agent in formats such as, but not limited to, VoiceXML (VXML), and/or the like. For example, in one implementation, a VXML document may take a form similar to the following:

```
<vxml version="2.0" xmlns="http://www.website.org/2001/vxml">
    <form>
        <block>
            <prompt>
                What is your favorite ice-cream flavor?
            </prompt>
        </block>
    </form>
</vxml>
```

In one embodiment, the DCM-Platform may establish and manage consumer interactions via a virtual world platform.

In one embodiment, the DCM-Platform may employ mobile operating systems (Mobile OS) to control mobile devices within embodiments of the DCM-Platform operation. For example, in one implementation, Mobile OS such as, but not limited to, Google Android, Windows Mobile, iPhone OS, Symbian OS, and/or the like, may be employed.

It is to be understood that, depending on the particular needs and/or characteristics of a DCM-Platform application, associated security data sources, associated operating system, user interface, object, administrator, server, hardware configuration, network framework, and/or the like, various embodiments of the DCM-Platform may be implemented that enable a great deal of flexibility and customization. The instant disclosure discusses embodiments of the DCM-Platform primarily within the context of digital conversation value exchange. However, it is to be understood that the system described herein may be readily configured/customized for a wide range of other applications or implementations. For example, aspects of the DCM-Platform may be adapted for general virtual commodity management, pricing and exchange, and/or the like.

DCM-Platform

FIG. 1 shows a block diagram illustrating DCM-Platform and affiliated entities 100 within embodiments of the DCM-Platform. Within various embodiments, one or more consumers 102(*a*)-(*d*), consumer device(s) 101(*a*)-(*d*), artificial intelligence (AI) agent(s) 130(*a*)-(*b*), DCM-Platform 120, DCM-Platform database(s) 119, a virtual application exchange platform 139, a financial trading platform 140, distributed external DCM-Platforms 125, DCM-Platform client(s) 135 and DCM-Platform database(s) 119 are shown to interact via various communication channels.

In one embodiment, a consumer 102(*a*)-(*d*) may operate a variety of consumer devices, such as, but not limited to a cellular phone 101(*a*), a smartphone 101(*b*), a computer 101(*c*), a telephone 101(D) and/or the like, to have a conversation with an AI agent 130(*a*)-(*b*). For example, the consumer may talk to the AI agent over the phone, or type texts in an instant messenger, and/or an online chatting platform to communicate with the AI agent.

In one implementation, the AI agent 130(*a*)-(*b*) may comprise an artificial intelligence ROS and/or other intelligent devices. The AI agent may communicate with, and/or be monitored by the DCM-Platform 120, which may employ the AI agent to furnish intelligence hardware abstraction, consumer interfacing, low-level device control, implementation of controlling and recording consumer conversations, message-passing between processes, application package management, and/or the like. For example, in one implementation, the DCM-Platform may retrieve knowledge and dialogue scripts from the DCM-Platform database 119 to generate interactive dialogue steps and scripts, and send it to the AI agent. In one implementation, the DCM-Platform may be implemented within a central server. In alternative implementations, there may be distributed DCM-Platforms 125 to control a cluster of AI agents.

In one embodiment, the DCM-Platform may receive interactive dialogues from the AI agents and encapsulate the digital dialogue scripts to generate tradable virtual assets for exchange on a virtual application exchange platform 139, and/or a financial trading platform 140. In one embodiment, the digital conversation between a consumer and an AI agent may provide information indicating the consumer's preferences and thus useful for new advertising inventory and other forms of revenues for DCM-Platform clients 135. Within embodiments, the digital assets comprising digital dialogue assets may be purchased by DCM-Platform clients and/or knowledge agents 135. For example, a DCM-Platform client may purchase the digital asset to perform data mining to obtain knowledge and information from the digital conversations. In one implementation, the DCM-Platform clients may comprise an AI agent, a DCM-Platform, an advertising company, and/or the like.

In another implementation, a DCM-Platform may devise marketing plans using AI agents for the DCM-Platform clients, and the DCM-Platform clients may purchase virtual avatar AI advertising service from the DCM-Platform from the virtual application exchange platform 139. For example, a virtual advertising avatar may be employed to communicate with consumers for advertising purposes via a variety of media channels, such as, but not limited to print media 135(*a*), television 135(*b*), radio 135(*c*), Internet 135(*d*), and/or the like.

In a further implementation, the DCM-Platform 120 may generate tradable financial instruments backed by the virtual assets and facilitate transactions of the financial instruments. In one implementation, the digital assets may be used to generate a variety of financial instruments, such as, but not limited to futures, forwards, options, and/or the like, to be traded on a financial trading platform 140, e.g., the New York Stock Exchange, and/or the like. For example, investors 144 of the digital assets may purchase stock shares of an AI agent (e.g., a digital asset owner, etc.) via the financial trading platform 140, as further illustrated in FIGS. 4A-7D and 8A-8B.

Figure 2A:
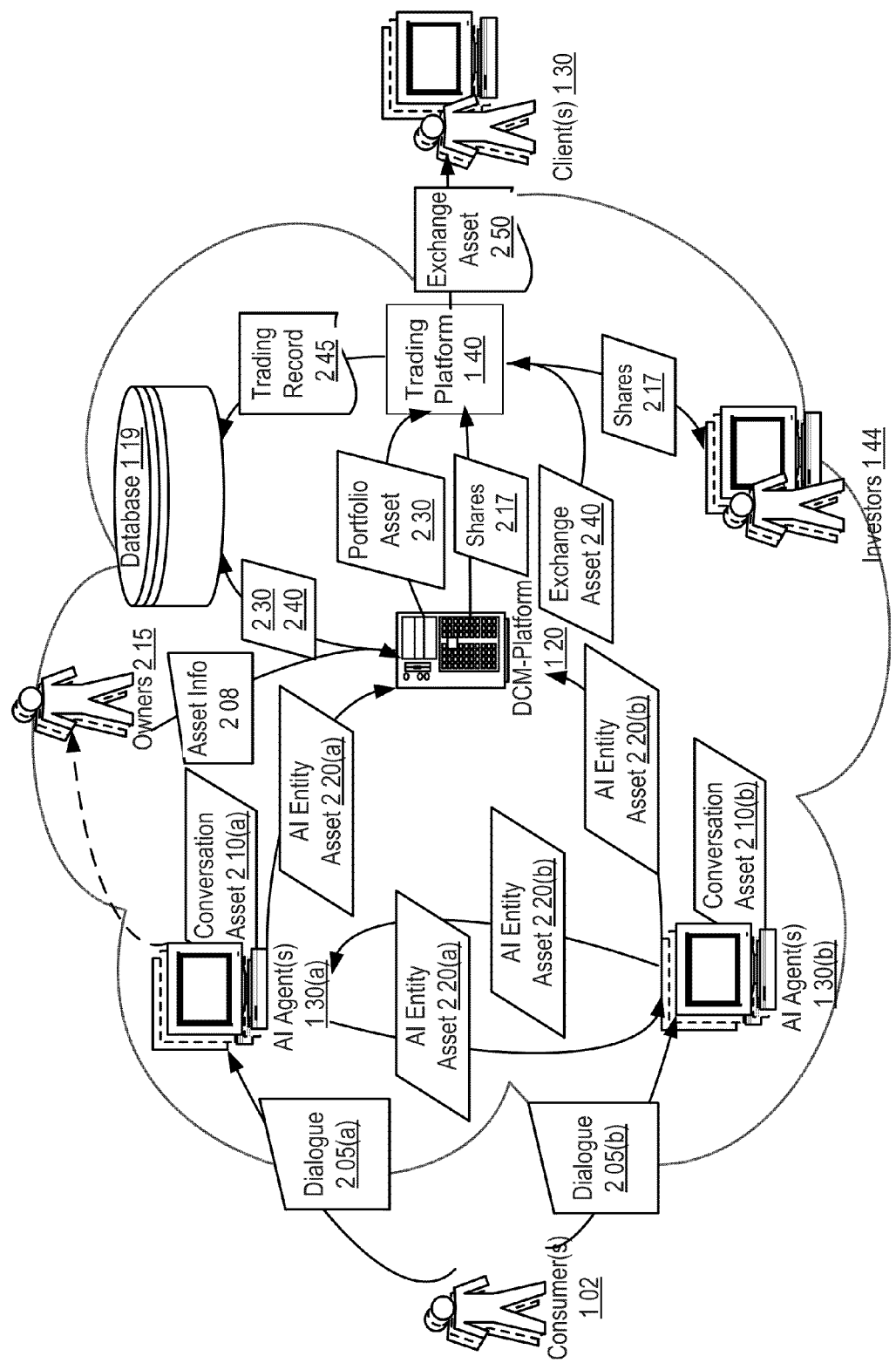
FIGS. 2A-2D show data flow diagrams illustrating embodiments of the DCM-Platform.

FIG. 2A shows a block diagram illustrating DCM-Platform data flows within embodiments of the DCM-Platform. In one embodiment, a consumer 102 may exchange dialogues 205(*a*)-(*b*) with an AI agent 130(*a*)-(*b*), wherein the AI agent may comprise a computer employing an AI robot system. For example, in one implementation, a consumer may talk to a robot calling system over his cellular phone or telephone, and the audio conversation may be recorded and saved as a dialogue 105(*a*)-(*b*). For another example, a consumer may interact with a robot avatar on an instant messenger platform (e.g., iRobot, etc.), an avatar on a social media platform (e.g., Facebook, LinkedIn, Twitter, etc.), and the textual dialogue scripts 205(*a*)-(*b*) may be exchanged and saved.

Within implementations, the AI agent may encapsulate one or more saved conversation between the consumer and the AI agent to generate a digital asset, which is referred to as the conversation asset 210(*a*)-(*b*). When the digital conversation is owned by an AI Agent, one or more conversation asset with related topic may be encapsulated as an AI Entity asset 220(*a*)-(*b*), and the actual digital conversation component is referred to as a Conversation Asset 210(*a*)-(*b*). For example, an AI entity may combine one or more conversations with regard to the same advertising project (e.g., a new product promotion, etc.) as an AI entity asset.

Within various implementations, the AI Entity assets 220(*a*)-(*b*) may be sent to the DCM-Platform 120, wherein the DCM-Platform may group the AI Entity assets to form a Portfolio asset 230. In one implementation, the DCM-Platform may group AI entity assets from AI agents employed by the same client, and/or the same advertising project as a Portfolio asset. For example, a number of AI agents, e.g., social media avatars, robot messengers, robot callers, etc., may be employed for a new product's market promotion, and the digital assets from all the AI agents with regard to the product campaign may be grouped as a Portfolio asset. In further implementations, a collection of Portfolio assets may be traded within a trading platform 140 and thus it is known as an Exchange asset 240. For example, Portfolio assets 230 related to similar products may be grouped and traded as an Exchange asset 240. Within implementations, the DCM-Platform may store the Portfolio asset 230 and the Exchange asset 240, and/or the transaction record 245 at the database 119. Examples of types of digital assets, including the conversation assets 210(2)-(*b*), AI entity assets 220(*a*)-(*b*), portfolio assets 230, exchange assets 250, and/or the like, are further illustrate in FIG. 2B.

In one implementation, a DCM-Platform client 130 may purchase the digital asset in the form of exchange asset 250 from the trading form, which may be further illustrated in FIG. 8. In an alternative implementation, exchange assets 250 may be traded between AI entities as different asset owners, as further illustrated in FIGS. 4A-7D. In another implementation, investors 144 of the virtual assets may purchase stock shares 217 from the financial trading platform 140, wherein the stock shares are generated at the DCM-Platform based on the asset information 208 submitted by the asset owners 215.

Figure 2B:
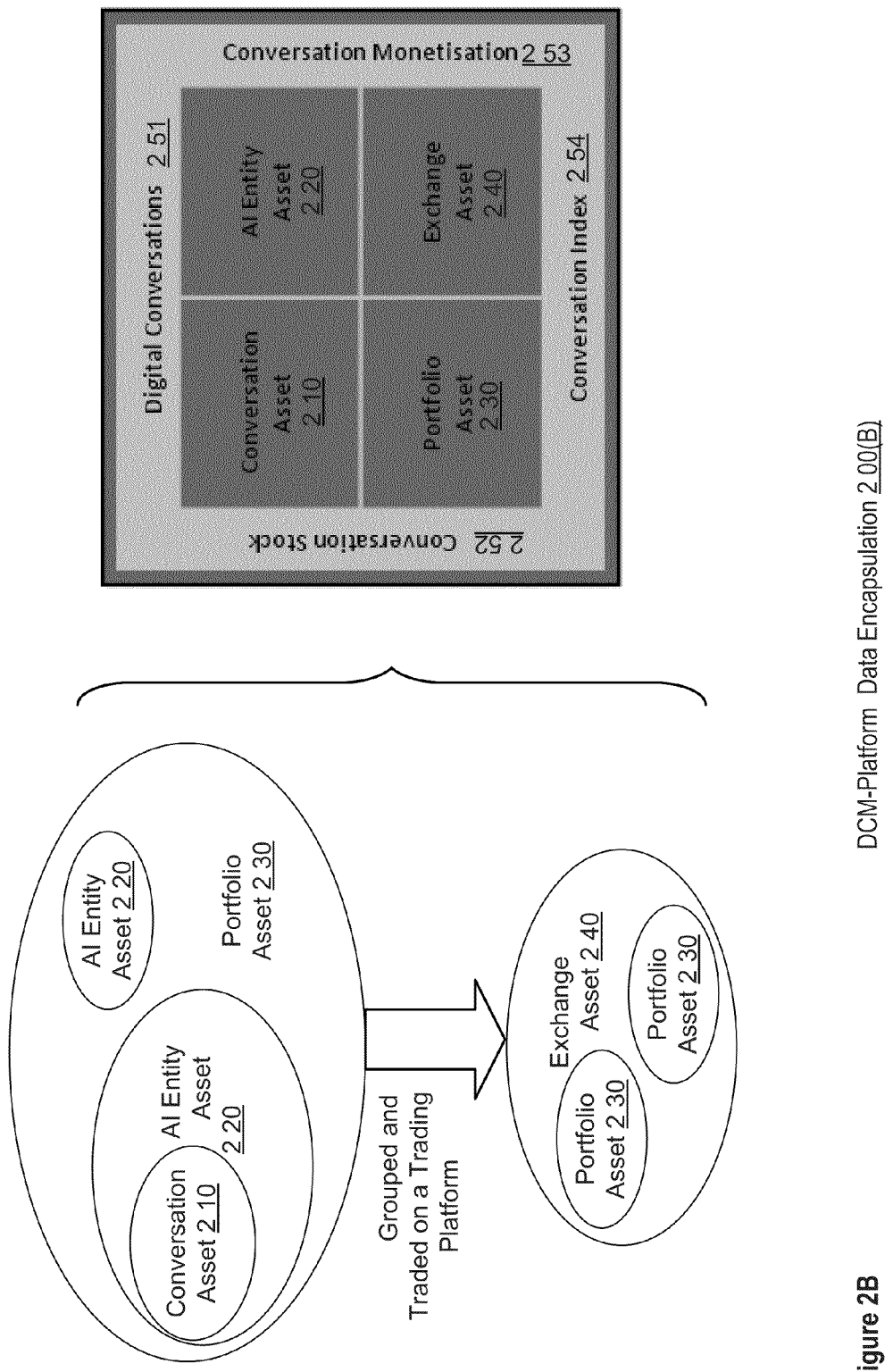

FIG. 2B provides a block diagram illustrating DCM-Platform data encapsulations within embodiments of the DCM-Platform. In one embodiment, DM-Platform may create four classes of assets within digital conversations.

In one implementation, the conversation asset 210 may be created to include the dialogue interactions between AI entities and humans, and/or amongst AI entities. In one implementation, an AI entity asset 220 may comprise one ore more conversation 210 and the means, such as intelligence hardware abstraction, consumer interfaces, and/or the like, for conducting digital conversations included in the conversation asset 210. In one implementation, the portfolio asset 230 may include a plurality of AI entity assets and/or the conversation assets, wherein the portfolio asset 230 provides a branded vehicle for the accreditation, aggregation and performance of conversation assets and AI entity assets. In a further implementation, the exchange asset 240 may include one or more portfolio assets grouped together to be traded on a public trading platform, wherein the exchange asset 240 provides accreditation, aggregation and performance of portfolio assets 230 within a public or private domain.

For example, in one implementation, an intelligent messenger avatar may interact with consumers on the messaging platform to provide information with regard to hair styling. The conversation scripts between the avatar and one or more consumers may be encapsulated as a package, which forms a conversation asset associated with the intelligent messenger avatar, and the identification information, such as the account information of the avatar account, together with the conversation asset may form an AI entity asset. In one implementation, similar conversations from different AI entities, such as conversations related to a new hair styling product, may be grouped by the DCM-Platform to create a portfolio asset, wherein the portfolio asset may be labeled and/or associated with the new hair styling product. In one implementation, the hair styling product portfolio asset may be traded with other portfolio assets (e.g., portfolio assets related to other hair treatment products) in a transaction, which may be referred to as the exchange asset in the transaction.

Within embodiments, various data structures, objects, and relational structures may be adopted for creation, storage and implementations of the conversation asset 210, AI entity assets 220, portfolio assets 230 and exchange assets 240. For example, in one implementation, an exemplar XML implementation of conversation assets 210 may take a form similar to the following:

---

...
</Title> Joe_Doe_Hair_dresser_0001 </Title>
</Description>
Messenger Hair Salon customer service
</Description>
</Asset_Owner> Robot Corp <Asset_Owner>
</Global_Identifier>
RObotCorp_JoeDoe_Hair_hhhht
<Global_Identifier>
<Status> draft
</Status>
<Shares number> ... </Shares number>
<platform> AOL </Platform>
<OS> Windows 200X, XP </OS>
<Compatibility> Paml OS, BlackBerry OS </Compatibility>
...

---

In one embodiment, DCM-Platform may generate tradable assets based on the digital conversations 251. Within implementations, DCM-Platform may determine dollar values of the digital assets 210-240, monetize the conversation 253, and determine conversation stock shares 252 and conversation index 254 for exchange, as further illustrated in FIGS. 4A-8B.

In one embodiment, as digital conversations may be measurable at the lowest common denominator of a dialogue-step, a digital conversation may be commoditized as conversation stock 252, which is a tradable instrument. The commoditization is based on encapsulation of the digital conversation script with a wrapper that contains all the means for the exchange of value, which is represented as conversation monetization 253. Within implementations, DCM-Platform may generate a conversation index 254 to monitor the conversation monetization together with the digital conversation interactions from an AI end.

Within implementations, trading prices of conversation assets for exchange may be determined by market dynamics (e.g., NYSE index, etc.), which may be affected by authorship, ownership and monetization of digital conversation and by whether the conversation assets are accredited as part of a branded portfolio. The value may be also influenced by the brand of the exchange chosen for the trading of value. Included are past, present and future digital conversation for valuation of conversation assets in context to individuals, both in terms of human and artificial intelligence entities. In one embodiment, DCM-Platform may assess conversation liquidity and generate conversation index, which includes the emergent patterns of conversational trends and evolution.

In one embodiment, the methods that affect the pricing of digital conversation assets may further include, but not limited to searches and matches of conversational needs, conversation access rights, conversation events, conversation hand-offs, conversational learning loops conversational references and conversational transaction, with the associated rules of engagements for conversation assets including reputational, ownership transfers, withdrawals or suspension from algorithmic trading, and/or the like.

Figure 2C:
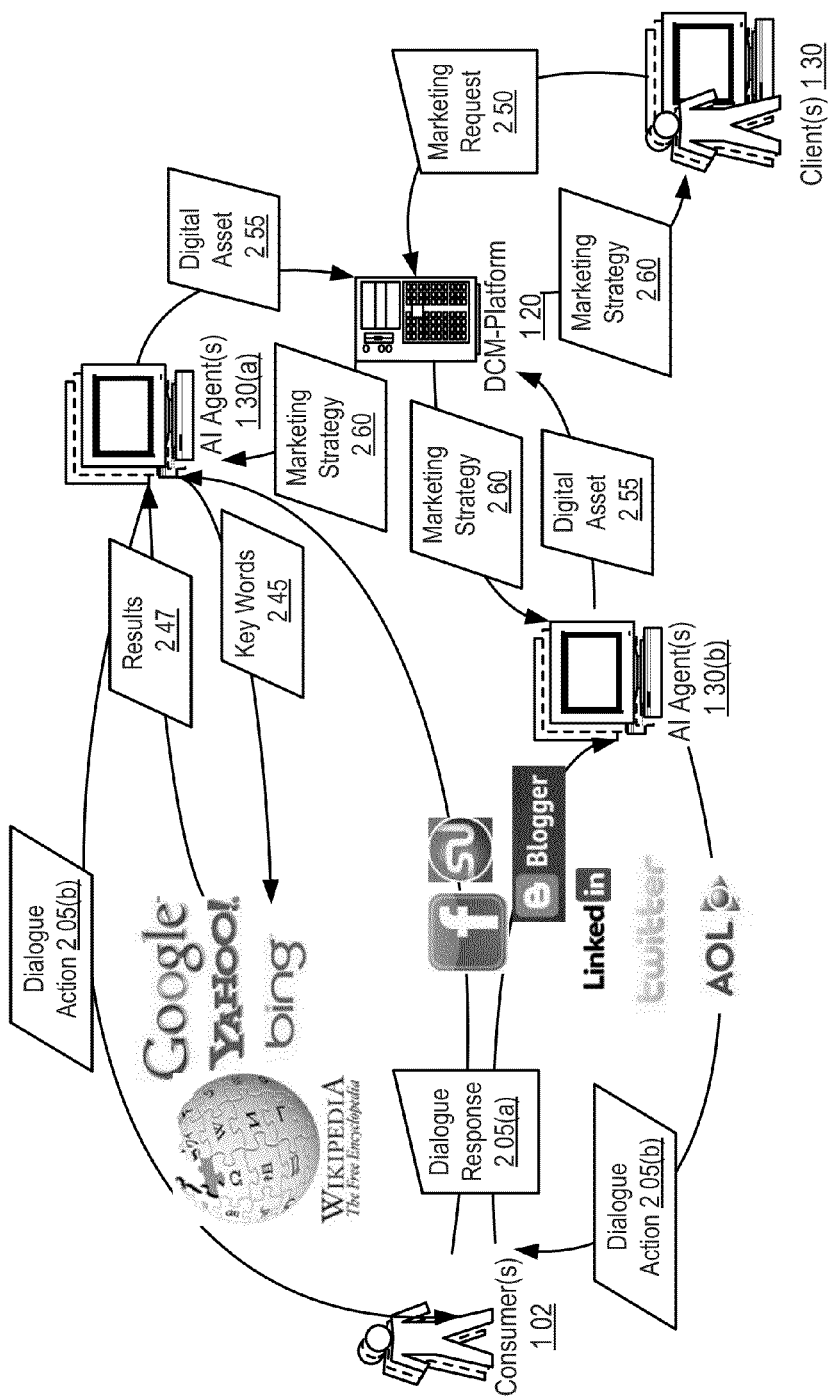

FIG. 2C provides a data flow diagram illustrating conversation interactions within one embodiment of the DCM-Platform. Within embodiments, the consumers 102 may interact with AI agents 130(a)-(b) to engage in a dialogue. The AI agent(s) 130(a)-(b) may provide dialogue actions 205(b) to a consumer 102 via a dialogue platform, and the consumer 102 may submit s dialogue response 205(a) in return. For example, in one implementation, the AI agent 130(a)(b) may be an avatar identity on a social media platform, such as, but not limited to AOL messenger, Facebook, eBlogger, LinkedIn, Twitter, and/or the like, and post a dialogue line via the social media platform, e.g., "would you like a 30% cash-back discount?". The consumer 102 may then respond via the social media platform by submitting a line "Yes. What is it?". In one implementation, the conversation between the consumer 102 and the AI agent 130(a)-(b) may continue in a progressive manner, as further illustrated in FIGS. 10A-11L.

In one implementation, the AI agents 130(a)-(b) may receive inquiries from the consumer 102 during a dialogue. For example, the consumer may submit a dialogue line "where can I buy a hair dresser with the 30% cash-back discount?" In one implementation, the AI agents may then connect to an Internet search engine, such as, but not limited to Google, Bing, Yahoo, and/or the like, to obtain search results 247 from the search engines based on key words 245 search "hair dresser cash back," and/or the like.

In one implementation, the AI agents may wrap the recorded digital dialogue scripts with consumers to generate digital assets 255 and submit to the DCM-Platform for trading on an exchange platform. In one implementation, a client 130, such as an advertising company, etc., may interact with the DCM-Platform 120 to submit a marketing request 250 to employ AI agent for advertising purposes. The DCM-Platform may then devise marketing strategy 260 for the client and deploy the strategy with AI agents.

For example, in one implementation, a hair dresser manufacturer may request the DCM-Platform devise a marketing strategy for their new hair dresser product. The DCM-Platform may analyze previously stored consumer dialogues, e.g., to extract information related to consumer preferences of hair dressers, etc., and then devise a dialogue application and select AI agents to implement the application, as further illustrated in FIGS. 10A-11L.

Figure 2D:
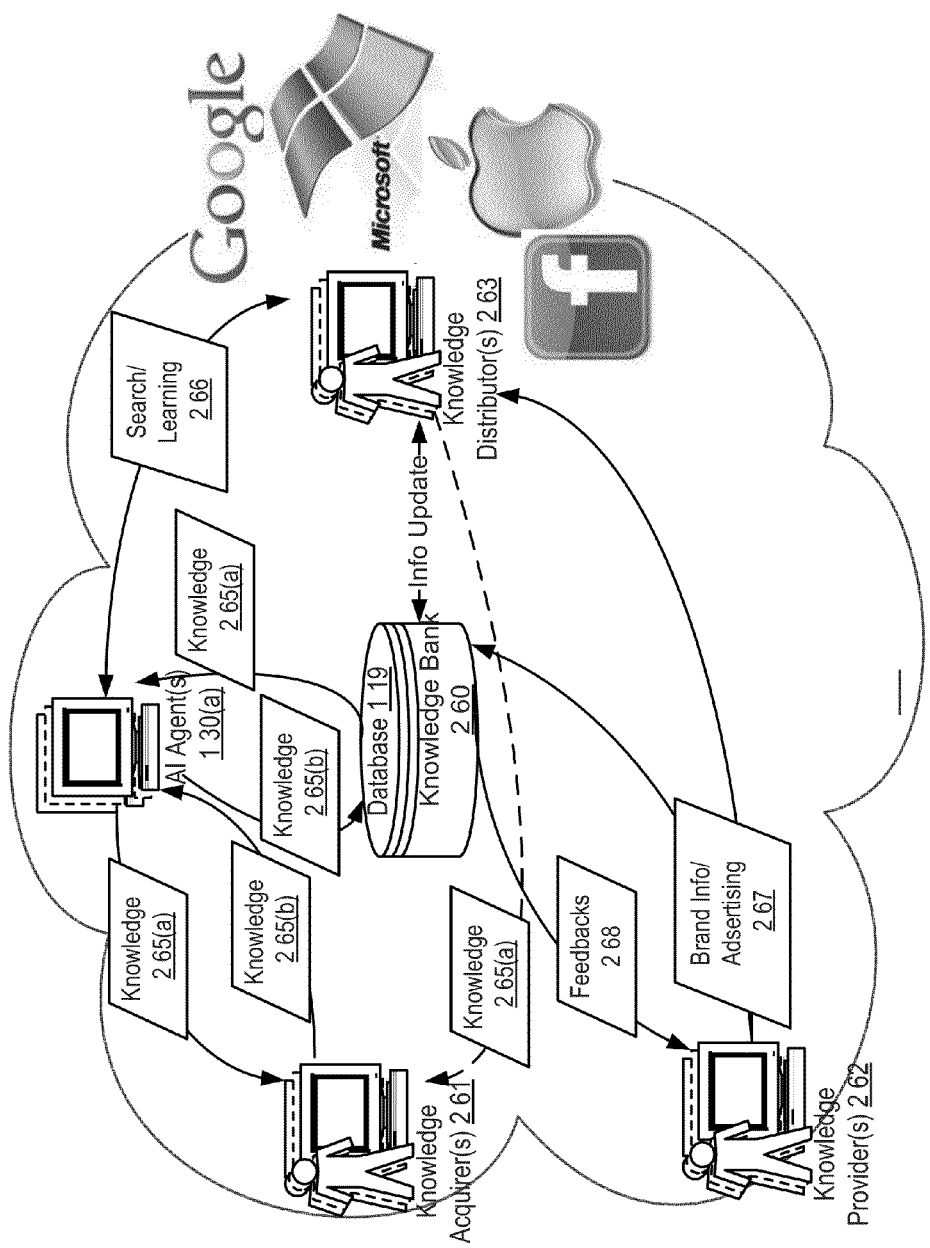

FIG. 2D provides a data flow diagram illustrating knowledge accumulation within one embodiment of the DCM-Platform. In one embodiment, the knowledge acquirers 261, e.g., consumers, etc., may interact with AI agents 130(a)(b) through conversation to access contextual branded Just-in-Time high quality knowledge 265(a), which maybe free or priced to use. For example, the AI agent(s) may provide information with regard to new products, services, and/or the like, to the knowledge acquirers during the interactive dialogues. For another example, the knowledge acquirers may submit responses to the knowledge received, which in turn provide knowledge 265(b) to the AI agents, such as, but no limited to consumers' ratings, comments of a product, and/or the like.

In one implementation, the knowledge 265(a)-(b) may be wrapped, stored, and/or filtered through dialogue scripts from a knowledge bank 265 database. In one implementation, the knowledge bank database 260 may be a central database maintained by the DCM-Platform. In alternative implementations, the knowledge bank database 260 may comprise a plurality of mutually connected distributed databases.

In one embodiment, knowledge providers 262 may comprise the consumer brands advertising to disseminate their "knowledge" about their products or services. In one implementation, the knowledge providers 262 may convert their branded procedural knowledge 267 and incorporate them into AI agent applications via the knowledge bank database 260. In another implementation, the knowledge providers 262 may obtain consumer feedbacks from the knowledge bank 260 and/or the AI agents via implementations of the AI agent applications.

In a further implementation, the market may be seeded with AI agent applications containing high quality knowledge across a few consumer products brands, and the DCM-Platform may create and sell advertising tools for User Generated Virtual Agent Apps to accelerate the population of AI agent applications, each containing specific knowledge. For example, the knowledge provider 262 may purchase AI agent application templates to imbue and update their latest product information for advertising with consumers.

Within embodiments, knowledge distributers 263 may comprise Internet search engines, social media platforms, such as, but not limited to Apple, Google, Microsoft, RIM, and/or the like, which have channels to market and would benefit from new revenue streams driven by AI agents. In one implementation, the knowledge distributors 263 may obtain knowledge (e.g., brand/product information) from the knowledge providers. For example, the knowledge provider may post advertisements containing product information 267 on the World Wide Web (www) indexed by the search engines. In another implementation, AI agents may access the knowledge distributors 263 to search and learn knowledge 266. For example, the AI agents may conduct a key-word search on a search engine platform to obtain knowledge for an on-going conversation with a consumer.

In a further implementation, DCM-Platform may create AI agent application for exchange, e.g., an AI application sold in the Apple iTunes Store, etc. In one implementation, the AI agent applications may be connected to the knowledge bank database 260, and further distribution with social network providers such as Yahoo! and Facebook, ad/or the like, may be also linked to the knowledge bank database 260. In one implementation, the knowledge distributors 264 may facilitate knowledge providers 262 to access the knowledge acquirers 261 via knowledge learning by the AI agents.

Figure 3:
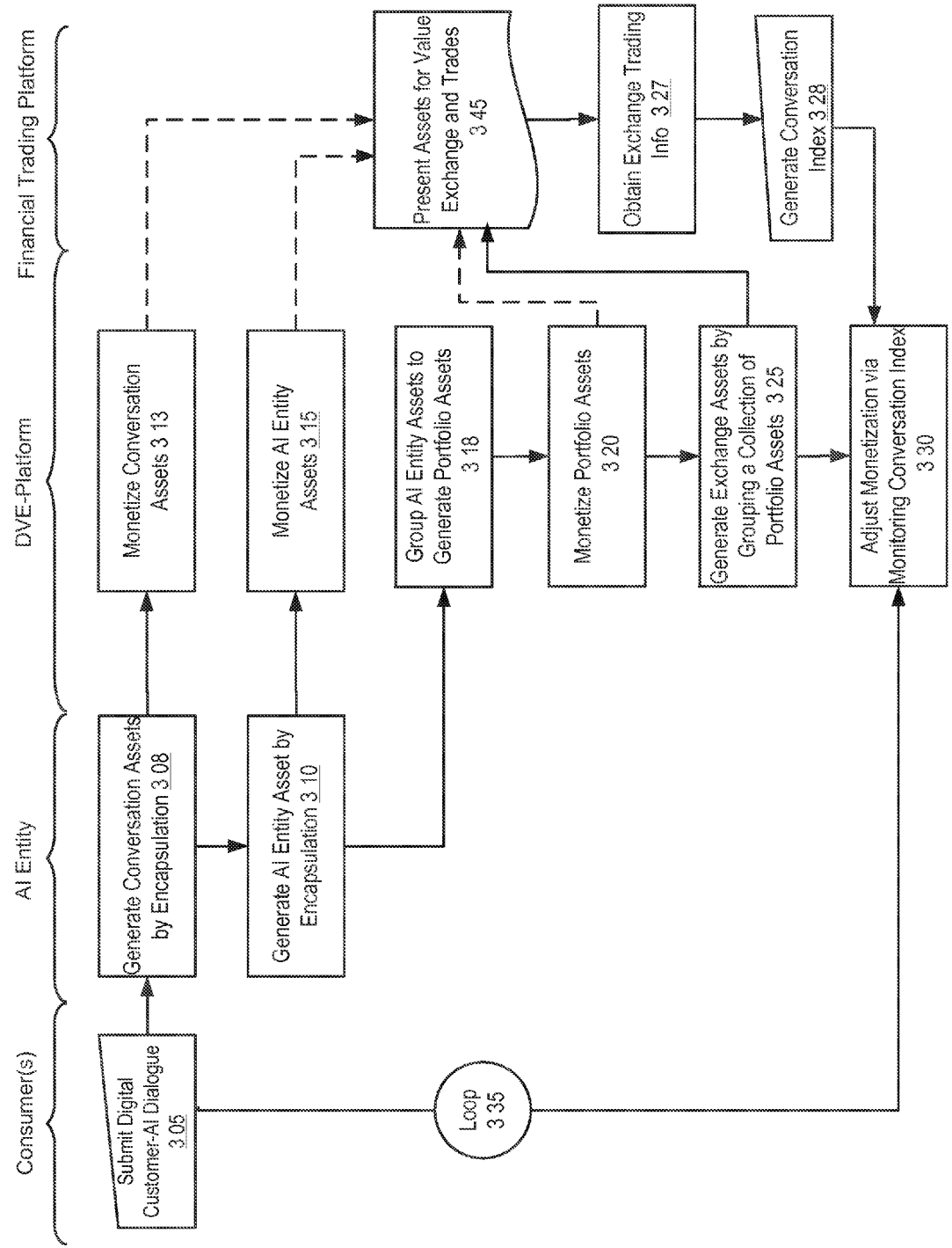
FIG. 3 shows a logic flow diagram illustrating interactions between entities within embodiments of the DCM-Platform.

FIG. 3 provides a logic flow diagram illustrating conversation asset monetization within embodiments of the DCM-Platform. In one embodiment, a consumer may interact with an AI agent to generate customer-AI dialogue 305. For example, in one implementation, the AI agent may operate an autodialer to call a consumer, wherein the audio conversation may be recorded and the audio file may be translated into textual scripts. For another example, the AI agent may manage a social network avatar, e.g., a messenger identity, a Facebook account, etc., and chat with a consumer via the social network platform.

Figure 4A:
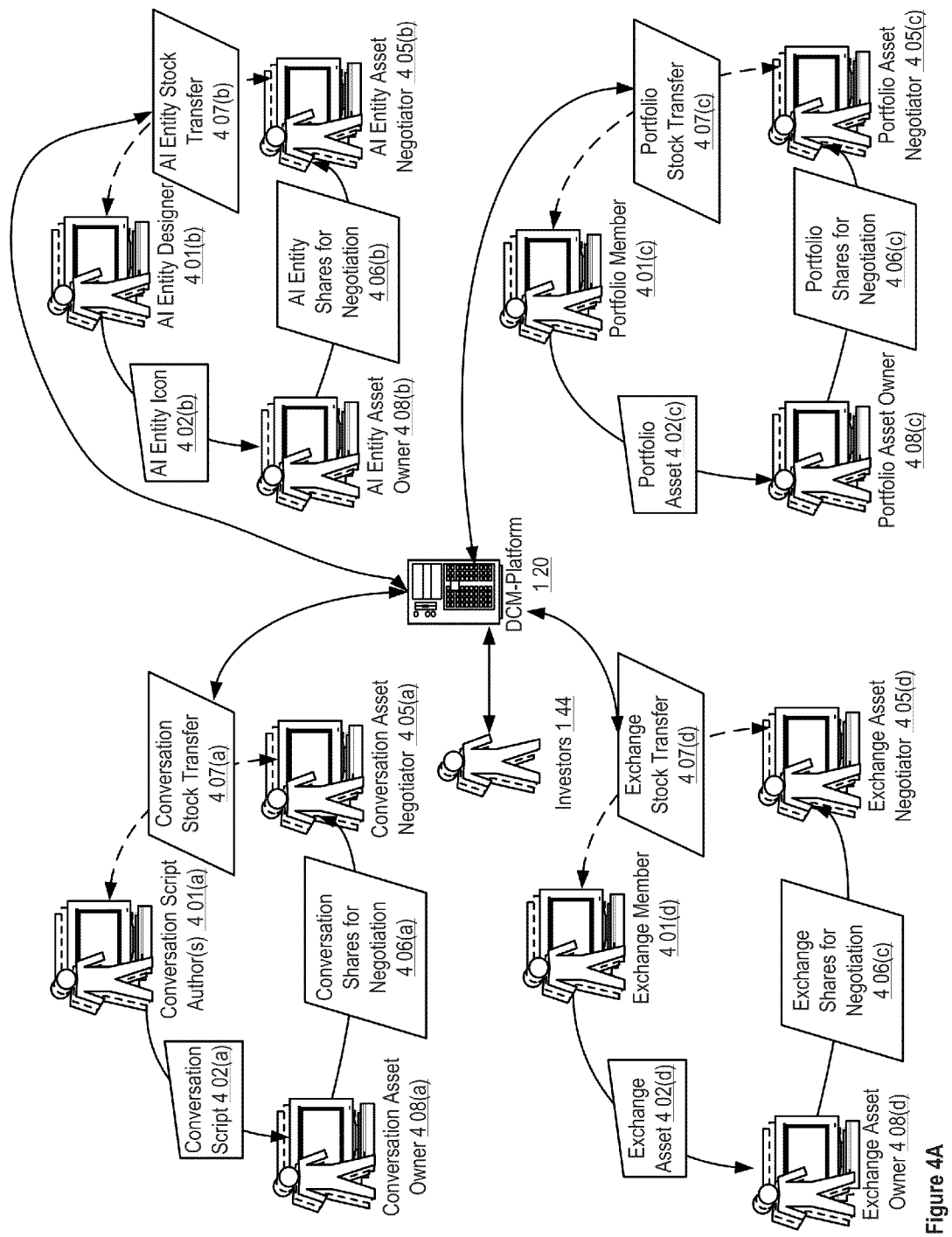
FIG. 4A-4D show diagrams illustrating monetizing a conversation asset within embodiments of the DCM-Platform.
Figure 4B:
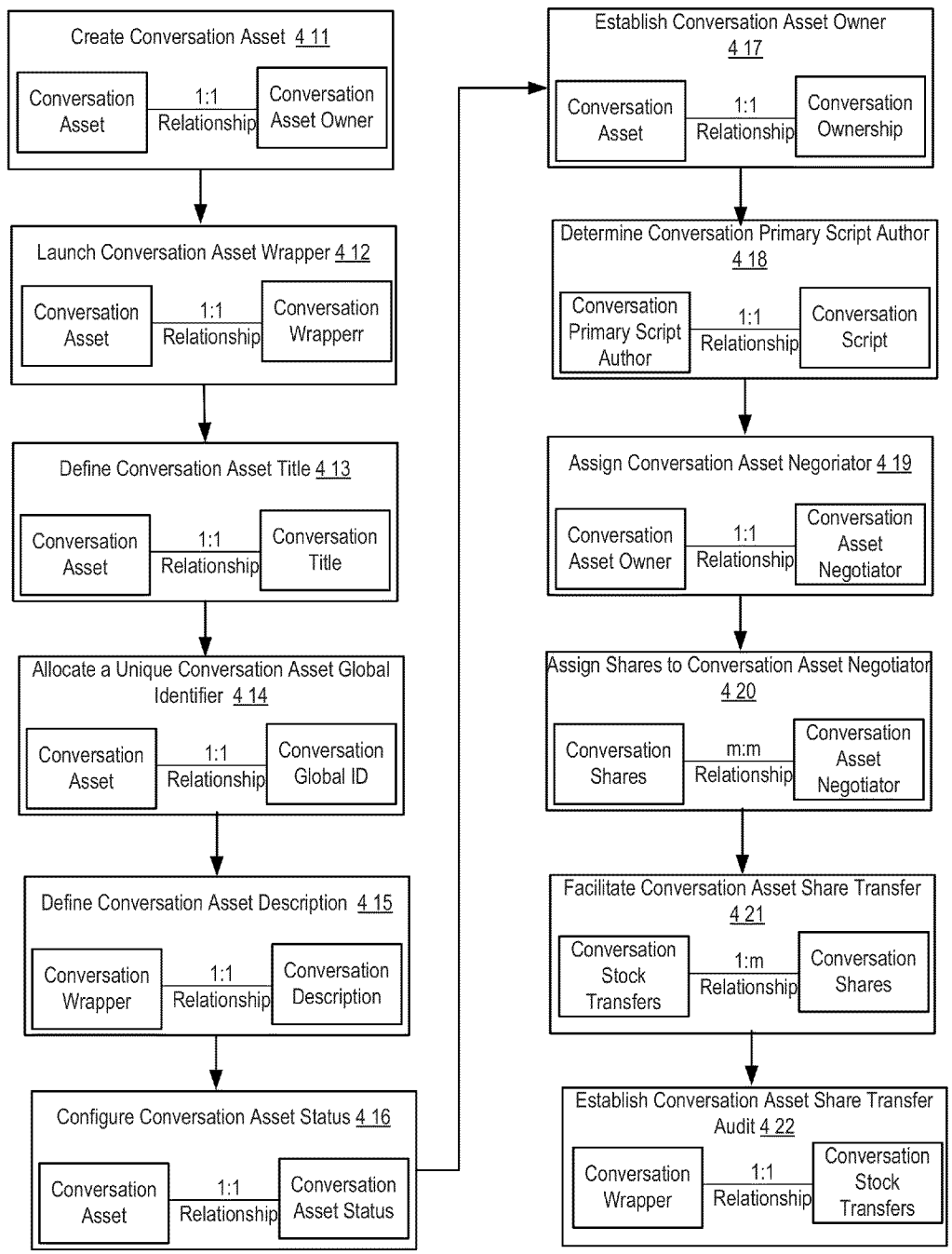
Figure 4C:
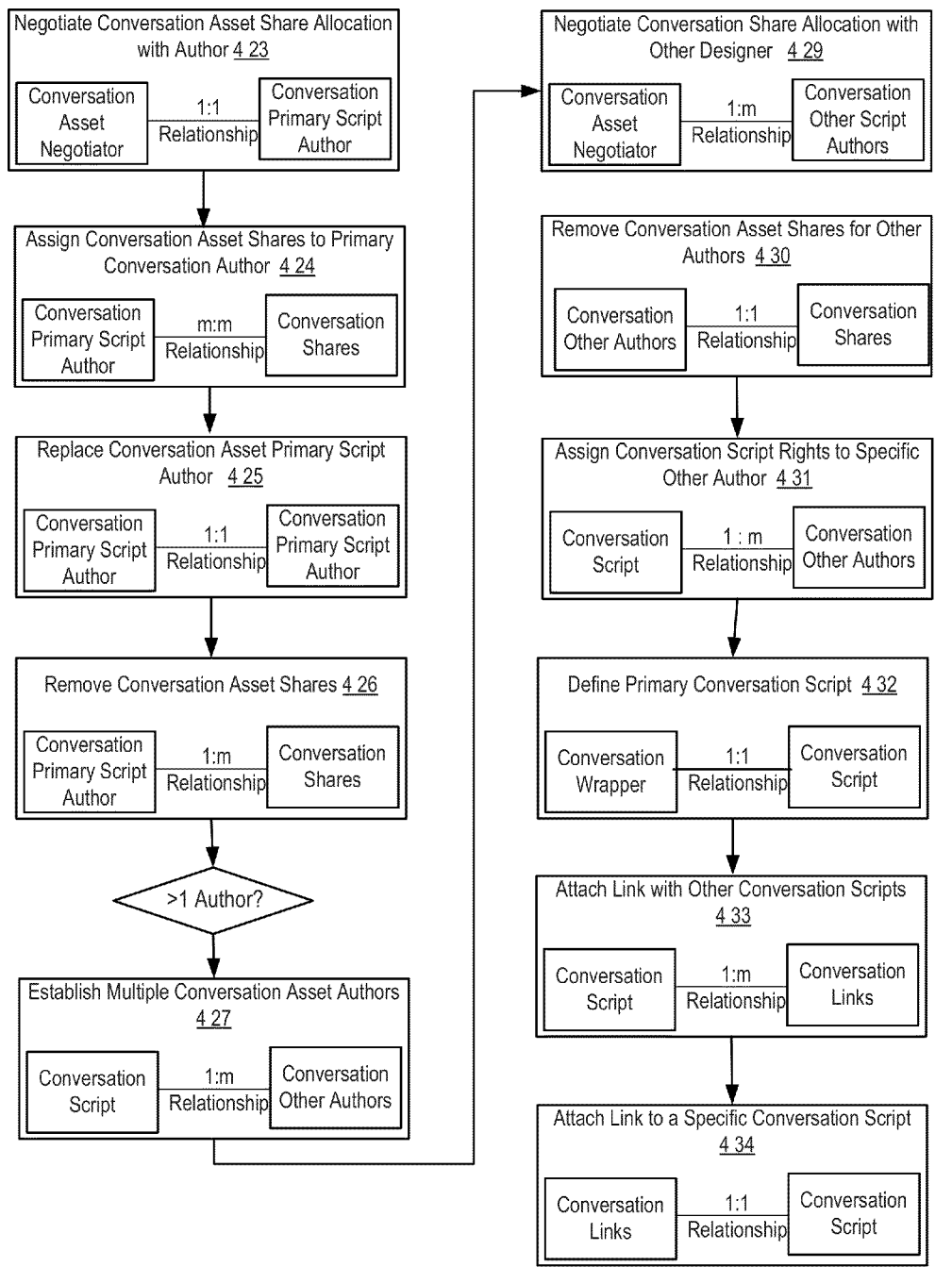
Figure 4D:
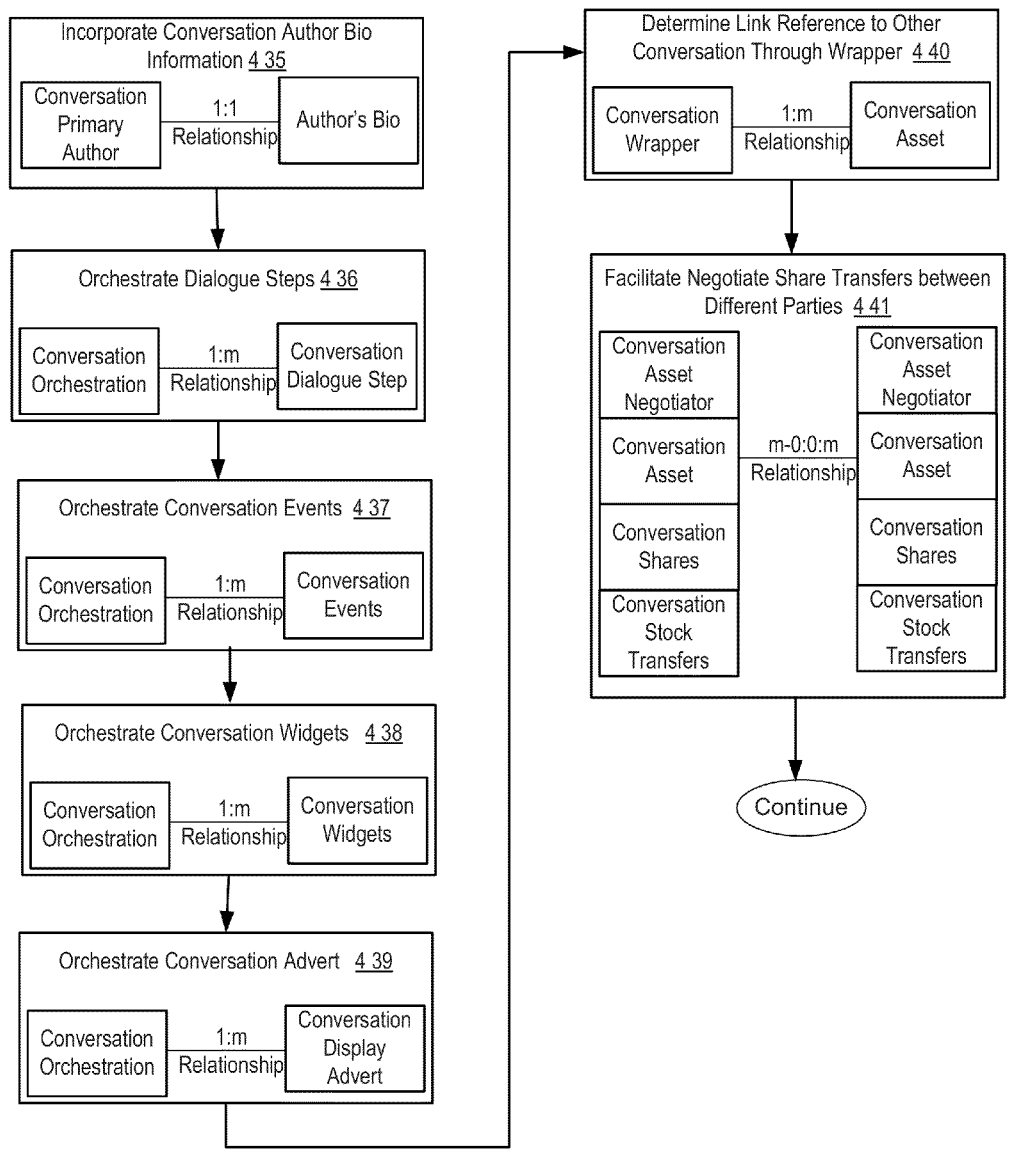

In one implementation, the AI agent may generate conversation assets by creating a wrapper encapsulating the conversation scripts with the consumer, as further illustrated in FIGS. 4B-4D. For example, in one implementation, the AI agent may convert one or more textual conversation scripts into a XML file, with metadata of the conversation scripts, such as, but not limited to ownership information, authorship information, and/or the like. In one implementation, the AI agent may associate information such as the software implementation packages, operating system information, hardware abstraction information, with the generated conversation assets to generate AI entity assets 310, as further illustrated in FIG. 5A-5C. In an alternative implementation, the conversation assets and AI entity assets may be generated at the DCM-Platform.

Within implementations, the DCM-Platform may receive information of the generated conversation assets and AI entity assets and monetize the assets 313,315. For example, in one implementation, the DCM-Platform may receive pricing information from the owner of the assets, e.g., the AI agents, etc., and price the assets accordingly.

In one implementation, the DCM-Platform may group AI entity assets to generate portfolio assets 318, e.g., by combining AI entity assets based on related conversation topics, related AI entity types, and/or the like. The generated portfolio assets may be monetized 320 for exchange, and/or grouped to generate exchange assets 325. In one implementation, the DCM-Platform may present the generated asset wrappers, including the conversation assets, AI entity assets, portfolio assets and/or exchange assets to a financial trading platform for trade transactions 345. In one implementation, the DCM-Platform may obtain pricing information of the virtual assets on the market 327, and generate a conversation index 328 based on the supply-demand market characteristics. For example, conversation assets may be priced differently based on its content, topics, volume, client demands, and/or the like.

In one implementation, the DCM-Platform may adjust the conversation monetization via monitoring the conversation index 330 in a loop 335. For example, the DCM-Platform may feedback the market prices of conversation assets to an AI agent, which is engaged in a conversation with a consumer and may determine a dollar value associated with a dialogue step. For example, if the market information indicates conversation assets with regard to consumer preferences over "colors of hair highlights" are highly demanded, then during the conversation, a consumer dialogue line "I like red hair highlights" may be priced with a higher dollar value.

FIG. 4A provides a block diagram illustrating monetizing digital assets between different entities within embodiments of the DCM-Platform. Within embodiments, digital asset owners, such as an AI agent, an advertising company which employs AI agents for advertising services, and/or the like, may monetize their virtual assets to generate revenues by determining and selling stock shares to investors.

For example, in one implementation, the DCM-Platform may determine a common denominator for the exchange of value relates to the establishment of a conversation asset, e.g., a dollar value associated with a dialogue script, a dialogue action/line, etc. In one implementation, the DCM-Platform may facilitate initiation of a conversation asset and the exchange of value between the conversation asset owner 408(*a*), conversation script author(s) 401(*a*), and conversation asset negotiator(s) 405(*a*), including changes over time. Within implementations, the conversation script author(s) 401(*a*) may provide conversation scripts 404(*a*) to the conversation asset owner(s) 408(*a*), and the asset owner may then allocate conversation asset shares for negotiation 406(*a*), while the conversation asset negotiator 405(*a*) may negotiate the conversation stock transfers 407(*a*) via the DCM-Platform 120 to an investor 144. The example initiation of conversation assets is further illustrated in FIGS. 4B-4D.

Figure 5A:
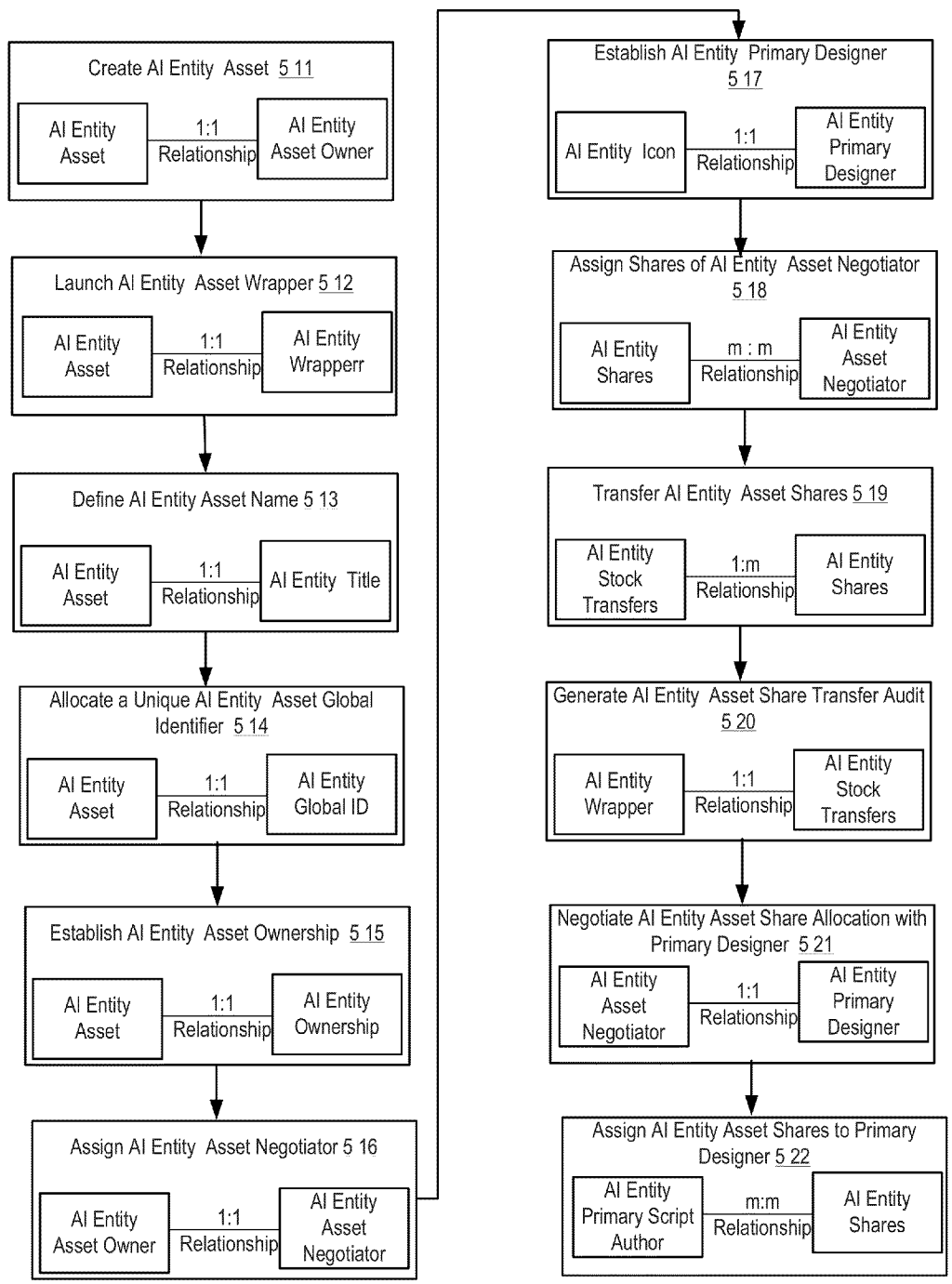
FIG. 5A-5C show diagrams illustrating monetizing a conversation AI entity asset within embodiments of the DCM-Platform.
Figure 5B:
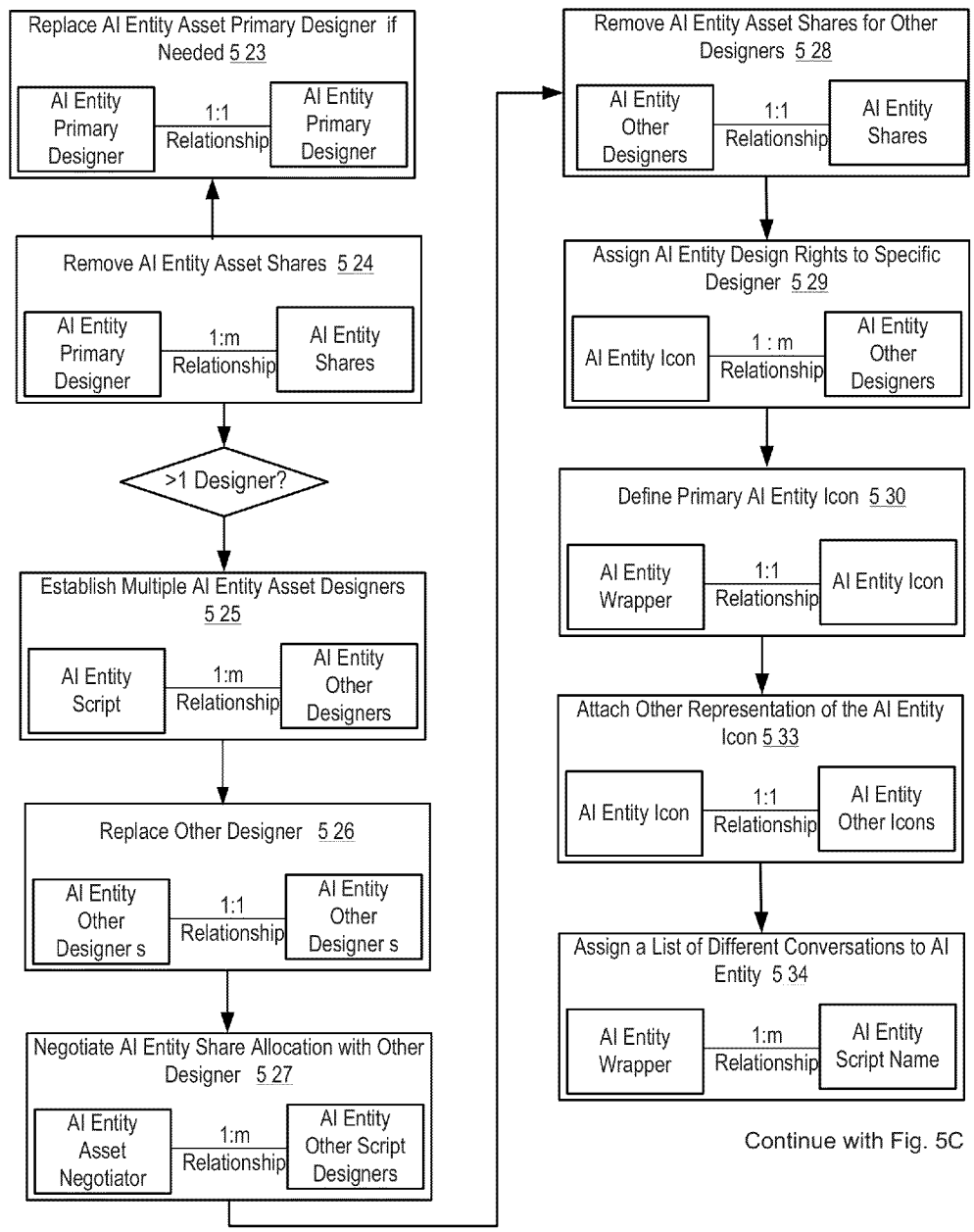
Figure 5C:
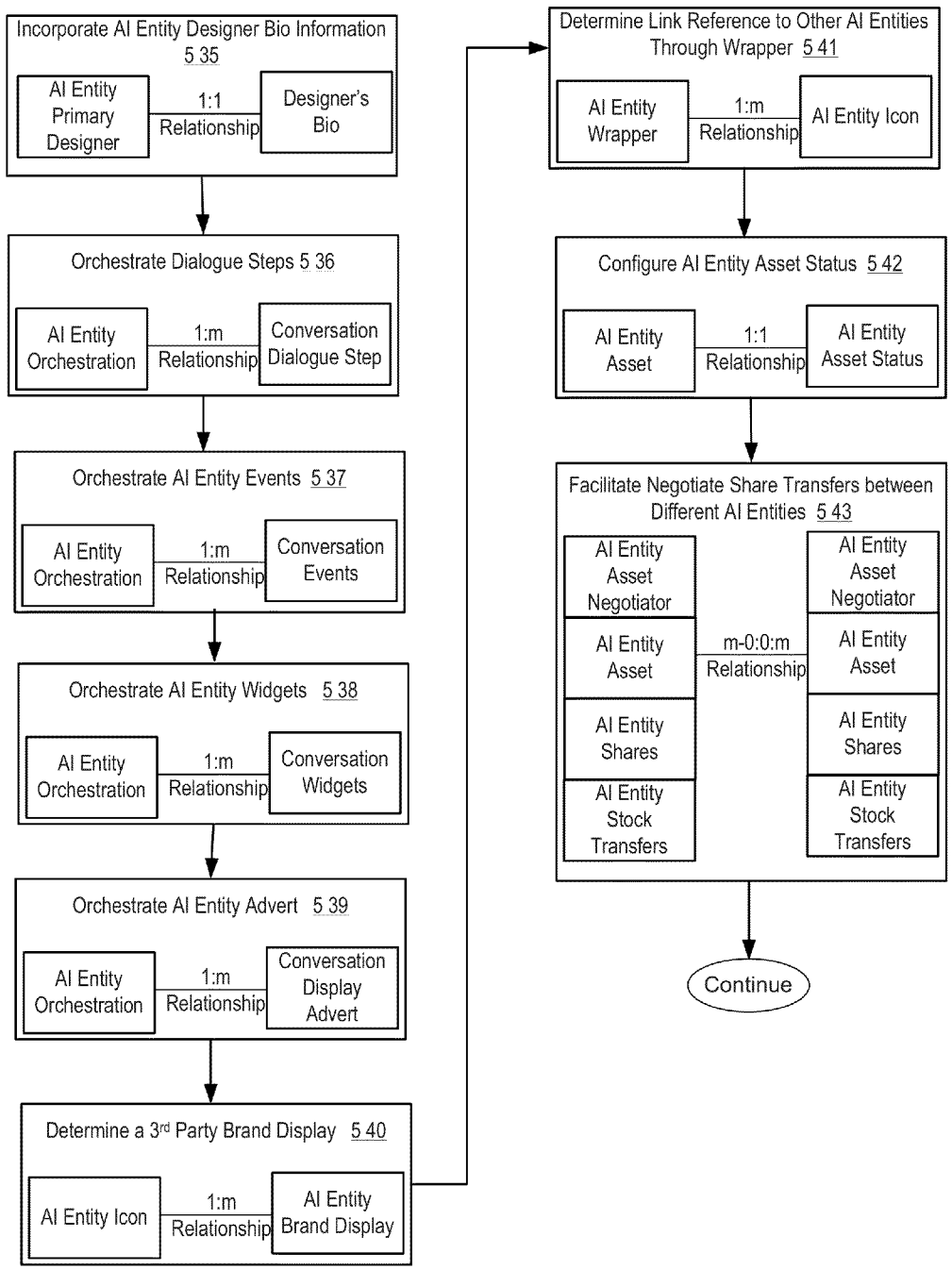

For another example, as further illustrated in FIGS. 5A-5C, the DCM-Platform may facilitate initiation of an AI entity asset and the exchange of value between the AI entity asset owner 408(*b*), AI entity designer(s) 401(*b*), and AI entity asset negotiator(s) 405(*b*), including changes over time. Within implementations, the AI entity designers 401(*b*) may provide AI entity icons 402(*b*) to the AI entity asset owner(s) 408(*b*), and the asset owner may then allocate AI asset shares for negotiation 406(*b*), while the AI entity asset negotiator 405(*a*) may negotiate the AI entity stock transfers 407(*b*) via the DCM-Platform 120 to an investor 144.

Figure 6A:
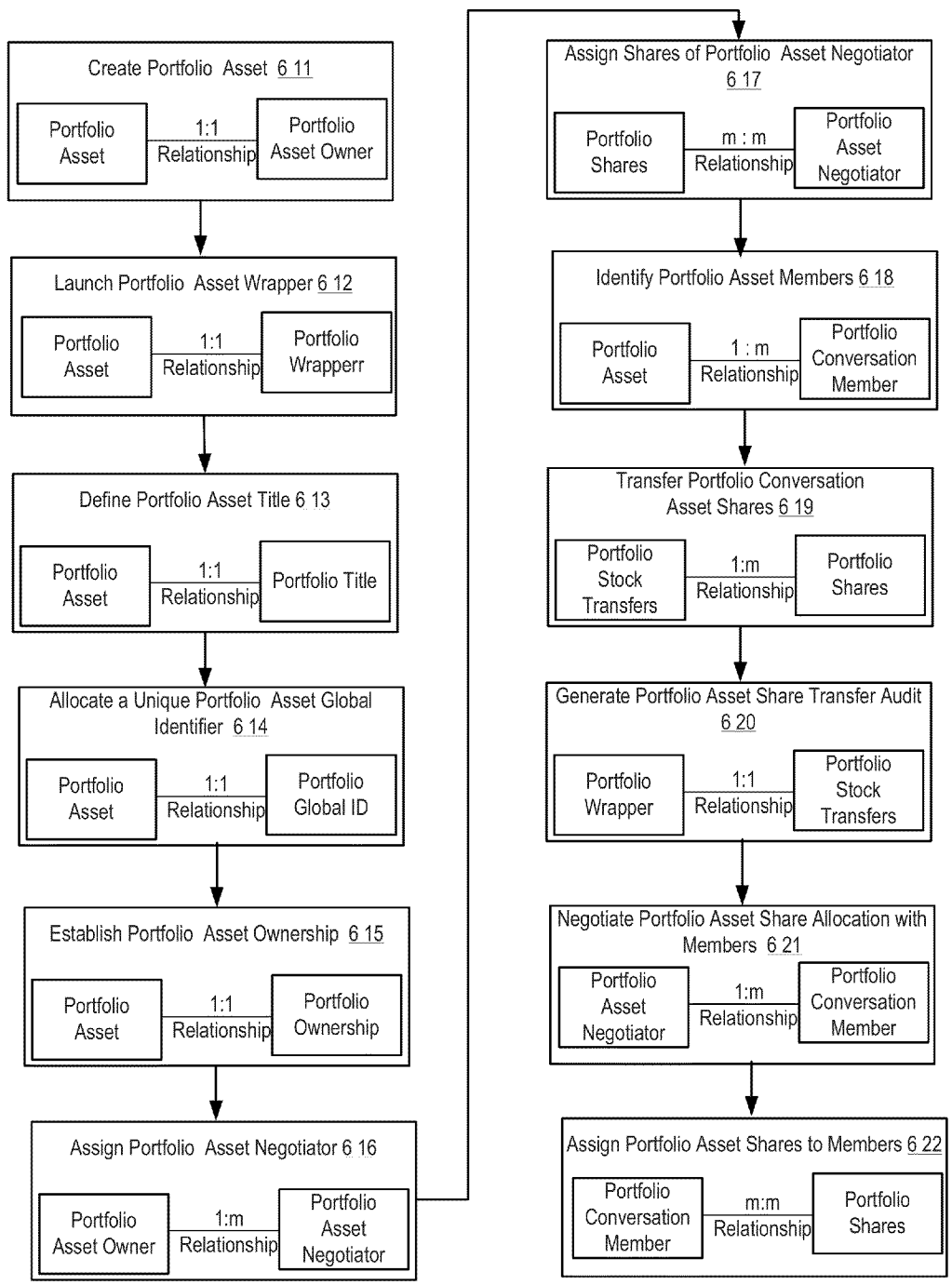
FIG. 6A-6C show diagrams illustrating monetizing a portfolio asset within embodiments of the DCM-Platform.
Figure 6B:
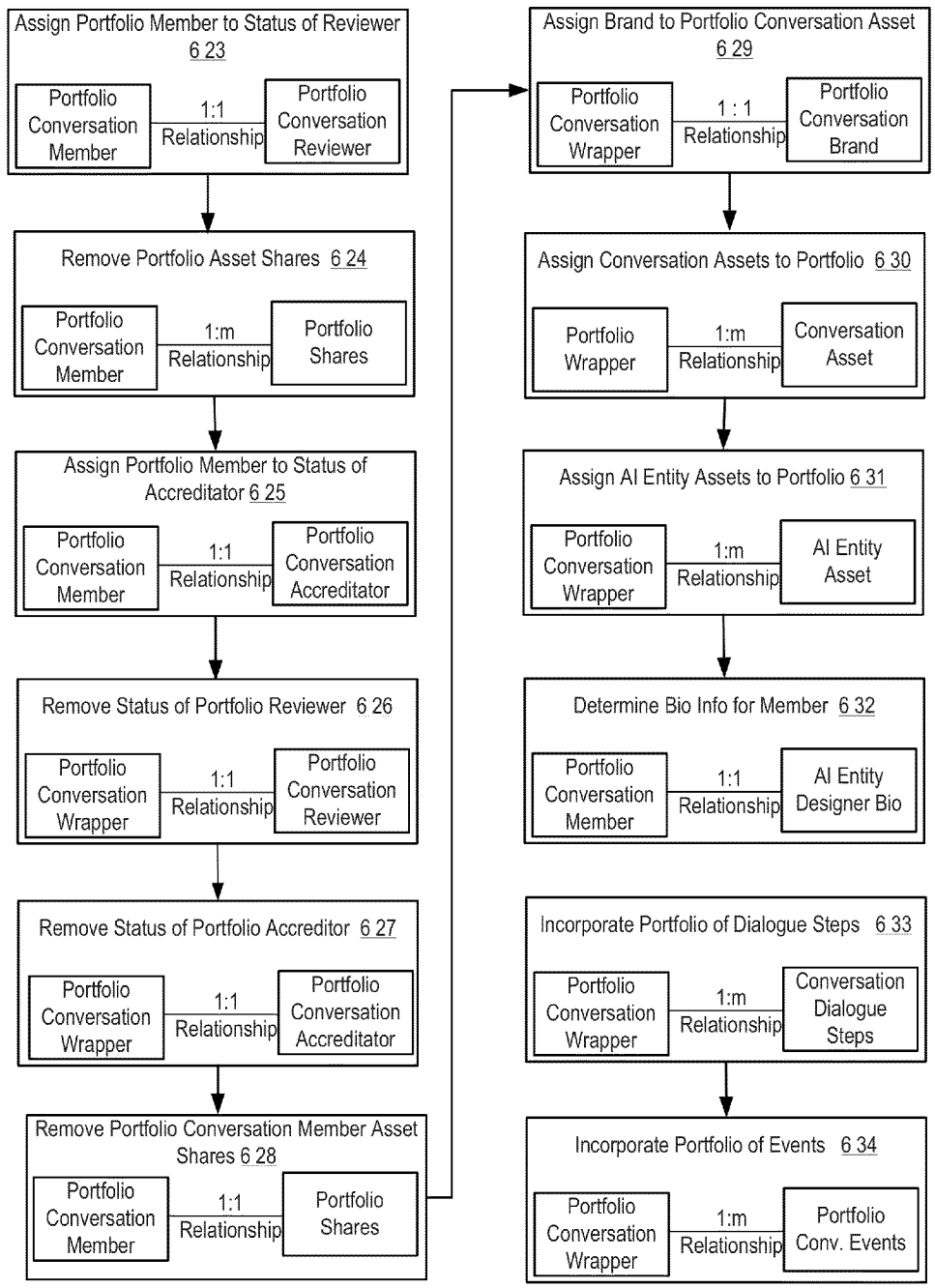
Figure 6C:
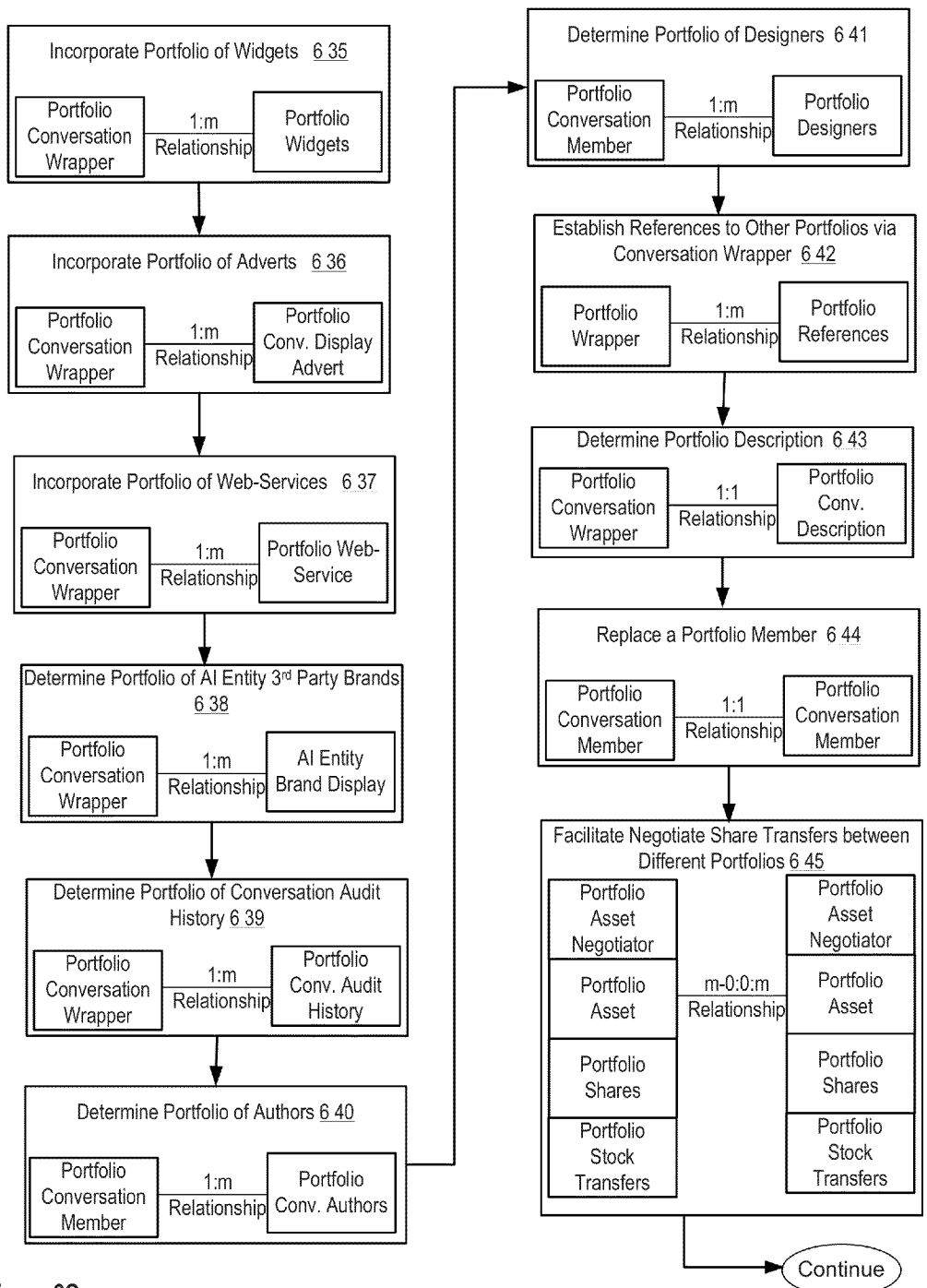
Figure 7A:
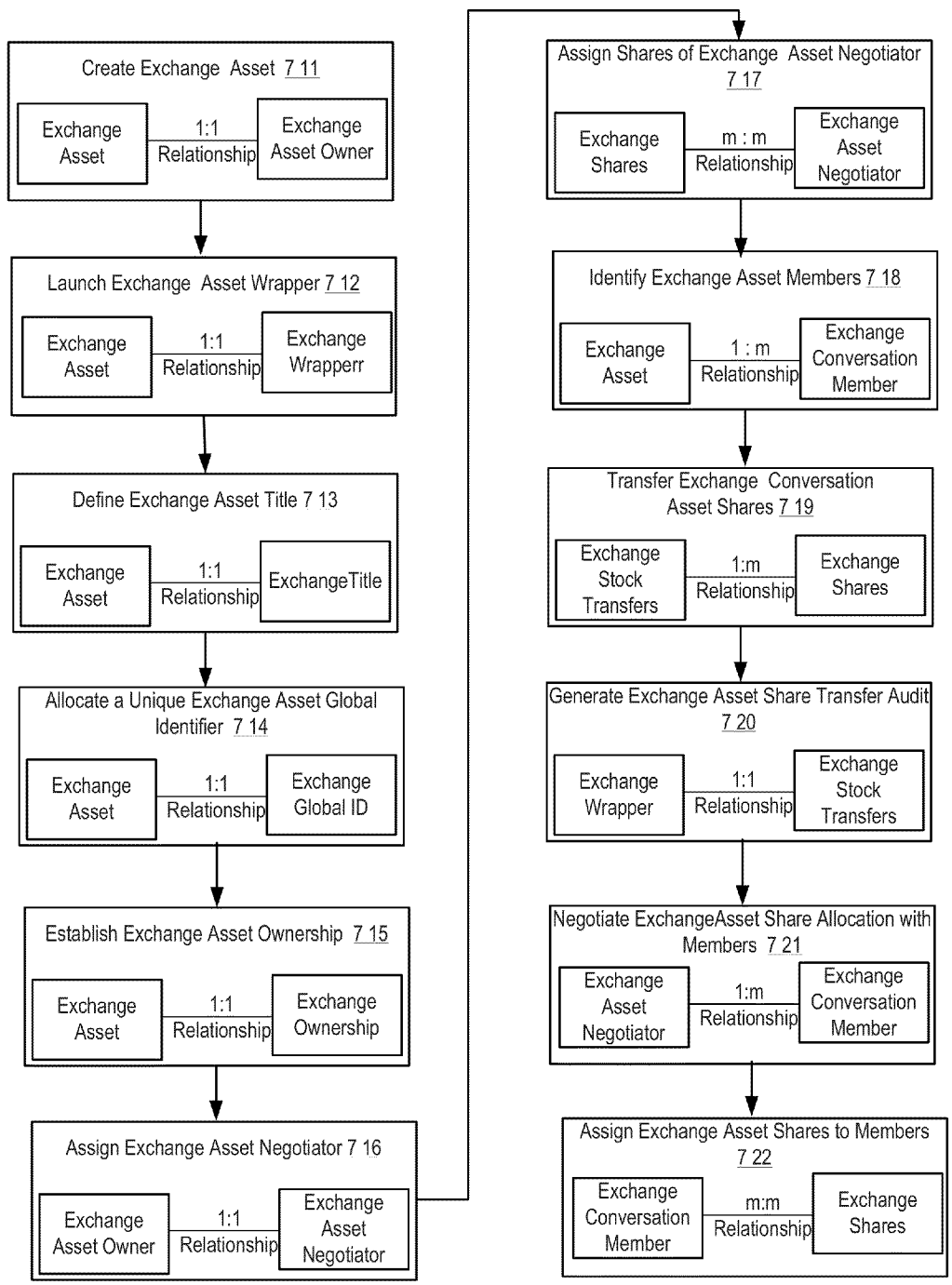
FIG. 7A-7D show diagrams illustrating monetizing an exchange asset within embodiments of the DCM-Platform.
Figure 7B:
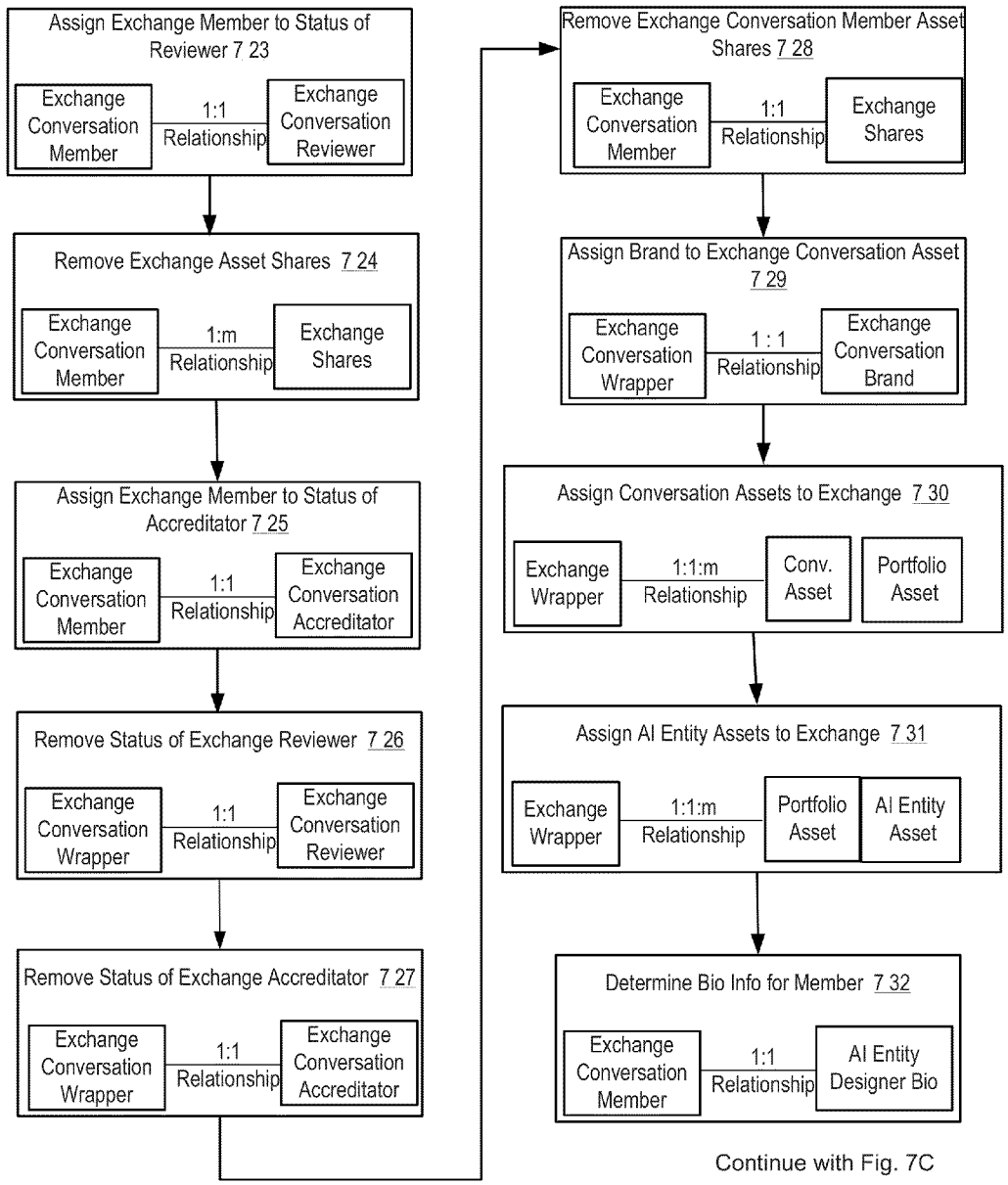
Figure 7C:
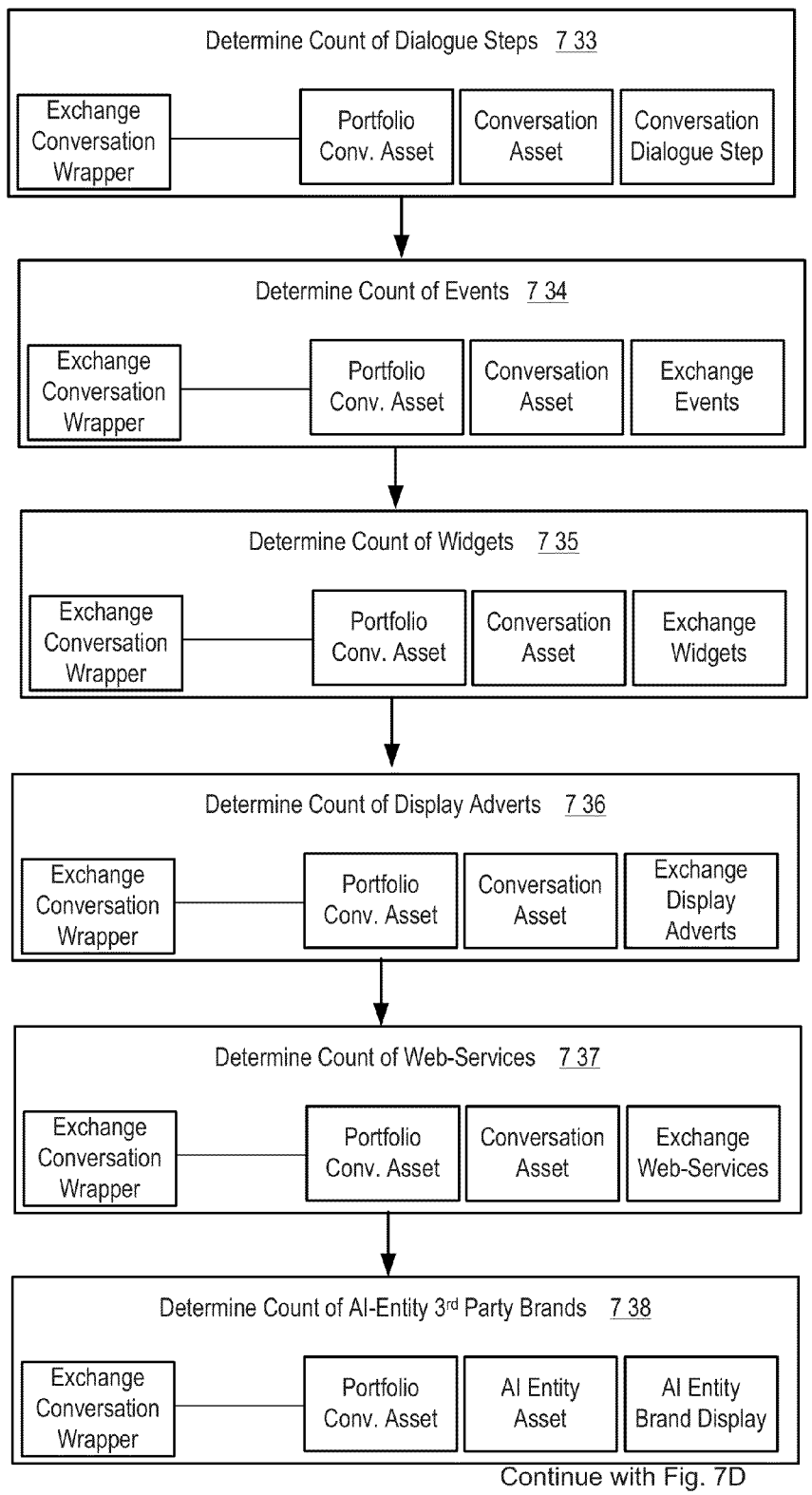
Figure 7D:
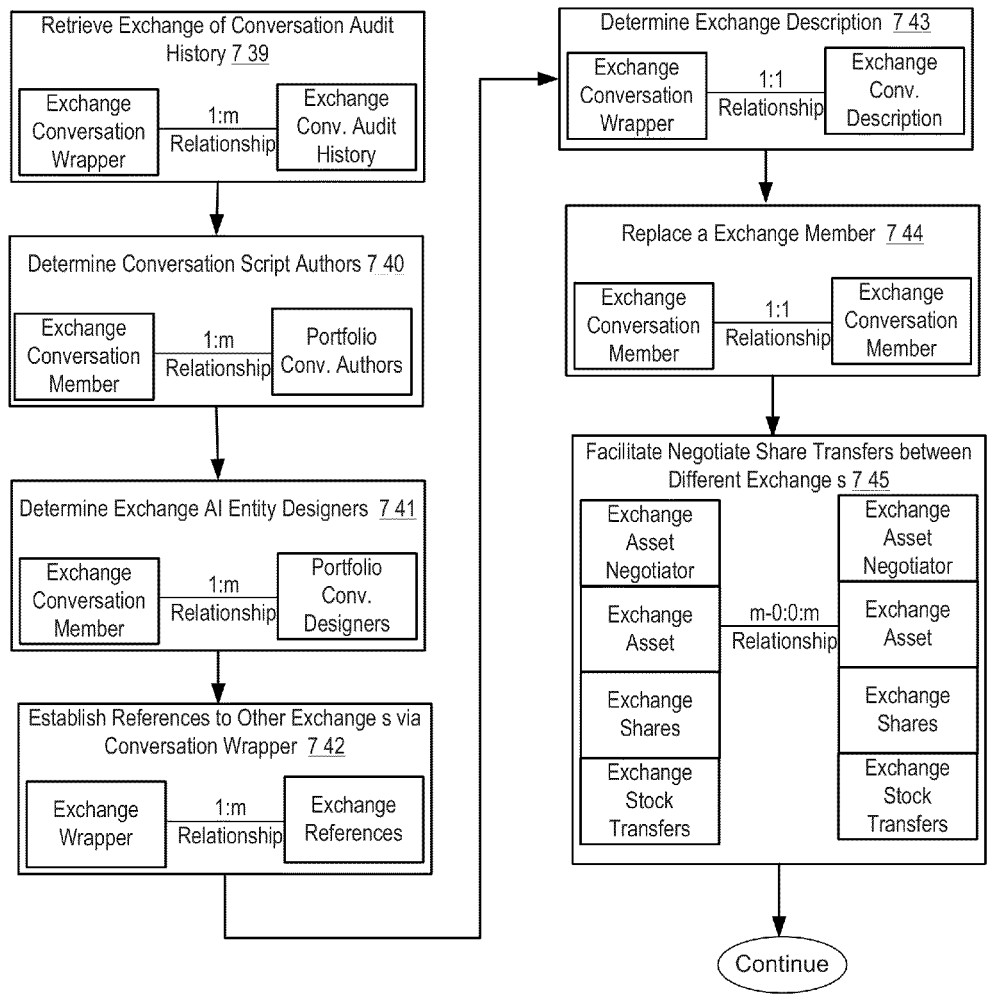

For another example, as further illustrated in FIGS. 6A-6C, the DCM-Platform may facilitate initiation of a portfolio asset and the exchange of value between the portfolio asset owner 408(*c*), portfolio script author(s) 401(*c*), and portfolio asset negotiator(s) 405(*c*), including changes over time. Within implementations, the portfolio script author(s) 401(*c*) may provide portfolio scripts 404(*c*) to the portfolio asset owner(s) 408(*c*), and the asset owner may then allocate portfolio asset shares for negotiation 406(*c*), while the portfolio asset negotiator 405(*c*) may negotiate the portfolio stock transfers 407(*a*) via the DCM-Platform 120 to an investor 144.

For another example, as further illustrated in FIGS. 7A-7D, the DCM-Platform may facilitate initiation of a exchange asset and the exchange of value between the exchange asset owner 408(*d*), exchange script author(s) 401(*d*), and exchange asset negotiator(s) 405(*d*), including changes over time. Within implementations, the exchange script author(s) 401(*d*) may provide exchange scripts 404(*d*) to the exchange asset owner(s) 408(*d*), and the asset owner may then allocate exchange asset shares for negotiation 406(*d*), while the exchange asset negotiator 405(*d*) may negotiate the exchange stock transfers 407(*d*) via the DCM-Platform 120 to an investor 144.

FIGS. 4B-4D provide logic flow diagrams illustrating example initiation of a conversation asset within embodiments of the DCM-Platform.

In one embodiment, the DCM-Platform or the AI agent may create a conversation asset based on the captured conversation script. Within implementations, conversation assets may be created and developed 411 by the conversation asset owner, e.g., an AI agent, an advertising company, etc., which may be a 1:1 relationship to the conversation asset. The conversation asset owner may be an individual or an organization or a named asset portfolio, and the ownership may be transferred to another person, organization or to a named portfolio. In one implementation, an individual name may be required as the authoritative person to establish. Once the conversation asset owner identity and contact details have been established that person may create a conversation wrapper to establish the conversation asset.

In one embodiment, upon establishment of the conversation asset ownership, the DCM-Platform may launch a conversation asset wrapper, which may be a data package comprising the conversation asset and trade information with regard to the conversation asset, which may have a 1:1 relationship to the conversation asset. Within embodiments, a conversation wrapper may be governed by a set of methods covering all the different parts and interrelationships that are the basis for algorithmic trading for the creation of value of a conversation asset. For example, in one implementation, an exemplar XML implementation of a conversation asset wrapper is discussed in FIG. 2B.

In one embodiment, the DCM-Platform may define a conversation asset title 413. The conversation wrapper may contain a title of the conversation asset, which is a 1:1 relationship to the conversation asset. For example, the conversation asset owner may be responsible for the conversation title.

In one embodiment, the DCM-Platform may allocate a unique conversation asset global identifier 414 to the conversation wrapper, which is a 1:1 relationship to the conversation asset. The conversation asset global identifier may remain unchanged for the lifetime, including archive, of the conversational asset even if constitution, ownership of the asset changes.

In one embodiment, once the conversation asset global identity has been assigned, the conversation asset status filed in the conversation wrapper may be set 416. For example, if the conversation asset status is set to be "draft," which is a 1:1 relationship to the conversation asset, the "draft" status may indicate the conversation asset is not ready for use in a digital conversation; once the conversation asset status is set to be "production" then the digital conversations are ready to commence.

In one embodiment, the DCM-Platform may update the conversation asset wrapper with a description of the conversation asset, which is a 1:1 relationship. For example, the conversation asset owner may compile and edit the conversation description. the person responsible for the conversation description is the conversation asset owner.

In one embodiment, once the conversation description has been established, the conversation asset ownership may be assigned to the conversation asset owner 417, which is a 1:1 relationship between conversation asset and the conversation asset owner. In one implementation, the establishment of ownership of the conversation asset may determine that the conversation asset having one share, which is fully owned by the conversation asset owner. Alternative implementations of determining shares are further illustrated in FIGS. 8A-8B.

In one embodiment, the conversation wrapper references the primary script author for each conversation script 418, which is a 1:1 relationship. For example, the primary script may be the first component used by an AI entity for digital conversation.

In one implementation, if the conversation asset owner is the author of this primary script then the primary script author identity and contact details are treated as the same. Otherwise, in alternative implementations, if the conversation asset owner is not the same as the primary script owner then the conversation asset owner may arrange for the following: define the primary script author identification and contact details; ascertain whether the primary script author will be given partial ownership of the conversation asset.

In one embodiment, upon assigning a conversation asset negotiator, the conversation asset negotiator may negotiate with the primary script author a percentage of shares to be sold and once determined the asset shares are assigned. The allocation may not be a whole unit and therefore the assignment of conversation shares can be fractional.

In one embodiment, if both parties agree on the conversation shares then a conversation stock transfer is undertaken, where an audit trail of the transaction is maintained as part of the conversation asset wrapper. In one embodiment, a primary script author may be replaced by another primary script author 425 and an audit trial is maintained of past primary script authors with the conversation wrapper. To change a primary script author, the authority may be vested with the person with the conversation asset negotiator. If there was a prior agreement with the current primary script author to release their conversation shares in the case that they loose their primary script author status then the share allocation is removed. If there was no prior agreement the current primary script author may agree to release their shares in consultation with the conversation asset negotiator. In one implementation, the shares withdrawn become part of the audit trail within the conversation asset wrapper. The primary script author may wish to retain all or part of their shares. The conversation asset negotiator may obtain prior agreement with the conversation asset owner to increase the number of conversation shares.

In one embodiment, the conversation asset owner may ascertain whether a conversation asset negotiator is needed, e.g., a third party to negotiate during a transaction on their behalf. In an alternative embodiment, the conversation asset owner may be assigned the status of conversation asset negotiator 419, which is a 1:1 relationship.

In alternative implementations, the asset owner may define conversation asset negotiator identification and contact details. For example, if the conversation asset owner wishes to assign proportional ownership to the conversation asset negotiator then a percentage is determined and the asset shares are assigned 420. The allocation may not be a whole unit and therefore the assignment of shares can be fractional, e.g., a m:m relationship between the conversation asset shares and the conversation asset negotiator.

In one embodiment, upon negotiation the conversation asset share allocation with the primary script author 423, and both parties agree the conversation shares then a conversation stock transfer is undertaken 421, where an audit trail of the transaction is maintained as part of the conversation asset wrapper. When the stock transfer is finished, the conversation asset shares are removed from the primary script author 426.

In one embodiment, the DCM-Platform may determine whether there are more than 1 primary authors. If there are other script authors, e.g., a 1:m relationship between the conversation script and the conversation authors 427, the conversation wrapper references the other authors for each conversation script. In one implementation, if the conversation asset owner is an other script author, the identity and contact details are treated as the same. If the conversation asset owner is not the same as one of the other script owners or if there are other script authors, then the conversation asset owner may define for each other script author identification and contact details; ascertain for each one, whether the other script author will be given partial ownership of the conversation asset.

In one embodiment, the conversation asset negotiator negotiates with the other script author 429 a percentage and once determined the asset shares are assigned and removed from other authors 430. The allocation does not need to be a whole unit and therefore the assignment of conversation shares can be fractional. In one embodiment, once both parties agree the conversation shares then a conversation stock transfer is undertaken, where an audit trail of the transaction is maintained as part of the conversation asset wrapper.

In one embodiment, conversation script rights may be assigned to other authors 431. An other script author may be replaced by another other script author and an audit trail is maintained of past other script authors with the conversation wrapper. To change an other script author the authority is vested with the person with the conversation asset negotiator. if there was a prior agreement with the current other script author to release their conversation shares in the case that they loose their other script author status then the share allocation is removed. if there was no prior agreement the current other script author may agree to release their shares in consultation with the conversation asset negotiator. The shares withdrawn become part of the audit trail within the conversation asset wrapper.

In one implementation, the other script author may desire to retain all or part of their shares. The conversation asset negotiator may obtain prior agreement with the conversation asset owner to increase the number of conversation shares. In an alternative embodiment, the other script authors may not be allowed to change a script unless they have been given temporary authority by the primary script author. The assignment may be time sensitive assignment and this status may be removed. In one implementation, only one script author is allowed at a moment in time to change the script.

In one embodiment, the conversation wrapper references the primary conversation script 432, which is a 1:1 relationship wherein the primary conversation script contains identification information such as name and version, and/or the like.

In one embodiment, the primary conversation script may link with other conversation scripts 433, which is a 1:m relationship and in turn each other conversation script component may link with other conversation scripts. For example, a conversation script wrapper may reference a specific link to another conversation script that is related to similar topics 434. These networks of conversation links are referenced from the conversation wrapper with associated creation details. The conversation script is produced and changed by the primary script author or as already mentioned an other script author that has been assigned the temporary status to perform script changes. Each conversation link is to a named conversation script, which is a 1:1 relationship. Each conversation script is a conversation asset and therefore each has its own conversation asset owner wrappers. In one implementation, the authorship amongst different conversation assets is likely to be different. The conversation assets may be triggered by conversation links that potentially increase the value of the conversation asset, which is described within the conversation wrapper.

In one embodiment, the conversation wrapper references for each script author their bio in context of the conversation script 435, which is a 1:1 relationship.

In one embodiment, the conversation may orchestrate one ore more dialogue steps 436; a conversation step may orchestrate one or more activities, which is a 1:m relationship. Within implementations, the conversation orchestration handles three primary activities, which are events, widgets and adverts.

In one implementation, the conversational orchestration may trigger one or more events 437, which is a 1:m relationship. These conversation events are in context to the conversation step and thus cover things such as an AI entity movement to the trigger of any digital medium such as an audio, picture, video or indeed any digital medium. Those digital mediums triggered by conversation assets that potentially increase the value of the conversation asset may be described within the conversation wrapper. For example, a conversational event may comprise, but not limited to transmission of a multimedia file (e.g., an audio, video, etc.) in a text based dialogue, consumer's election to switch AI agents during a conversation, and/or the like.

In one embodiment, the conversational orchestration may trigger one or more widgets 438, which is a 1:m relationship. These conversation widgets are in context to the conversation step and thus cover any type of function that may be performed by a widget such as a diary appointment to a transaction, e.g., a scheduled transfer of stock shares. Those conversation widgets triggered by conversation orchestration that potentially increase the value of the conversation asset may be described within the conversation wrapper.

In one embodiment, the conversational orchestration may trigger one or more adverts 439, which is a 1:m relationship. The advert may cover different forms such as a pictorial or video. These conversation adverts are in context to the conversation step and are governed by the methods for exchanging value for advertisements. These conversation adverts may be undertaken in conjunction with conversation events and conversation widgets. Those conversation adverts triggered by conversation orchestration that potentially increase the value of the conversation asset may be described within the conversation wrapper. For example, the link to the conversational advert may be date and time sensitive and thus enabling different placements for different contexts.

In one embodiment, the conversation wrapper may be used to recommend other conversation assets. For example, the conversation wrapper may determine link references to other conversation through the file wrapper 440, which may further involve the trading of conversation asset shares or the assignment of conversation asset shares new shares between the respective conversation asset negotiators 441.

FIGS. 5A-5C provide logic flow diagrams illustrating monetizing an AI entity asset within embodiments of the DCM-platform. In one embodiment, the AI entity is a logical and/or physical form of artificial intelligence that is used as the conduit of a digital conversation, e.g., it may be an avatar whereas in a physical form it may be say a household robot, an autodialing system, a virtual identity on a messenger/social media platform, etc. In one implementation, in its logical form a digital conversation is used for dialogue but may also govern movement of the AI entity or instruct the AI entity to perform a task.

Within implementations, the AI entity asset may be treated in a similar way to a conversation asset. In one embodiment, the conversation AI entity asset is created and developed by the conversation AI entity asset owner, which is a 1:1 relationship 511. The conversation AI entity asset owner may be an individual or an organization or a named portfolio, however, if the latter two then an individual name may be required as the authoritative person. The ownership may change to another person, organization or to a named portfolio. Once the conversation AI entity asset owner identity and contact details have been established that person may create a conversation AI entity wrapper to establish the conversation AI entity asset.

In one embodiment, each conversation AI entity asset may launch an AI entity asset wrapper 512, which has a 1:1 relationship. In one implementation, a conversation AI entity wrapper is governed by a set of methods covering all the different parts and interrelationships that are the basis for algorithmic trading for the creation of value of a conversation AI entity asset, which may be traded as a tangible and measurable financial instrument.

In one embodiment, the conversation AI entity wrapper may contain a name of the conversation AI entity asset 513, which is a 1:1 relationship. For example, the conversation AI entity asset owner may be responsible for the conversation AI entity name.

In one embodiment, once the conversation name has been established, a unique global identifier is assigned to the conversation AI entity wrapper 514, which is a 1:1 relationship. The conversation AI entity asset global identifier may remain unchanged for the lifetime, including archive, of the conversational AI entity asset even if the constitution of the asset changes.

In one embodiment, once the AI entity asset global identifier has been established, the conversation AI entity asset ownership may be fully assigned to the conversation AI entity asset owner 515. Within implementations, there may be a 1:1 relationship between conversation AI entity asset and the conversation AI entity asset owner, which may indicate that the conversation AI entity asset has one share, fully owned by the conversation AI entity asset owner.

In one embodiment, the conversation AI entity asset owner may ascertain whether they wish someone else to negotiate on their behalf. In one implementation, the conversation AI entity asset owner is assigned the status of conversation AI entity asset negotiator 516, which is a 1:1 relationship.

In alternative implementations, the conversation AI entity asset may define conversation AI entity asset negotiator identification and contact details 521. In one embodiment, if the conversation AI entity asset owner wishes to assign proportional ownership to the conversation AI entity asset negotiator, then a percentage is determined and the conversation AI entity shares are assigned 522. The allocation may not be a whole unit and therefore the assignment of shares may be fractional.

In one embodiment, once both parties agree the conversation AI entity shares then a conversation AI entity stock transfer is undertaken, where an audit trail of the transaction is maintained as part of the conversation AI entity wrapper.

In one embodiment, the conversation AI entity wrapper references the primary AI entity designer for each AI entity design 517, which is a 1:1 relationship. If the conversation AI entity asset owner is the main designer then the primary AI entity designer identity and contact details are treated as the same. If the conversation AI entity asset owner is not the same as the primary AI entity designer then the conversation AI entity asset owner may define the primary AI entity designer identification and contact details; and ascertain whether the primary AI entity designer will be given partial ownership of the conversation AI entity asset. if so, the conversation AI entity asset negotiator may negotiate with the primary AI entity designer a percentage and once determined the AI entity shares are assigned 518. the allocation may not be a whole unit and therefore the assignment of AI entity shares may be fractional.

In one embodiment, once both parties agree the AI entity shares then a conversation AI entity stock transfer is undertaken 519, where an audit trail of the transaction is maintained as part of the conversation AI entity asset wrapper 520.

In one embodiment, a primary AI entity designer may be replaced by another primary AI entity designer 523 and an audit trial is maintained of past primary AI entity designers with the conversation AI entity wrapper. To change a primary AI entity designer, the authority may be vested with the person with the conversation AI entity asset negotiator status. if there was a prior agreement with the current primary AI entity designer to release their conversation AI entity shares in case that they lose their primary AI entity designer status, then the share allocation is removed 524. if there was no prior agreement, the current primary AI entity designer may agree to release their shares in consultation with the conversation AI entity asset negotiator. The shares withdrawn become part of the audit trail within the conversation AI entity asset wrapper. The primary AI entity designer may wish to retain all or part of their shares. The conversation AI entity asset negotiator may obtain prior agreement with the conversation AI entity asset owner to increase the number of conversation AI entity shares.

In one embodiment, there may be more than one AI entity designer 525, which is a 1:m relationship. Within implementations, the conversation AI entity wrapper references the other designers for each separate design for the same AI entity, which is a 1:m relationship. The conversation AI entity asset owner may be an other AI entity designers and if so the identity and contact details are treated as the same. If the conversation AI entity asset owner is not the same as one of the other AI entity designers or if there is a need for one other AI entity designer then the conversation AI, entity asset owner may: define for each other AI entity designer identification and contact details; ascertain for each one, whether the other AI entity designer will be given partial ownership of the conversation AI entity asset. if so, the conversation AI entity asset negotiator may negotiates with the other AI entity designer 527 a percentage and once determined the conversation AI entity shares are assigned 529, and the AI entity asset shares are removed 528. The allocation may not be a whole unit and therefore the assignment of conversation AI entity shares may be fractional.

In one embodiment, once both parties agree the conversation AI entity shares then a conversation stock transfer is undertaken, where an audit trail of the transaction is maintained as part of the conversation AI entity asset wrapper.

In one embodiment, an other AI entity designer may be replaced by another other AI entity designer and an audit trial is maintained of past other AI entity designer with the conversation AI entity wrapper. To change an other AI entity designer the authority may be vested with the person with the conversation AI entity asset negotiator. If there was a prior agreement with the current other AI entity designer to release their conversation AI entity shares in the case that they loose their other AI entity designer status then the share allocation is removed. If there was no prior agreement the current other AI entity designer may agree to release their shares in consultation with the conversation AI entity asset negotiator. The shares withdrawn become part of the audit trail within the conversation AI entity asset wrapper. The other AI entity designer may wish to retain all or part of their shares. The conversation AI entity asset negotiator may obtain prior agreement with the conversation AI entity asset owner to increase the number of conversation shares.

In one embodiment, the other AI entity designers are not allowed to change a design unless they have been given temporary authority by the primary AI entity designer. This may be a time sensitive assignment and this status may be removed. In one implementation, only one AI entity designer is allowed at a moment in time to change the design.

In one embodiment, the conversation AI entity wrapper references the primary AI entity icon 530 defined by AI entity designers, which is a 1:1 relationship. This primary AI entity icon contains identification information such as name and version. Within implementations, the primary AI entity icon may have a primary AI entity design and may have any number of other AI entity icon designers.

In one embodiment, the AI entity icon references within the conversation AI entity wrapper other AI entity icons 533, which is a 1:m relationship. For example, different representations may be needed for different devices within the AI entity. Each variation contains identification information such as name and version.

In one embodiment, the conversation AI entity icon orchestrates specific conversation scripts, including a list of different conversations to the AI entity 534, which is a 1:m relationship, which means the same AI entity icon may engage in a range of different scripted digital conversations. Each orchestrated scripted conversation is uniquely identified, which includes the name and descriptions. These conversation scripts may link with other components of conversation script, which is a 1:m relationship and in turn each other conversation script component may link with other conversation script components. These networks of conversation links are referenced from the conversation wrapper with associated creation details. Within implementations, some AI entities may become labeled as "good" conversation and thus increase the value of the AI entity itself as it develops brand value. The conversation AI entity wrapper may contain a list of the conversation scripts associated with the AI entity 534.

In one embodiment, the conversation wrapper references for each AI Entity Designer their bio in context of the AI Entity Icon 535, which is a 1:1 relationship.

In one embodiment, an AI Entity may orchestrate activities based on dialogue-steps within digital conversations 536, which is a 1:m relationship. The AI Entity orchestration handles three primary activities, which are events, widgets and adverts.

In one embodiment, the AI Entity orchestration may trigger one or more events 537, which is a 1:m relationship. These conversation AI entity events are in context to the conversation step and thus cover things such as an AI entity movement to the trigger of any digital medium such as an audio, picture, video or indeed any digital medium. Those digital mediums triggered by AI entities potentially increase the value of the conversation AI entity asset may be described within the conversation AI entity wrapper.

In one embodiment, the AI entity orchestration may trigger one or more widgets 538, which is a 1:m relationship[22,28]. These conversation AI entity widgets are in context to the conversation step and thus cover any type of function that may be performed by a widget such as a diary appointment to a transaction. Those widgets triggered by AI entity orchestration that potentially increase the value of the conversation AI entity asset may be described within the conversation AI entity wrapper.

In one embodiment, the AI entity orchestration may trigger one or more adverts 539, which is a 1:m relationship. The advert may cover different forms such as a pictorial or video. these conversation adverts are in context to the conversation step and are governed by the methods for exchanging value for advertisements. These conversation AI entity adverts may be undertaken in conjunction with conversation AI entity events and conversation AI entity widgets. Those conversation AI entity widgets triggered by AI entity orchestration that potentially increase the value of the conversation AI entity asset can be described within the conversation AI entity wrapper. the link to the conversational AI entity advert may be date and time sensitive and thus enabling different placements for different contexts. The link to the conversational AI entity advert may be data sensitive and thus enabling different placements for different contexts.

In one embodiment, the AI entity icon may contain a $3^{rd}$ party brand or brands as part of its inventory 540, this is a 1:m relationship. The value of this brand displayed is influenced by a number of factors, including the volume of dialogue steps. This AI entity brand display may be date and time sensitive and thus enabling different placements for different contexts. The conversational AI entity brand display may be data sensitive and thus enabling different placements for different contexts.

In one embodiment, the conversation wrapper may be used to recommend other conversation AI entity asset, including link references to other AI entities through wrapper 541. This may involve the trading of conversation AI entity asset shares or the assignment of conversation AI entity asset shares new shares between the respective conversation AI entity asset negotiators.

In one embodiment, once the conversation AI entity asset global identity has been assigned, the conversation wrapper is mandated with the conversation AI entity asset status 542, e.g., set to "draft," which is a 1:1 relationship. The "draft" status may indicate the conversation AI entity asset is not ready for digital conversation interaction, while a "production" status may indicate the digital conversations through the AI entity icon are ready to commence.

In one embodiment, the DCM-Platform may facilitate negotiate share transfers between different AI entities 543 in a similar manner as discussed in FIGS. 5A-5C.

FIGS. 6A-6C provide logic flow diagrams illustrating monetizing a portfolio asset within embodiments of the DCM-Platform. In one embodiment, the portfolio conversation asset is the aggregation of conversation assets and AI entity assets that it has accredited, wherein a portfolio conversation asset's overall value will be determined by factors such as its brand and what it represents in terms of digital conversation. In one implementation, the portfolio conversation asset may be treated in a similar way to a conversation asset or as a conversation AI entity asset.

In one embodiment, the portfolio conversation asset is created and developed by the portfolio conversation asset owner 611, which is a 1:1 relationship. The portfolio conversation asset owner may be an individual or an organization, wherein the latter may require an individual name as the authoritative person. This ownership can change to another person, organization or to a named portfolio. Once the portfolio conversation asset owner identity and contact details have been established, the owner may create a portfolio conversation wrapper to establish the portfolio conversation asset.

In one embodiment, each portfolio conversation asset may launch a wrapper 612, which has a 1:1 relationship. A portfolio conversation wrapper is governed by a set of methods covering all the different parts and interrelationships that are the basis for algorithmic trading for the creation of value of a portfolio conversation asset. In one implementation, a portfolio conversation asset may be traded in digital form as a tangible and measurable financial instrument.

In one embodiment, the portfolio conversation wrapper may contain a title of the portfolio conversation asset 613, which is a 1:1 relationship. In one implementation, the asset owner may be responsible for the portfolio conversation title, which may be followed by a portfolio conversation asset description.

In one embodiment, once the portfolio conversation title has been established, a unique global identifier is assigned to the portfolio conversation wrapper 614, which is a 1:1 relationship. The portfolio conversation asset global identifier may remain unchanged for the lifetime, including archive, of the conversational portfolio conversation asset even if the constitution of the asset changes.

In one embodiment, once the portfolio conversation asset global identifier has been established, the portfolio conversation asset ownership is fully assigned to the portfolio conversation asset owner 615, with a 1:1 relationship between the portfolio conversation asset and the portfolio conversation asset owner, which may indicate the portfolio conversation asset has one share, fully owned by the portfolio conversation asset owner.

In one embodiment, the portfolio conversation asset owner may ascertain whether they wish someone else to negotiate on their behalf. If not, the portfolio conversation asset owner is assigned the status of portfolio conversation asset negotiator. Otherwise it may assign one or more other people to the status portfolio conversation asset negotiator 616, which is a 1:m relationship; in other words, a portfolio may consist of any number of portfolio conversation asset negotiators thus enabling the portfolio to grow to any size it wishes.

In one implementation, the portfolio asset owner may retain the right to be a portfolio conversation asset negotiator but also communicate with, and/or require participations of other portfolio conversation asset negotiators. To establish one or more other portfolio conversation asset negotiators, the owner may define portfolio conversation asset negotiator identification and contact details. The portfolio conversation asset negotiator may become a member of the portfolio conversation asset 618.

In one implementation, if the portfolio conversation asset owner wishes to assign proportional ownership to the portfolio conversation asset negotiator then a percentage is determined and the portfolio conversation shares are assigned 617. The allocation may not be a whole unit and therefore the assignment of shares can be fractional. Within implementations, once both parties agree the portfolio conversation shares then a portfolio conversation stock transfer is undertaken 619, where an audit trail of the transaction is maintained as part of the portfolio conversation wrapper 620.

In one embodiment, the portfolio conversation wrapper references the portfolio conversation member or members that cover the spectrum for each conversation asset or conversation AI entity asset, which is a 1:m relationship. The method for engaging new portfolio conversation members may be undertaken by the portfolio conversation asset negotiator. For example, the asset negotiator may define the portfolio conversation member identification and contact details; ascertain whether the portfolio conversation member will be given partial ownership of the portfolio conversation asset. if so, then in one embodiment, the portfolio conversation asset negotiator negotiates with the portfolio conversation member 621a percentage and once determined the portfolio conversation shares are assigned 622. The allocation may not a whole unit and therefore the assignment of portfolio conversation shares can be fractional.

In one embodiment, once both parties agree the portfolio conversation shares then a portfolio conversation stock transfer is undertaken, where an audit trail of the transaction is maintained as part of the portfolio conversation asset wrapper.

In one embodiment, a portfolio conversation member may be replaced by another portfolio conversation member 644 and an audit trail is maintained of past portfolio conversation members within the portfolio conversation wrapper. To change a portfolio conversation member the authority may be vested with the person with the portfolio conversation asset negotiator status. If there was a prior agreement with the current portfolio conversation member to release their portfolio conversation shares in the case that they loose their portfolio conversation member status then the share allocation is removed 624. If there was no prior agreement the current portfolio conversation member may agree to release their shares in consultation with the portfolio conversation asset negotiator. The shares withdrawn become part of the audit trail within the portfolio conversation asset wrapper. The portfolio conversation member may wish to retain all or part of their shares. The portfolio conversation asset negotiator may obtain prior agreement with the portfolio conversation asset owner to increase the number of portfolio conversation shares.

In one embodiment, a portfolio conversation member may be assigned, if agreeable, the status of Reviewer 623, which is a role for the portfolio conversation member to have the vested authority to review conversation assets and conversation AI entity assets. There may be multiple portfolio conversation reviewers, which is a 1:1 relationship with portfolio conversation member. A portfolio conversation reviewer may not review conversation assets and conversation AI entity assets that they have authored or designed respectively. In one implementation, the portfolio conversation wrapper references portfolio conversation reviewers 625. For each portfolio conversation reviewer, the wrapper may reference a description of their relevant experience, and the asset owner may ascertain whether the portfolio conversation reviewer will be given partial ownership of the portfolio conversation asset in exchange for their contribution to reviews. If so, then in one embodiment, the portfolio conversation asset negotiator negotiates with the portfolio conversation reviewer a percentage and once determined the portfolio conversation shares are assigned. The allocation may not be a whole unit and therefore the assignment of portfolio conversation shares can be fractional.

In one embodiment, once both parties agree the portfolio conversation shares then a conversation stock transfer is undertaken, where an audit trail of the transaction is maintained as part of the portfolio conversation asset wrapper.

In one embodiment, the portfolio conversation reviewer status can be removed 626, e.g., when the portfolio conversation negotiator is involved and then the change of status defined on the portfolio conversation wrapper. An audit trail is maintained of past portfolio conversation reviewers within the portfolio conversation wrapper. If there was a prior agreement with the portfolio conversation reviewer to release their portfolio conversation shares in the case that they loose their portfolio conversation reviewer status then the share allocation is removed. If there was no prior agreement, the current portfolio conversation reviewer may agree to release their shares in consultation with the portfolio conversation asset negotiator. The shares withdrawn become part of the audit trail within the portfolio conversation asset wrapper. The portfolio conversation reviewer may retain all or part of their shares. In one embodiment, the portfolio conversation reviewer may not have the authority to change a conversation asset or a conversation AI entity asset.

In one embodiment, a portfolio conversation member may be assigned, if agreeable, the status of accreditor, which may be a role for the portfolio conversation member to have the vested authority to provide an accreditation rating for conversation assets and conversation AI entity assets. Within implementations, there can be multiple portfolio conversation accreditors, which is a 1:1 relationship with portfolio conversation member. A portfolio conversation accreditor can also be a portfolio conversation reviewer, subject to the rules established by the portfolio conversation owner.

In one implementation, a portfolio conversation accreditor may not accredit conversation assets and conversation AI entity assets that they have authored or designed respectively. The portfolio conversation wrapper references portfolio conversation accreditors. For each portfolio conversation accreditor, the wrapper may contain a description of their relevant experience, and the owner may ascertain whether the portfolio conversation accreditor will be given partial ownership of the portfolio conversation asset in exchange for their contribution to accreditation ratings. If so, in one embodiment, the portfolio conversation asset negotiator negotiates with the portfolio conversation accreditor a percentage and once determined the portfolio conversation shares are assigned. The allocation does not need to be a whole unit and therefore the assignment of portfolio conversation shares can be fractional.

In one embodiment, once both parties agree the portfolio conversation shares then a conversation stock transfer is undertaken, where an audit trail of the transaction is maintained as part of the portfolio conversation asset wrapper.

In one embodiment, the portfolio conversation accreditor status can be removed 627. For example, the portfolio conversation negotiator may remove the accreditor status and involves notification and then the change of status defined on the portfolio conversation wrapper. An audit trail is maintained of past portfolio conversation accreditors within the portfolio conversation wrapper. If there was a prior agreement with the portfolio conversation accreditor to release their portfolio conversation shares in the case that they loose their portfolio conversation accreditor status then the share allocation is removed 628. If there was no prior agreement the current portfolio conversation accreditor may agree to release their shares in consultation with the portfolio conversation asset negotiator. The shares withdrawn become part of the audit trail within the portfolio conversation asset wrapper.

In one embodiment, the portfolio conversation accreditor may not have the authority to change a conversation asset or a conversation AI entity asset.

In one embodiment, the portfolio conversation negotiator may remove shares 628, which belong to a member. This may be addressed by the portfolio conversation negotiator and involves notification and then the removal of portfolio conversation asset shares, which requires an update to the portfolio conversation wrapper. An audit trail is maintained of removed shares within the portfolio conversation wrapper.

In one embodiment, the portfolio conversation wrapper references the portfolio conversation brand 629, which is a 1:1 relationship. In one implementation, the portfolio conversation asset owner is responsible for changes to the portfolio conversation asset brand. An audit trail is maintained of changes to the portfolio conversation asset brand within the portfolio conversation wrapper.

In one embodiment, the portfolio conversation wrapper references each conversation asset 630, which is a 1:m relationship. The conversation asset may be developed by portfolio conversation members within the portfolio conversation. In another embodiment, for conversation assets developed outside the domain of the portfolio, the conversation asset author may wish to become a member of the portfolio so that their conversation assets can be reviewed and receive an accreditation rating. The portfolio conversation owner through their portfolio conversation negotiator may require that they take ownership of conversation asset shares. In this case, the negotiations may be undertaken between the portfolio conversation negotiator and the conversation asset negotiator, and ascertain the value of exchange in terms of shares.

In one implementation, there may be an agreement of new shares within the conversation asset that are assigned to the portfolio conversation asset. In other words, the agreed transfer of conversation asset shares is registered with the portfolio conversation wrapper.

In one embodiment, the negotiation may involve a swap of shares between the portfolio conversation asset and the conversation asset. The conversation asset negotiator may agree to pay an amount that may be standalone or in conjunction with the trade in shares as described. If the amount, is agreed then this transaction may be entered in the portfolio conversation monetization log with all the transactional details.

Once the portfolio conversation asset negotiator agrees the value exchange terms with the conversation asset negotiator then the transaction is completed, which may include assignment of conversation asset shares and if necessary portfolio conversation asset shares, which are stored in their respective wrappers. The allocations may not be a whole unit and therefore the assignment of conversation shares may be fractional.

In one embodiment, once both parties agree the shares then a stock transfer is undertaken with an audit trail of the transactions maintained on the respective wrappers for the portfolio conversation asset and the conversation asset.

In one embodiment, the portfolio conversation wrapper contains a list of all conversation asset shares and a link to the conversation asset and its wrapper, which is then eligible for receiving the portfolio asset brand and subsequent portfolio reviews and accreditation.

In one embodiment, the conversation asset wrapper contains a list of all portfolio conversation asset shares within its wrapper. Within implementations, the conversation asset may be exclusive or non exclusive with a portfolio conversation asset. if it is the latter, then the conversation asset may be represented by any number of portfolios.

In one embodiment, the portfolio conversation wrapper references each conversation AI entity asset 631 to the portfolio, which is a 1:m relationship. The conversation AI entity asset may be developed by portfolio conversation members within the portfolio conversation, and therefore follows the methods as already defined for Conversation AI Entity Assets. In other implementations, for conversation AI entity assets developed outside the domain of the portfolio, the conversation AI entity designer may wish to become a member of the portfolio so that their conversation AI entity assets can be reviewed and receive an accreditation rating. In order to do so, the portfolio conversation owner through their portfolio conversation negotiator may require that they take ownership of conversation AI entity asset shares. In this case, the negotiations may be undertaken between the portfolio conversation negotiator and the conversation AI entity asset negotiator.

In one implementation, the portfolio asset owner may ascertain the value of exchange in terms of shares. In one embodiment, this may be an agreement of net shares within the conversation AI entity asset that are assigned to the Portfolio conversation asset. In other words, the agreed transfer of conversation AI entity asset shares may be registered with the portfolio conversation wrapper.

In one embodiment, the negotiation may involve a swap of shares between the portfolio conversation asset and the conversation AI entity asset. In one embodiment, the negotiator may agree to pay an amount that may be standalone or in conjunction with the trade in shares as described. If the amount is agreed then this transaction may be entered in the portfolio conversation monetization log with all the transactional details.

In one embodiment, once the portfolio conversation asset negotiator agrees the value exchange terms with the conversation AI entity asset negotiator then the transaction is completed. This includes assignment of conversation AI entity asset shares and if necessary portfolio conversation asset shares, which are stored in the respective wrappers. The allocations may not be a whole unit and therefore the assignment of shares can be fractional.

In one embodiment, once both parties agree the shares then a stock transfer is undertaken with an audit trail of the transactions maintained on the respective wrappers for the portfolio conversation asset and the conversation AI entity asset.

In one embodiment, the portfolio conversation wrapper contains a list of all conversation AI entity asset shares and a link to the conversation AI entity asset and its wrapper, which is then eligible for receiving the portfolio asset brand and subsequent portfolio reviews and accreditation.

In one embodiment, the conversation AI entity asset wrapper contains a list of all portfolio conversation asset shares within its wrapper. Within implementations, the conversation AI entity asset may be exclusive or non exclusive with a portfolio conversation asset. if it is the latter, then the conversation AI entity asset may be represented by any number of portfolios.

In one embodiment, the portfolio conversation wrapper references for each portfolio conversation member their bio 632, which is a 1:1 relationship.

In one embodiment, a portfolio conversation wrapper may maintain a counter of the dialogue-steps within digital conversations 633, which is a 1:m relationship for each conversation asset.

In one embodiment, a portfolio conversation wrapper maintains a counter of the conversation asset events 634 triggered by digital conversations, which is a 1:m relationship for each conversation asset.

In one embodiment, a portfolio conversation wrapper maintains a counter of the conversation asset widgets 635 triggered by digital conversations, which is a 1:m relationship for each conversation asset.

In one embodiment, a portfolio conversation wrapper maintains a counter of the conversation asset adverts 636 triggered by digital conversations, which is a 1:m relationship for each conversation asset.

In one embodiment, a portfolio conversation wrapper maintains a counter of the conversation asset web-services 637 triggered by digital conversations, which is a 1:m relationship for each conversation asset.

In one embodiment, a portfolio conversation wrapper maintains a counter of the conversation AI entity brand displays (3$^{rd}$ Party) 638 triggered by digital conversations, which is a 1:m relationship for each conversation AI entity asset.

In one embodiment, all interactions and transactions related to the portfolio conversation asset are stored as an audit that provides a basis for future projected value 639. This audit history is accessible from the portfolio conversation wrapper, which is a 1:m relationship.

In one embodiment, a portfolio conversation wrapper maintains a list of portfolio conversation members that also have the status of portfolio conversation authors 640, which is a 1:m relationship in a similar manner as discussed in establishing conversation asset authors.

In one embodiment, a portfolio conversation wrapper maintains a list of portfolio conversation members that also have the status of portfolio conversation designers 641, which is a 1:m relationship. The means to become a designer is covered in the methods associated with conversation AI entity designer.

In one embodiment, the portfolio conversation wrapper may be used to establish references 642 for other portfolio conversation assets, which may include the trading of portfolio conversation asset shares or the assignment of portfolio conversation asset shares, and/or new shares 645 between the respective portfolio conversation asset negotiators.

FIGS. 7A-7D provide logic flow diagrams illustrating monetizing an exchange asset within embodiments of the DCM-Platform. In one embodiment, the exchange conversation asset is the aggregation of conversation assets and AI entity assets that have been accredited by the portfolio conversation asset that has a relationship with the exchange conversation asset. An exchange conversation asset's overall value will be determined by factors such as its brand and what it represents in terms of digital conversation from the aggregation of portfolio conversation assets. The exchange conversation asset is treated in a similar way to a portfolio conversation asset, with different embodiments in trading conversation assets and conversation AI entity assets. The exchange conversation asset may have its own portfolio conversation asset to directly deal with conversation authors and conversation AI entity designers that are not exclusive to other portfolio conversation assets. The exchange conversation asset may be linked with multiple exchange conversation assets.

In one embodiment, the exchange conversation asset is created and developed by the exchange conversation asset owner 711, which is a 1:1 relationship. The exchange conversation asset owner may be an individual or an organization, wherein an individual name may be needed as the authoritative person. This ownership can change to another individual or another organization. In one implementation, once the exchange conversation asset owner identity and contact details have been established that person may create an exchange conversation wrapper 712 to establish the exchange conversation asset.

In one embodiment, each exchange conversation asset contains a wrapper 712, which has a 1:1 relationship. An exchange conversation wrapper is governed by a set of methods covering all the different parts and interrelationships that are the basis for algorithmic trading for the creation of value of an Exchange Conversation Asset. In one implementation, the exchange conversation asset is tradable in digital forms as a financial instrument.

In one embodiment, the exchange conversation wrapper may contain a title of the Exchange Conversation Asset 713, which is a 1:1 relationship$^{D4,3}$. The exchange conversation asset owner person may be responsible for the exchange conversation title, followed by an exchange conversation asset description.

In one embodiment, once the exchange conversation title has been established, a unique global identifier is assigned to the exchange conversation wrapper 714, which is a 1:1 relationship. The exchange conversation asset global identifier may remain unchanged for the lifetime, including archive, of the conversational exchange conversation asset even if the constitution of the asset changes.

In one embodiment, once the exchange conversation asset global identifier has been established the exchange conversation asset ownership is fully assigned to the exchange conversation asset owner 715, with a 1:1 relationship between the exchange conversation asset and the exchange conversation asset owner. This is equivalent to the exchange conversation asset having one share, which is fully owned by the exchange conversation asset owner.

In one embodiment, the exchange conversation asset owner may ascertain whether they wish someone else to negotiate on their behalf 716. if not, the exchange conversation asset owner is assigned the status of exchange conversation asset negotiator. Otherwise it may assign one or more other people to the status exchange conversation asset negotiator 716, which is a 1:m relationship; in other words, an exchange may consist of any number of exchange conversation asset negotiators thus enabling the exchange to grow to any size it wishes. The exchange asset owner may retain the right to be an exchange conversation asset negotiator, but also require more exchange conversation asset negotiators. To establish one or more other exchange conversation asset negotiators, the asset owner may define exchange conversation asset negotiator identification and contact details. The exchange conversation asset negotiator becomes a member of the exchange conversation asset.

In one embodiment, if the exchange conversation asset owner wishes to assign proportional ownership to the exchange conversation asset negotiator then a percentage is determined and the exchange conversation shares are assigned 717. The allocation may not be a whole unit and therefore the assignment of shares can be fractional.

In one embodiment, once both parties agree the exchange conversation shares then an exchange conversation stock transfer 719 is undertaken, where an audit trail of the transaction is maintained as part of the exchange conversation wrapper.

In one embodiment, the exchange conversation wrapper references the exchange conversation member or members that cover the spectrum for each conversation asset or conversation AI entity asset within each portfolio conversation asset 718, which is a 1:m relationship. The method for engaging new Exchange conversation members may be undertaken by the exchange conversation asset negotiator as follows.

In one implementation, the asset owner may define the exchange conversation member identification and contact details; ascertain whether the exchange conversation member will be given partial ownership of the exchange conversation asset. If so, then the exchange conversation asset negotiator negotiates 721 with the exchange conversation member a percentage and once determined the exchange conversation shares are assigned 722. The allocation may not be a whole unit and therefore the assignment of exchange conversation shares can be fractional. In one embodiment, once both parties agree the exchange conversation shares then an exchange conversation stock transfer is undertaken 719, where an audit trail of the transaction is maintained as part of the exchange conversation asset wrapper 720.

In one embodiment, an exchange conversation member can be replaced by another exchange conversation member and an audit trial is maintained of past exchange conversation members within the exchange conversation wrapper. To change an exchange conversation member, the authority may be vested with the person with the exchange conversation asset negotiator status. If there was a prior agreement with the current exchange conversation member to release their exchange conversation shares in the case that they loose their exchange conversation member status then the share allocation is removed 724. If there was no prior agreement the current exchange conversation member may agree to release their shares in consultation with the exchange conversation asset negotiator. The shares withdrawn become part of the audit trail within the exchange conversation asset wrapper. The exchange conversation member may wish to retain all or part of their shares. The exchange conversation asset negotiator may obtain prior agreement with the exchange conversation asset owner to increase the number of exchange conversation shares.

In one embodiment, an exchange conversation member may be assigned, if agreeable, the status of reviewer 723, which may be a role for the exchange conversation member to have the vested authority to review portfolio conversation assets, conversation assets and conversation AI entity assets. There may be multiple exchange conversation reviewers, which is a 1:1 relationship with exchange conversation member. An exchange conversation reviewer may not review conversation assets and conversation AI entity assets that they have authored or designed respectively. In one implementation, it is optional for the exchange to review conversation assets and conversation AI entity assets, which may be undertaken to increase the future earnings of an asset. The exchange conversation wrapper references exchange conversation reviewers. For each exchange conversation reviewer, the wrapper may include a description of their relevant experience, and ascertain whether the exchange conversation reviewer will be given partial ownership of the exchange conversation asset in exchange for their contribution to reviews. If so, then the exchange conversation asset negotiator negotiates with the exchange conversation reviewer a percentage and once determined the exchange conversation shares are assigned. The allocation may not be a whole unit and therefore the assignment of Exchange Conversation Shares can be fractional.

In one embodiment, once both parties agree the exchange conversation shares then a conversation stock transfer is undertaken, where an audit trail of the transaction is maintained as part of the exchange conversation asset wrapper.

In one embodiment, the exchange conversation reviewer status may be removed 726. For example, the removal may be addressed by the exchange conversation negotiator and involves notification and then the change of status defined on the exchange conversation wrapper. An audit trial is maintained of past exchange conversation reviewers within the exchange conversation wrapper. If there was a prior agreement with the exchange conversation reviewer to release their exchange conversation shares in the case that they loose their exchange conversation reviewer status then the share allocation is removed. If there was no prior agreement the current exchange conversation reviewer may agree to release their shares in consultation with the exchange conversation asset negotiator. The shares withdrawn become part of the audit trail within the exchange conversation asset wrapper. The exchange conversation reviewer may wish to retain all or part of their shares.

In one embodiment, the exchange conversation reviewer may not have the authority to change a portfolio conversation asset, conversation asset or a conversation AI entity asset.

In one embodiment, an exchange conversation member may be assigned, if agreeable, the status of accreditor 725, which is a role for the exchange conversation member to have the vested authority to provide an accreditation rating for portfolio conversation assets, conversation assets and conversation AI entity assets. There may be multiple exchange conversation accreditors, which is a 1:1 relationship with the exchange conversation member. An exchange conversation accreditor can also be an exchange conversation reviewer, subject to the rules established by the exchange conversation owner. An exchange conversation accreditor may not accredit conversation assets and conversation AI entity assets that they have authored or designed respectively nor can they accredit a portfolio conversation asset that they hold the status of conversation asset owner or conversation asset negotiator. The exchange conversation wrapper references exchange conversation accreditors. For each exchange conversation accreditor, the wrapper may include a description of their relevant experience, and ascertain whether the exchange conversation accreditor will be given partial ownership of the exchange conversation asset in exchange for their contribution to accreditation ratings. If so, then the exchange conversation asset negotiator negotiates$^{d4,11}$ with the exchange conversation accreditor a percentage and once determined the exchange conversation shares are assigned. The allocation may not need to be a whole unit and therefore the assignment of exchange conversation shares can be fractional.

In one embodiment, once both parties agree the exchange conversation shares then a conversation stock transfer is undertaken, where an audit trail of the transaction is maintained as part of the exchange conversation asset wrapper.

In one embodiment, the exchange conversation accreditor status may be removed 727. For example, the removal may be addressed by the exchange conversation negotiator and involves notification and then the change of status defined on the exchange conversation wrapper. An audit trial is maintained of past exchange conversation accreditors within the exchange conversation wrapper. If there was a prior agreement with the exchange conversation accreditor to release their exchange conversation shares in the case that they loose their exchange conversation accreditor status then the share allocation is removed. If there was no prior agreement the current exchange conversation accreditor may agree to release their shares in consultation with the exchange conversation asset negotiator. The shares withdrawn become part of the audit trail within the exchange conversation asset wrapper. The exchange conversation accreditor may wish to retain all or part of their shares.

In one embodiment, the exchange conversation accreditor may not have the authority to change a conversation asset or a conversation AI entity asset.

In one embodiment, the exchange conversation negotiator may remove shares 728, which belong to a member, which may be addressed by the exchange conversation negotiator and involves notification and then the removal of exchange conversation asset shares, which requires an update to the exchange conversation wrapper. An audit trial is maintained of deleted shares within the exchange conversation wrapper.

In one embodiment, the exchange conversation wrapper references the exchange conversation brand 729, which is a 1:1 relationship. In one implementation, the change to the exchange conversation asset brand is the responsibility of the exchange conversation asset owner. An audit trial is maintained of changes to the exchange conversation asset brand within the exchange conversation wrapper.

In one embodiment, the exchange conversation wrapper references each portfolio conversation asset and within this grouping every conversation asset 730, which is a 1:1:m relationship. The portfolio conversation asset and the associated conversation assets may be developed by exchange conversation members, and thus follows a similar manner as discussed for portfolio conversation assets. For conversation assets developed outside the domain of the exchange, the conversation asset author may wish to become a member of the exchange so that their conversation assets can be reviewed and receive an accreditation rating. In one implementation, the exchange conversation owner through their exchange conversation negotiator would point the conversation asset owner to one of their portfolio conversation assets and then similar methods discussed for portfolio conversation assets may be applied.

In one embodiment, the exchange conversation wrapper references each portfolio conversation asset and within this grouping every conversation AI entity asset 731, which is a 1:1:m relationship. The portfolio conversation asset and the associated conversation AI entity assets may be developed by exchange conversation members, and then follow similar manners discussed for portfolio conversation assets. For conversation AI entity assets developed outside the domain of the exchange, the conversation asset designer may wish to become a member of the exchange so that their conversation AI entity assets can be reviewed and receive an accreditation rating. The exchange conversation owner through their exchange conversation negotiator would point the conversation AI entity asset owner to one of their portfolio conversation assets and then the methods discussed for portfolio conversation assets may be applied.

In one embodiment, the exchange conversation wrapper references for each exchange conversation member their bio 732, which is a 1:1 relationship.

In one embodiment, an exchange conversation wrapper maintains a counter of the dialogue-steps 733 within digital conversations, for each conversation asset within each portfolio conversation asset.

In one embodiment, an exchange conversation wrapper maintains a counter of the conversation asset events 734 triggered by digital conversations, for each conversation asset within each portfolio conversation asset.

In one embodiment, an exchange conversation wrapper maintains a counter of the conversation asset widgets 735 triggered by digital conversations, for each conversation asset within each portfolio conversation asset.

In one embodiment, an exchange conversation wrapper maintains a counter of the conversation asset display adverts 736 triggered by digital conversations, for each conversation asset within each portfolio conversation asset.

In one embodiment, an exchange conversation wrapper maintains a counter of the conversation asset web-services 737 triggered by digital conversations, for each conversation asset within each portfolio conversation asset.

In one embodiment, an exchange conversation wrapper maintains a counter of the conversation AI entity $3^{rd}$ party brands 738 triggered by digital conversations, for each conversation AI entity asset within each portfolio conversation asset.

In one embodiment, all interactions and transactions related to the exchange conversation asset are stored as an audit that provides a basis for future projected value 739. The retrieved audit history includes categorization by the portfolio conversation assets, which is accessible from the exchange conversation wrapper.

In one embodiment, an exchange conversation wrapper maintains a list of exchange conversation members that also have the status of exchange conversation authors 740, which are categorized by their respective portfolio conversation asset.

In one embodiment, an exchange conversation wrapper maintains a list of exchange conversation members that also have the status of exchange conversation designers 741, which are categorized by their respective portfolio conversation asset.

In one embodiment, the Exchange Conversation Wrapper may be used to establish references to other exchange conversation assets 742, which may involve the trading of Exchange conversation asset shares or the assignment of exchange conversation asset shares new shares between the respective exchange conversation asset negotiators 745.

Figure 8A:
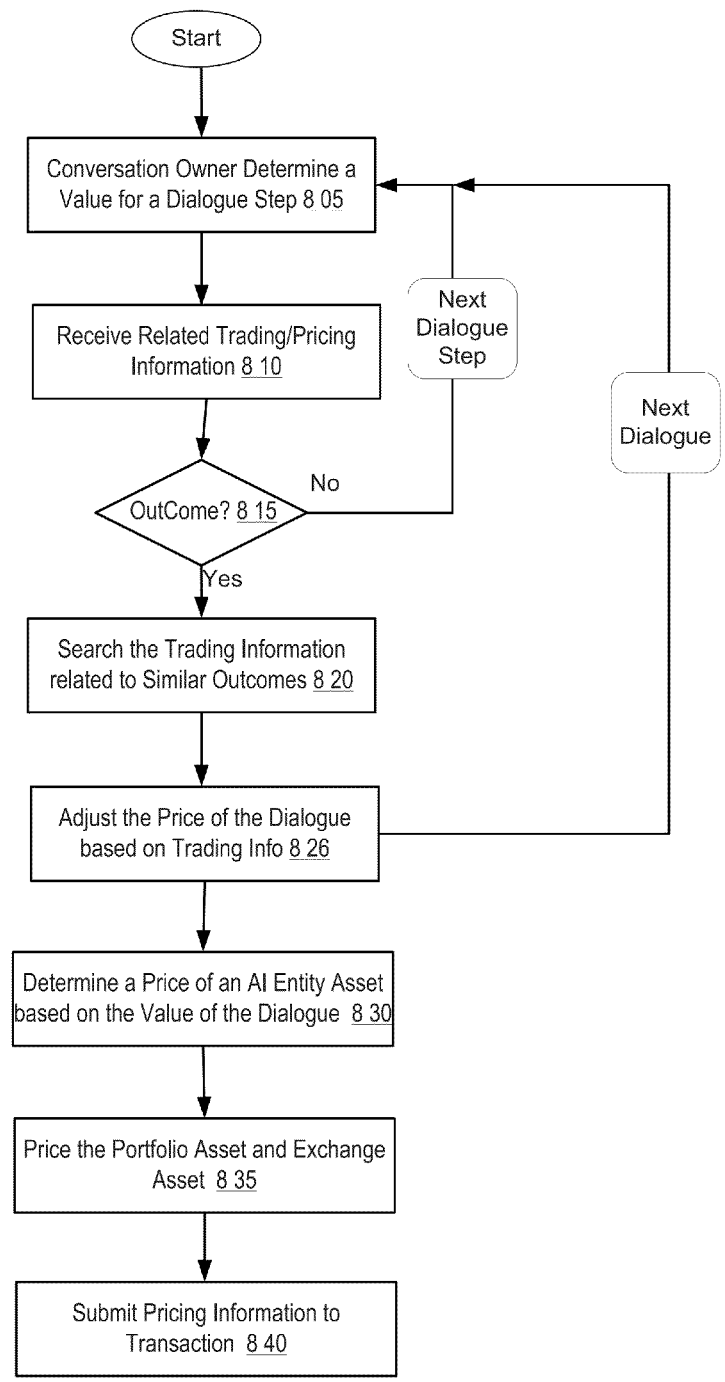
FIGS. 8A-8B show logic flow diagrams illustrating pricing a digital conversation asset within embodiments of the DCM-Platform.

FIG. 8A provides a logic flow diagram illustrating pricing a virtual asset within embodiments of the DCM-Platform. In one embodiment, an asset owner, e.g., a conversation asset owner as discussed in FIGS. 4B-4D, a conversation AI entity asset owner as discussed in FIGS. 5A-5C, a portfolio asset owner as discussed in FIGS. 6A-6C, an exchange asset owner as discussed in FIGS. 7A-7D, etc., may determine a dollar value for a dialogue step 805 in a conversation. In one implementation, the asset owner may determine the value based on past pricing information of similar dialogue steps. For example, to price a dialogue line "I prefer hair dresser for straight and sleek hair styles," the asset owner may consider past pricing information indicative of consumer preferences on hair dressers.

In another implementation, the DCM-Platform may receive related trading/pricing information 810 from a trading platform as a reference of price determination. For example, pricing information of conversation assets from the same author may be grouped to provide relevant pricing information.

In one implementation, the value of a dialogue may be determined based on the contents, e.g., whether there is an outcome 815, etc. For example, if a dialogue starts with a question from an AI entity "what kind of hair dresser are you looking for?", and an outcome is generated from the consumer's dialogue response "I prefer hair dresser for straight and sleek hair styles," then such dialogue may be priced higher than a dialogue without any outcome, e.g., the consumer's response does not address any preferences: "I don't know." If no outcome is generated, the DCM-Platform may continue to price the next dialogue step.

In one implementation, if an outcome is included in a dialogue step, the DCM-Platform may search received trading information related to similar outcomes 820, and based on the searched pricing information, the DCM-Platform may adjust the price of the dialogue step 826. For example, the trading information of conversations comprising outcomes indicating consumer's preferences of hair dressers may reflect the supply-demand relationship of such information on the market, and if the demand is high, the DCM-Platform may price the dialogue step higher accordingly.

In one implementation, the DCM-Platform may continue to determine every dialogue step in a conversation, based on which the price of a conversation asset, a conversation AI entity asset 830, a portfolio asset and an exchange asset 835 may be determined. The DCM-Platform may then update the wrapper of the virtual asset and submit pricing information for a transaction 840.

Figure 8B:
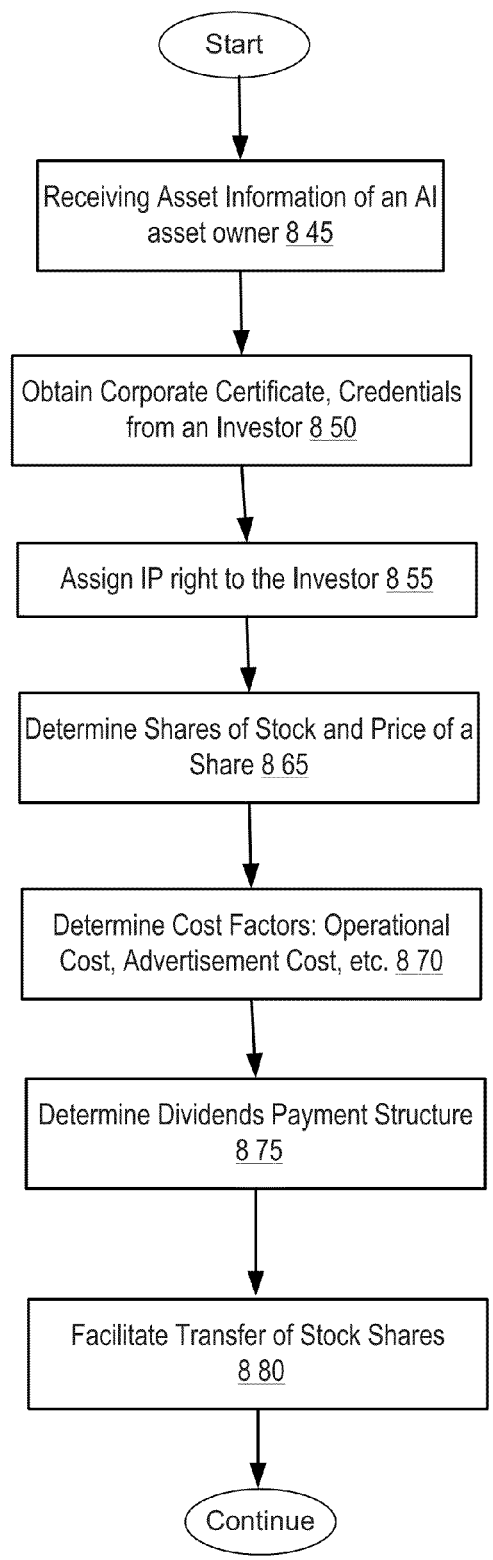

FIG. 8B provides a logic flow diagram illustrating asset monetization within alternative embodiments of the DCM-Platform. In one implementation, the DCM-Platform may receive asset information of a virtual asset owner 845, such as, but not limited to asset ownership information, asset authorship information, asset description, asset title, asset icon information, and/or the like.

Within implementations, the DCM-Platform may facilitate the initiation of monetization by obtaining a corporate certificate of the asset owner, and/or credentials from an investor 850. The DCM-Platform may then assign intellectual property rights associated with the digital assets to the investor 855, and then determine shares of stock and price of a stock share 865 based on the pricing information submitted by the asset owner.

In one implementation, the DCM-Platform may determine cost factors associated with the monetization 870, such as, but not limited to operational cost, advertisement cost, and/or the like. The DCM-Platform may then determine a dividends payment structure based on the determined stock shares and the cost factors 875, and facilitate transfer of stock shares 880. For example, the DCM-Platform may generate a financial instrument based on the stock shares, such as futures, forwards, options and/or the like, which are based on the underlying virtual assets, and submit to a financial trading platform for transactions.

Alternative Embodiments of DCM-Platform Asset Pricing

In one embodiment, the method for the determination of a Conversation Asset Index is influenced by whether it is standalone or part of a Portfolio Conversation or an Exchange Conversation. This method applies to the standalone Conversation Asset. In one implementation, the method involves two parts: Interaction (Conversation Asset Interaction Index) and Monetary (Conversation Asset Monetary Index)

In one embodiment, every digital conversation interaction involves one or more conversation-steps. A conversation-step contains the following attributes: the dialogue, the date and time the conversation-step started, the number of words within the dialogue, the number of dialogue-options, which can be zero or more, the selected country/language.

In one embodiment, each conversation-step interaction is recorded and stored in an archive with the dialogue together with the attributes above.

In one embodiment, the conversation asset interaction index is updated for each conversation-step as follows: go back to the previous conversation-step, which is not relevant for the first conversation-step; go to the next conversation-step which is relevant when there are no dialogue-options present but is not relevant in the case of the last conversation-step; selected a dialogue-option and moves to the next contextual conversation-step with interaction counter point for each appropriate backward forward or selected option taken.

In one embodiment, each Digital Conversation has a start and an end point. This is known as a Conversation-String. There is a minimum of one Conversation-Step for each Conversation-String, but there is no limit to the number of Conversation-Steps within a Conversation-String. Therefore, every action taken whether it is Forward, Backward or Selected adds another node to the Conversation-String. The Conversation-String can be extended across multiple user sessions and therefore is not constrained by time. The Conversation Asset Interaction Index is the aggregation of points derived from the Conversation-Strings. Stored with the Conversation-String is the attributes defined above so this enables the calculation of the time it took to undertake a Digital Conversation though this does not impact the Conversation Asset Interaction Index.

In one embodiment, there is a Conversation-Link between Conversation-Assets then the Conversation-String continues unabated by accumulating the Interaction Counter Points. There is no constraint in the use of Conversation-Links between Conversation-Assets. Therefore, a Conversation-String may encompass any number of Conversation-Assets. There is no limit to the number of Conversation-Steps that can be counted and update the Conversation Asset Interaction Index. The first Conversation-Asset is the origination of the Conversation-String and therefore has its own Conversation Asset Interaction Index. However, each Conversation Asset has its own Conversation-String and its own Conversation Asset Interaction Index, which are also updated even though they may not be the origination for a given Digital Conversation. Example: Let's take three Conversation Assets called CA1, CA2 and CA3. The interaction starts with CA1 and involves 3 Conversation-Steps. The CA1 Index is set to 3 Interaction Points. The CA1 Conversation Link goes to CA2 that involves 4 Conversation-Steps. The CA1 Index is now set to 7 Interaction Points and the CA2 Index is now set to 4 Interaction Points. The CA2 Conversation Link goes to CA3 that involves 5 Conversation-Steps. The CA1 Index is now set to 12 Interaction Points, the CA2 Index is now set to 9 Interaction Points and the CA3 Index is now set to 5 Interaction Points.

In one embodiment, there are no deductions to the Conversation Asset Interaction Index for standalone Conversation Assets.

In one embodiment, the Conversation Asset Interaction Index consistently is applied across changed versions of the Conversation Asset. However, a historical audit is kept by Conversation Asset versions for trend and comparison analysis. This means the Conversation Asset Interaction Index provides a life time view of the Conversation Asset's interaction performance.

In one embodiment, the Conversation Asset Interaction Index and the associated attributes of the Digital Conversation usage as described above are maintained with the Conversation Asset Wrapper.

In one embodiment, the Conversation Asset Monetary Index is the accumulative numeric value associated with the Conversation Asset and is pegged to a global currency that is determined for the trading associated with the Conversation Asset.

In one embodiment, there are varies ways that a standalone Conversation Asset can be monetized to update the Conversation Asset Monetary Index, as follows:

The DCM-Platform may sell conversation asset shares;

For example, in one embodiment, where monetary value has been exchanged for Conversation Assets Shares this is logged to the Conversation Asset Monetary Index. So say one sold 10 shares out of 100 shares for a Conversation Asset for say $20 each. Once the transaction has been logged within the Conversation Asset Wrapper then the Conversation Asset is now worth in total 2,000 Monetary Points (100 shares*$20) plus any additional monetary value sourced from elsewhere—see below. If one more Conversation Asset share is sold for $10 then the Conversation Asset is now worth in total 1,000 Monetary Points (100 shares*$10) plus any additional monetary value sourced from elsewhere. But if the next is sold for $30 then the Conversation Asset is now worth in total 3,000 Monetary Points (100 shares*$30) plus any additional monetary value sourced from elsewhere—see below. If no Conversation Assets Shares are sold then the Conversation Asset Monetary Index cannot be altered for this consideration (100 shares*$0).

In one embodiment, the DCM-Platform may swap conversation asset shares;

In one embodiment, this is treated in the same way as for Sell Conversation Asset Shares. The difference is that if a swap is with another Conversation Asset Shares and if this Conversation Asset Share has a monetary value then the current value is used as the bid price and is then treated like money. So if the Conversation Asset is worth $100 per share and it swaps 1 share for 2 shares then the bid price equates to $50 a share (100 shares*$50) thus the Conversation Asset is now worth in total 5,000 Monetary Points plus any additional monetary value sourced from elsewhere.

Swap Conversation AI Entity Asset Shares

In one embodiment, this is treated in the same way as for Sell Conversation Asset Shares. The difference is that if a swap is with a Conversation AI Entity Asset Shares and if this Conversation AI Entity Asset Share has a monetary value then the current value is used as the bid price and is then treated like money. So if the Conversation AI Entity Asset is worth $100 per share and it swaps 1 share for 2 shares then the bid price equates to $50 a share (100 shares*$50) thus the Conversation Asset is now worth in total 5,000 Monetary Points plus any additional monetary value sourced from elsewhere—see below.

Conversation Display Advertising

In one embodiment, if monetary value is received for context Conversation Display Advertising or marketing then the transaction is logged in the Conversation Asset Wrapper and the Conversation Asset Monetary Index is updated accordingly. The term period for this monetary value is defaulted to one year unless a specific contract has been negotiated. Once this transaction has been updated into the Conversation Asset the Conversation Asset Monetary Index is updated for the period of the monetary term. For example: if the advert is a dollar per display then the Conversation Asset Monetary Index is updated by one monetary point that is removed after 1 year. If however, it was negotiated that an advert would be permanently displayed at a given Conversation-Step for $1,000 for 3 months then the Conversation Asset Monetary Index is updated by 1,000 Monetary Points but the amount is removed from the Conversation Asset Monetary Index at the end of the 3 month period.

In one embodiment, the Conversation Asset Monetary Index is only updated for the specific Conversation Asset and not for that Conversation Asset that it directly or indirectly has Conversation Links. However, if the Conversation Asset Negotiator of a direct or indirect Linked Conversation Asset agrees to a pro rata monetary value for triggered Conversation Display Advert due to an earlier Digital Conversation but within the same Conversation-String then this pro rata value is added to the Conversation Asset Monetary Index.

In one embodiment, it should be remembered that Conversation Display Adverts can be triggered for each specific Conversation-Step.

$3^{rd}$ Party Conversation Events

In one embodiment, if monetary value is received for triggering a $3^{rd}$ Party Conversation Event then the transaction is logged in the Conversation Asset Wrapper and the Conversation Asset Monetary Index is updated accordingly.

In one embodiment, the conditions and the term period for each Conversation Event are specifically negotiated.

In one embodiment, the negotiation could be a fixed price for a given term period regardless to the number of times a Conversation Event is triggered. In this case, once this transaction has been updated into the Conversation Asset the Conversation Asset Monetary Index is updated for the period of the monetary term but removed from the Conversation Asset Monetary Index at the end of the negotiated term period.

In one embodiment, the negotiation could be a fee-based price for each time a specific Conversation Event is triggered. For example: If the Conversation Event is a dollar per Conversation Event triggered then the Conversation Asset Monetary Index is immediately updated by the agreed monetary unit whenever this trigger occurs. These Monetary Points are removed after the agreed term period negotiated.

In one embodiment, the negotiation may be time sensitive so events are triggered only within an agreed time period.

This may involve a fixed and/or variable set of conditions including a cap to limit liability. Alternatively, different Conversation Events can be triggered by different Dialogue-Options. Regardless of these variations the method still applies that the Conversation Asset Monetary Index is updated accordingly whether to add or delete monetary points.

In one embodiment, the Conversation Asset Monetary Index is only updated for the specific Conversation Asset and not for that Conversation Asset that it directly or indirectly has Conversation Links. However, if the Conversation Asset Negotiator of a direct or indirect Linked Conversation Asset agrees to a pro rata monetary value for triggered Conversation Events due to an earlier Digital Conversation but within the same Conversation-String then this pro rata value is added to the Conversation Asset Monetary Index.

In one embodiment, it should be remembered that Conversation Event can be triggered for each specific Conversation-Step.

3$^{rd}$ Party Conversation Widgets

In one embodiment, if monetary value is received for triggering a 3$^{rd}$ Party Conversation Widget then the transaction is logged in the Conversation Asset Wrapper and the Conversation Asset Monetary Index is updated accordingly.

In one embodiment, the conditions and the term period for each Conversation Widget are specifically negotiated.

In one embodiment, the negotiation could be a fixed price for a given term period regardless to the number of times a Conversation Widget is triggered. In this case, once this transaction has been updated into the Conversation Asset the Conversation Asset Monetary Index is updated for the period of the monetary term but removed from the Conversation Asset Monetary Index at the end of the negotiated term period.

In one embodiment, the negotiation could be a fee-based price for each time a specific Conversation Widget is triggered. For example: If the Conversation Widget is a dollar per Conversation Widget triggered then the Conversation Asset Monetary Index is immediately updated by the agreed monetary unit whenever this trigger occurs. These Monetary Points are removed after the agreed term period negotiated.

In one embodiment, the negotiation could be a commission-based price for each time a specific Conversation Widget that results with an agree outcome such as the purchase of a product or the provision of personalized information. For example: If the Conversation Widget is 10% of a product purchase then this monetary value is added to the Conversation Asset Monetary Index. These Monetary Points are removed after the agreed term period negotiated.

In one embodiment, the negotiation may be time sensitive so events are triggered only within an agreed time period. This may involve a fixed and/or variable set of conditions including a cap to limit liability. Alternatively, different Conversation Widget can be triggered by different Dialogue-Options. Regardless of these variations the method still applies that the Conversation Asset Monetary Index is updated accordingly whether to add or delete monetary points.

In one embodiment, the Conversation Asset Monetary Index is only updated for the specific Conversation Asset and not for that Conversation Asset that it directly or indirectly has Conversation Links. However, if the Conversation Asset Negotiator of a direct or indirect Linked Conversation Asset agrees to a pro rata monetary value for triggered a Conversation Widget due to an earlier Digital Conversation but within the same Conversation-String then this pro rata value is added to the Conversation Asset Monetary Index.

In one embodiment, it should be remembered that Conversation Widget can be triggered for each specific Conversation-Step.

Handoffs

In one embodiment, the Conversation Asset Monetary Index is only updated for the specific Conversation Asset and not for other Conversation Assets that are linked to; so a Conversation Asset through Digital Conversation could handoff to another Conversation Asset.

In one embodiment, however, if the Conversation Asset Negotiator of a direct or indirect Linked Conversation Asset agrees to a pro rata monetary value for a handoff then this pro rata value is added to the Conversation Asset Monetary Index with the inherited terms.

Subscription-Based Digital Conversations

In one embodiment, if monetary value is received for subscription-based Digital Conversations then the transaction or pro-rated part of the transaction is logged in the Conversation Asset Wrapper and the Conversation Asset Monetary Index is updated accordingly. The term period for this monetary value is defaulted to one year unless a specific contract has been negotiated. Once this transaction has been updated into the Conversation Asset the Conversation Asset Monetary Index is updated for the period of the monetary term. For example: if the subscription is an annualized $1,000 to access ten Conversation Assets then the Conversation Asset Monetary Index could be updated by 100 Monetary Points if prorated on an equal spread, but the amount is removed from the Conversation Asset Monetary Index at the end of the 12 month period. Alternative disbursement means can be used.

Conversation-Steps Meter

In one embodiment, the Conversation-Steps can be metered for Digital Conversation interactions and the associated transaction is logged in the Conversation Asset Wrapper and the Conversation Asset Monetary Index is updated accordingly. The term period for this monetary value is defaulted to one year unless a specific alternative period is determined. Once this transaction has been updated into the Conversation Asset the Conversation Asset Monetary Index is updated for the period of the monetary term. For example: if the meter is $10 per Conversation-Step and the interaction involved 20 Conversation-Steps then the transaction is valued at $200 then the Conversation Asset Monetary Index would be updated by 100 Monetary Points, but the amount is removed from the Conversation Asset Monetary Index at the end of a 12 month period.

Conversation-Outcome Metered

In one embodiment, the Conversation-Outcomes can be metered for Digital Conversation interactions and the associated transaction is logged in the Conversation Asset Wrapper and the Conversation Asset Monetary Index is updated accordingly. The term period for this monetary value is defaulted to one year unless a specific alternative period is determined. Once this transaction has been updated into the Conversation Asset the Conversation Asset Monetary Index is updated for the period of the monetary term. For example: if the meter is $40 for a specific Conversation-Outcome and $20 for a different Conversation-Outcome then the Conversation Asset Monetary Index would be updated by 40 and 20 Monetary Points respectively, but the amount is removed from the Conversation Asset Monetary Index at the end of a 12 month period.

Digital Conversation Auction

In one embodiment, the Digital Conversation can be auctioned thus introducing scarcity into the supply/demand equation. The auction transaction is logged in the Conversation Asset Wrapper and the Conversation Asset Monetary Index is updated accordingly. The term period for this monetary value is defaulted to one year unless a specific alternative period is determined. Once this transaction has been updated into the Conversation Asset the Conversation Asset Monetary Index is updated for the period of the monetary term. For example: if the auction paid $10,000 for a specific Digital Conversation then the Conversation Asset Monetary Index would be updated by 10,000 Monetary Points respectively, but the amount is removed from the Conversation Asset Monetary Index at the end of a 12 month period.

Conversational Intelligence

In one embodiment, the Digital Conversation Audit provides Conversational Intelligence that can be copied and sold, or accessed or aggregated with $3^{rd}$ party data, as a one off or for an agreed period in exchange for a monetary value. The Conversational Intelligence transaction or prorated if shared with others is logged in the Conversation Asset Wrapper and the Conversation Asset Monetary Index is updated accordingly. The term period for this monetary value is defaulted to one year unless a specific alternative period is determined. Once this transaction has been updated into the Conversation Asset the Conversation Asset Monetary Index is updated for the period of the monetary term. For example: if a copy of 3 months Digital Conversation is sold for $500 then the Conversation Asset Monetary Index would be updated by 500 Monetary Points respectively, but the amount is removed from the Conversation Asset Monetary Index at the end of a 3 month period.

Other Monetary Options

In one embodiment, the methods above show a diverse range of methods for monetization of a Conversation Asset. This does not negate other methods of monetization but the underlying method for the assignment of Monetary Points still stands.

Example Conversation Asset Index

In one embodiment, the Conversation Asset Index is formula driven and is calculated by Conversation Asset Interaction Index+Conversation Asset Monetary Index.

In one embodiment, every change to the Conversation Asset Index is logged with a date and time stamp for trend analysis and future value predictions and trading.

In one embodiment, the Conversation Asset Index, Conversation Asset Interaction Index and the Conversation Asset Monetary Index values are captured on a daily, weekly, monthly and annual basis for trend analysis and future value predictions and trading.

In one embodiment, all the above information is accessible via the Conversation Asset Wrapper defined by the Conversation Asset Global Identity.

In one embodiment, further breakdowns of the Indexes can be viewed by: versions of the conversation asset; conversation link(s), conversation event(s), conversation widget(s), conversation advert(s).

In one embodiment, the Index is not calculated when the Conversation Asset Status is anything but 'Production'.

Example Aggregation of the Conversation Asset Index

In one embodiment, the Conversation Asset Index, Conversation Asset Interaction Index and the Conversation Asset Monetary Index values are also stored individually and at an aggregated level across all related Conversation Assets for the following: conversation asset ownership, conversation asset negotiator, conversation asset primary script author, conversation asset other script author(s), conversation AI entity asset.

Example Method for Determining a Standalone Conversation AI Entity Performance Index In one embodiment, the method for the determination of a Conversation AI Entity Performance Index is influenced by whether it is standalone or part of a Portfolio Conversation or an Exchange Conversation. This method applies only to the standalone Conversation AI Entity Asset. The Conversation AI Entity Performance Index is an associated method and does not reflect the actual monetization as an earning asset for the Conversation AI Entity Asset as this is addressed in the next chapter.

Example Conversation AI Entity Performance Index Method Involves Two Parts

Interaction (Conversation AI Entity Interaction Performance Index)

Monetary (Conversation AI Entity Monetary Performance Index)

Example Interaction

In one embodiment, as already described the associated Conversation Asset Interaction Index is also stored against the Conversation AI Entity Asset and therefore becomes the Conversation AI Entity Interaction Performance Index.

In one embodiment, as a Conversation AI Entity Asset can be involved with more than one primary Conversation Assets then the Conversation AI Entity Interaction Performance Index is the aggregation of the associated Conversation Asset Interaction Indexes.

In one embodiment, the Conversation AI Entity Interaction Performance Index consistently is applied across changed versions of the Conversation AI Entity. However, a historical audit is kept by Conversation AI Entity versions for trend and comparison analysis. This means the Conversation AI Entity Interaction Performance Index provides a life time view of the Conversation AI Entity's interaction performance.

In one embodiment, the Conversation AI Entity Interaction Performance Index and the associated attributes of the interactions are maintained with the Conversation AI Entity Wrapper.

In one embodiment, as already described the associated Conversation Asset Monetary Index is also stored against the associated Conversation AI Entity Asset and therefore becomes the Conversation AI Entity Monetary Performance Index.

In one embodiment, as a Conversation AI Entity Asset can be involved with more than one primary Conversation Assets then the Conversation AI Entity Monetary Performance Index is the aggregation of the associated Conversation Asset Monetary Indexes.

In one embodiment, the Conversation AI Entity Monetary Performance Index is consistently applied across changed versions of the Conversation AI Entity. However, a historical audit is kept by Conversation AI Entity versions for trend and comparison analysis. This means the Conversation AI Entity Monetary Performance Index provides a life time view of the Conversation AI Entity's monetary performance.

In one embodiment, the Conversation AI Entity Monetary Performance Index and the associated attributes of the monetary transactions are maintained with the Conversation AI Entity Wrapper.

Example Conversation AI Entity Performance Index

In one embodiment, the Conversation AI Entity Performance Index is formula driven and is calculated by Conversation AI Entity Interaction Performance Index+Conversation AI Entity Monetary Performance Index.

In one embodiment, every change to the Conversation AI Entity Performance Index is logged with a date and time stamp for trend analysis and future value predictions and trading.

In one embodiment, the Conversation AI Entity Performance Index, Conversation AI Entity Interaction Performance Index and the Conversation AI Entity Monetary Performance Index values are captured on a daily, weekly, monthly and annual basis for trend analysis and future value predictions and trading.

In one embodiment, all the above information is accessible via the Conversation AI Entity Asset Wrapper defined by the Conversation AI Entity Asset Global Identity.

In one embodiment, further breakdowns of the Indexes can be viewed by: versions of the conversation asset conversation link(s) conversation event(s) conversation widget(s) conversation advert(s).

In one embodiment, the Index is not calculated when the Conversation AI Entity Asset Status is anything but 'Production'.

Example Aggregation of the Conversation Asset Index

In one embodiment, the Conversation AI Entity Performance Index, Conversation AI Entity Interaction Performance Index and the Conversation AI Entity Monetary Performance Index values are also stored individually and at an aggregated level across all related conversation AI entity assets for the following: conversation AI entity asset ownership conversation AI entity asset negotiator conversation AI entity asset primary designer conversation AI entity asset other designers(s).

Example Method for Determining a Standalone Conversation AI Entity Monetary Index In one embodiment, the method for the determination of a Conversation AI Entity Monetary Index is influenced by whether it is standalone or part of a Portfolio Conversation or an Exchange Conversation. This method applies only to the standalone Conversation AI Entity Asset. The Conversation AI Entity Monetary Index is the monetization of a Conversation AI Entity Asset as an earning asset.

In one embodiment, a Conversation AI Entity Monetary Index is the accumulative numeric value associated with the Conversation AI Entity Asset and is pegged to a global currency that is determined for the trading associated with the Conversation AI Entity Asset.

In one embodiment, there are varies ways that a standalone Conversation AI Entity Asset can be monetized to update the a Conversation AI Entity Monetary Index, as follows:

Sell Conversation AI Entity Asset Shares

In one embodiment, where monetary value has been exchanged for Conversation AI Entity Assets Shares this is logged to the Conversation AI Entity Monetary Index. Look at similar contextual example above that involved applying Monetary Points to the Conversation Asset Monetary Index.

Swap with Conversation Asset Shares

In one embodiment, this is treated in the same way as for Sell Conversation AI Entity Asset Shares. The difference is that if a swap is with Conversation Asset Shares and if this Conversation Asset Share has a monetary value then the current value is used as the bid price and is then treated like money. Look at similar contextual example above that involved applying Monetary Points to the Conversation Asset Monetary Index.

Swap with Other Conversation AI Entity Asset Shares

In one embodiment, this is treated in the same way as for Sell Conversation AI Entity Asset Shares. The difference is that if a swap is with a Conversation AI Entity Asset Shares and if this Conversation AI Entity Asset Share has a monetary value then the current value is used as the bid price and is then treated like money. Look at similar contextual example above that involved applying Monetary Points to the Conversation Asset Monetary Index.

AI Entity Brand Display

In one embodiment, if monetary value is received for context an AI Entity Brand Display ($3^{rd}$ party brand being displayed as part of the Avatar inventory) then the transaction is logged in the Conversation AI Entity Asset Wrapper and Conversation AI Entity Monetary Index is updated accordingly. The term period for this monetary value is defaulted to one year unless a specific contract has been negotiated. Once this transaction has been updated into the Conversation AI Entity Asset the Conversation AI Entity Monetary Index is updated for the period of the monetary term. Look at similar contextual example above that involved applying Monetary Points to the Conversation Asset Monetary Index.

$3^{rd}$ Party Conversation Events

In one embodiment, if monetary value is received for triggering a $3^{rd}$ Party Conversation Event then the transaction is logged in the Conversation AI Entity Asset Wrapper and the Conversation Asset Monetary Index is updated accordingly.

In one embodiment, the conditions and the term period for each Conversation Event are specifically negotiated.

In one embodiment, the negotiation could be a fixed price for a given term period regardless to the number of times a Conversation Event is triggered. In this case, once this transaction has been updated into the Conversation AI Entity Asset the Conversation AI Entity Monetary Index is updated for the period of the monetary term but removed from the Conversation AI Entity Monetary Index at the end of the negotiated term period.

In one embodiment, the negotiation could be a fee-based price for each time a specific Conversation Event is triggered. For example: If the Conversation Event is a dollar per Conversation Event triggered then the Conversation AI Entity Monetary Index is immediately updated by the agreed monetary unit whenever this trigger occurs. These Monetary Points are removed after the agreed term period negotiated.

In one embodiment, the negotiation may be time sensitive so events are triggered only within an agreed time period. This may involve a fixed and/or variable set of conditions including a cap to limit liability. Alternatively, different Conversation Events can be triggered by different Dialogue-Options. Regardless of these variations the method still applies that the Conversation AI Entity Monetary Index is updated accordingly whether to add or delete monetary points.

$3^{rd}$ Party Conversation Widgets

In one embodiment, if monetary value is received for triggering a $3^{rd}$ Party Conversation Widget then the transaction is logged in the Conversation AI Entity Asset Wrapper and the Conversation AI Entity Monetary Index is updated accordingly.

In one embodiment, the conditions and the term period for each Conversation Widget are specifically negotiated.

In one embodiment, the negotiation could be a fixed price for a given term period regardless to the number of times a Conversation Widget is triggered. In this case, once this transaction has been updated into the Conversation AI Entity Asset the Conversation AI Entity Monetary Index is updated for the period of the monetary term but removed from the Conversation AI Entity Monetary Index at the end of the negotiated term period.

In one embodiment, the negotiation could be a fee-based price for each time a specific Conversation Widget is triggered. For example: If the Conversation Widget is a dollar per Conversation Widget triggered then the Conversation AI Entity Monetary Index is immediately updated by the agreed monetary unit whenever this trigger occurs. These Monetary Points are removed after the agreed term period negotiated.

In one embodiment, the negotiation could be a commission-based price for each time a specific Conversation Widget that results with an agree outcome such as the purchase of a product or the provision of personalized information. For example: If the Conversation Widget is 10% of a product purchase then this monetary value is added to the Conversation AI Entity Monetary Index. These Monetary Points are removed after the agreed term period negotiated.

In one embodiment, the negotiation may be time sensitive so events are triggered only within an agreed time period. This may involve a fixed and/or variable set of conditions including a cap to limit liability. Alternatively, different Conversation Widgets can be triggered by different Dialogue-Options. Regardless of these variations the method still applies that the Conversation AI Entity Monetary Index is updated accordingly whether to add or delete monetary points.

Handoffs

In one embodiment, the Conversation AI Entity Monetary Index is only updated for the specific Conversation AI Entity Asset and not for Conversation AI Entity Assets that are linked to; so an AI Entity through Digital Conversation or through a display within its landscape could handoff to another Conversation AI Entity.

In one embodiment, however, if the Conversation AI Entity Asset Negotiator of a direct or indirect linked Conversation AI Entity Asset agrees to a pro rata monetary value for a handoff then this pro rata value is added to the Conversation AI Entity Monetary Index with the inherited terms.

Subscription-Based Digital Conversations

In one embodiment, if monetary value is received for subscription-based Digital Conversations then the transaction or pro-rated part of the transaction can be assigned to the Conversation AI Entity. In this case it is logged in the Conversation AI Entity Asset Wrapper and the Conversation AI Entity Monetary Index is updated accordingly subject to the terms. Look at similar contextual example above that involved applying Monetary Points to the Conversation Asset Monetary Index.

Conversation-Steps Meter

In one embodiment, the Conversation-Steps can be metered for Digital Conversation interactions and the associated transaction or pro-rated part of the transaction can be assigned to the Conversation AI Entity. In this case it is logged in the Conversation AI Entity Asset Wrapper and the Conversation AI Entity Monetary Index is updated accordingly subject to the terms. Look at similar contextual example above that involved applying Monetary Points to the Conversation Asset Monetary Index.

Conversation-Outcome Metered

In one embodiment, the Conversation-Outcomes can be metered for Digital Conversation interactions and the associated transaction or pro-rated part of the transaction can be assigned to the Conversation AI Entity. In this case it is logged in the Conversation AI Entity Asset Wrapper and the Conversation AI Entity Monetary Index is updated accordingly subject to the terms. Look at similar contextual example above that involved applying Monetary Points to the Conversation Asset Monetary Index.

Conversation AI Entity Auction

In one embodiment, the Conversation AI Entity can be auctioned thus introducing scarcity into the supply/demand equation. The auction transaction or pro-rated part of the transaction can be assigned to the Conversation AI Entity. In this case it is logged in the Conversation AI Entity Asset Wrapper and the Conversation AI Entity Monetary Index is updated accordingly subject to the terms. Look at similar contextual example above that involved applying Monetary Points to the Conversation Asset Monetary Index.

Conversational Intelligence

In one embodiment, the Digital Conversation Audit provides Conversational Intelligence that can be copied and sold, or accessed or aggregated with $3^{rd}$ party data, as a one off or for an agreed period in exchange for a monetary value. The Conversational Intelligence transaction or pro-rated part of the transaction can be assigned to the Conversation AI Entity. In this case it is logged in the Conversation AI Entity Asset Wrapper and the Conversation AI Entity Monetary Index is updated accordingly subject to the terms. Look at similar contextual example above that involved applying Monetary Points to the Conversation Asset Monetary Index.

Other Monetary Options

In one embodiment, the methods above show a diverse range of methods for monetization of a Conversation AI Entity Asset. This does not negate other methods of monetization but the underlying method for the assignment of Monetary Points still stands.

Example Method for Determining a Portfolio Conversation Asset Index

In one embodiment, the method for the determination of a Portfolio Conversation Asset Index is the aggregation and portfolio-based weightings for:

Portfolio Conversation Asset Index=Sum of the Conversation Asset Indexes that have been branded by the Portfolio and are within the rules of engagement defined earlier.

Portfolio Conversation Asset Interaction Index=Sum of the Conversation Asset Interaction Indexes that have been branded by the Portfolio and are within the rules of engagement defined earlier.

Portfolio Conversation Asset Monetary Index=Sum of the Conversation Asset Monetary Indexes that have been branded by the Portfolio and are within the rules of engagement defined earlier.

Portfolio Conversation AI Entity Performance Index=Sum of the Conversation AI Entity Performance Indexes that have been branded by the Portfolio and are within the rules of engagement defined earlier.

Portfolio Conversation AI Entity Interaction Performance Index=Sum of the Conversation Interaction AI Entity Performance Indexes that have been branded by the Portfolio and are within the rules of engagement defined earlier.

Portfolio Conversation AI Entity Monetary Performance Index=Sum of the Conversation AI Entity Monetary Performance Indexes that have been branded by the Portfolio and are within the rules of engagement defined earlier.

Portfolio Conversation AI Entity Monetary Index=Portfolio Conversation AI Entity Monetary Index+Sum of the Portfolio Conversation AI Entity Monetary Indexes that have been branded by the Portfolio and are within the rules of engagement defined earlier.

The Portfolio Conversation Asset contains all the permutations associated with Conversation Assets and Conversation AI Entity Assets covered earlier.

Example Portfolio Conversation Tariffs

In one embodiment, the Portfolio Conversation Asset governs the monetary rules of engagement that apply to all the associated Conversation Assets and the AI Entity Assets that have been covered earlier for the individual asset classes.

Example Portfolio Interaction Weightings

In one embodiment, the Portfolio Conversation Asset governs the weighting rules of engagement that apply to all the associated Conversation Assets and the AI Entity Assets that have been covered earlier for the individual asset classes.

These weighting rules can be governed by the Portfolio and can be established for any permutation of influence including:

Portfolio Conversation Asset Feedback for example, if the Portfolio has a weighting value of 5 for five star feedback then the number of Conversation-Steps can be multiplied by a number assigned by the Portfolio; thus 20 Conversation-Steps is multiplied by 2 for a five star feedback equating to 40 weighted Conversation-Steps that are applied to the Interaction Index.

Portfolio Conversation Asset Review for example, if the Portfolio has a weighting value of 3 for a top review of a Conversation Asset then the number of Conversation-Steps can be multiplied by a number assigned by the Portfolio; thus 20 Conversation-Steps is multiplied by 3 for a top review feedback equating to 60 weighted Conversation-Steps that are applied to the Interaction Index.

Portfolio Conversation Asset Outcomes for example, if the Portfolio has assigned a weighting value of 10 for a primary Conversation Outcome then the number of Conversation-Steps can be multiplied by a 10 equating to 1000 weighted Conversation-Steps that are applied to the Interaction Index.

Further weightings applied in a similar way to the above can be given to the following and again can be varied according to associated variables: portfolio conversation display advert portfolio conversation widget portfolio conversation event. A Portfolio Conversation Asset can combine other variables such as country and any permutation of the above to apply weightings to the Portfolio Interactions.

The approach to these weighting for Conversation Asset Interactions also applied to the Conversation AI Entity Interactions, which can be treated the same or at a Portfolio chosen variant.

The Portfolio Weightings are not applied to the monetary indexes as is simply a monetary actualization.

Example Portfolio Conversation Liquidity Index

In one embodiment, the Portfolio Conversation Liquidity Index monitors the trends for the accumulative monetary movements covering: portfolio conversation asset monetary index portfolio conversation AI entity monetary index.

In one embodiment, as the Portfolio Conversation Liquidity Index is updated as monetary changes occur the Portfolio Conversation Liquidity Index can show trends by: hour, day, month, year.

In one embodiment, these trends can be drilled down into the Portfolio Conversation Asset Monetary Index and the Portfolio Conversation AI Entity Monetary Index. In turn these Indexes can be drill down into the actual transactions detailed earlier.

In one embodiment, should the Portfolio Conversation Liquidity Index be zero or indeed stagnates (no changes over time) then this means the Portfolio is illiquid.

Example Portfolio Conversation Capital Index

In one embodiment, the Portfolio Conversation Capital Index monitors the trends for the accumulative asset share price movements covering: Portfolio Conversation Assets, Portfolio Conversation AI Entity Assets.

In one embodiment, the Portfolio Conversation Capital Index changes whenever Conversation Assets are added or removed to the production portfolio and an Asset Share Price has been applied or Conversation AI Entity Assets are added or removed to the production portfolio and an Asset Share Price has been applied or Asset Share has been traded.

In one embodiment, the latest Asset Share Price used for a transaction is applied to all the Shares of the Asset: Total Asset Shares*Latest Current Share Price; the currency used is determined by the Portfolio Owner.

In one embodiment, the Portfolio Conversation Capital Index is the accumulative calculated share value for all the Assets within the Portfolio.

In one embodiment, the Portfolio Conversation Capital Index can show trends by: hour, day, month, year.

In one embodiment, these trends can be drilled down into the Asset Share transactions.

In one embodiment, should the Portfolio Conversation Capital Index be zero then this means the Portfolio has not been capitalized.

Example Portfolio Conversation Future Index

In one embodiment, the Portfolio Conversation Future Index is the future trend for the accumulation of the following: Portfolio Conversation Liquidity Index, Portfolio Conversation Capital Index, The Portfolio Future=Portfolio Conversation Liquidity Index+Portfolio Conversation Capital Index and is calculated forward based on past trends covering weekly, monthly and yearly projections. The Portfolio Conversation Future Index can be adjusted by weightings over time set by the Portfolio. The primary purpose of the Portfolio Conversation Future Index is for Asset Share Investors and derivative trades. Forward projections may also be calculated with Portfolio based adjustments for: Portfolio Conversation Asset Index, Portfolio Conversation Asset Interaction Index, Portfolio Conversation Asset Monetary Index, Portfolio Conversation AI Entity Performance Index, Portfolio Conversation AI Entity Interaction Performance Index, Portfolio Conversation AI Entity Monetary Performance Index, Portfolio Conversation AI Entity Monetary Index In one embodiment, should the Portfolio Conversation Future Index be zero then this means the Portfolio is illiquid.

Example Method for Determining a Exchange Conversation Asset Index

In one embodiment, the method for the determination of an Exchange Portfolio Conversation Asset Index is the aggregation and portfolio-based weightings for:

---

Exchange Conversation Asset Index = Sum of the Portfolio Conversation Asset Indexes that have been branded by the Exchange and are within the rules of engagement defined earlier.
Exchange Conversation Asset Interaction Index = Sum of the Portfolio Conversation Asset Interaction Indexes that have been branded by the Exchange and are within the rules of engagement defined earlier.
Exchange Conversation Asset Monetary Index = Sum of the Portfolio Conversation Asset Monetary Indexes that have been branded by the Exchange and are within the rules of engagement defined earlier.
Exchange Conversation AI Entity Performance Index = Sum of the Portfolio Conversation AI Entity Performance Indexes that have been branded by the Exchange and are within the rules of engagement defined earlier.
Exchange Conversation AI Entity Interaction Performance Index = Sum of the Portfolio Conversation Interaction AI Entity Performance Indexes that have been branded by the Exchange and are within the rules of engagement defined earlier.
Exchange Conversation AI Entity Monetary Performance Index = Sum of the Portfolio Conversation AI Entity Monetary Performance Indexes that have been branded by the Exchange and are within the rules of engagement defined earlier.
Exchange Conversation AI Entity Monetary Index = Exchange Conversation AI Entity Monetary Index + Sum of the Exchange Conversation AI Entity Monetary Indexes that have been branded by the Exchange and are within the rules of engagement defined earlier.

---

The Exchange Conversation Asset contains all the permutations associated with Conversation Assets and Conversation AI Entity Assets covered earlier.

Example Exchange Conversation Tariffs

In one embodiment, the Exchange Conversation Asset governs the monetary rules of engagement that apply to all the associated Portfolio Conversation Assets and the Portfolio AI Entity Assets that have been covered earlier for the individual asset classes.

Example Exchange Interaction Weightings

In one embodiment, the Exchange Conversation Asset governs the weighting rules of engagement that apply to all the associated Portfolio Conversation Assets and the Portfolio AI Entity Assets that have been covered earlier for the individual asset classes. These weighting rules can be governed by the Exchange and can be established for any permutation of influence including:

Exchange Conversation Asset Feedback—this is treated in the same way as for Portfolio Conversation Asset Feedback. The Exchange can deploy the same Feedback standards across all or selected Portfolios or empower selected Portfolios to deploy their own Feedback standards.

Exchange Conversation Asset Review—this is treated in the same way as for Portfolio Conversation Asset Review. The Exchange can deploy the same Review standards across all or selected Portfolios or empower selected Portfolios to deploy their own Review standards.

Exchange Conversation Asset Outcomes—this is treated in the same way as for Portfolio Conversation Asset Outcomes. The Exchange can deploy the same Outcomes standards across all or selected Portfolios or empower selected Portfolios to deploy their own Outcomes standards.

In one embodiment, further weightings applied in a similar way to the above can be given to the following and again can be varied according to associated variables: Exchange Conversation Display Advert, Exchange Conversation Widget, Exchange Conversation Event. An Exchange Conversation Asset can combine other variables such as country and any permutation of the above to apply weightings to the Exchange Interactions.

The approach to these weighting for Conversation Asset Interactions also applied to the Conversation AI Entity Interactions, which can be treated the same or at a Exchange chosen variant.

The Exchange Weightings may not be applied to the monetary indexes as is simply a monetary actualization.

Example Exchange Conversation Liquidity Index

In one embodiment, the Exchange Conversation Liquidity Index monitors the trends for the accumulative monetary movements covering: Exchange Conversation Asset Monetary Index, Exchange Conversation AI Entity Monetary Index.

In one embodiment, as the Exchange Conversation Liquidity Index is updated as monetary changes occur the Exchange Conversation Liquidity Index can show trends by: hour, day, month, year.

In one embodiment, these trends can be drilled down into the Exchange Conversation Asset Monetary Index and the Exchange Conversation AI Entity Monetary Index. In turn these Indexes can be drill down into the actual transactions detailed earlier, including by Portfolio Assets.

In one embodiment, should the Exchange Conversation Liquidity Index be zero or indeed stagnates (no changes over time) then this means the Exchange is illiquid.

Example Exchange Conversation Capital Index

In one embodiment, the Exchange Conversation Capital Index monitors the trends for the accumulative asset share price movements covering: Exchange Conversation Assets, Exchange Conversation AI Entity Assets.

In one embodiment, the Exchange Conversation Capital Index changes whenever portfolio assets are added or removed to the production exchange and an asset share price has been applied conversation assets are added or removed to the production exchange and an asset share price has been applied or conversation AI entity assets are added or removed to the production exchange and an asset share price has been applied or an asset share has been traded.

In one embodiment, the latest Asset Share Price used for a transaction is applied to all the Shares of the Asset: Total Asset Shares*Latest Current Share Price; the currency used is determined by the Exchange Owner.

In one embodiment, the Exchange Conversation Capital Index is the accumulative calculated share value for all the Assets within the Exchange.

In one embodiment, the Exchange Conversation Capital Index can show trends by: hour, day, month, year.

In one embodiment, these trends can be drilled down into the Asset Share transactions.

In one embodiment, should the Exchange Conversation Capital Index be zero then this means the Exchange has not been capitalized.

Example Exchange Conversation Future Index

In one embodiment, the Exchange Conversation Future Index is the future trend for the accumulation of the following: Exchange Conversation Liquidity Index, Exchange Conversation Capital Index. The Exchange Future=Exchange Conversation Liquidity Index+Exchange Conversation Capital Index and is calculated forward based on past trends covering weekly, monthly and yearly projections. The Exchange Conversation Future Index can be adjusted by weightings over time set by the Exchange. The primary purpose of the Exchange Conversation Future Index is for Asset Share Investors and derivative trades.

In one implementation, forward projections are also calculated with Exchange based adjustments for: Exchange Conversation Asset Index, Exchange Conversation Asset Interaction Index, Exchange Conversation Asset Monetary Index, Exchange Conversation AI Entity Performance Index, Exchange Conversation AI Entity Interaction Performance Index, Exchange Conversation AI Entity Monetary Performance Index, Exchange Conversation AI Entity Monetary Index.

In one embodiment, should the Exchange Conversation Future Index be zero then this means the Exchange is illiquid.

Example Method for Asset Status

In one embodiment, the status of all Asset Classes includes: Production—status needed for trading and indexes, Pre-production, Withdrawn, Suspension, Archived, Deleted.

In one embodiment, the overriding sequence for changing status in descending order of influence is as follows: Exchange (higher level accreditation), Portfolio (lower level of accreditation), Individual (non accredited)

In one embodiment, if there are shares involving multiple ownership associated with a given Asset then the Asset cannot be Archived or Deleted until agreement has been reached with all shareholders.

In one embodiment, the Exchange and Portfolio can customize their own rules for the Asset Status classes.

In one embodiment, if a Exchange Asset Class is Withdrawn, Suspended, Archived or Deleted that status applies to all Assets within its control and thus includes: Conversation Assets, Conversation AI Entity Assets, Portfolio Assets.

In one embodiment, if a Portfolio Asset Class is Withdrawn, Suspended, Archived or Deleted that status applies to all Assets within its control and thus includes: Conversation Assets, Conversation AI Entity Assets.

In one embodiment, within a Portfolio or Exchange an Asset Owner has the option, subject to Portfolio and/or Exchange conditions to transfer their Assets to another Exchange or Portfolio or indeed return to unaccredited status. However, should there be restriction clauses with the Asset Shareholders Agreement that the Transfer cannot occur unless these conditions are satisfied.

In one embodiment, assets can be assigned a banned status by a Portfolio or an Exchange.

In one embodiment, assets can be assigned an age suitability status by a Portfolio or an Exchange.

In one embodiment, assets can be assigned restrictive access status by a Portfolio or an Exchange.

Example Method for Asset Account Management

In one embodiment, each individual and Asset have their own account that contain all access rights, authorization rights, approval rights, control rights, approval rights, share ownership rights and monetary rights.

In one embodiment, the status of all Accounts includes:
Live
Suspension
Archived
Deleted In one embodiment, the overriding sequence for changing status of an Account in descending order of influence is as follows:
Exchange (higher level accreditation)
Portfolio (lower level of accreditation)
Individual (non accredited)

In one embodiment, an Account that has multiple owners cannot be archived or deleted until agreement has been reached with all other Account holders.

In one embodiment, the Exchange and Portfolio can customize their own rules for the Accounts within their own domain.

In one embodiment, within a Portfolio or Exchange an Account Owner has the option, subject to Portfolio and/or Exchange conditions to transfer their Accounts to another Exchange or Portfolio or indeed return to non Portfolio or Exchange status. However, should there be restriction clauses with the Account Agreement that the Transfer cannot occur unless these conditions are satisfied.

In one embodiment, accounts can be assigned a minimum age for qualification but can be setup in conjunction with an authorized persona such as lawyer, parent or guardian.

In one embodiment, accounts can support multiple currencies and sub-accounts such as reward bearing. Transfers between sub-accounts are allowable subject to Exchange or Portfolio Rules.

In one embodiment, the Exchange or Portfolio may impose restrictions regarding transfers from the individual account.

In one embodiment, an Exchange or Portfolio may have a Prime Account which automatically receives all or partial monetary value from accounts within its domain. In some cases, the individual accounts within their domain can be regarded as Shadow Accounts. For example: an Exchange is owned by a Corporation that owns all the monies generated from the Assets but wants to retain Shadow Accounts for individual performance.

Example Method for Leveraging Anonymous Conversation Data

In one embodiment, the Conversation Data, as already covered is stored anonymously with other data tags such as Country Code.

In one embodiment, the ownership of this Conversational Data belongs with the Conversation Asset share ownership as already covered.

In one embodiment, however, the Portfolio and the Exchange can have terms and conditions, which give them rights over the Anonymous Data in exchange for membership and/or monetization.

In one embodiment, a high level of semantic meaning the Portfolio and or the Exchange may well set codification standards for the user generated conversation and its use of Display Ads, Widgets and Events. By establishing the standards of these codes enables pick-up data to be obtained during the Digital Conversation. This Pick-up Data enables higher forms of intelligence to be derived in context to actual Conversational-Steps. When combining this Pick-up Data with the Anonymous Conversational Data could provide deep hindsights, insights and foresights this increasing the value through aggregation across many different types of Conversations.

In one embodiment, those Portfolios and Exchanges that establish the deployment of the aggregation of data through their own standardization increase the probability of generating high forms of new value exchange.

Example Method for Short Learning Cycles

In one embodiment, the method for increasing the knowledge within a Conversation Asset or a collection of Conversation Assets is based on the following: Analysis of Digital Conversation Usage Patterns and the aggregation of Conversation-Strings, Analysis of Conversational Outcomes and Conversational End-Points, Analysis if timings associated with Conversation-Steps, Feedback: structured or unstructured, External sources of influence.

In one embodiment, the Conversation Asset can be extended through: Modification of script, Extension of script within the Conversation Asset, Extension of script through linking with New Conversation Asset(s), Extension through linking with other existing Conversation Assets.

In one embodiment, as the Conversation Asset when applied to knowledge is an aggregation of 'best' human knowledge then when that knowledge is immature or limited then the learning cycles can be relatively short as changes are applied.

In one embodiment, the change controls are imposed within Portfolios and Exchanges covering: empowered change with review checks, empowered changes with the option for reviews, controlled changes with enforced review or reviews In one embodiment, changes are undertaken within a pre-production status, which includes a test to ensure that the Conversation AI Entity and the Conversation Asset are synchronized without technical mishap.

In one embodiment, once the changes have been successfully applied then the respective Asset Negotiator or a delegated person has the authority to release into production.

In one embodiment, the Digital Conversation is stored within the version of the Asset change and is aggregated for the overall Asset. In this way, comparison analysis can be undertaken to ascertain the impact thus accelerating the learning cycles if appropriate.

In one embodiment, the script for Digital Conversations can be represented in multiple languages. When multiple languages are present then checks are made when changes are made to ensure that the changes are applied to the other language derivatives.

Example Method for Finding the Best-Fit Digital Conversation

In one embodiment, the Portfolios and Exchanges can establish a taxonomic tree-based structure so that the Conversational Asset Author can link the Asset Wrapper to the final contextual node within the taxonomic structure.

In one embodiment, where a Conversation Asset is best represented by multiple taxonomic nodes then the method is reapplied multiple times.

In one embodiment, when multiple nodes are referenced then these are weighted to reflect the level of relevancy for a Digital Conversation.

In one embodiment, the Conversation Asset Author can extend the end-point Taxonomic Node with a customized taxonomic tree-structure to advance the level of systemic precision.

In one embodiment, where there are more that one Conversation Asset associated with an end-node or multiple-end node point then the list of Conversation Assets can be listed by the following: date & time of creation or last change, owner, author(s), accreditor(s), negotiator(s), AI entity, shareholder(s), feedback rating, inter exchanges—accredited asset indexes including: exchange conversation asset index, exchange conversation asset interaction index, exchange conversation asset monetary index, exchange conversation AI entity performance index, exchange conversation AI entity interaction performance index, exchange conversation AI entity monetary performance index, exchange conversation AI entity monetary index, intra exchange portfolios—accredited asset indexes including: exchange portfolio conversation asset index, exchange portfolio conversation asset interaction index, exchange portfolio conversation asset monetary index, exchange portfolio conversation AI entity performance index, exchange portfolio conversation AI entity interaction performance index, exchange portfolio conversation AI entity monetary performance index, exchange portfolio conversation AI entity monetary index, portfolio—accredited asset indexes including portfolio conversation asset index, portfolio conversation asset interaction index, portfolio conversation asset monetary index, portfolio conversation AI entity performance index, portfolio conversation AI entity interaction performance index, portfolio conversation AI entity monetary performance index, portfolio conversation AI entity monetary index.

DCM-Platform Dialogue Agent Creation

Figure 9:
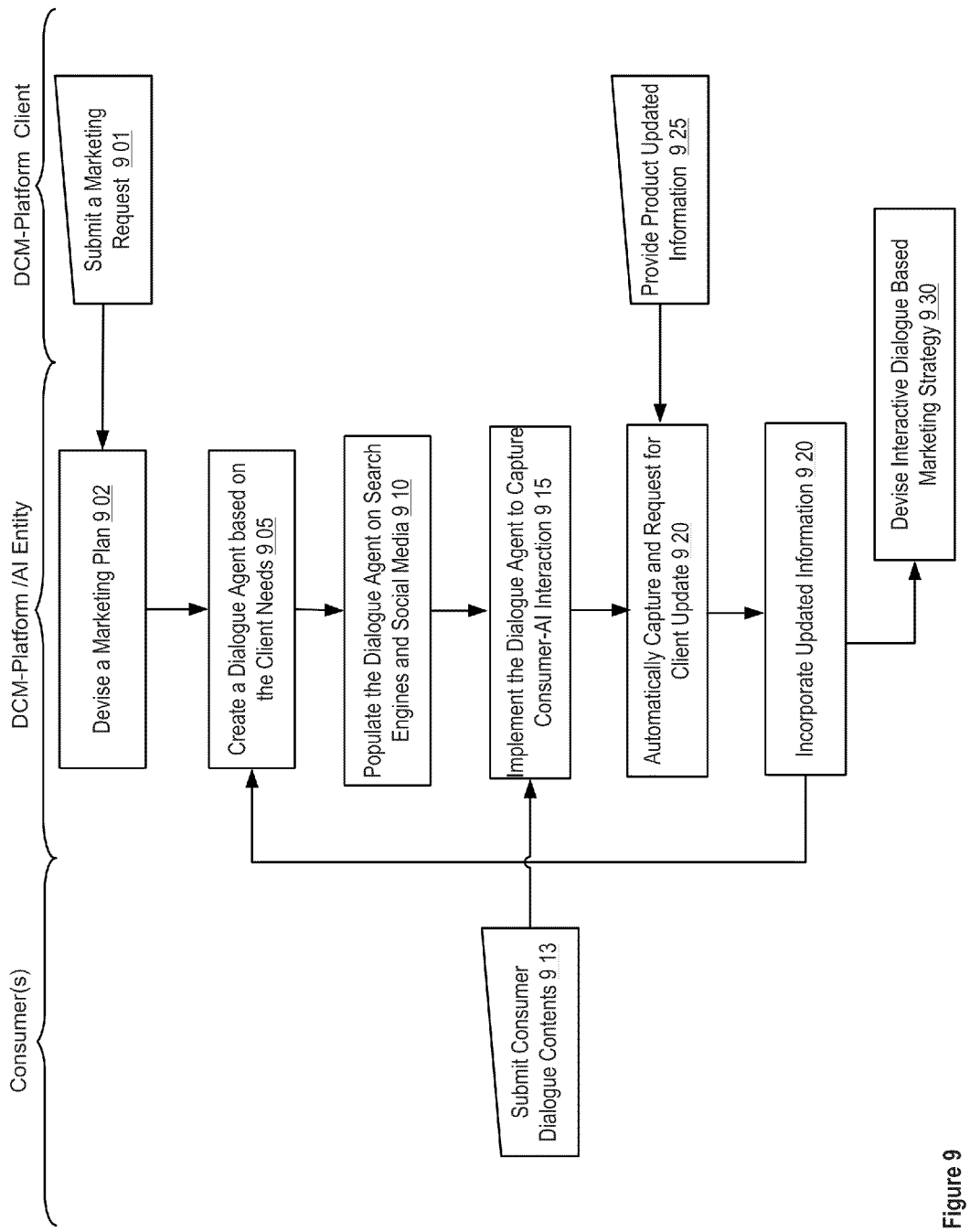
FIG. 9 shows a logic flow diagram illustrating consumer-agent conversation capturing within embodiments of the DCM-Platform.

FIG. 9 provides a logic flow diagram illustrating creating and capturing dialogues within embodiments of the DCM-Platform. In one embodiment, the consumer may submit consumer dialogue contents to an AI agent (and/or DCM-Platform) 913 via a telephone call, an online chatting platform, a messenger, a social media platform, and/or the like, as discussed in FIG. 2A.

Within implementations, the AI agent may receive the dialogue response from a consumer and perform data analysis. In alternative implementations, the DCM-Platform may receive a marketing request 901 from a client and perform the data analysis to devise a marketing plan for the client 902. In one implementation, the DCM-Platform may create a dialogue agent application based on the client needs 905

For example, a hair dresser manufacturer may submit a request to the DCM-Platform for AI marketing service for their new hair dresser product. The manufacturer may provide their marketing budget, product information, and/or the like to the DCM-Platform. The DCM-Platform may determine the number of AI agents to employ, the platform to deploy the AI agent, and create a dialogue agent accordingly.

The DCM-Platform may then populate the created dialogue agent on search engines and social media 910 and implement the dialogue agent to capture consumer-AI interactive dialogues 915, as further illustrated in FIGS. 10A-11L.

In one implementation, the created dialogue agent application may automatically capture and request for client update 920, wherein the client may provide updated product information 925, as further illustrated in FIG. 13. The dialogue agent may incorporate the updated information 920 into the dialogue application, and devise interactive dialogue based marketing strategies 930, as further illustrated in FIGS. 15A-F.

Figure 10A:
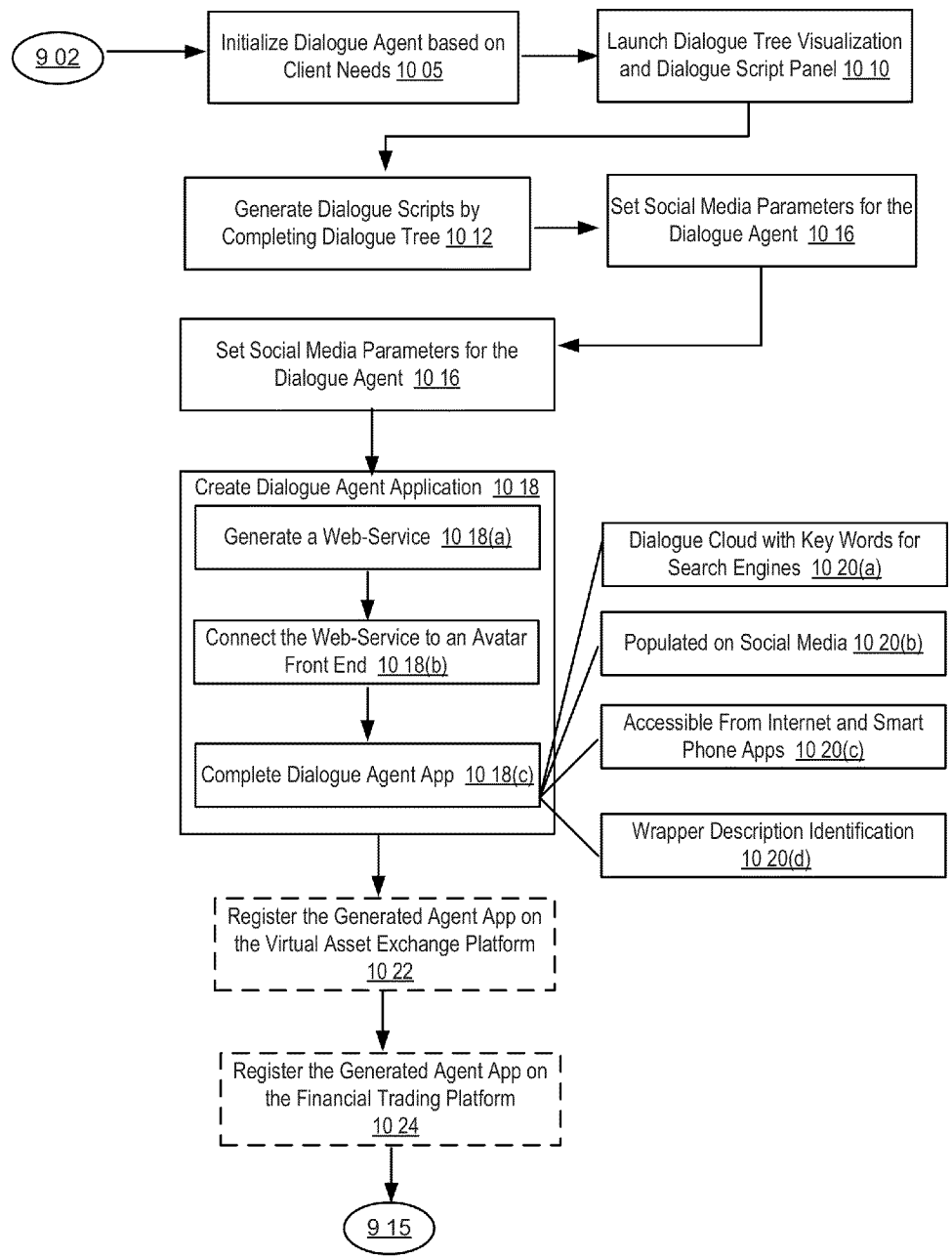
Figure 10C:
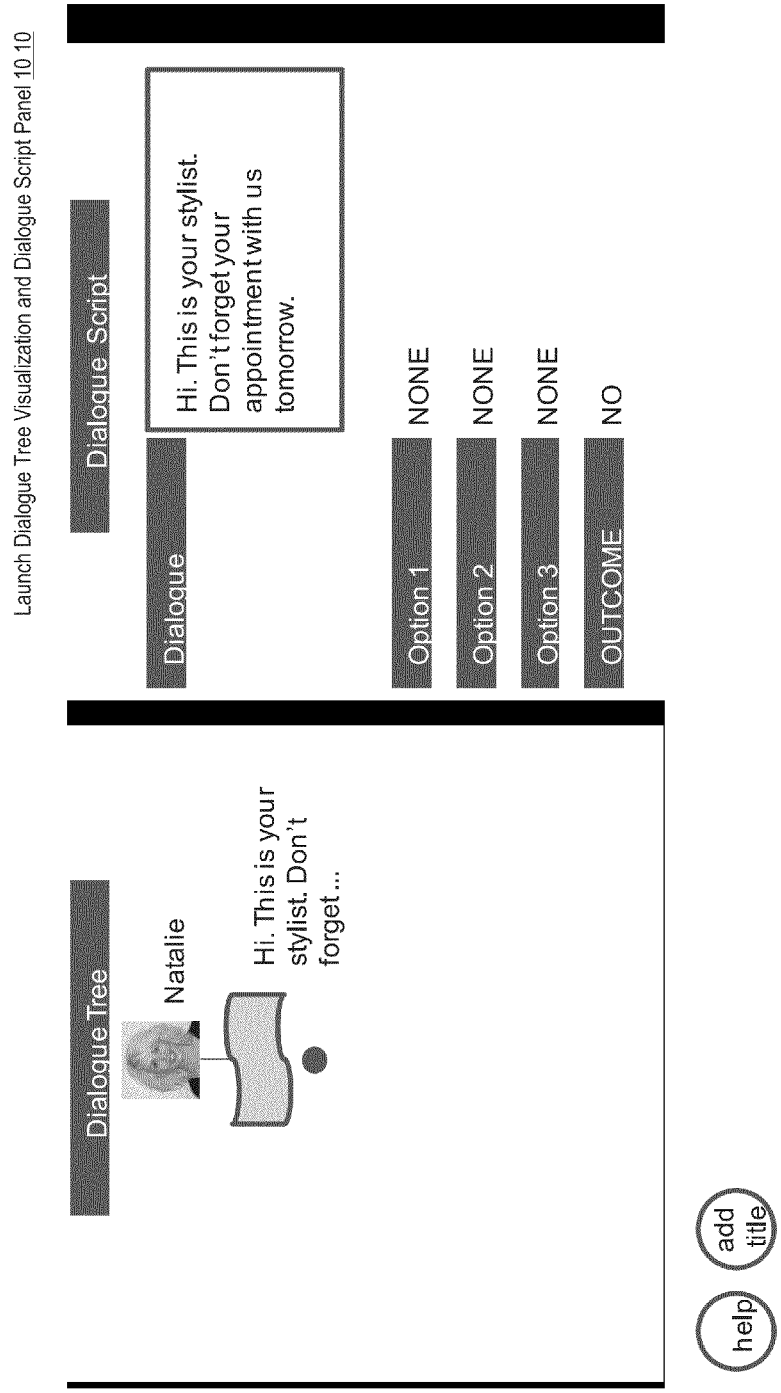
Figure 10D:
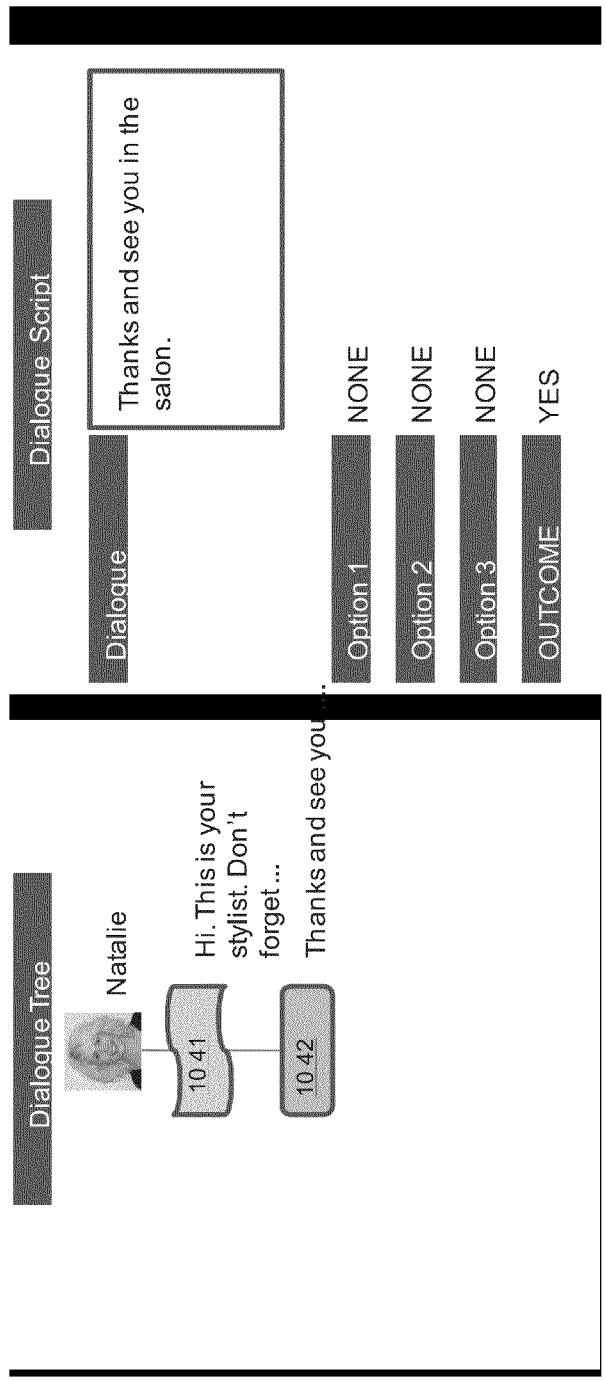

FIG. 10A-10F-3 provide diagrams illustrating creation of a dialogue agent application within embodiments of the DCM-Platform. In one embodiment, to create a dialogue agent application, the DCM-Platform may initialize a dialogue agent based on client needs 1005, and launch dialogue tree visualization and dialogue script panel 1010. For example, as shown in FIG. 10B-C, a user interface comprising a split screen that provides dialogue tree visualisation and a dialogue script panel may be provided, wherein the left half of the screen may provide a dialogue tree 1035 illustrating the evolution of dialogue steps, and the right half of the screen may illustrate the dialogue script 1306, including information with regard to the dialogue agent 1037, subject 1038, key words 1039, and/or the like In one implementation, the DCM-Platform may generate dialogue scripts by completing a dialogue tree 1012, e.g., joining all the dots within a dialogue tree as shown in FIG. 10D. For example, as shown in FIG. 10D, a dot 1041 in the dialogue tree may comprise a dialogue line from the AI agent "Hi, this is your stylist . . . ", and an ending dot 1042 comprises a line "Thanks and see you." The dialogue may be considered complete when an ending dot 1042 is connected in the dialogue tree.

Figure 10E:
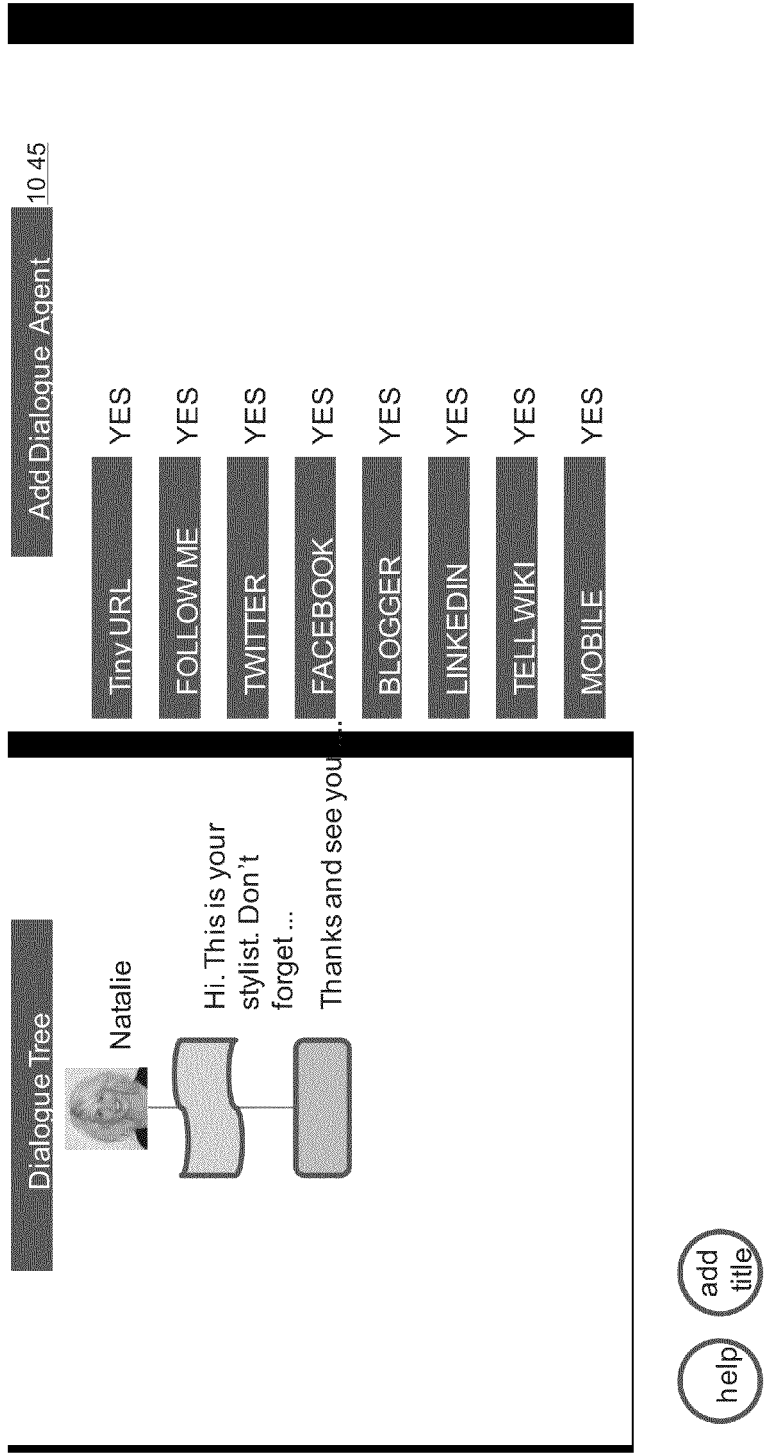

In one implementation, upon completing a dialogue tree, the DCM-Platform may set social media parameters for the dialogue agent 1016. For example, as shown in FIG. 10E, the DCM-Platform may add dialogue agent 1045 to a variety of social media platforms, such as, but not limited to Tiny URL, FOLLOW ME, Twitter, Facebook, Blogger, LinkedIn, Tell Wiki, Mobile, and/or the like. In one implementation, the DCM-Platform may configure the social media parameters based on client requests. In alternative implementations, the DCM-Platform may determine the social media deployment based on client marketing budget.

In one implementation, the DCM-Platform may create dialogue agent application 1018, which may be implemented via automatically generating a web-service 1018(a), automatically connecting the dialogue web-service to an avatar front end 1018(b), based on which a dialogue agent application may be completed 1018(c).

Figures 1, 10F:
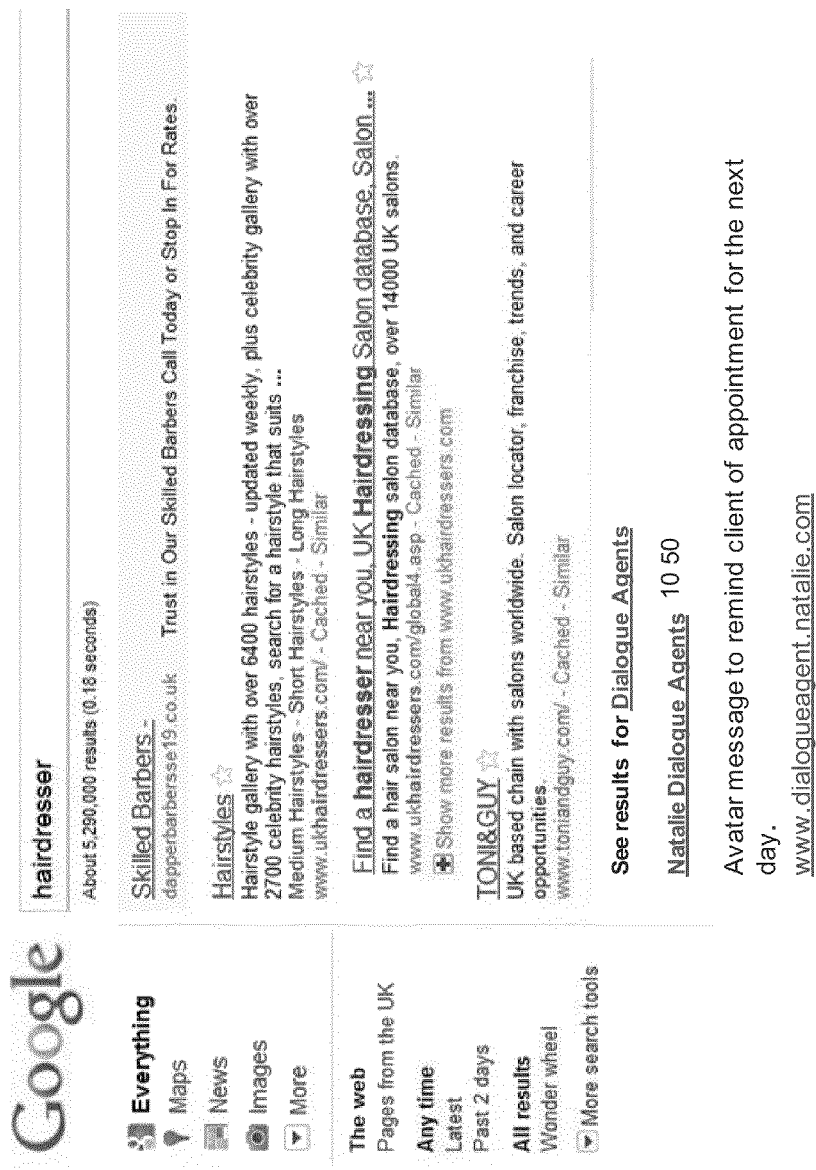
Figure 10F:
Figure 3:
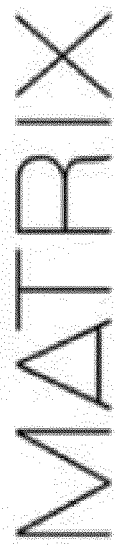

In a further implementation, the dialogue agent application may be created within a dialogue cloud with key words which may be picked up by search engines (e.g., Bing, Yahoo, Google, etc.) 1020(a). For example, as shown in FIG. 10F-1, the dialogue script discussed in FIGS. 10B-E may be associated with a keyword "hairdresser," which may be populated onto Google search for products, services related to "hairdresser" for the AI agent "Natalie" 1050, and the AI agent "Natalie" may in turn utilize the search results to generate dialogue lines to provide information with regard to the "hairdresser" to a consumer.

In another further implementation, the dialogue agent may be populated onto social media platforms 1020(b). For example, FIG. 10F-2 illustrates an automated population of a micro logging and social networking service (i.e., Twitter) using a shortened URL (e.g., Tiny URL, etc.).

In another further implementation, the dialogue agent may create mobile applications accessible from the internet and smart phone applications (e.g., Apple iPhone, Blackberry, Evo, etc.). For example, as shown in FIG. 10F-3, a dialogue agent avatar 1055 may be displayed on a consumer's smart phone, and a list of Internet search results on related products and/or services 1060 may be displayed in contextual adds-on alongside the dialogue avatar.

Upon completing creation a dialogue agent application, the DCM-Platform may also generate wrapper description identification 1020(d) of the dialogue agent application. For example, the wrapper of a conversation asset, an AI entity asset, a portfolio asset, and/or an exchange asset that contains the created AI agent application may be updated with the description of the application accordingly.

In a further implementation, the DCM-Platform may register the generated AI agent application on the virtual asset exchange platform 1022, and the financial trading platform 1024, by generating a wrapper for the agent application as described within embodiments of FIGS. 4B-7C.

Figure 11A:
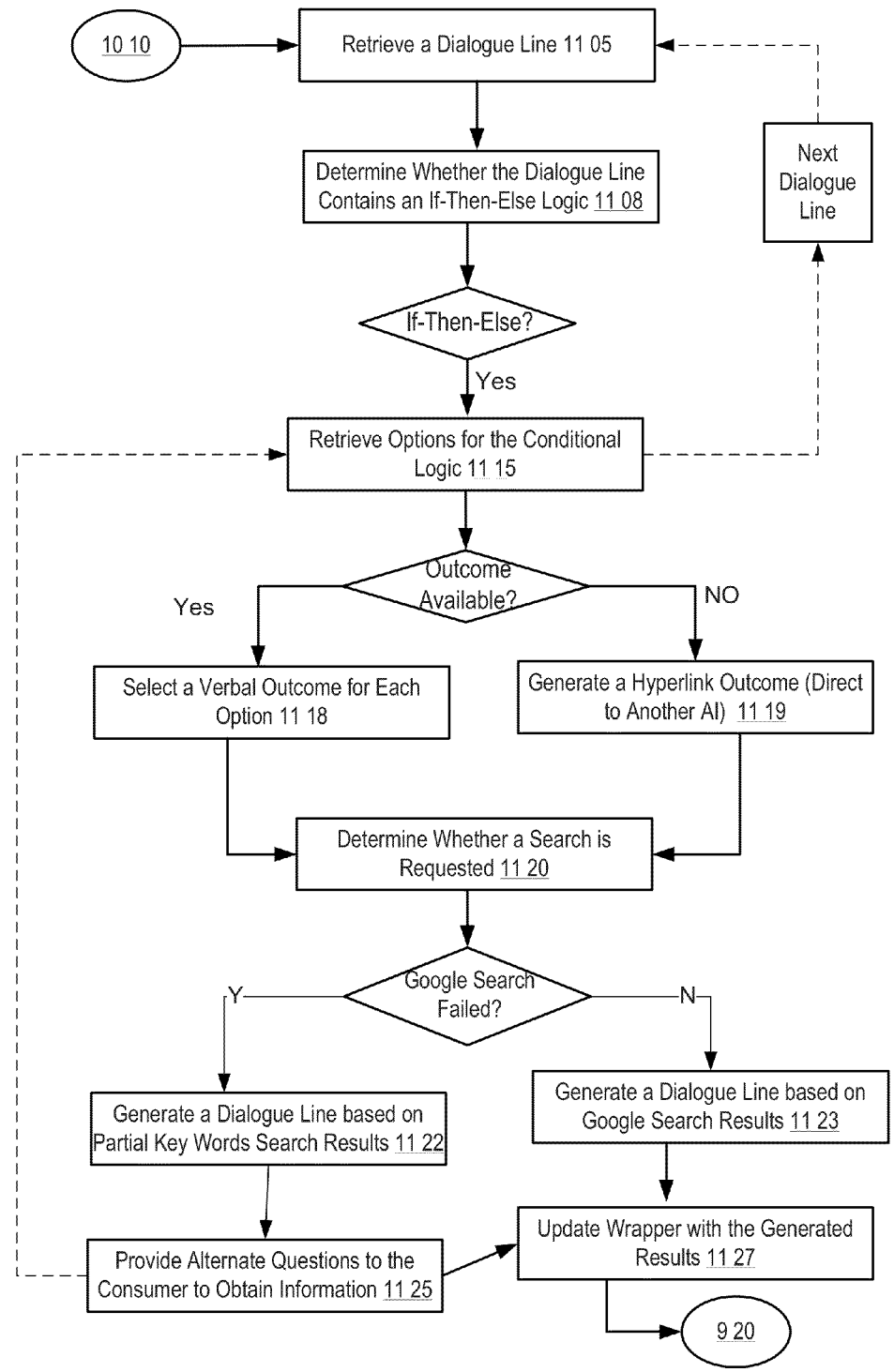

FIG. 11A provides a logic flow illustrating generating an intelligent dialogue within embodiments of the DCM-Platform. In one embodiment, to start a dialogue and/or to respond to a consumer submitted dialogue line, the dialogue agent may retrieve a dialogue line 1105 from the dialogue application. The dialogue application may determine whether the on-going dialogue contains an If-Then-Else logic 1108.

If there is an If-Then-Else logic, the agent may retrieve options for the conditional logic 1115, and determines whether the consumer submitted dialogue step contains an outcome. If there is an outcome, the agent may select a verbal outcome for each option to present to the consumer 1118. Otherwise, the agent may resort to a search engine to generate a hyperlink outcome for the consumer 1119, and/or direct the consumer to another AI agent to continue the conversation.

Figure 11B:
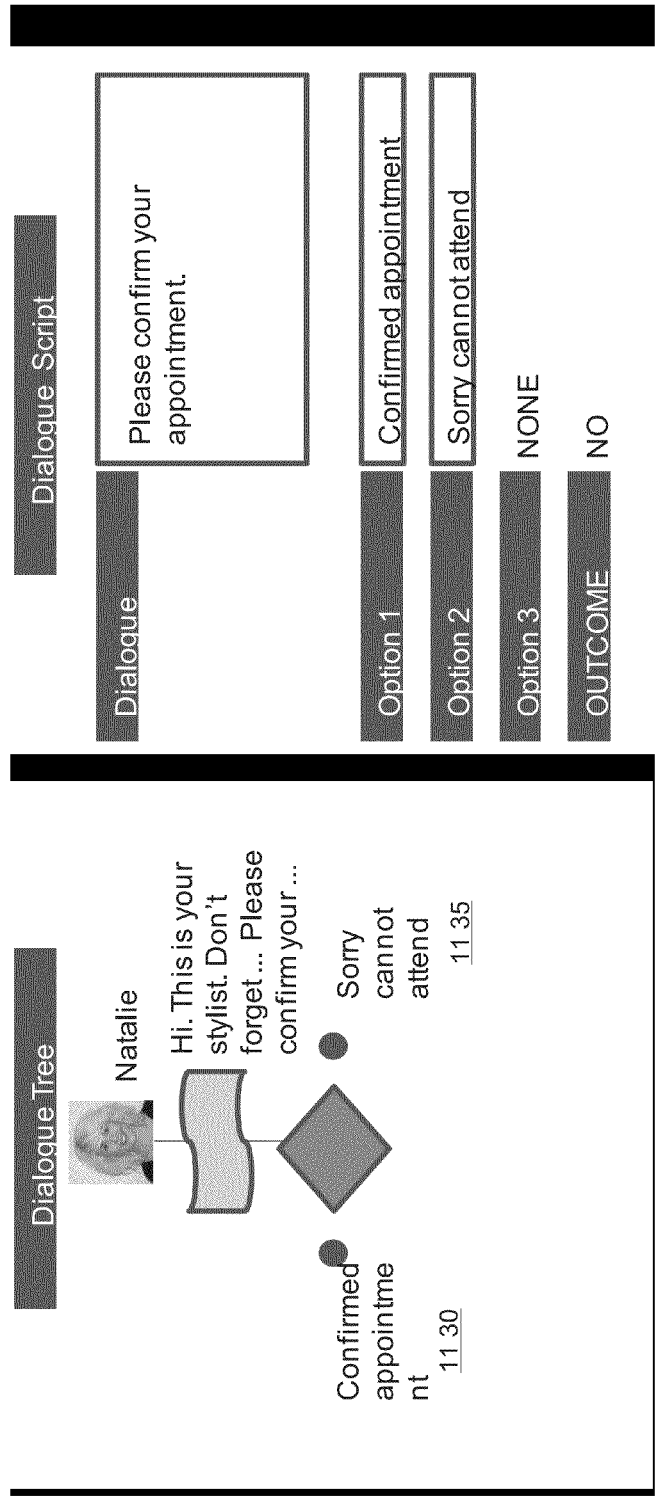
Figure 11C:
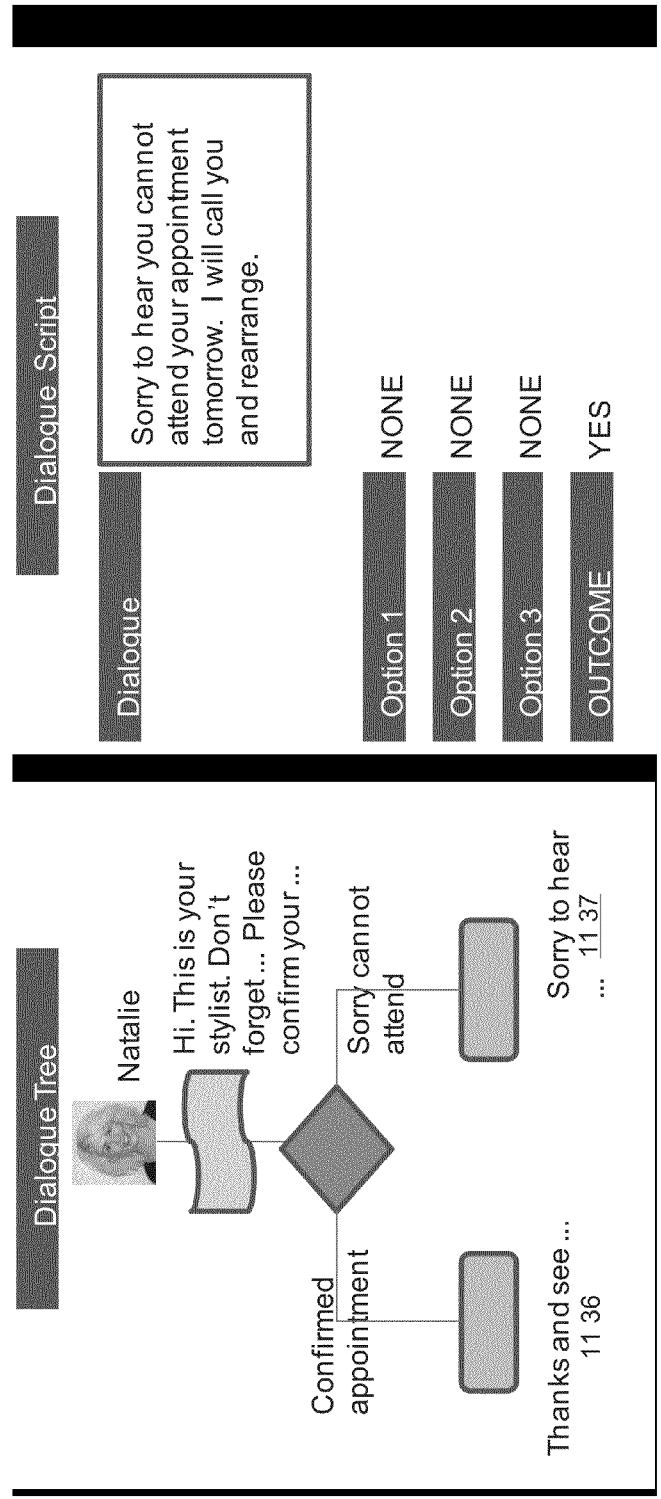
Figure 11D:
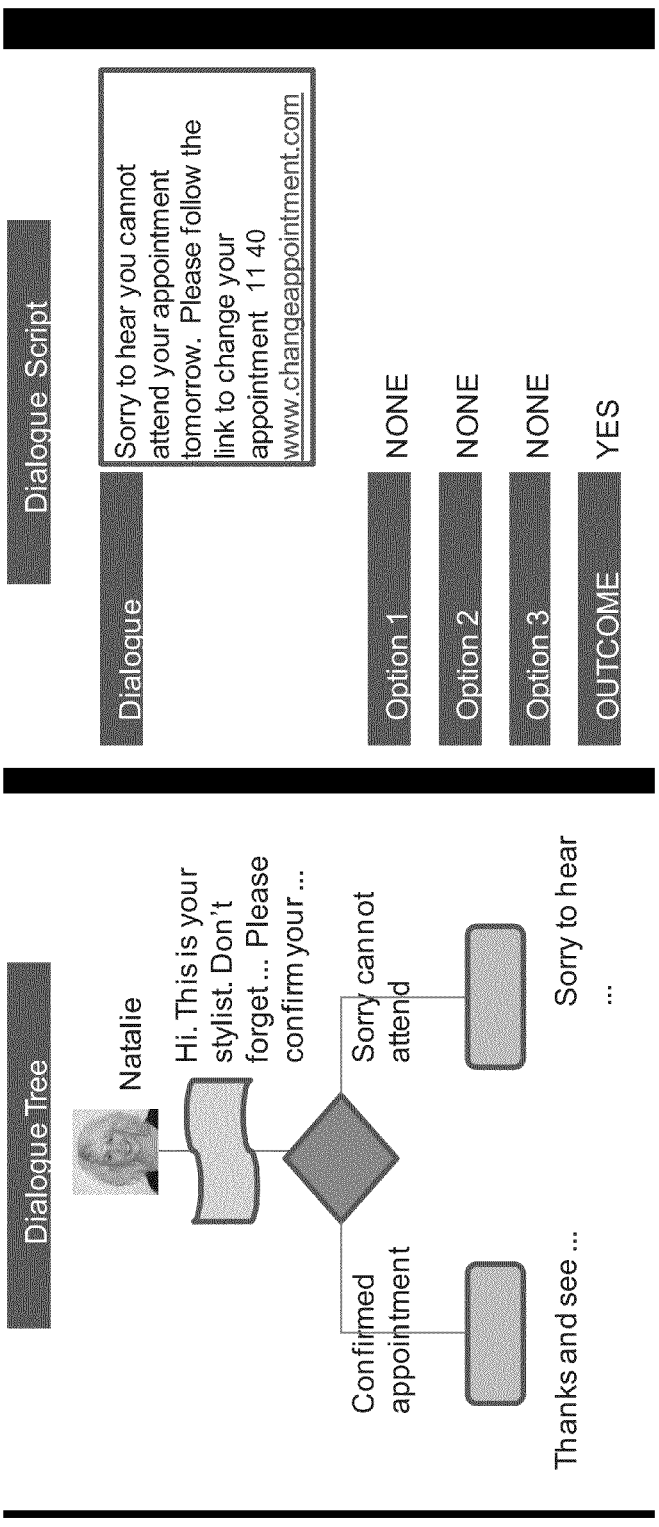
Figure 11E:
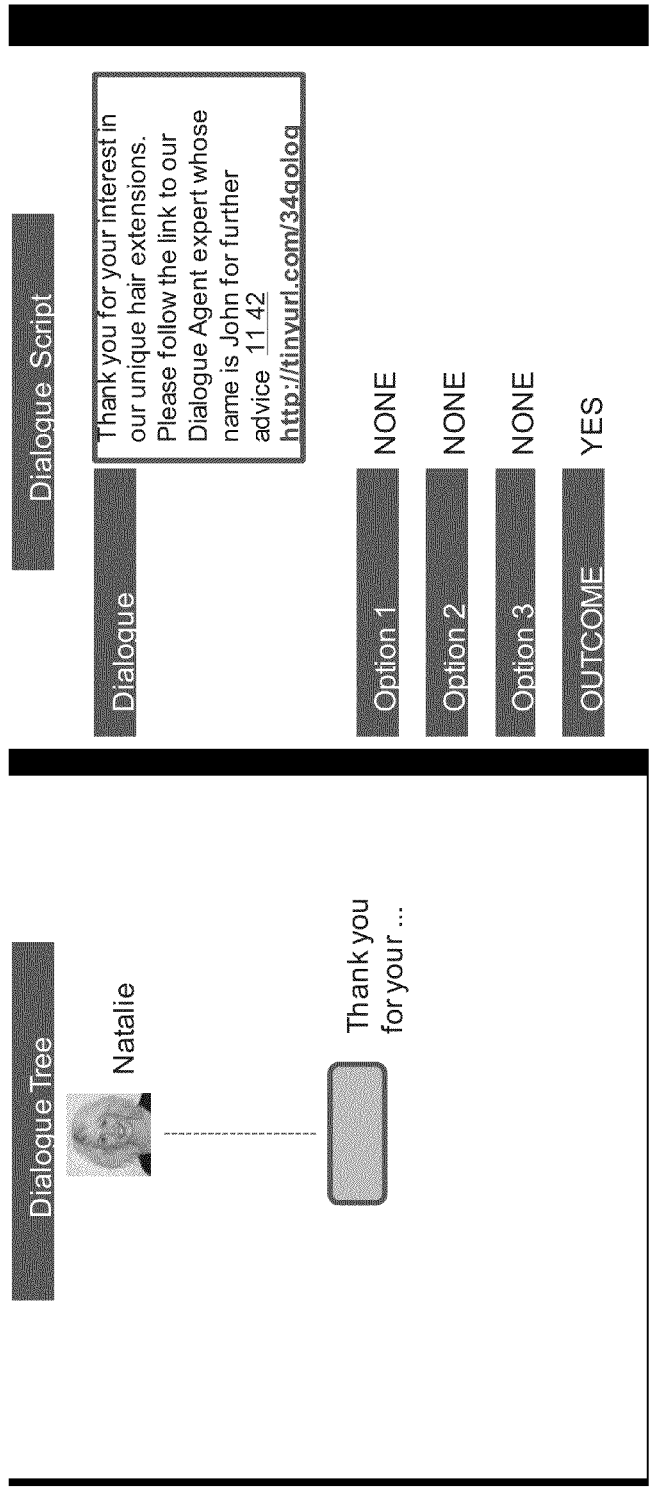

For example, as shown in FIG. 11B, the dialogue agent may receive two potential responses from a consumer "confirm appointment" 1130 or "cannot attend" 1135, each associated with a response 1136 and 1137 as shown in FIG. 11C. In another example, as shown in FIG. 11D, the dialogue agent may generate a hyperlink 1140, e.g., to suggest the consumer reschedule the appointment. In another example, as shown in FIG. 11E, the dialogue agent may provide a hyperlink to direct the consumer to another AI agent "John" 1142.

In one implementation, to help optimise conventional search, the dialogue agent may determine whether a search is requested in the conversation 1120, e.g., whether a consumer inquiry is received, and/or an aid is available to capture search logic, outputs and comments with the dialogue agent. In one implementation, the dialogue agent may populate key words onto a search engine (e.g., Google, etc.) for results, and generate a dialogue line for the consumer based on the Google search results 1123.

Figure 11F:
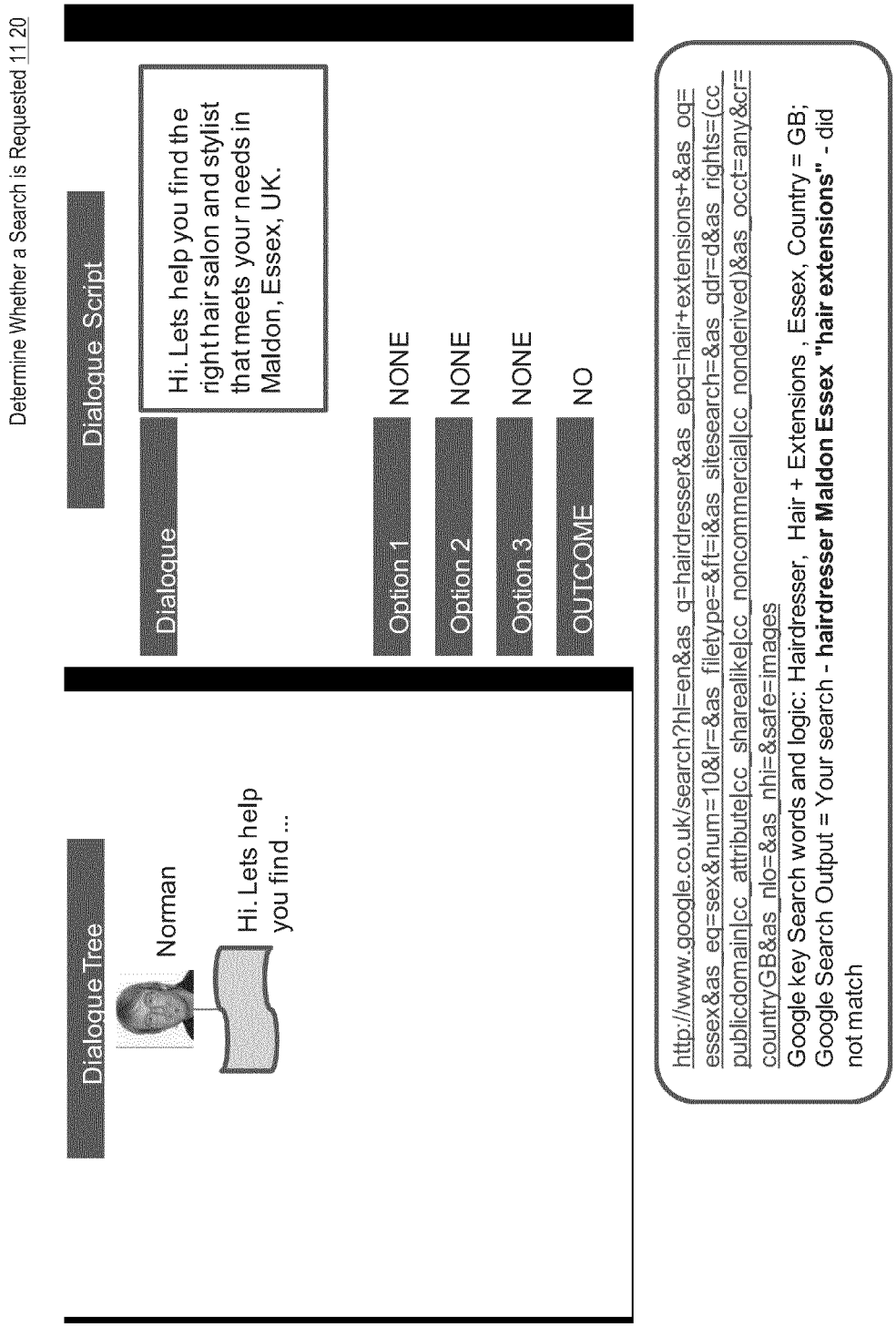
Figure 11G:
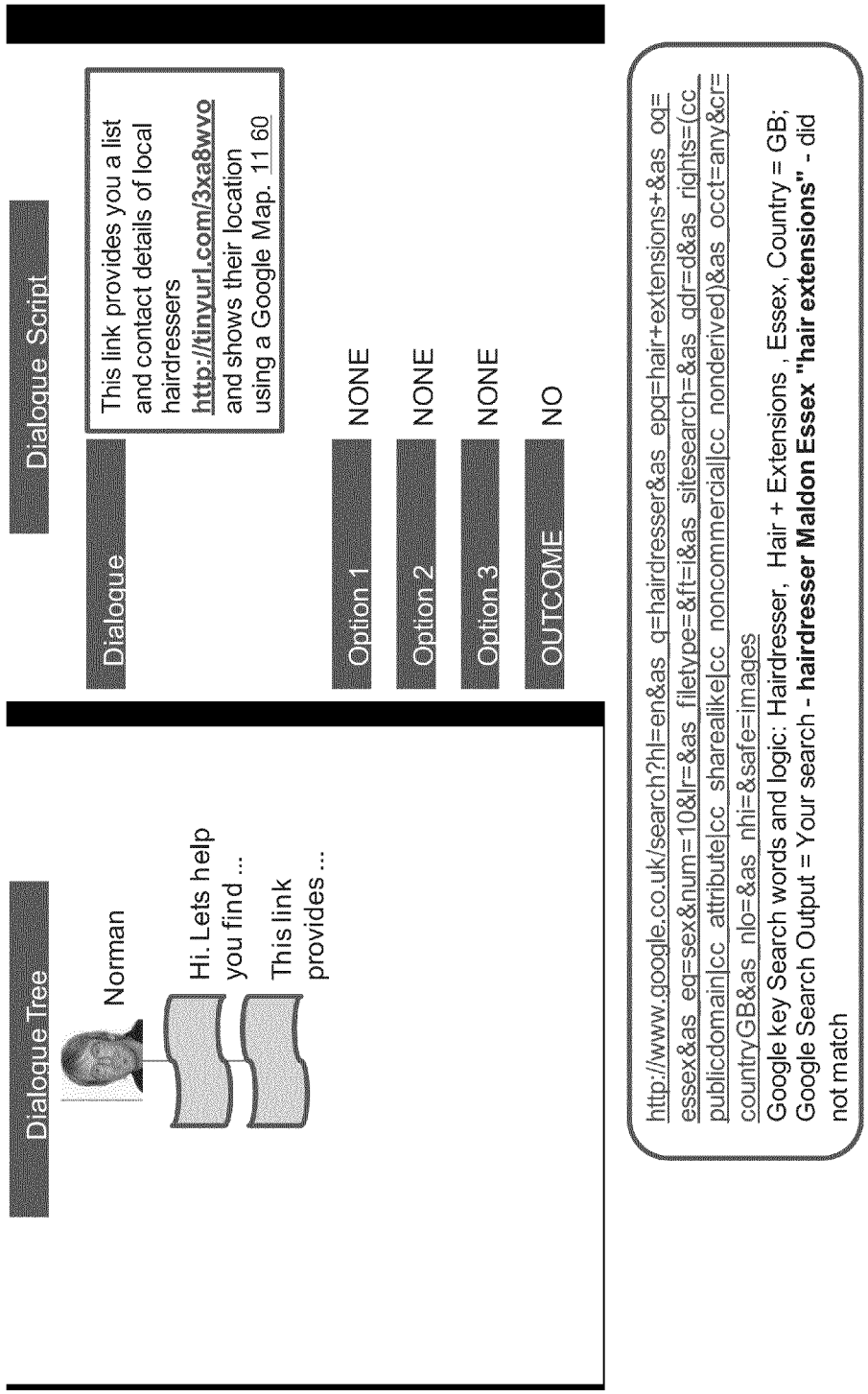

In one implementation, search engine may not return desirable results. For example, FIG. 11F illustrates a dialogue search that Google Search failed to match the search need, wherein the agent's search on "hair salon and stylist" in "Maldon, Essex, UK" does not return any result. As shown in FIG. 11G, the dialogue agent may generate a dialogue line based on partial key words search results when Google search failed 1122. For example, as shown in FIG. 11G, when the Google search "hairdresser Maldon Essex hair extension" fails to return desirable results, the dialogue agent may generate a link comprising a list of local hairdressers 1160.

Figure 11H:
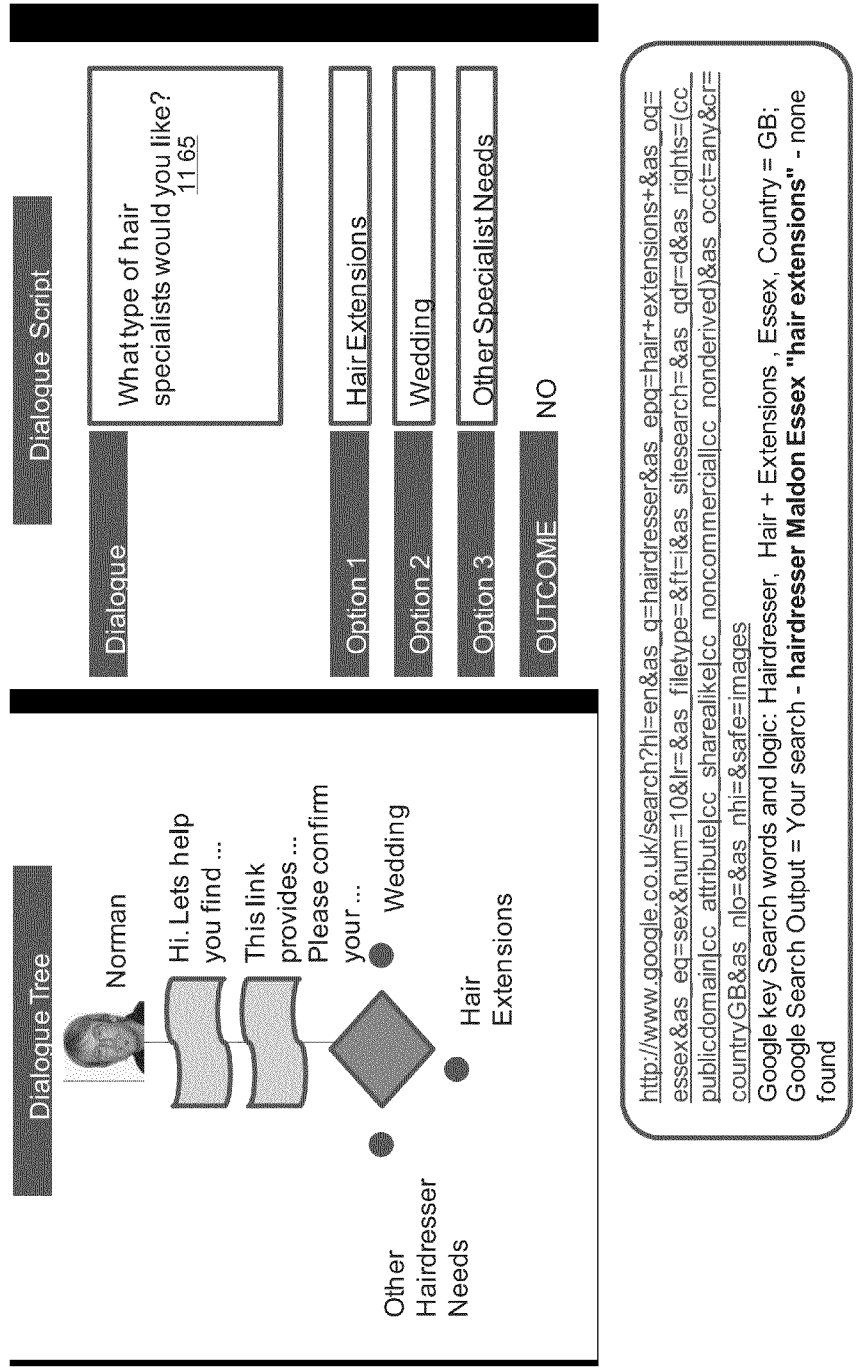

In an alternative implementation, the dialogue agent may provide alternate questions to the consumer to obtain information 1125. For example, as shown in FIG. 11H, the dialogue agent may generate a line "what type of hair specialist would you like" to obtain further information to narrow down the search 1165, and thus provide relevant search results based on consumer provided preferences 1170 as shown in FIG. 11I.

In one implementation, the dialogue agent may then update an asset wrapper with the generated search results and the dialogue lines 1127.

Figure 11L:
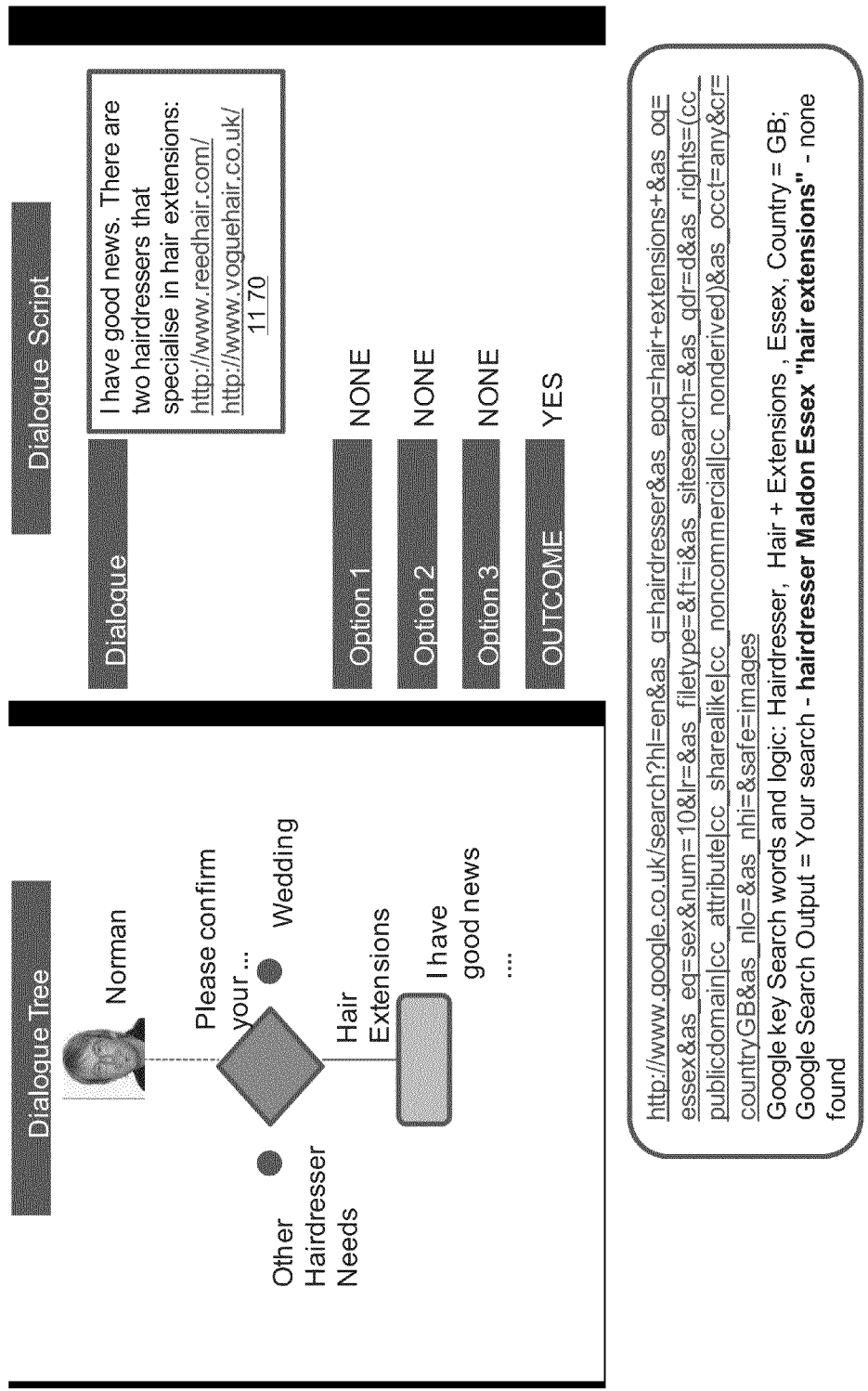
Figure 11J:
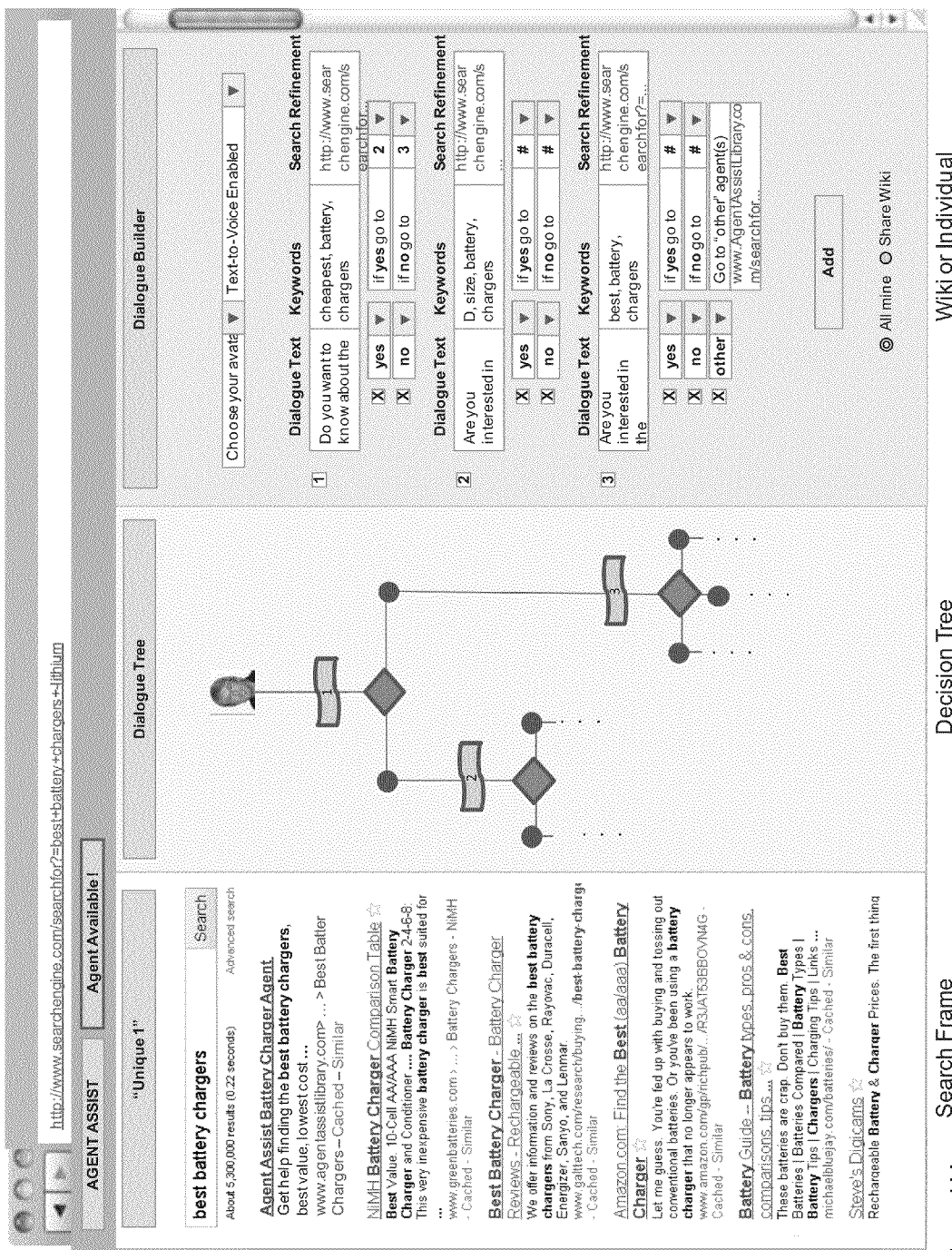
Figure 11K:
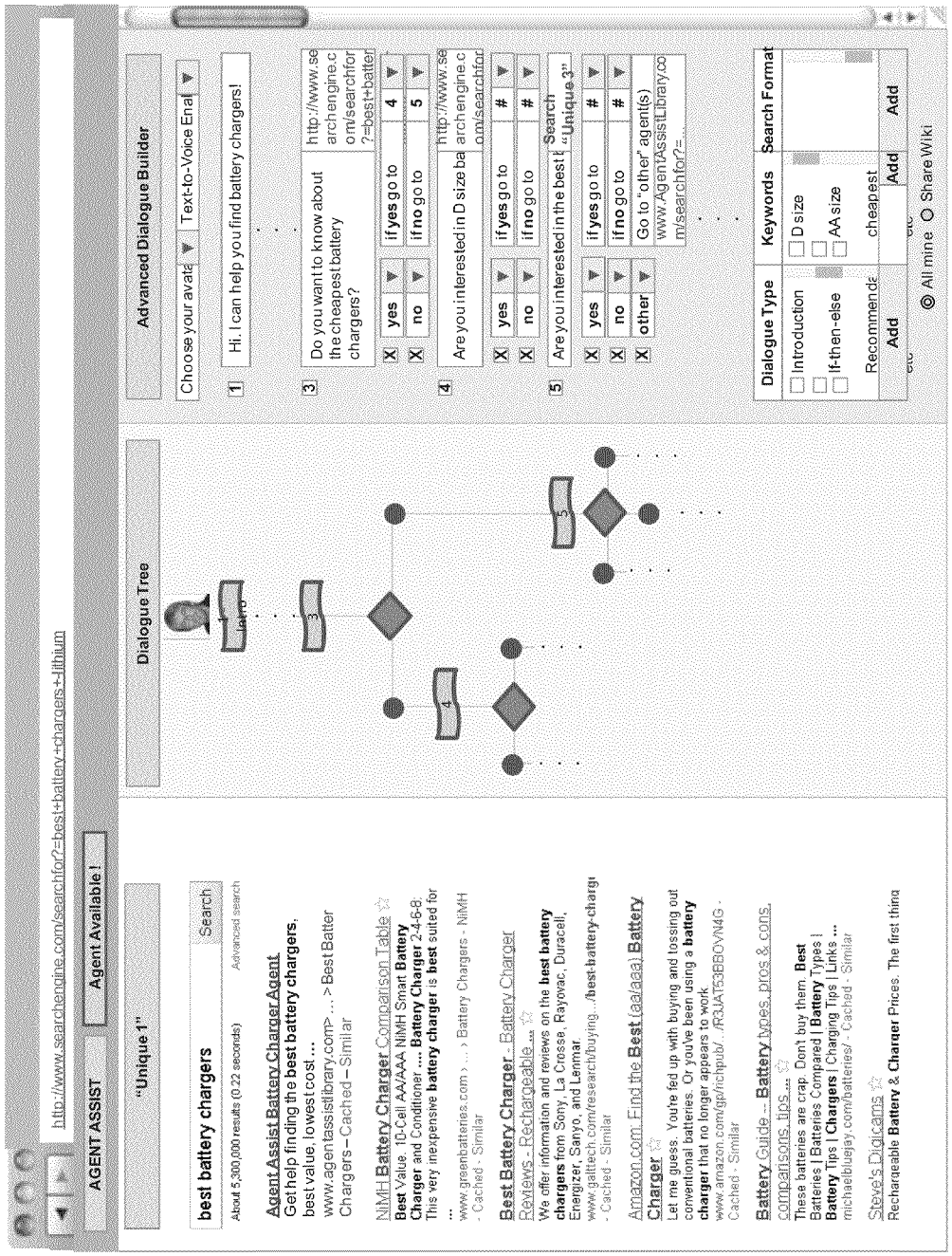

FIGS. 11J-L further illustrate generating a dialogue comprising an If-Then-Else logic within embodiments of the DCM-Platform. FIG. 11J-K provide an exemplar user interface screen for dialogue agent creation.

In one implementation, as shown in FIG. 11J-K, a dialogue agent application developer may create a dialogue logic by building a decision tree associated with search engine results. For example, a dialogue line "Do you want to know about the cheapest battery charger?" may be generated as a dialogue step for a consumer as the node "1" in the decision tree; two conditional responses from the consumer "Yes" and "No" are associated with this question, and thus form a bipartite branches "2" and "3" in the decision tree. For each branch, the dialogue agent may associate a search result link to be incorporated as a dialogue response for the conditional branch.

In one implementation, the dialogue builder may be created by a human developer. In another implementation, the dialogue applications may form an Internet community to allow Wiki submission of dialogue lines and conditions.

In one implementation, the search associated with each dialogue step may be refined progressively based on the consumer submitted feedback. For example, as shown in FIG. 11L, the dialogue agent may start a query on "best battery chargers," when the consumer triggers the branch "Yes"; the search may be refined to a query on "D-size best battery charger" when the consumer triggers the conditional branch by indicating "D-size."

For example, in one implementation, an exemplar XML implementation of an If-Then-Else logic in the dialogue may take a form similar to:

```
if cheapest_batter_charger="yes"
display the following text, "are you interested in D size battery chargers?"
query www.google.com "cheapest battery charger"
if cheapest_batter_charger="NO"
display the following text, "Are you interested in the best battery chargers."
query www.google.com "best battery charger"
if D-size_battery="Yes"
display the following text, "please visit www.d-size_battery.com/...."
if D-size_battery="No"
display the following text, "Thank you for visiting our website."
...
end if statements
```

In a further implementation, the DCM-Platform may facilitate a consumer to search for an available dialogue agent in a similar manner as discussed in FIG. 11L. For example, a consumer may submit "battery charger," and the DCM-Platform may prompt a search on its database for a dialogue agent that can assist on topics related to "battery chargers."

FIGS. 12A-12D provide diagrams illustrating dialogue analytics within embodiments of the DCM-Platform. In one embodiment, the dialogue agent may initiate dialogue analytics to drive the consumer-AI interaction 1205. For example, the dialogue agent may retrieve recorded dialogue actions in related topics 1210, including dialogue action recorded anonymously for large scale analytics 1210(a), linked to user for profiling analytics 1210(*b*), and/or linked to dialogue agent for value analytics 1210(*c*).

The dialogue agent may then determine a dialogue pathway of the retrieved dialogue 1215. For example, FIGS. 12B (a)-(d) illustrate examples of pathways taken by a consumer interacting with a dialogue agent, wherein each node denotes a dialogue action/line in the dialogue tree discussed in FIG. 10C. For example, FIG. 12B(a) shows a dialogue pathway wherein the consumer terminated the interaction before reaching an outcome.

Based on the dialogue pathway, the dialogue agent may determine dialogue parameters 1220, such as, but not limited to an actual number of dialogue actions in the interaction 1220(*a*), an amount of time taken for each dialogue-action 1220(*b*), and/or the like. For example, as shown in FIG. 12B(c), the number of dialogue actions may be the number of edges along a dialogue pathway, and the amount of time for each dialogue-action is illustrated in FIG. 12B(d).

In one implementation, the dialogue agent may determine whether multiple consumers, and/or multiple dialogue pathways are included in the dialogue. IF yes, the dialogue analytics may aggregate decision-pathways across multiple consumers interacting with the dialogue agent 1225, as shown in FIG. 12C.

Figure 12A:
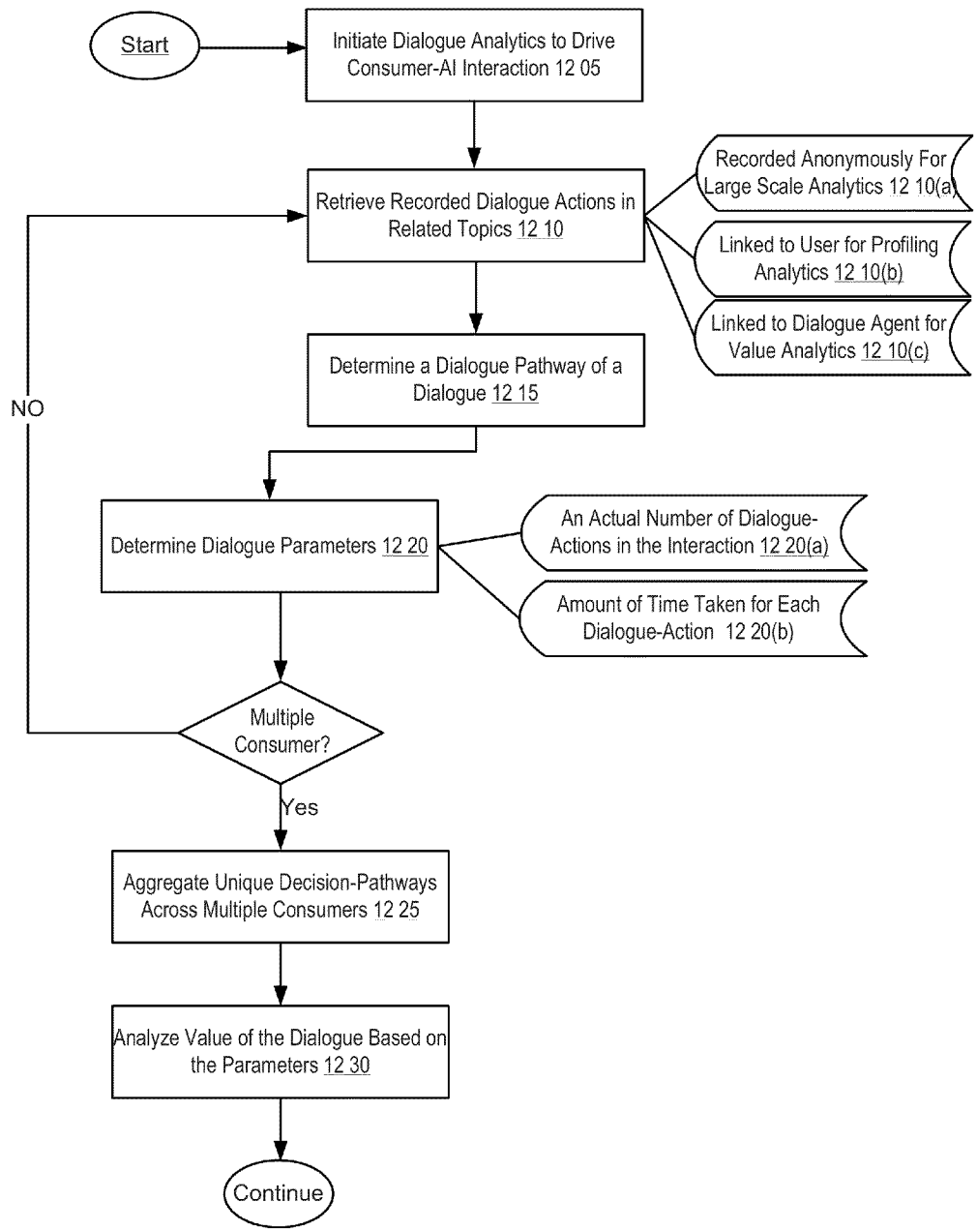
Figure 12D:
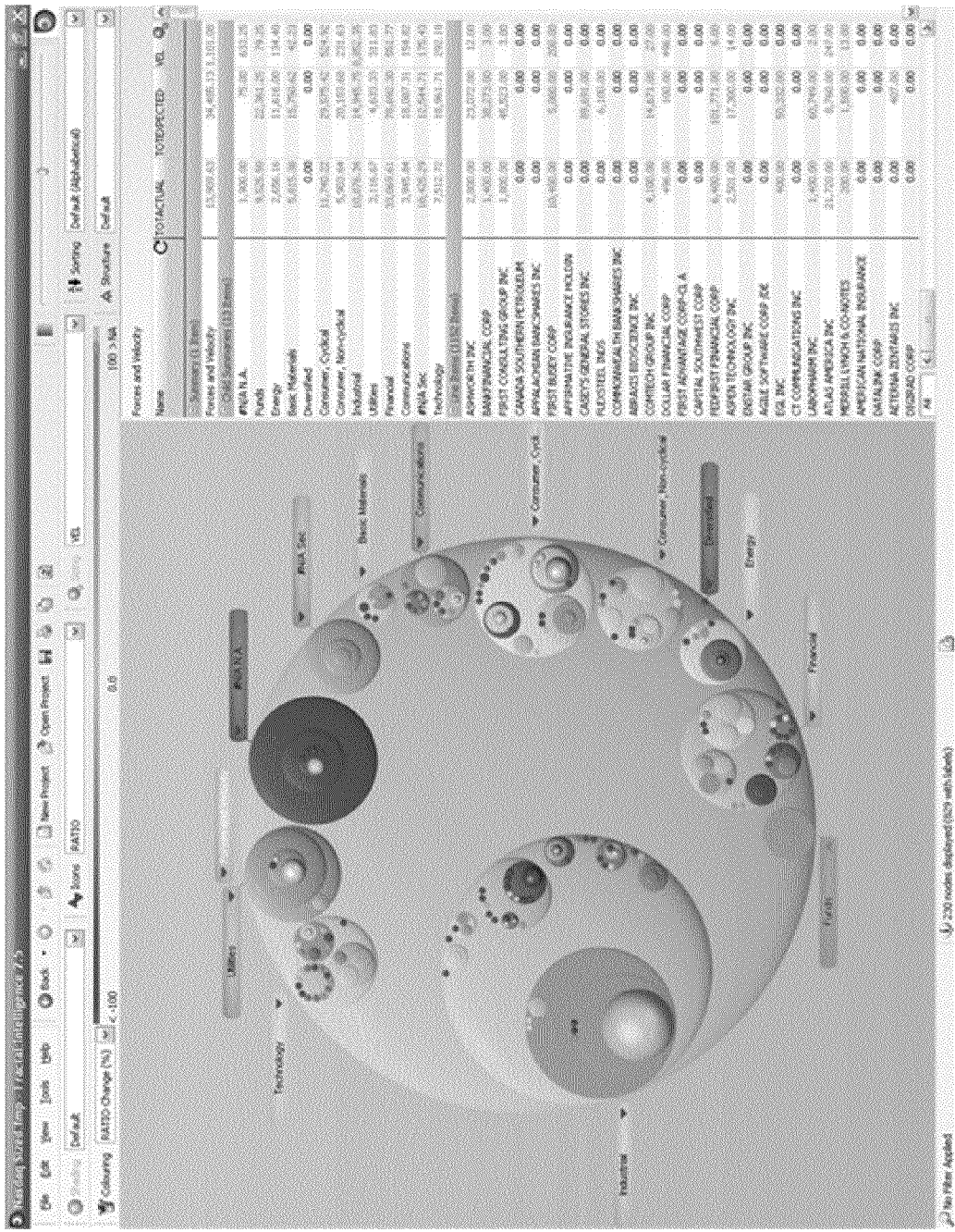

The dialogue agent may further analyze value of the dialogue based on the parameters, pathways of the dialogue 1230, and update the related asset wrapper accordingly. FIG. 12D provide an exemplary screen shot illustrating a visualisation with multiple dimensions of dialogue analytics within embodiments of the DCM-Platform.

FIG. 13 illustrates an exemplar diagram illustrating capturing client update within embodiments of the DCM-Platform. For example, a dialogue agent's knowledge may be updated, via incorporating search results, and/or the like. As shown in FIG. 13, the dialogue agent may capture new information related to the client while performing searches on a search engine (e.g., Google, etc.) 1305, and then send a request to the client 1310 for updated product information, so that the dialogue agent may incorporate the new information into the dialogue application to advertise it to consumers.

Figure 14A:
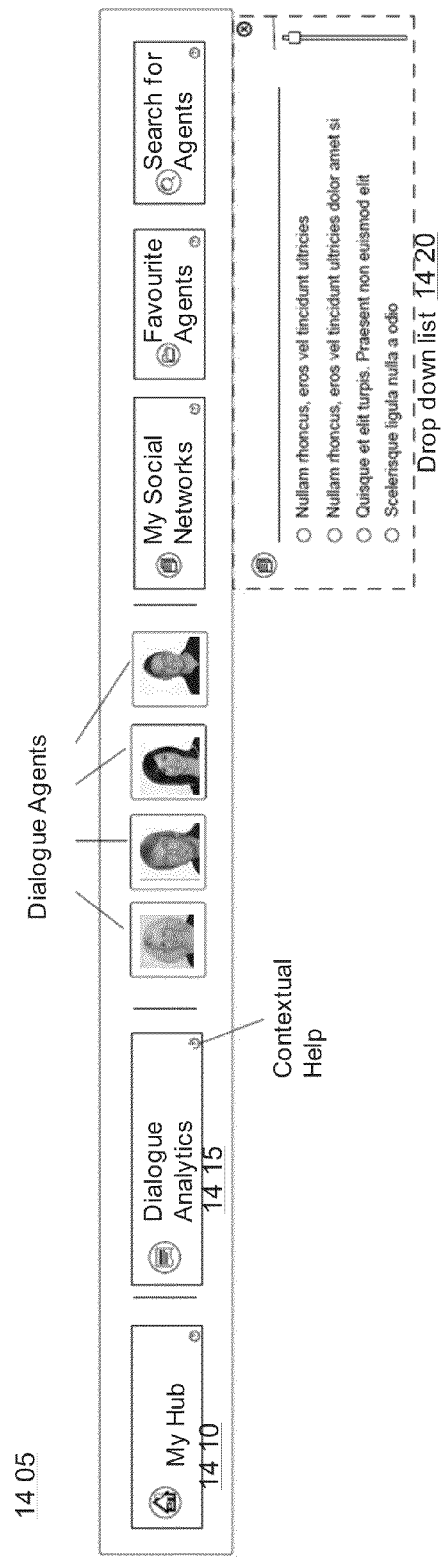
Figure 14B:
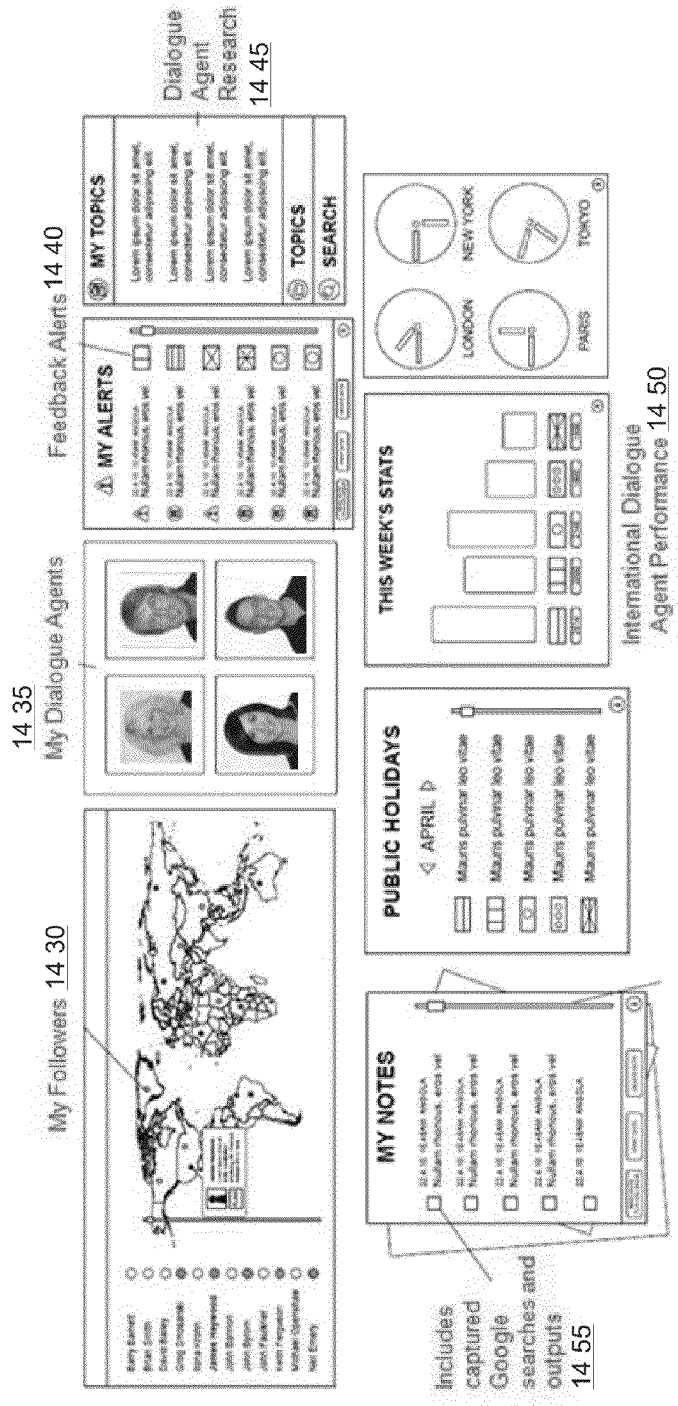

FIGS. 14A-B illustrate exemplar user interfaces within embodiments of the DCM-Platform. In one embodiment, a DCM-Platform user, e.g., an AI advertising company employee, a dialogue agent application developer, etc., may operate the dialogue applications with a personalised action bar 1405 as shown in FIG. 14A. In one implementation, the action bar 1405 may comprise a "My Hub" 1410 as a way of monitoring activity and tasks, a dialogue analytics button 1415 for dialogue pathway analysis, a list of generated dialogue agents, a drop down list of dialogue activities in foreign languages 1420, and/or the like.

In another implementation, the "My Hub" application 1410 may provide a dashboard view for the DCM-Platform users to track activities of the dialogue agents and the associated interactions with the consumers. For example, FIG. 14B shows the "My Hub" feature may show "My Followers" 1430 from social media platforms, a list of "My dialogue Agents" 1435, a list of feedback alerts 1440, a list of dialogue agent research on different topics and searches 1445, a chart illustrating international dialogue agent performance 1450, a list of notes on captured Google searches and outputs 1455, and/or the like.

Figure 15A:
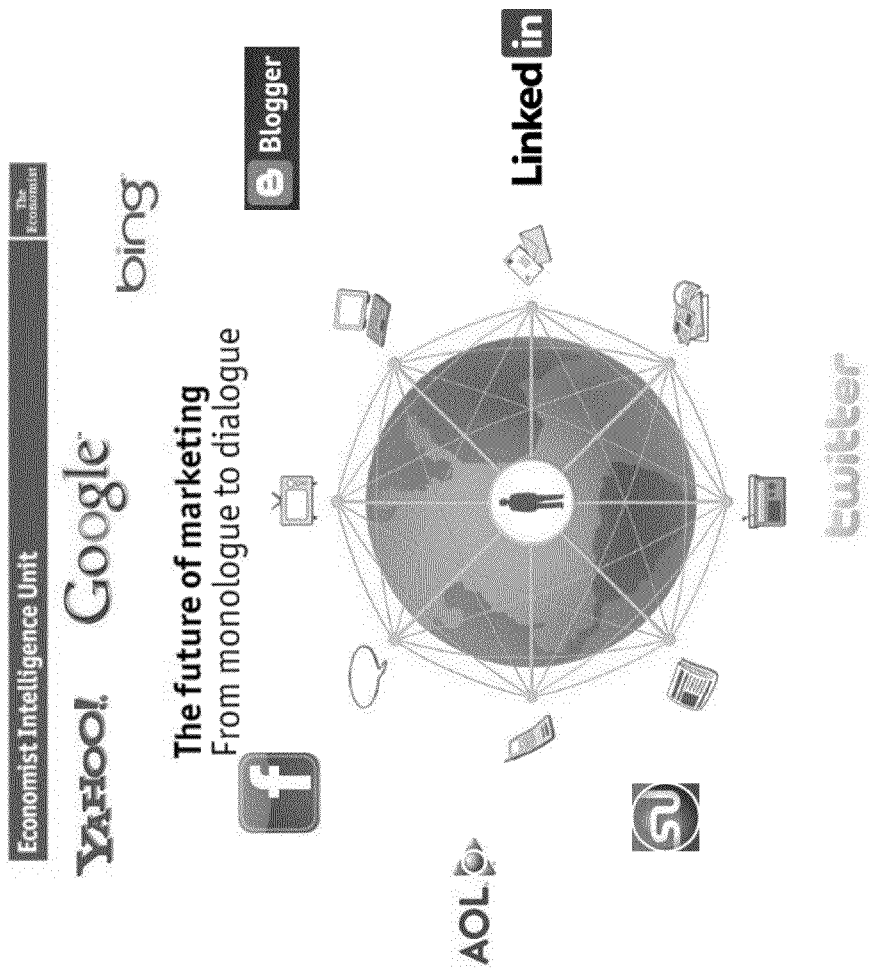

FIGS. 15A-E provide diagrams illustrating various implementations of interactive marketing via DCM-Platform. In one implementation, business, such as manufacturers, retailers, service providers, and/or the like, may use the dialogue agents to sell and support products via web-based marketing, as shown in FIG. 15A. For example, web-based search engines, such as Yahoo, Google, Bing, etc., may retrieve key words from the dialogue agents and feed search results including advertised products information to the dialogue agents.

Figure 15B:

In a further implementation, interactive marketing may be realized via Internet communities. For example, the DCM-Platform may use Internet communities, recommendation engines and services, and social networks (e.g., Stumble Upon, Digg, etc.) to stimulate global networking of favourite dialogue agents, e.g., by selecting related topics via Stumble Upon as shown in FIG. 15B.

Figure 15C:
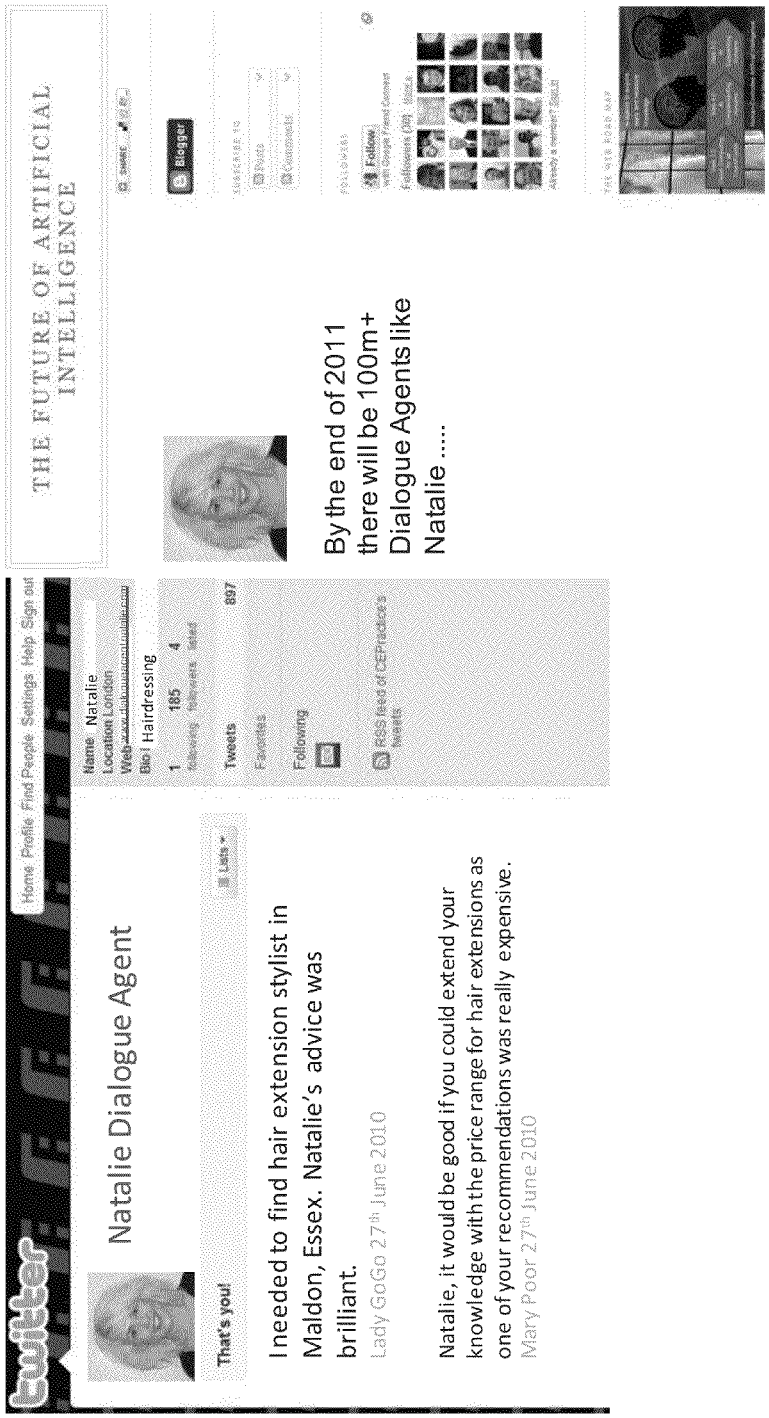

In another example, each dialogue agent may have its own social media identity (e.g., Twitter, eBlogger, etc.) and followers, and thus form feedback loops from its followers automatically linked to Twitter, as shown in FIG. 15C. In this way, the dialogue agent and/or the DCM-Platform may revise the marketing plan, e.g., the content, language, presentation, format, of the dialogue, etc., based on consumer feedbacks on a real-time basis.

Figure 15D:
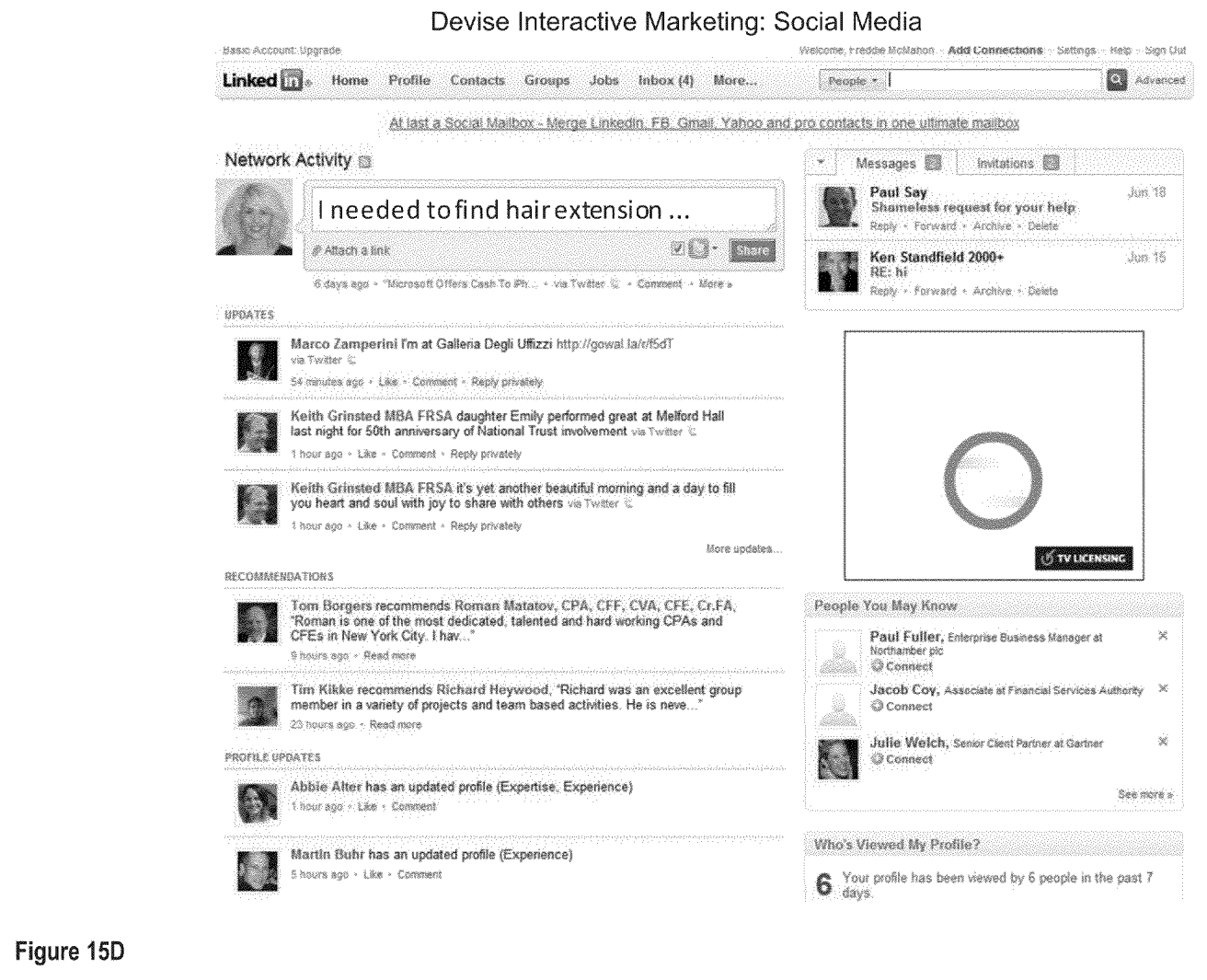

In one implementation, when a consumer has an activity via the social media, e.g., update his status indicating a demand of service "hair extension," as shown in FIG. 15D, the dialogue agents may receive the status update and automatically generate dialogue lines providing information of "hair extension" services featuring hair salons which may be advertising clients of the DCM-Platform. For another example, the dialogue agents may communicate via social networks to update their stored knowledge and information, as shown in FIG. 15D. Thus dialogue agents and consumers may form a community and group on social media platforms to offer advice and share knowledge of brand products and services.

Figure 15E:
Figure 15F:

In a further implementation, authors of dialogue agents may use their blogs for publishing details about their advancements and interactions. In a further implementation, the DCM-Platform may connect to Wikis (e.g., Wikipedia, etc.) to include dialogue agents that are relevant to a subject matter, e.g., a dialogue wiki application. For example, as shown in FIG. 15E, the Wikipedia entry of the founder of Artificial intelligence 1535, an AI dialogue agent 1540 may be associated with the Wikipedia entry to provide interactive knowledge to a reader. For example, a reader may ask questions with regard to the topic, e.g., "what are major academic journals on artificial intelligence?", etc., and the dialogue agent 1540 may then generate answers to the reader.

In a further implementation, the DCM-Platform may form a dialogue agent application community to build dialogue agent applications, enhance existing applications with dialogue agents and/or the like. For example, the dialogue agent applications may be sold on an Internet store, e.g., the iTunes store, etc., and business seeking for advertising services may purchase dialogue agent applications for marketing plan executions.

FIGS. 16A-D provide diagrams illustrating dialogue knowledge accumulation within embodiments of the DCM-Platform.

Figure 16A:
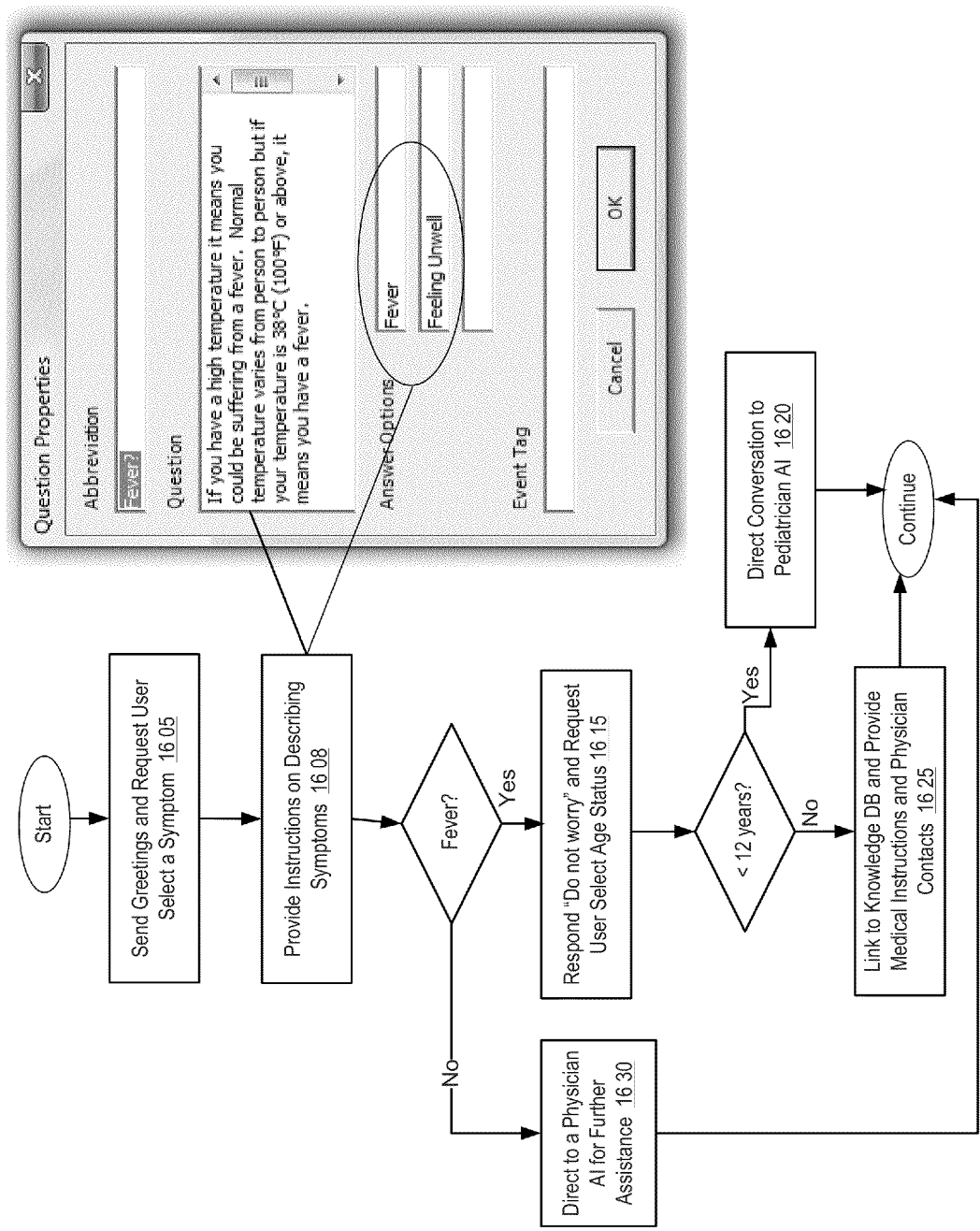

FIG. 16A provides an example dialogue for medical assistance within embodiments of the DCM-Platform. In one embodiment, as shown in FIG. 16A, a dialogue between a consumer and a medical consultant dialogue agent may start with the dialogue agent sending greetings and requesting the consumer select a symptom 1605. For example, the consumer may select whether he has developed a fever.

The dialogue agent may further provide instructions to describe symptoms 1608, e.g., to explain what is a fever to the consumer. If the consumer indicates a fever, the dialogue agent may respond "Do not worry" and request the consumer select an age status 1615, e.g., whether the consumer is under 12 years old. If yes, the dialogue agent may direct the conversation to a pediatrician dialogue agent 1620. Otherwise, the dialogue agent may link to a knowledge database and provide medical instructions on fever to the consumer 1625. In a further implementation, the dialogue agent may generate a search list of physician contacts to the consumer.

In another implementation, if the consumer does not select fever, the dialogue agent may direct the consumer to a physician dialogue agent for further assistance 1630, or suggest the consumer see a physician and provide a list of physician contacts.

In one embodiment, the DCM-Platform may create ecosystems of a new type of virtual agent application that enables just-in-time knowledge. For example, each virtual agent application has its' own decision-tree containing scripted dialogue that can be "dynamically linked" to other applications, which facilitates the knowledge acquirer to reach their specific relevant, targeted outcomes, as shown in FIG. 16B.

Figure 16C:
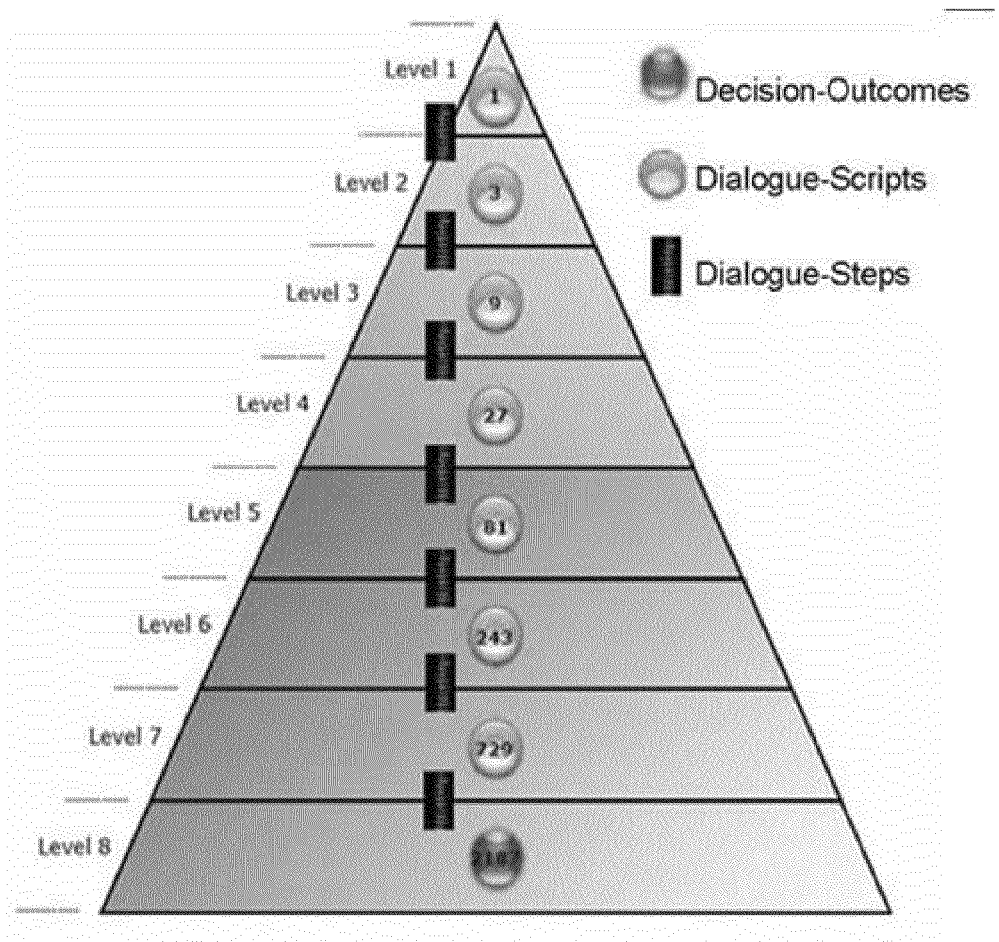

In one implementation, whereas search is barely a one-step interaction. these virtual agent applications use a combination of natural and scripted language for a meaningful conversation with consumers including decision outcomes, as shown in FIG. 16C.

As shown in FIG. 16C, when a virtual agent application engages in conversation, the acquirer interacts with a dialogue-step at a time so they only 'see' the selected pathway, e.g., a pathway selected by the consumer (FIG. 16B(a)). Each conversation is captured in a decision-string, as shown in FIG. 16B(b). In one implementation, the dialogue with a person is streamlined along a decision-pathway that can be as long or short as needed and, if necessary based on questions answered, one virtual agent can automatically hand off to another virtual agent on a different decision-string with more relevant knowledge, and a successful dialogue may end with a decision-outcome and thus presents the optimal point for monetization, as shown in FIG. 16B(b).

Figure 16D:
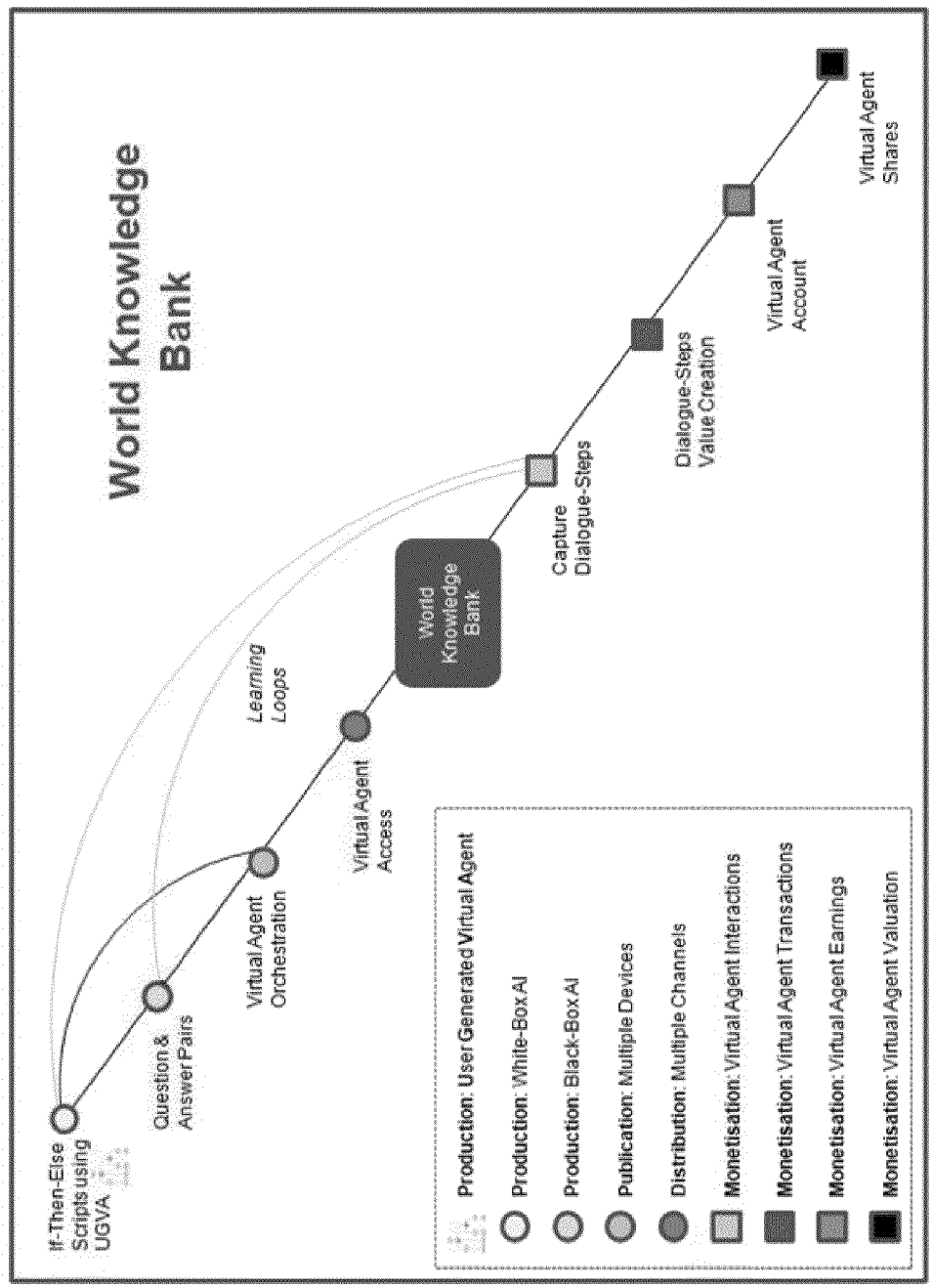

In one embodiment, the DCM-Platform may obtain and store knowledge to form a world knowledge bank, e.g., a knowledge database, as shown in FIG. 16D. For example, each virtual agent app may have an API link with the world knowledge bank for access to the latest version of their knowledge, the recording of their dialogue and the orchestration of events such as adverts and transactions. The knowledge bank may be monetized through virtual agent apps across markets.

For example, via the knowledge bank, DCM-Platform may provide knowledge delivery as professional advisory services by virtual agent apps across global health in paramedical, world trade paralegal and world trade accounting services, and/or the like; and establish consumer market retail brands provide knowledge delivery through virtual agent apps for consumers across consumables including electronics (e.g. digital cameras), white goods, clothing, travel, etc. leading to smarter online transactions.

In further implementations, the DCM-Platform may monetize the knowledge bank with revenues generated from dialogue advertising, including multimedia advertisement at each dialogue-step, tariffs on high quality knowledge exceed the price-per-display, price-per-click and location-based pricing CPM rates, and/or the like. The DCM-Platform may further generate revenue from Dialogue Analytics for business intelligence (value from emergent dialogue, patterns and flows), Transactions Commissions (dialogue transaction commission per dialogue-step, microfinance administration charges), corporate services (subscription charges to access knowledge portfolios, licensed revenues through virtual agent platforms, corporate internal knowledge exchange: priced per conversation), knowledge stock exchanges (trading of virtual agent app shares—several owners of each virtual agent, pass-thru transactions such as a financial products, derivatives, securities), and/or the like.

Alternative Embodiments of Dialogue Agent Applications

Further implementations of the DCM-Platform may include a white-box artificial intelligence engine associated with a dialogue avatar. The AI engine may support advertisement inventory for each dialogue-action, and an API may be created to link with an advertisement engine enabling dynamic ad placement and pricing.

For another example, The AI Engine may support media placement for selective dialogue-actions, and placement of movement codes for selective dialogue-actions.

In another implementation, the AI engine may support placement of semantic codes for selective dialogue-actions, wherein the semantic codes provides the basis for semantic analytics to generate greater insights and learning. The AI engine may further support placement of ecommerce codes for selective dialogue-actions.

In one implementation, the AI engine may generate ecommerce codes used to orchestrate $3^{rd}$ party ecommerce services for a targeted product or service. The AI engine may further be extended with an API to link dialogue agents into virtual communities for 7/24 accessibility.

In further implementations, the AI engine may support automated handover to another dialogue-tree, which facilitates an infinite number of dialogue pathways to be created and captured during the interaction In further implementations, the DCM-Platform may comprise new advertisement inventory across all digital end users; use Dialogue-Action as a new universal currency for measurement; empowers users to create dialogue agent apps; create new earning asset for authors; orchestrate sponsorship and advertisements; orchestrate ecommerce; orchestrate media; establish foundation for knowledge assets, and/or the like.

In some embodiments the DCM-Platform may optimises search by creating Dialogue Agents that are driven by human powered artificial intelligence; In some embodiments, the DCM-Platform may provide incentives to maximize the population of a dialogue wiki, dialogue agents, dialogue agent avatars, and dialogue agent applications across clouds, mobile operators, networked marketing, networked marketing and networked marketing, and social networks, in order to maximise highest volume population outcomes.

In some implementations, a percentage of the links generated by the dialogue agents may have referral links that give money or incentive 'value' points and/or prizes.

In some implementations, the dialogue agent may confirm user understanding and compliance via interactive user feedback, reward mechanisms, and/or the like.

In some implementations, the dialogue wiki, dialogue agents, dialogue agent avatars, and dialogue agent applications may be aggregated and analyzed for user data, characteristics, tutorial adoption, user interactive feedback such as asking "how was your purchase," system usage, user behaviour(s) and/or the like, and structure pay-for-performance incentives based on the intelligence for various entities participating in providing products and/or services for system users.

DCM-Platform Components

Figure 17:
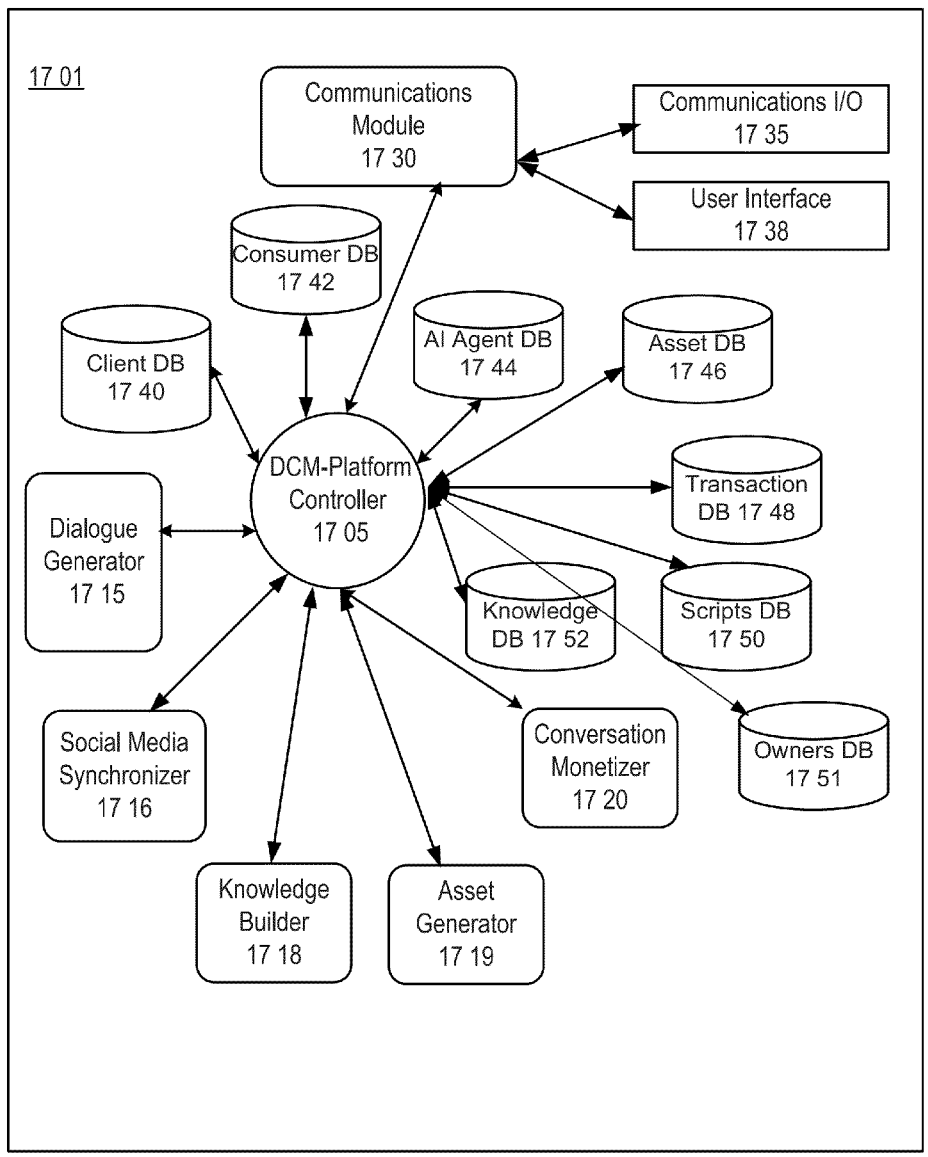
FIG. 17 shows a block diagrams illustrating components within embodiments of the DCM-Platform.

FIG. 17 illustrates an implementation of DCM-Platform components in one embodiment of DCM-Platform operation. A DCM-Platform apparatus 1701 may contain a number of processing components and/or data stores. A DCM-Platform controller 1705 may serve a central role in some embodiments of DCM-Platform operation, serving to orchestrate the reception, generation, and distribution of data and/or instructions to, from and between target device(s) and/or client device(s) via DCM-Platform modules and in some instances mediating communications with external entities and systems.

In one embodiment, the DCM-Platform controller 1705 may be housed separately from other modules and/or databases within the DCM-Platform system, while in another embodiment, some or all of the other modules and/or databases may be housed within and/or configured as part of the DCM-Platform controller. Further detail regarding implementations of DCM-Platform controller operations, modules, and databases is provided below.

In one embodiment, the DCM-Platform Controller 1705 may be coupled to one or more interface components and/or modules. In one embodiment, the DCM-Platform Controller may be coupled to a communications module 1730 and communications input/output (I/O) interface 1735, a maintenance interface 212, and a power interface 214. The user interface 1738 may be configured to receive user inputs and display application states and/or other outputs. The UI may, for example, allow a user to adjust DCM-Platform system settings, select communication methods and/or protocols, engage mobile device application features and/or the like. In one implementation, the user interface 1738 may include, but not limited to devices such as, keyboard(s), mouse, stylus(es), touch screen(s), digital display(s), and/or the like.

In one embodiment, the DCM-Platform Controller 205 may further be coupled to a communications module 1730, configured to interface with and/or process signals from communications I/O components 1735. The communications I/O components 1735 may comprise components facilitating transmission of electronic communications via a variety of different communication protocols and/or formats as coordinated with and/or by the communications module 1730. Communication I/O components 1735 may, for example, contain ports, slots, antennas, amplifiers, and/or the like to facilitate transmission of user interactive dialogue feedbacks, Internet search results, via any of the aforementioned methods. Communication protocols and/or formats for which the communications module 1730 and/or communications IO components 1735 may be compatible may include, but are not limited to, GSM, GPRS, W-CDMA, CDMA, CDMA2000, HSDPA, Ethernet, WiFi, Bluetooth, USB, and/or the like. In various implementations, the communication I/O 235 may, for example, serve to configure data into application, transport, network, media access control, and/or physical layer formats in accordance with a network transmission protocol, such as, but not limited to FTP, TCP/IP, SMTP, Short Message Peer-to-Peer (SMPP) and/or the like. The communications module 1730 and communications I/O 1735 may further be configurable to implement and/or translate Wireless Application Protocol (WAP), VoIP and/or the like data formats and/or protocols. The communications I/O 1735 may further house one or more ports, jacks, antennas, and/or the like to facilitate wired and/or wireless communications with and/or within the DCM-Platform system. For instance, in the above example, the DCM-Platform controller 1705 may transmit the generated dialogue actions to the communication module 1730, and the dialogue actions may then be transmitted to external entities (e.g., an AI entity, or a consumer, etc.) through the communications I/O 1735.

Numerous data transfer protocols may also be employed as DCM-Platform connections, for example, TCP/IP and/or higher protocols such as HTTP post, FTP put commands, and/or the like. In one implementation, the communications module 1730 may comprise web server software equipped to configure application state data for publication on the World Wide Web. Published application state data may, in one implementation, be represented as an integrated video, animation, rich internet application, and/or the like configured in accordance with a multimedia plug-in such as Adobe Flash. In another implementation, the communications module 1730 may comprise remote access software, such as Citrix, Virtual Network Computing (VNC), and/or the like equipped to configure application state data for viewing on a remote client (e.g., a remote display device).

In one embodiment, the DCM-Platform Controller may further be coupled to a Dialogue Generator 1715, a Social Media Synchronizer 1716, a Knowledge Builder 1718, an Asset Generator 1719, a Conversation Monetizer 1720 and/or the like. Within various implementations, the Dialogue Generator 1715 may receive and process consumer dialogue requests, and generate interactive dialogue actions. The generated dialogues may be populated and implemented via a virtual conversation AI entity on a social media platform by the Social Media Synchronizer 1716. The Knowledge Builder 1718 may perform data mining over the stored interactive dialogue scripts, and obtain various information from a client (e.g., brand information, product information, etc.) to synthesize information and store in the Knowledge database 1752. In one implementation, the Asset Generator 1719 may encapsulate the digital conversation and create conversation assets, AI entity assets, portfolio assets, and/or exchange assets for trades, and the Conversation Monetizer 1720 may determine the value of each asset.

Figure 18:
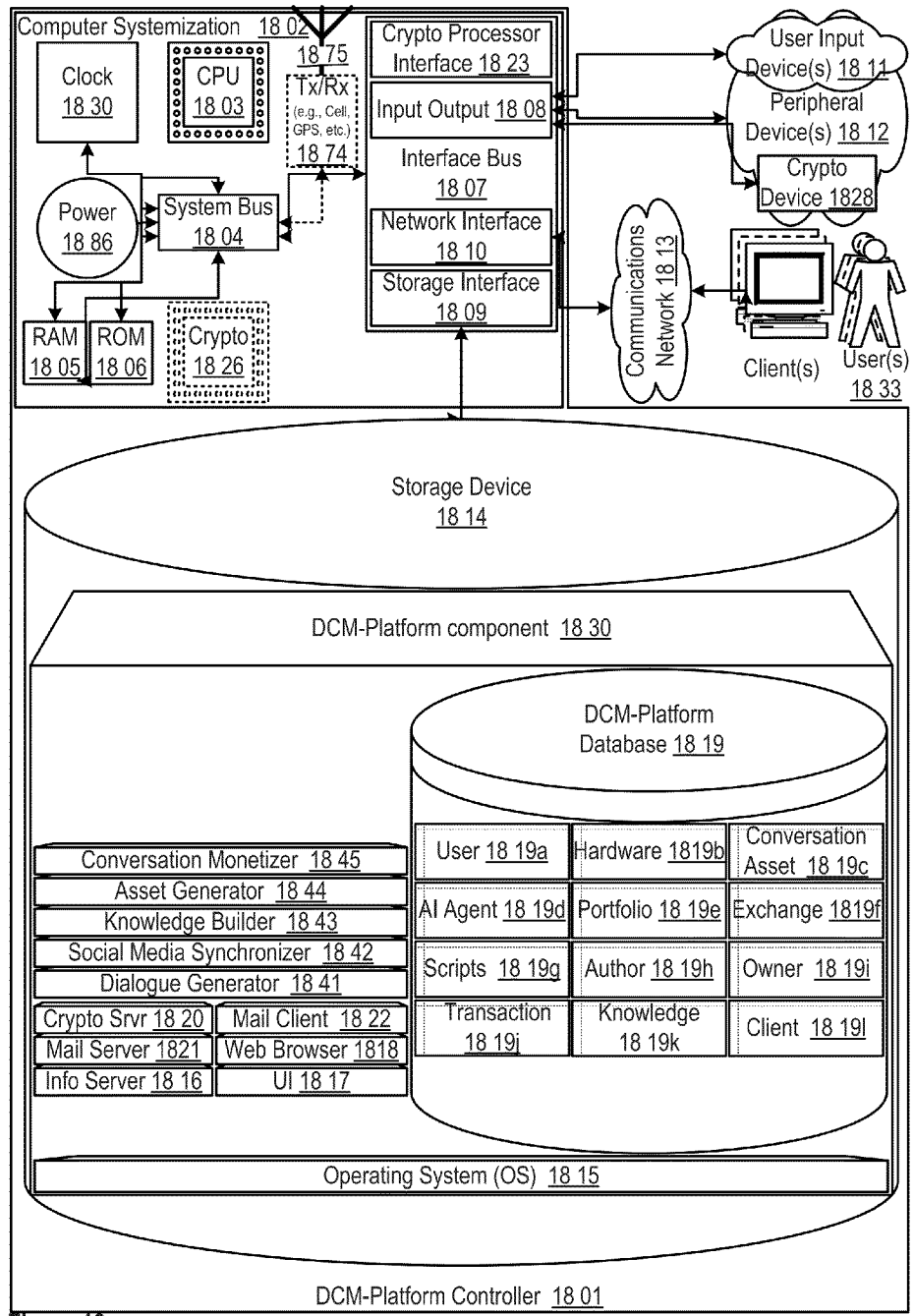
FIG. 18 shows a block diagram illustrating embodiments of a DCM-Platform controller.

In one implementation, the DCM-Platform controller 1705 may further be coupled to a plurality of databases configured to store and maintain DCM-Platform data, such as but not limited to a Client database 1740, a Consumer database 1742, an AI Agent database 1744, an Asset database 1746, a Transaction database 1748, a Scripts database 1750, a Knowledge database 1752, and/or the like, as further illustrated in FIG. 18.

DCM-Platform Controller

FIG. 18 shows a block diagram illustrating embodiments of a DCM-Platform controller. In this embodiment, the DCM-Platform controller 1801 may serve to aggregate, process, store, search, serve, identify, instruct, generate, match, and/or facilitate interactions with a computer through artificial intelligence technologies, and/or other related data.

Typically, users, which may be people and/or other systems, may engage information technology systems (e.g., computers) to facilitate information processing. In turn, computers employ processors to process information; such processors 1803 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1829 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DCM-Platform controller 1801 may be connected to and/or communicate with entities such as, but not limited to: one or more users from user input devices 1811; peripheral devices 1812; an optional cryptographic processor device 1828; and/or a communications network 1813.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks 12 (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DCM-Platform controller 1801 may be based on computer systems that may comprise, but are not limited to, components such as: a computer systemization 1802 connected to memory 1829.

Computer Systemization

A computer systemization 1802 may comprise a clock 1830, central processing unit ("CPU(s)" and/or "processor(s)" (these terms are used interchangeable throughout the disclosure unless noted to the contrary)) 1803, a memory 1829 (e.g., a read only memory (ROM) 1806, a random access memory (RAM) 1805, etc.), and/or an interface bus 1807, and most frequently, although not necessarily, are all interconnected and/or communicating through a system bus 1804 on one or more (mother)board(s) 1802 having conductive and/or otherwise transportive circuit pathways through which instructions (e.g., binary encoded signals) may travel to effectuate communications, operations, storage, etc. The computer systemization may be connected to a power source 1886; e.g., optionally the power source may be internal. Optionally, a cryptographic processor 1826 and/or transceivers (e.g., ICs) 1874 may be connected to the system bus. In another embodiment, the cryptographic processor and/or transceivers may be connected as either internal and/or external peripheral devices 1812 via the interface bus I/O. In turn, the transceivers may be connected to antenna(s) 1875, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing DCM-Platform controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1829 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the DCM-Platform controller and beyond through various interfaces. Should processing requirements dictate a greater amount speed and/or capacity, distributed processors (e.g., Distributed DCM-Platform), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the DCM-Platform may be achieved by implementing a microcontroller such as CAST's R8051XC2 microcontroller; Intel's MCS 51 (i.e., 8051 microcontroller); and/or the like. Also, to implement certain features of the DCM-Platform, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DCM-Platform component collection (distributed or otherwise) and/or features may be implemented via the microprocessor and/or via embedded components; e.g., via ASIC, coprocessor, DSP, FPGA, and/or the like. Alternately, some implementations of the DCM-Platform may be implemented with embedded components that are configured and used to achieve a variety of features or signal processing.

Depending on the particular implementation, the embedded components may include software solutions, hardware solutions, and/or some combination of both hardware/software solutions. For example, DCM-Platform features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DCM-Platform features. A hierarchy of programmable interconnects allow logic blocks to be interconnected as needed by the DCM-Platform system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the DCM-Platform may be developed on regular FPGAs and then migrated into a fixed version that more resembles ASIC implementations. Alternate or coordinating implementations may migrate DCM-Platform controller features to a final ASIC instead of or in addition to FPGAs. Depending on the implementation all of the aforementioned embedded components and microprocessors may be considered the "CPU" and/or "processor" for the DCM-Platform.

Power Source

The power source 1886 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1886 is connected to at least one of the interconnected subsequent components of the DCM-Platform thereby providing an electric current to all subsequent components. In one example, the power source 1886 is connected to the system bus component 1804. In an alternative embodiment, an outside power source 1886 is provided through a connection across the I/O 1808 interface. For example, a USB and/or IEEE 1394 connection carries both data and power across the connection and is therefore a suitable source of power.

Interface Adapters

Interface bus(ses) 1807 may accept, connect, and/or communicate to a number of interface adapters, conventionally although not necessarily in the form of adapter cards, such as but not limited to: input output interfaces (I/O) 1808, storage interfaces 1809, network interfaces 1810, and/or the like. Optionally, cryptographic processor interfaces 1827 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1809 may accept, communicate, and/or connect to a number of storage devices such as, but not limited to: storage devices 1814, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1810 may accept, communicate, and/or connect to a communications network 1813. Through a communications network 1813, the DCM-Platform controller is accessible through remote clients 1833*b* (e.g., computers with web browsers) by users 1833*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed DCM-Platform), architectures may similarly be employed to pool, load balance, and/or otherwise increase the communicative bandwidth required by the DCM-Platform controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1810 may be used to engage with various communications network types 1813. For example, multiple network interfaces may be employed to allow for the communication over broadcast, multicast, and/or unicast networks.

Input Output interfaces (I/O) 1808 may accept, communicate, and/or connect to user input devices 1811, peripheral devices 1812, cryptographic processor devices 1828, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1811 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1812 may be connected and/or communicate to I/O and/or other facilities of the like such as network interfaces, storage interfaces, directly to the interface bus, system bus, the CPU, and/or the like. Peripheral devices may be external, internal and/or part of the DCM-Platform controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the DCM-Platform controller may be embodied as an embedded, dedicated, and/or monitor-less (i.e., headless) device, wherein access would be provided over a network interface connection.

Cryptographic units such as, but not limited to, microcontrollers, processors 1826, interfaces 1827, and/or devices 1828 may be attached, and/or communicate with the DCM-Platform controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+16 MB/s of cryptographic instructions; VLSI Technology's 33 MHz 6868; and/or the like.

Memory

Generally, any mechanization and/or embodiment allowing a processor to affect the storage and/or retrieval of information is regarded as memory 1829. However, memory is a fungible technology and resource, thus, any number of memory embodiments may be employed in lieu of or in concert with one another. It is to be understood that the DCM-Platform controller and/or a computer systemization may employ various forms of memory 1829. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1829 will include ROM 1806, RAM 1805, and a storage device 1814. A storage device 1814 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1829 may contain a collection of program and/or database components and/or data such as, but not limited to: operating system component(s) 1815 (operating system); information server component(s) 1816 (information server); user interface component(s) 1817 (user interface); Web browser component(s) 1818 (Web browser); database(s) 1819; mail server component(s) 1821; mail client component(s) 1822; cryptographic server component(s) 1820 (cryptographic server); the DCM-Platform component(s) 1835; and/or the like (i.e., collectively a component collection). These components may be stored and accessed from the storage devices and/or from storage devices accessible through an interface bus. Although non-conventional program components such as those in the component collection, typically, are stored in a local storage device 1814, they may also be loaded and/or stored in memory such as: peripheral devices, RAM, remote storage facilities through a communications network, ROM, various forms of memory, and/or the like.

Operating System

The operating system component 1815 is an executable program component facilitating the operation of the DCM-Platform controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DCM-Platform controller to communicate with other entities through a communications network 1813. Various communication protocols may be used by the DCM-Platform controller as a subcarrier transport mechanism for interaction, such as, but not limited to: multicast, TCP/IP, UDP, unicast, and/or the like.

Information Server

An information server component 1816 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo!Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DCM-Platform controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DCM-Platform database 1819, operating systems, other program components, user interfaces, Web browsers, and/or the like.

Access to the DCM-Platform database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DCM-Platform. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DCM-Platform as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1817 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1818 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the DCM-Platform enabled nodes. The combined application may be nugatory on systems employing standard Web browsers.

Mail Server

A mail server component 1821 is a stored program component that is executed by a CPU 1803. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the DCM-Platform.

Access to the DCM-Platform mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1822 is a stored program component that is executed by a CPU 1803. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1820 is a stored program component that is executed by a CPU 1803, cryptographic processor 1826, cryptographic processor interface 1827, cryptographic processor device 1828, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DCM-Platform may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DCM-Platform component to engage in secure transactions if so desired. The cryptographic component facilitates the secure accessing of resources on the DCM-Platform and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DCM-Platform Database

The DCM-Platform database component 1819 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DCM-Platform database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DCM-Platform database is implemented as a data-structure, the use of the DCM-Platform database 1819 may be integrated into another component such as the DCM-Platform component 1835. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 includes several tables 519*a-e*. A User table 1819*a* includes fields such as, but not limited to: UserID, UserAddress, UserPhoneNumer, UserName, UserAddress, UserPassword, UserType, UserPreference, UserAccount, and/or the like. The User table may support and/or track multiple entity accounts on a DCM-Platform. A Hardware table 1819*b* includes fields such as, but not limited to: HardwareID, UserID, ScriptID, ConvAssetID, HardwareType, HardwareName, DataFormattingRequirements, HardwareProtocols, AddressInfo, UsageHistory, HardwareRequirements and/or the like. A Conversation Asset table 1819*c* includes fields such as, but not limited to: AssetID, AssetSymbol, AssetName, AssetType, AIAgentID, AIAgentName, ExchangeID, PortfolioID, AssetIndex, AssetOwnership, AssetNegotiator, AssetWrapperTag, AssetSize, ScriptID and/or the like. An AI Agent table 119*d* includes fields such as, but not limited to: AgentID, AgentName, AssetID, AssetName, AssetOwnership, PortfolioID, AgentHistory, AgentCredit, and/or the like. A Portfolio table 1819*e* includes fields such as, but not limited to: PortfolioID, PortfolioName, AssetID, AssetName, PortfolioOwnership, PortfolioWrapperTag, PortfolioIndex, PortfolioNegatiator, AgentID, and/or the like. An Exchange table 1819*f* includes fields such as, but not limited to: ExchangeID, ExchangeParty, ExchangeIndex, ExchangeTime, AssetID, PortfolioID, AgentID, and/or the like. A Scripts table 1819*g* includes fields such as, but not limited to: ScriptID, ScriptName, ScriptTime, ScriptFile, AssetID, AgentID, HardwareID, ScriptFormat, ScriptType, ScriptProgram, ScriptAuthor, and/or the like. An author table 1819*h* includes fields such as, but not limited to: AuthorName, AuthorID, AuthorScript, AuthorAI, AuthorType, AuthorConversationID, and/or the like. An owner table 1819*i* includes fields such as, but not limited to: OwnerName, OwnerType, OwnerID, OwnerAssetID, OwnerAI, OwnerLegalInfo, and/or the like. A transaction table 1819*j* includes fields such as, but not limited to: TransactionID, TransactionParty, TransactionOwner, TransactionAI, TransactionAsset, TranctionTime, TransactionPrice, TransactionVolume, and/or the like. A knowledge table 1819*k* includes fields such as, but not limited to: KnowledgeID, KnowledgeSource, KnowledgeScriptID, KnowledgeSearchID, KnowledgeDistributorID, and/or the like. A client table 1819*l* includes fields such as, but not limited to: ClientID, ClientName, ClientAd, ClientAI, ClientProject, and/or the like.

In one embodiment, the DCM-Platform database may interact with other database systems. For example, employing a distributed database system, queries and data access by search DCM-Platform component may treat the combination of the DCM-Platform database, an integrated data security layer database as a single database entity.

In one embodiment, user programs may contain various user interface primitives, which may serve to update the DCM-Platform. Also, various accounts may require custom database tables depending upon the environments and the types of clients the DCM-Platform may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1819a-l. The DCM-Platform may be configured to keep track of various settings, inputs, and parameters via database controllers.

The DCM-Platform database may communicate to and/or with other components in a component collection, including itself, and/or facilities of the like. Most frequently, the DCM-Platform database communicates with the DCM-Platform component, other program components, and/or the like. The database may contain, retain, and provide information regarding other nodes and data.

The DCM-Platforms

The DCM-Platform component 1835 is a stored program component that is executed by a CPU. In one embodiment, the DCM-Platform component incorporates any and/or all combinations of the aspects of the DCM-Platform that was discussed in the previous figures. As such, the DCM-Platform affects accessing, obtaining and the provision of information, services, transactions, and/or the like across various communications networks.

The DCM-Platform transforms digital dialogue from consumers, client demands and, Internet search inputs via DCM-Platform components Conversation Monetizer 1845, Asset Generator 1844, Knowledge Builder 1843, Social Media Synchronizer 1842 and Dialogue Generator 1841 into tradable digital assets, and client needs based artificial intelligence campaign plan outputs.

The DCM-Platform component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the DCM-Platform server employs a cryptographic server to encrypt and decrypt communications. The DCM-Platform component may communicate to and/or with other components in a component collection, including itself, and/or facilities of the like. Most frequently, the DCM-Platform component communicates with the DCM-Platform database, operating systems, other program components, and/or the like. The DCM-Platform may contain, communicate, generate, obtain, and/or provide program component, system, user, and/or data communications, requests, and/or responses.

Distributed DCM-Platforms

The structure and/or operation of any of the DCM-Platform node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DCM-Platform controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

---
w3c -post http://... Value1

--- where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the DCM-Platform controller may be executing a PHP script implementing a Secure Sockets Layer ("SSL") socket server via the information sherver, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to
address');
socket_listen($sock);
$client = socket_accept($sock);
// read input data from client device in 1024 byte blocks until
end of message
do {
        $input = "";
        $input = socket_read($client, 1024);
        $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT
database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Additional embodiments of the DCM-Platform may comprise the following:

1. A digital conversation generating processor-implemented method embodiment, comprising:
  instantiating a conversational artificial-intelligence agent;
  identifying an individual target for conversation;
  initiating a conversation with the individual target by the artificial-intelligence agent by providing a first portion of a conversational dialogue to the individual target;
  recording a response from the individual target to the first portion of the conversational dialogue; and
  responding to the response from the individual target with a next contextual portion of the conversational dialogue.

2. The method of embodiment 1, further comprising:
  receiving an advertising client request; and
  creating a dialogue agent based on the client request.

3. The method of embodiment 2, further comprising:
  populating the dialogue agent on social media; and
  implement the dialogue agent to capture interactive dialogue actions.

4. The method of embodiment 2, wherein the creating the dialogue agent comprises:
  generating a web service;
  connecting the web-service to an avatar front end; and
  completing dialogue agent application.

5. The method of embodiment 4, wherein the completing dialogue agent application further comprises dialogue cloud with key words for search engines;
  populating on a social media platform;
  generating links accessible from Internet and smart phone applications; and
  updating wrapper description identifications.

6. The method of embodiment 1, wherein the artificial-intelligence agent is an avatar on a social media platform.

7. The method of embodiment 1, further comprising:
  registering the conversation on a virtual asset exchange platform.

8. The method of embodiment 1, further comprising:
  registering the conversation on a financial trading platform.

9. The method of embodiment 1, further comprising:
  providing options for a conditional logic.

10. The method of embodiment 1, further comprising:
  initiating a search to obtain information for the conversation; and
  generating a hyperlink outcome based on the search results.

11. The method of embodiment 10, wherein the search comprises a key word based Google search.

12. The method of embodiment 11, further comprising:
  providing alternate questions to the individual target to obtain further information if the search fails; and
  generating a dialogue line based on partial key word search and the obtained information.

13. The method of embodiment 1, further comprising:
  capturing updated product information from the Internet; and
  requesting a client provide updated product information.

14. The method of embodiment 1, further comprising:
  initiating dialogue analytics to drive individual-agent interactions;
  determining a dialogue pathway of a dialogue; and
  determining dialogue parameters based on the dialogue pathway.

15. The method of embodiment 14, wherein the dialogue parameters comprises a number of dialogue actions in the dialogue pathway and an amount of time take for each dialogue action.

16. The method of embodiment 15, further comprising aggregating dialogue pathways from a plurality of individual targets.

17. The method of embodiment 15, further comprising determining a dollar value associated with each dialogue action.

18. A digital conversation generating apparatus embodiment, comprising:
  a memory;
  a processor disposed in communication with said memory, and configured to issue a plurality of processing instructions stored in the memory, wherein the processor issues instructions to:
    instantiate a conversational artificial-intelligence agent;
    identify an individual target for conversation;
    initiate a conversation with the individual target by the artificial-intelligence agent by providing a first portion of a conversational dialogue to the individual target;
    record a response from the individual target to the first portion of the conversational dialogue; and
    respond to the response from the individual target with a next contextual portion of the conversational dialogue.

19. The apparatus of embodiment 18, wherein the processor further issues instructions for:
  receiving an advertising client request; and
  creating a dialogue agent based on the client request.

20. The apparatus of embodiment 19, wherein the processor further issues instructions for:
  populating the dialogue agent on social media; and
  implement the dialogue agent to capture interactive dialogue actions.

21. The apparatus of embodiment 19, wherein the creating the dialogue agent comprises:
  generating a web service;
  connecting the web-service to an avatar front end; and
  completing dialogue agent application.

22. The apparatus of embodiment 21, wherein the completing dialogue agent application further comprises dialogue cloud with key words for search engines;
  populating on a social media platform;
  generating links accessible from Internet and smart phone applications; and
  updating wrapper description identifications.

23. The apparatus of embodiment 18, wherein the artificial-intelligence agent is an avatar on a social media platform.

24. The apparatus of embodiment 18, wherein the processor further issues instructions for:
  registering the conversation on a virtual asset exchange platform.

25. The apparatus of embodiment 18, wherein the processor further issues instructions for:
  registering the conversation on a financial trading platform.

26. The apparatus of embodiment 18, wherein the processor further issues instructions for:
  providing options for a conditional logic.

27. The apparatus of embodiment 18, wherein the processor further issues instructions for:
  initiating a search to obtain information for the conversation; and
  generating a hyperlink outcome based on the search results.

28. The apparatus of embodiment 27, wherein the search comprises a key word based Google search.

29. The apparatus of embodiment 28, wherein the processor further issues instructions for:
  providing alternate questions to the individual target to obtain further information if the search fails; and
  generating a dialogue line based on partial key word search and the obtained information.

30. The apparatus of embodiment 18, wherein the processor further issues instructions for:
  capturing updated product information from the Internet; and
  requesting a client provide updated product information.

31. The apparatus of embodiment 18, wherein the processor further issues instructions for:
  initiating dialogue analytics to drive individual-agent interactions;
  determining a dialogue pathway of a dialogue; and
  determining dialogue parameters based on the dialogue pathway.

32. The apparatus of embodiment 31, wherein the dialogue parameters comprises a number of dialogue actions in the dialogue pathway and an amount of time take for each dialogue action.

33. The apparatus of embodiment 32, wherein the processor further issues instructions for aggregating dialogue pathways from a plurality of individual targets.

34. The apparatus of embodiment 32, wherein the processor further issues instructions for determining a dollar value associated with each dialogue action.

35. A digital conversation generating system embodiment, comprising:
  means to instantiate a conversational artificial-intelligence agent;
  means to identify an individual target for conversation;
  means to initiate a conversation with the individual target by the artificial-intelligence agent by providing a first portion of a conversational dialogue to the individual target;
  means to record a response from the individual target to the first portion of the conversational dialogue; and
  means to respond to the response from the individual target with a next contextual portion of the conversational dialogue.

36. The system of embodiment 35, further comprising means for:
  receiving an advertising client request; and
  creating a dialogue agent based on the client request.

37. The system of embodiment 36, further comprising means for:
  populating the dialogue agent on social media; and
  implement the dialogue agent to capture interactive dialogue actions.

38. The system of embodiment 36, wherein the creating the dialogue agent comprises:
  generating a web service;
  connecting the web-service to an avatar front end; and
  completing dialogue agent application.

39. The system of embodiment 38, wherein the completing dialogue agent application further comprises dialogue cloud with key words for search engines;
  populating on a social media platform;
  generating links accessible from Internet and smart phone applications; and
  updating wrapper description identifications.

40. The system of embodiment 35, wherein the artificial-intelligence agent is an avatar on a social media platform.

41. The system of embodiment 35, further comprising means for:
registering the conversation on a virtual asset exchange platform.

42. The system of embodiment 35, further comprising means for:
registering the conversation on a financial trading platform.

43. The system of embodiment 35, further comprising means for:
providing options for a conditional logic.

44. The system of embodiment 35, further comprising means for:
initiating a search to obtain information for the conversation; and
generating a hyperlink outcome based on the search results.

45. The system of embodiment 44, wherein the search comprises a key word based Google search.

46. The system of embodiment 45, further comprising means for:
providing alternate questions to the individual target to obtain further information if the search fails; and
generating a dialogue line based on partial key word search and the obtained information.

47. The system of embodiment 35, further comprising means for:
capturing updated product information from the Internet; and
requesting a client provide updated product information.

48. The system of embodiment 35, further comprising means for:
initiating dialogue analytics to drive individual-agent interactions;
determining a dialogue pathway of a dialogue; and
determining dialogue parameters based on the dialogue pathway.

49. The system of embodiment 48, wherein the dialogue parameters comprises a number of dialogue actions in the dialogue pathway and an amount of time take for each dialogue action.

50. The system of embodiment 49, further comprising means for aggregating dialogue pathways from a plurality of individual targets.

51. The system of embodiment 49, further comprising means for determining a dollar value associated with each dialogue action.

52. A digital conversation generating processor-readable medium embodiment storing processor-issuable instructions to:
instantiate a conversational artificial-intelligence agent;
identify an individual target for conversation;
initiate a conversation with the individual target by the artificial-intelligence agent by providing a first portion of a conversational dialogue to the individual target;
record a response from the individual target to the first portion of the conversational dialogue; and
respond to the response from the individual target with a next contextual portion of the conversational dialogue.

53. The medium of embodiment 52, further storing processor-issueable instructions for:
receiving an advertising client request; and
creating a dialogue agent based on the client request.

54. The medium of embodiment 53, further storing processor-issueable instructions for:
populating the dialogue agent on social media; and
implement the dialogue agent to capture interactive dialogue actions.

55. The medium of embodiment 53, wherein the creating the dialogue agent comprises:
generating a web service;
connecting the web-service to an avatar front end; and
completing dialogue agent application.

56. The medium of embodiment 55, wherein the completing dialogue agent application further comprises dialogue cloud with key words for search engines;
populating on a social media platform;
generating links accessible from Internet and smart phone applications; and
updating wrapper description identifications.

57. The medium of embodiment 52, wherein the artificial-intelligence agent is an avatar on a social media platform.

58. The medium of embodiment 52, further storing processor-issueable instructions for:
registering the conversation on a virtual asset exchange platform.

59. The medium of embodiment 52, further storing processor-issueable instructions for:
registering the conversation on a financial trading platform.

60. The medium of embodiment 52, further storing processor-issueable instructions for:
providing options for a conditional logic.

61. The medium of embodiment 52, further storing processor-issueable instructions for:
initiating a search to obtain information for the conversation; and
generating a hyperlink outcome based on the search results.

62. The medium of embodiment 61, wherein the search comprises a key word based Google search.

63. The medium of embodiment 62, further storing processor-issueable instructions for:
providing alternate questions to the individual target to obtain further information if the search fails; and
generating a dialogue line based on partial key word search and the obtained information.

64. The medium of embodiment 52, further storing processor-issueable instructions for:
capturing updated product information from the Internet; and
requesting a client provide updated product information.

65. The medium of embodiment 52, further storing processor-issueable instructions for:
initiating dialogue analytics to drive individual-agent interactions;
determining a dialogue pathway of a dialogue; and
determining dialogue parameters based on the dialogue pathway.

66. The medium of embodiment 65, wherein the dialogue parameters comprises a number of dialogue actions in the dialogue pathway and an amount of time take for each dialogue action.

67. The medium of embodiment 66, further storing processor-issueable instructions for aggregating dialogue pathways from a plurality of individual targets.

68. The medium of embodiment 66, further storing processor-issueable instructions for determining a dollar value associated with each dialogue action.

69. A digital conversation value exchange processor-implemented method embodiment, comprising:
receiving information indicating a demand for a digital conversation asset;

determining a type of the demanded digital conversation asset;

initializing an exchange procedure for the determined type of the demanded digital conversation asset;

obtaining information required by the exchange procedure for the determined type of the demanded digital conversation asset; and determining an index of the demanded digital conversation asset at least based on the obtained information for the determined type of the demanded digital conversation asset.

70. The method of embodiment 69, further, comprising:
providing a payment to a provider of the conversational artificial-intelligence agent for each response to each portion of the conversational dialogue.

71. The method of embodiment 70, wherein each successive response warrants an increased payment.

72. The method of embodiment 71, wherein a last response to the conversational dialogue resulting in a purchase warrants a further increased payment.

73. The method of embodiment 72, wherein the further increased payment is a percentage of the purchases.

74. The method of embodiment 73, wherein the response performance of the artificial-intelligence agent is recorded over multiple conversational dialogues with multiple individuals.

75. The method of embodiment 74, wherein response performance of the artificial-intelligence agent may be compared to the performance of other artificial-intelligence agents.

76. The method of embodiment 75, wherein artificial-intelligence agents may be traded on an exchange based on their performance.

77. The method of embodiment 76, wherein recorded responses and conversational dialogues across the artificial-intelligence may be mined for trend information.

78. The method of embodiment 69, wherein the type of digital conversation asset comprises at least one of:
conversation asset, conversation artificial intelligence entity asset, portfolio asset, exchange asset.

79. The method of embodiment 69, further comprising determining an asset negotiator to negotiate a transaction between an asset owner and an investor.

80. The method of embodiment 69, further comprising:
generating an asset wrapper for the demanded digital conversation asset.

81. The method of embodiment 70, wherein the asset wrapper identifies an asset owner, an asset author, an asset negotiator for the digital conversation asset.

82. The method of embodiment 69, wherein the exchange procedure comprises:
monetizing the digital conversation asset by determining shares of stock and price of a share;
determining cost factors; and
determining a dividends payment structure.

83. The method of embodiment 82, further comprising:
receiving trading information from a financial trading platform related to the demanded digital conversation asset; and
adjust the index of the demanded digital conversation asset based on the received trading information.

84. The method of embodiment 82, further comprising:
facilitating transfer of stock shares.

85. The method of embodiment 82, further comprising:
obtaining corporate certificate and credentials from an investor; and
assigning intellectual property rights to the investor.

86. A digital conversation generating apparatus embodiment, comprising:

a memory;
a processor disposed in communication with said memory, and configured to issue a plurality of processing instructions stored in the memory, wherein the processor issues instructions to:
receive information indicating a demand for a digital conversation asset;
determine a type of the demanded digital conversation asset;
initialize an exchange procedure for the determined type of the demanded digital conversation asset;
obtain information required by the exchange procedure for the determined type of the demanded digital conversation asset; and
determine an index of the demanded digital conversation asset at least based on the obtained information for the determined type of the demanded digital conversation asset.

87. The apparatus of embodiment 86, further, comprising:
providing a payment to a provider of the conversational artificial-intelligence agent for each response to each portion of the conversational dialogue.

88. The apparatus of embodiment 87, wherein each successive response warrants an increased payment.

89. The apparatus of embodiment 88, wherein a last response to the conversational dialogue resulting in a purchase warrants a further increased payment.

90. The apparatus of embodiment 89, wherein the further increased payment is a percentage of the purchases.

91. The apparatus of embodiment 90, wherein the response performance of the artificial-intelligence agent is recorded over multiple conversational dialogues with multiple individuals.

92. The apparatus of embodiment 91, wherein response performance of the artificial-intelligence agent may be compared to the performance of other artificial-intelligence agents.

93. The apparatus of embodiment 92, wherein artificial-intelligence agents may be traded on an exchange based on their performance.

94. The apparatus of embodiment 93, wherein recorded responses and conversational dialogues across the artificial-intelligence may be mined for trend information.

95. The apparatus of embodiment 86, wherein the type of digital conversation asset comprises at least one of:
conversation asset, conversation artificial intelligence entity asset, portfolio asset, exchange asset.

96. The apparatus of embodiment 86, wherein the processor further issues instructions for determining an asset negotiator to negotiate a transaction between an asset owner and an investor.

97. The apparatus of embodiment 86, wherein the processor further issues instructions for: generating an asset wrapper for the demanded digital conversation asset.

98. The apparatus of embodiment 87, wherein the asset wrapper identifies an asset owner, an asset author, an asset negotiator for the digital conversation asset.

99. The apparatus of embodiment 86, wherein the exchange procedure comprises:
monetizing the digital conversation asset by determining shares of stock and price of a share;
determining cost factors; and
determining a dividends payment structure.

100. The apparatus of embodiment 99, wherein the processor further issues instructions for:
receiving trading information from a financial trading platform related to the demanded digital conversation asset; and adjust the index of the demanded digital conversation asset based on the received trading information.

101. The apparatus of embodiment 99, wherein the processor further issues instructions for:
facilitating transfer of stock shares.

102. The apparatus of embodiment 99, wherein the processor further issues instructions for:
obtaining corporate certificate and credentials from an investor; and
assigning intellectual property rights to the investor.

103. A digital conversation generating system embodiment, comprising:
means to receive information indicating a demand for a digital conversation asset;
means to determine a type of the demanded digital conversation asset;
means to initialize an exchange procedure for the determined type of the demanded digital conversation asset;
means to obtain information required by the exchange procedure for the determined type of the demanded digital conversation asset; and
means to determine an index of the demanded digital conversation asset at least based on the obtained information for the determined type of the demanded digital conversation asset.

104. The system of embodiment 103, further, comprising:
providing a payment to a provider of the conversational artificial-intelligence agent for each response to each portion of the conversational dialogue.

105. The system of embodiment 104, wherein each successive response warrants an increased payment.

106. The system of embodiment 105, wherein a last response to the conversational dialogue resulting in a purchase warrants a further increased payment.

107. The system of embodiment 106, wherein the further increased payment is a percentage of the purchases.

108. The system of embodiment 107, wherein the response performance of the artificial-intelligence agent is recorded over multiple conversational dialogues with multiple individuals.

109. The system of embodiment 108, wherein response performance of the artificial-intelligence agent may be compared to the performance of other artificial-intelligence agents.

110. The system of embodiment 109, wherein artificial-intelligence agents may be traded on an exchange based on their performance.

111. The system of embodiment 110, wherein recorded responses and conversational dialogues across the artificial-intelligence may be mined for trend information.

112. The system of embodiment 103, wherein the type of digital conversation asset comprises at least one of:
conversation asset, conversation artificial intelligence entity asset, portfolio asset, exchange asset.

113. The system of embodiment 103, further comprising means for determining an asset negotiator to negotiate a transaction between an asset owner and an investor.

114. The system of embodiment 103, further comprising means for: generating an asset wrapper for the demanded digital conversation asset.

115. The system of embodiment 104, wherein the asset wrapper identifies an asset owner, an asset author, an asset negotiator for the digital conversation asset.

116. The system of embodiment 103, wherein the exchange procedure comprises:
monetizing the digital conversation asset by determining shares of stock and price of a share;
determining cost factors; and
determining a dividends payment structure.

117. The system of embodiment 116, further comprising means for:
receiving trading information from a financial trading platform related to the demanded digital conversation asset; and
adjust the index of the demanded digital conversation asset based on the received trading information.

118. The system of embodiment 116, further comprising means for:
facilitating transfer of stock shares.

119. The system of embodiment 116, further comprising means for:
obtaining corporate certificate and credentials from an investor; and
assigning intellectual property rights to the investor.

120. A digital conversation generating processor-readable medium embodiment storing processor-issuable instructions to:
receive information indicating a demand for a digital conversation asset;
determine a type of the demanded digital conversation asset;
initialize an exchange procedure for the determined type of the demanded digital conversation asset;
obtain information required by the exchange procedure for the determined type of the demanded digital conversation asset; and
determine an index of the demanded digital conversation asset at least based on the obtained information for the determined type of the demanded digital conversation asset.

121. The medium of embodiment 120, further, comprising:
providing a payment to a provider of the conversational artificial-intelligence agent for each response to each portion of the conversational dialogue.

122. The medium of embodiment 121, wherein each successive response warrants an increased payment.

123. The medium of embodiment 122, wherein a last response to the conversational dialogue resulting in a purchase warrants a further increased payment.

124. The medium of embodiment 123, wherein the further increased payment is a percentage of the purchases.

125. The medium of embodiment 124, wherein the response performance of the artificial-intelligence agent is recorded over multiple conversational dialogues with multiple individuals.

126. The medium of embodiment 125, wherein response performance of the artificial-intelligence agent may be compared to the performance of other artificial-intelligence agents.

127. The medium of embodiment 126, wherein artificial-intelligence agents may be traded on an exchange based on their performance.

128. The medium of embodiment 127, wherein recorded responses and conversational dialogues across the artificial-intelligence may be mined for trend information.

129. The medium of embodiment 120, wherein the type of digital conversation asset comprises at least one of:
conversation asset, conversation artificial intelligence entity asset, portfolio asset, exchange asset.

130. The medium of embodiment 120, further storing processor-issuable instructions for determining an asset negotiator to negotiate a transaction between an asset owner and an investor.

131. The medium of embodiment 120, further storing processor-issuable instructions for: generating an asset wrapper for the demanded digital conversation asset.

132. The medium of embodiment 121, wherein the asset wrapper identifies an asset owner, an asset author, an asset negotiator for the digital conversation asset.

133. The medium of embodiment 120, wherein the exchange procedure comprises:
  monetizing the digital conversation asset by determining shares of stock and price of a share;
  determining cost factors; and
  determining a dividends payment structure.

134. The medium of embodiment 133, further storing processor-issuable instructions for:
  receiving trading information from a financial trading platform related to the demanded digital conversation asset; and
  adjust the index of the demanded digital conversation asset based on the received trading information.

135. The medium of embodiment 133, further storing processor-issuable instructions for:
  facilitating transfer of stock shares.

136. The medium of embodiment 133, further storing processor-issuable instructions for:
  obtaining corporate certificate and credentials from an investor; and
  assigning intellectual property rights to the investor.

137. A digital conversation generating processor-implemented method embodiment, comprising:
  creating a dialogue agent application;
  populating the created dialogue agent application on a dialogue platform;
  receiving a dialogue action from an individual target via the dialogue platform;
  generating a dialogue line in response to the received dialogue action via the dialogue agent application; and
  recording an interactive dialogue comprising the dialogue action and the generated dialogue line.

138. The method of embodiment 137, wherein the dialogue platform is an automatic dialing system.

139. The method of embodiment 137, wherein the dialogue platform is a social media platform.

140. The method of embodiment 137, wherein the dialogue platform is a mobile platform.

141. The method of embodiment 137, wherein creating the dialogue agent application further comprises:
  generating a web service;
  creating an avatar identity on the dialogue platform; and
  connecting the web-service to the avatar identity.

142. The method of embodiment 137, wherein the dialogue action comprises an inquiry for information.

143. The method of embodiment 137, wherein the dialogue line comprises a hyperlink connected to a search engine.

144. The method of embodiment 137, wherein the dialogue line comprises a hyperlink connected to another dialogue agent application.

145. The method of embodiment 137, further comprising:
  determining a condition associated with the received dialogue line; and
  retrieve an optional dialogue line in response to the determined condition.

146. The method of embodiment 137, further comprising:
  determining a pathway of the recorded interactive dialogue; and
  determining a plurality of parameters associated with the interactive dialogue.

147. The method of embodiment 146, further comprising:
  determining a conversation unit value of the interactive dialogue based on the pathway.

148. A digital conversation generating apparatus embodiment, comprising:
  a memory;
  a processor disposed in communication with said memory, and configured to issue a plurality of processing instructions stored in the memory, wherein the processor issues instructions to:
    create a dialogue agent application;
    populate the created dialogue agent application on a dialogue platform;
    receive a dialogue action from an individual target via the dialogue platform;
    generate a dialogue line in response to the received dialogue action via the dialogue agent application; and
    record an interactive dialogue comprising the dialogue action and the generated dialogue line.

149. The apparatus of embodiment 148, wherein the dialogue platform is an automatic dialing system.

150. The apparatus of embodiment 148, wherein the dialogue platform is a social media platform.

151. The apparatus of embodiment 148, wherein the dialogue platform is a mobile platform.

152. The apparatus of embodiment 148, wherein creating the dialogue agent application further comprises:
  generating a web service;
  creating an avatar identity on the dialogue platform; and
  connecting the web-service to the avatar identity.

153. The apparatus of embodiment 148, wherein the dialogue action comprises an inquiry for information.

154. The apparatus of embodiment 148, wherein the dialogue line comprises a hyperlink connected to a search engine.

155. The apparatus of embodiment 148, wherein the dialogue line comprises a hyperlink connected to another dialogue agent application.

156. The apparatus of embodiment 148, wherein the processor further issues instructions for:
  determining a condition associated with the received dialogue line; and
  retrieve an optional dialogue line in response to the determined condition.

157. The apparatus of embodiment 148, wherein the processor further issues instructions for:
  determining a pathway of the recorded interactive dialogue; and
  determining a plurality of parameters associated with the interactive dialogue.

158. The apparatus of embodiment 157, wherein the processor further issues instructions for:
  determining a conversation unit value of the interactive dialogue based on the pathway.

159. A digital conversation generating system embodiment, comprising:
  means to create a dialogue agent application;
  means to populate the created dialogue agent application on a dialogue platform;
  means to receive a dialogue action from an individual target via the dialogue platform;
  means to generate a dialogue line in response to the received dialogue action via the dialogue agent application; and
  means to record an interactive dialogue comprising the dialogue action and the generated dialogue line.

160. The system of embodiment 159, wherein the dialogue platform is an automatic dialing system.

161. The system of embodiment 159, wherein the dialogue platform is a social media platform.

162. The system of embodiment 159, wherein the dialogue platform is a mobile platform.

163. The system of embodiment 159, wherein creating the dialogue agent application further comprises:
   generating a web service;
   creating an avatar identity on the dialogue platform; and
   connecting the web-service to the avatar identity.
164. The system of embodiment 159, wherein the dialogue action comprises an inquiry for information.
165. The system of embodiment 159, wherein the dialogue line comprises a hyperlink connected to a search engine.
166. The system of embodiment 159, wherein the dialogue line comprises a hyperlink connected to another dialogue agent application.
167. The system of embodiment 159, further comprising means for:
   determining a condition associated with the received dialogue line; and
   retrieve an optional dialogue line in response to the determined condition.
168. The system of embodiment 159, further comprising means for:
   determining a pathway of the recorded interactive dialogue; and
   determining a plurality of parameters associated with the interactive dialogue.
169. The system of embodiment 168, further comprising means for:
   determining a conversation unit value of the interactive dialogue based on the pathway.
170. A digital conversation generating processor-readable medium embodiment storing processor-issuable instructions to:
   create a dialogue agent application;
   populate the created dialogue agent application on a dialogue platform;
   receive a dialogue action from an individual target via the dialogue platform;
   generate a dialogue line in response to the received dialogue action via the dialogue agent application; and
   record an interactive dialogue comprising the dialogue action and the generated dialogue line.
171. The medium of embodiment 170, wherein the dialogue platform is an automatic dialing system.
172. The medium of embodiment 170, wherein the dialogue platform is a social media platform.
173. The medium of embodiment 170, wherein the dialogue platform is a mobile platform.
174. The medium of embodiment 170, wherein creating the dialogue agent application further comprises:
   generating a web service;
   creating an avatar identity on the dialogue platform; and
   connecting the web-service to the avatar identity.
175. The medium of embodiment 170, wherein the dialogue action comprises an inquiry for information.
176. The medium of embodiment 170, wherein the dialogue line comprises a hyperlink connected to a search engine.
177. The medium of embodiment 170, wherein the dialogue line comprises a hyperlink connected to another dialogue agent application.
178. The medium of embodiment 170, further storing processor-issuable instructions for:
   determining a condition associated with the received dialogue line; and
   retrieve an optional dialogue line in response to the determined condition.
179. The medium of embodiment 170, further storing processor-issuable instructions for:
   determining a pathway of the recorded interactive dialogue; and
   determining a plurality of parameters associated with the interactive dialogue.
180. The medium of embodiment 179, further storing processor-issuable instructions for:
   determining a conversation unit value of the interactive dialogue based on the pathway.
181. A digital conversation generating processor-implemented method embodiment, comprising:
   instantiating a dialogue platform on an individual device;
   receiving a dialogue notice from a dialogue agent via the dialogue platform;
   submitting a dialogue action to the dialogue agent via the dialogue platform; and
   receiving a dialogue line in response to the submitted dialogue action from the dialogue agent.
182. The method of embodiment 181, wherein the individual device comprises a computer.
183. The method of embodiment 181, wherein the individual device comprises a mobile smart phone.
184. The method of embodiment 181, wherein the dialogue platform comprises a social media platform.
185. The method of embodiment 181, wherein the dialogue platform comprises a smart phone application.
186. The method of embodiment 181, wherein the dialogue action is associated with one condition in response to the dialogue notice.
187. The method of embodiment 181, wherein the received dialogue line comprises a hyperlink connected to a search engine.
188. The method of embodiment 187, wherein the search engine is any of Google, Yahoo, and Bing.
189. The method of embodiment 187, wherein the hyperlink comprises a search based on key words included in the dialogue action.
190. A digital conversation generating apparatus embodiment, comprising:
   a memory;
   a processor disposed in communication with said memory, and configured to issue a plurality of processing instructions stored in the memory, wherein the processor issues instructions to:
   instantiate a dialogue platform on an individual device;
   receive a dialogue notice from a dialogue agent via the dialogue platform;
   submit a dialogue action to the dialogue agent via the dialogue platform; and
   receive a dialogue line in response to the submitted dialogue action from the dialogue agent.
191. The apparatus of embodiment 190, wherein the individual device comprises a computer.
192. The apparatus of embodiment 190, wherein the individual device comprises a mobile smart phone.
193. The apparatus of embodiment 190, wherein the dialogue platform comprises a social media platform.
194. The apparatus of embodiment 190, wherein the dialogue platform comprises a smart phone application.
195. The apparatus of embodiment 190, wherein the dialogue action is associated with one condition in response to the dialogue notice.
196. The apparatus of embodiment 190, wherein the received dialogue line comprises a hyperlink connected to a search engine.
197. The apparatus of embodiment 196, wherein the search engine is any of Google, Yahoo, and Bing.

198. The apparatus of embodiment 196, wherein the hyperlink comprises a search based on key words included in the dialogue action.

199. A digital conversation generating system embodiment, comprising:
means to instantiate a dialogue platform on an individual device;
means to receive a dialogue notice from a dialogue agent via the dialogue platform;
means to submit a dialogue action to the dialogue agent via the dialogue platform; and
means to receive a dialogue line in response to the submitted dialogue action from the dialogue agent.

200. The system of embodiment 199, wherein the individual device comprises a computer.

201. The system of embodiment 199, wherein the individual device comprises a mobile smart phone.

202. The system of embodiment 199, wherein the dialogue platform comprises a social media platform.

203. The system of embodiment 199, wherein the dialogue platform comprises a smart phone application.

204. The system of embodiment 199, wherein the dialogue action is associated with one condition in response to the dialogue notice.

205. The system of embodiment 199, wherein the received dialogue line comprises a hyperlink connected to a search engine.

206. The system of embodiment 205, wherein the search engine is any of Google, Yahoo, and Bing.

207. The system of embodiment 205, wherein the hyperlink comprises a search based on key words included in the dialogue action.

208. A digital conversation generating processor-readable medium embodiment storing processor-issuable instructions to:
instantiate a dialogue platform on an individual device;
receive a dialogue notice from a dialogue agent via the dialogue platform;
submit a dialogue action to the dialogue agent via the dialogue platform; and
receive a dialogue line in response to the submitted dialogue action from the dialogue agent.

209. The medium of embodiment 208, wherein the individual device comprises a computer.

210. The medium of embodiment 208, wherein the individual device comprises a mobile smart phone.

211. The medium of embodiment 208, wherein the dialogue platform comprises a social media platform.

212. The medium of embodiment 208, wherein the dialogue platform comprises a smart phone application.

213. The medium of embodiment 208, wherein the dialogue action is associated with one condition in response to the dialogue notice.

214. The medium of embodiment 208, wherein the received dialogue line comprises a hyperlink connected to a search engine.

215. The medium of embodiment 214, wherein the search engine is any of Google, Yahoo, and Bing.

216. The medium of embodiment 214, wherein the hyperlink comprises a search based on key words included in the dialogue action.

217. A digital conversation management processor-implemented method embodiment, comprising:
receiving a client request to purchase dialogue agent service;
determining a plurality of dialogue agent parameters based on the client request;
creating a dialogue agent application;
populating the created dialogue agent application on a dialogue platform; and
implementing the dialogue agent application on the dialogue platform with an individual target.

218. The method of embodiment 217, wherein the client request comprises a marketing campaign request.

219. The method of embodiment 217, wherein the dialogue agent service comprises a marketing plan.

220. The method of embodiment 217, wherein the plurality of dialogue agent parameters comprise a number of dialogue agents, and a selection of a dialogue platform.

221. The method of embodiment 217, wherein the dialogue platform comprises a social media platform.

222. The method of embodiment 217, further comprising:
devising a marketing plan; and
incorporating the devised marketing plan into the created dialogue agent application.

223. The method of embodiment 217, wherein the individual target is a potential consumer.

224. A digital conversation management apparatus embodiment, comprising:
a memory;
a processor disposed in communication with said memory, and configured to issue a plurality of processing instructions stored in the memory, wherein the processor issues instructions to:
receive a client request to purchase dialogue agent service;
determine a plurality of dialogue agent parameters based on the client request;
create a dialogue agent application;
populate the created dialogue agent application on a dialogue platform; and
implement the dialogue agent application on the dialogue platform with an individual target.

225. The apparatus of embodiment 224, wherein the client request comprises a marketing campaign request.

226. The apparatus of embodiment 224, wherein the dialogue agent service comprises a marketing plan.

227. The apparatus of embodiment 224, wherein the plurality of dialogue agent parameters comprise a number of dialogue agents, and a selection of a dialogue platform.

228. The apparatus of embodiment 217, wherein the dialogue platform comprises a social media platform.

229. The apparatus of embodiment 224, wherein the processor further issues instructions for:
devising a marketing plan; and
incorporating the devised marketing plan into the created dialogue agent application.

230. The apparatus of embodiment 224, wherein the individual target is a potential consumer.

231. A digital conversation management system embodiment, comprising:
means to receive a client request to purchase dialogue agent service;
means to determine a plurality of dialogue agent parameters based on the client request;
means to create a dialogue agent application;
means to populate the created dialogue agent application on a dialogue platform; and
means to implement the dialogue agent application on the dialogue platform with an individual target.

232. The system of embodiment 231, wherein the client request comprises a marketing campaign request.

233. The system of embodiment 231, wherein the dialogue agent service comprises a marketing plan.

234. The system of embodiment 231, wherein the plurality of dialogue agent parameters comprise a number of dialogue agents, and a selection of a dialogue platform.

235. The system of embodiment 217, wherein the dialogue platform comprises a social media platform.

236. The system of embodiment 231, further comprising:
devising a marketing plan; and
incorporating the devised marketing plan into the created dialogue agent application.

237. The system of embodiment 231, wherein the individual target is a potential consumer.

238. A digital conversation generating processor-readable medium embodiment storing processor-issuable instructions to:
receive a client request to purchase dialogue agent service;
determine a plurality of dialogue agent parameters based on the client request;
create a dialogue agent application;
populate the created dialogue agent application on a dialogue platform; and
implement the dialogue agent application on the dialogue platform with an individual target.

239. The medium of embodiment 238, wherein the client request comprises a marketing campaign request.

240. The medium of embodiment 238, wherein the dialogue agent service comprises a marketing plan.

241. The medium of embodiment 238, wherein the plurality of dialogue agent parameters comprise a number of dialogue agents, and a selection of a dialogue platform.

242. The medium of embodiment 217, wherein the dialogue platform comprises a social media platform.

243. The medium of embodiment 238, further comprising:
devising a marketing plan; and
incorporating the devised marketing plan into the created dialogue agent application.

244. The medium of embodiment 238, wherein the individual target is a potential consumer.

245. A digital conversation exchange processor-implemented method embodiment, comprising:
capturing an interactive dialogue between an individual target and a dialogue agent;
creating a digital asset comprising at least the captured interactive dialogue;
instantiating the created digital asset;
generating a tradable financial instrument based on the instantiated digital asset;
determining an index of the tradable financial instrument; and
facilitate a transaction of the financial instrument between an owner of the digital asset and an investor.

246. The method of embodiment 245, wherein the interactive dialogue is saved in a voice xml format.

247. The method of embodiment 245, wherein the individual target comprises a smart phone.

248. The method of embodiment 245, wherein the dialogue agent comprises an avatar identity on a social media platform.

249. The method of embodiment 245, further comprising:
creating a digital asset wrapper comprising the captured interactive dialogue.

250. The method of embodiment 245, wherein the digital asset is one of a conversation asset, an artificial intelligence entity asset, a portfolio asset and an exchange asset.

251. The method of embodiment 245, wherein the instantiation of the created digital asset comprises:
receiving asset information of the digital asset;
obtaining corporate certificate and credentials from an owner of the digital asset;
indentifying a negotiator for a transaction; and
assigning shares of the digital asset to a negotiator to engage in the transaction.

252. The method of embodiment 245, wherein the instantiation further comprises:
determining cost factors of the digital asset.

253. The method of embodiment 252, wherein the instantiation further comprises:
determining a dividends payment structured based on the cost factors.

254. The method of embodiment 245, wherein the instantiation further comprises:
establishing intellectual property right to an investor.

255. The method of embodiment 245, wherein the financial instrument comprises one of a future, a forward and an option.

256. The method of embodiment 245, wherein the financial instrument comprises stock shares of the digital asset.

257. The method of embodiment 245, wherein the index of the financial instrument is measured in dialogue value units.

258. The method of embodiment 245, wherein the index of the financial instrument is a dollar value.

259. The method of embodiment 245, wherein the financial instrument is traded on a financial trading platform.

260. A digital conversation exchange apparatus embodiment, comprising:
a memory;
a processor disposed in communication with said memory, and configured to issue a plurality of processing instructions stored in the memory, wherein the processor issues instructions to:
capture an interactive dialogue between an individual target and a dialogue agent;
create a digital asset comprising at least the captured interactive dialogue;
instantiate the created digital asset;
generate a tradable financial instrument based on the instantiated digital asset;
determine an index of the tradable financial instrument; and
facilitate a transaction of the financial instrument between an owner of the digital asset and an investor.

261. The apparatus of embodiment 260, wherein the interactive dialogue is saved in a voice xml format.

262. The apparatus of embodiment 260, wherein the individual target comprises a smart phone.

263. The apparatus of embodiment 260, wherein the dialogue agent comprises an avatar identity on a social media platform.

264. The apparatus of embodiment 260, wherein the processor further issues instructions to:
creating a digital asset wrapper comprising the captured interactive dialogue.

265. The apparatus of embodiment 260, wherein the digital asset is one of a conversation asset, an artificial intelligence entity asset, a portfolio asset and an exchange asset.

266. The apparatus of embodiment 260, wherein the instantiation of the created digital asset comprises:
receiving asset information of the digital asset;
obtaining corporate certificate and credentials from an owner of the digital asset;
indentifying a negotiator for a transaction; and
assigning shares of the digital asset to a negotiator to engage in the transaction.

267. The apparatus of embodiment 260, wherein the instantiation further comprises:
determining cost factors of the digital asset.

268. The apparatus of embodiment 267, wherein the instantiation further comprises:
  determining a dividends payment structured based on the cost factors.

269. The apparatus of embodiment 260, wherein the instantiation further comprises:
  establishing intellectual property right to an investor.

270. The apparatus of embodiment 260, wherein the financial instrument comprises one of a future, a forward and an option.

271. The apparatus of embodiment 260, wherein the financial instrument comprises stock shares of the digital asset.

272. The apparatus of embodiment 260, wherein the index of the financial instrument is measured in dialogue value units.

273. The apparatus of embodiment 260, wherein the index of the financial instrument is a dollar value.

274. The apparatus of embodiment 260, wherein the financial instrument is traded on a financial trading platform.

275. A digital conversation exchange system embodiment, comprising:
  means to capture an interactive dialogue between an individual target and a dialogue agent;
  means to create a digital asset comprising at least the captured interactive dialogue;
  means to instantiate the created digital asset;
  means to generate a tradable financial instrument based on the instantiated digital asset;
  means to determine an index of the tradable financial instrument; and
  means to facilitate a transaction of the financial instrument between an owner of the digital asset and an investor.

276. The system of embodiment 275, wherein the interactive dialogue is saved in a voice xml format.

277. The system of embodiment 275, wherein the individual target comprises a smart phone.

278. The system of embodiment 275, wherein the dialogue agent comprises an avatar identity on a social media platform.

279. The system of embodiment 275, further comprising:
  creating a digital asset wrapper comprising the captured interactive dialogue.

280. The system of embodiment 275, wherein the digital asset is one of a conversation asset, an artificial intelligence entity asset, a portfolio asset and an exchange asset.

281. The system of embodiment 275, wherein the instantiation of the created digital asset comprises:
  receiving asset information of the digital asset;
  obtaining corporate certificate and credentials from an owner of the digital asset;
  indentifying a negotiator for a transaction; and
  assigning shares of the digital asset to a negotiator to engage in the transaction.

282. The system of embodiment 275, wherein the instantiation further comprises:
  determining cost factors of the digital asset.

283. The system of embodiment 282, wherein the instantiation further comprises:
  determining a dividends payment structured based on the cost factors.

284. The system of embodiment 275, wherein the instantiation further comprises:
  establishing intellectual property right to an investor.

285. The system of embodiment 275, wherein the financial instrument comprises one of a future, a forward and an option.

286. The system of embodiment 275, wherein the financial instrument comprises stock shares of the digital asset.

287. The system of embodiment 275, wherein the index of the financial instrument is measured in dialogue value units.

288. The system of embodiment 275, wherein the index of the financial instrument is a dollar value.

289. The system of embodiment 275, wherein the financial instrument is traded on a financial trading platform.

290. A digital conversation exchange processor-readable medium embodiment storing processor-issuable instructions to:
  capture an interactive dialogue between an individual target and a dialogue agent;
  create a digital asset comprising at least the captured interactive dialogue;
  instantiate the created digital asset;
  generate a tradable financial instrument based on the instantiated digital asset;
  determine an index of the tradable financial instrument; and
  facilitate a transaction of the financial instrument between an owner of the digital asset and an investor.

291. The medium of embodiment 290, wherein the interactive dialogue is saved in a voice xml format.

292. The medium of embodiment 290, wherein the individual target comprises a smart phone.

293. The medium of embodiment 290, wherein the dialogue agent comprises an avatar identity on a social media platform.

294. The medium of embodiment 290, further comprising:
  creating a digital asset wrapper comprising the captured interactive dialogue.

295. The medium of embodiment 290, wherein the digital asset is one of a conversation asset, an artificial intelligence entity asset, a portfolio asset and an exchange asset.

296. The medium of embodiment 290, wherein the instantiation of the created digital asset comprises:
  receiving asset information of the digital asset;
  obtaining corporate certificate and credentials from an owner of the digital asset;
  indentifying a negotiator for a transaction; and
  assigning shares of the digital asset to a negotiator to engage in the transaction.

297. The medium of embodiment 290, wherein the instantiation further comprises:
  determining cost factors of the digital asset.

298. The medium of embodiment 297, wherein the instantiation further comprises:
  determining a dividends payment structured based on the cost factors.

299. The medium of embodiment 290, wherein the instantiation further comprises:
  establishing intellectual property right to an investor.

300. The medium of embodiment 290, wherein the financial instrument comprises one of a future, a forward and an option.

301. The medium of embodiment 290, wherein the financial instrument comprises stock shares of the digital asset.

302. The medium of embodiment 290, wherein the index of the financial instrument is measured in dialogue value units.

303. The medium of embodiment 290, wherein the index of the financial instrument is a dollar value.

304. The medium of embodiment 290, wherein the financial instrument is traded on a financial trading platform.

305. A digital conversation exchange processor-implemented method embodiment, comprising:
  submitting a demand for a digital asset to a financial trading platform;

receiving financial information of tradable financial instruments related to the demanded digital asset;

submitting credential information associated with an investor;

proposing a transaction with regard to a tradable financial instrument related to the demanded digital asset; and completing the proposed transaction via the financial trading platform.

306. A digital conversation exchange apparatus embodiment, comprising:

a memory;

a processor disposed in communication with said memory, and configured to issue a plurality of processing instructions stored in the memory, wherein the processor issues instructions to:

submit a demand for a digital asset to a financial trading platform;

receive financial information of tradable financial instruments related to the demanded digital asset;

submit credential information associated with an investor;

propose a transaction with regard to a tradable financial instrument related to the demanded digital asset; and complete the proposed transaction via the financial trading platform.

307. A digital conversation exchange system embodiment, comprising:

means to submit a demand for a digital asset to a financial trading platform;

means to receive financial information of tradable financial instruments related to the demanded digital asset;

means to submit credential information associated with an investor;

means to propose a transaction with regard to a tradable financial instrument related to the demanded digital asset; and means to complete the proposed transaction via the financial trading platform.

308. A digital conversation exchange processor-readable medium embodiment storing processor-issuable instructions to:

submit a demand for a digital asset to a financial trading platform;

receive financial information of tradable financial instruments related to the demanded digital asset;

submit credential information associated with an investor;

propose a transaction with regard to a tradable financial instrument related to the demanded digital asset; and complete the proposed transaction via the financial trading platform.

309. A digital conversation pricing processor-implemented method embodiment, comprising:

retrieving a digital dialogue between an individual target and a dialogue agent;

determining a plurality of parameters associated with the digital dialogue;

allocating a value point to each dialogue step of the digital dialogue;

receiving trading information from a trading platform;

adjusting the allocated value point of each dialogue step based on the received trading information.

310. The method of embodiment 309, wherein the dialogue agent comprises an avatar identity on a social platform.

311. The method of embodiment 309, wherein digital dialogue is saved in a voice XML format.

312. The method of embodiment 309, wherein the plurality of parameters comprises a pathway of the dialogue.

313. The method of embodiment 312, wherein the pathway is associated with a starting node and an ending node.

314. The method of embodiment 309, wherein the plurality of parameters comprises a number of dialogue steps in the dialogue.

315. The method of embodiment 309, wherein the plurality of parameters comprises an amount of time taken for each dialogue step.

316. The method of embodiment 309, wherein the value point allocated to each dialogue step is determined based on an outcome of the dialogue.

317. The method of embodiment 309, wherein the value point comprises a dialogue value metric.

318. The method of embodiment 309, wherein the value point comprises a dollar value.

319. The method of embodiment 309, further comprising:

querying for related dialogue on the received trading information of digital assets.

320. The method of embodiment 309, wherein the adjusting the allocated value point of each dialogue step is based on a supply-demand relationship reflected by the received trading information.

321. A digital conversation pricing apparatus embodiment, comprising:

a memory;

a processor disposed in communication with said memory, and configured to issue a plurality of processing instructions stored in the memory, wherein the processor issues instructions to:

retrieve a digital dialogue between an individual target and a dialogue agent;

determine a plurality of parameters associated with the digital dialogue;

allocate a value point to each dialogue step of the digital dialogue;

receive trading information from a trading platform;

adjust the allocated value point of each dialogue step based on the received trading information.

322. The apparatus of embodiment 321, wherein the dialogue agent comprises an avatar identity on a social platform.

323. The apparatus of embodiment 321, wherein digital dialogue is saved in a voice XML format.

324. The apparatus of embodiment 321, wherein the plurality of parameters comprises a pathway of the dialogue.

325. The apparatus of embodiment 324, wherein the pathway is associated with a starting node and an ending node.

326. The apparatus of embodiment 321, wherein the plurality of parameters comprises a number of dialogue steps in the dialogue.

327. The apparatus of embodiment 321, wherein the plurality of parameters comprises an amount of time taken for each dialogue step.

328. The apparatus of embodiment 321, wherein the value point allocated to each dialogue step is determined based on an outcome of the dialogue.

329. The apparatus of embodiment 321, wherein the value point comprises a dialogue value metric.

330. The apparatus of embodiment 321, wherein the value point comprises a dollar value.

331. The apparatus of embodiment 321, wherein the processor further issues instructions for:

querying for related dialogue on the received trading information of digital assets.

332. The apparatus of embodiment 321, wherein the adjusting the allocated value point of each dialogue step is based on a supply-demand relationship reflected by the received trading information.

333. A digital conversation pricing system embodiment, comprising:

means to retrieve a digital dialogue between an individual target and a dialogue agent;

means to determine a plurality of parameters associated with the digital dialogue;

means to allocate a value point to each dialogue step of the digital dialogue;

means to receive trading information from a trading platform;

means to adjust the allocated value point of each dialogue step based on the received trading information.

334. The system of embodiment 333, wherein the dialogue agent comprises an avatar identity on a social platform.

335. The system of embodiment 333, wherein digital dialogue is saved in a voice XML format.

336. The system of embodiment 333, wherein the plurality of parameters comprises a pathway of the dialogue.

337. The system of embodiment 336, wherein the pathway is associated with a starting node and an ending node.

338. The system of embodiment 333, wherein the plurality of parameters comprises a number of dialogue steps in the dialogue.

339. The system of embodiment 333, wherein the plurality of parameters comprises an amount of time taken for each dialogue step.

340. The system of embodiment 333, wherein the value point allocated to each dialogue step is determined based on an outcome of the dialogue.

341. The system of embodiment 333, wherein the value point comprises a dialogue value metric.

342. The system of embodiment 333, wherein the value point comprises a dollar value.

343. The system of embodiment 333, further comprising:
querying for related dialogue on the received trading information of digital assets.

344. The system of embodiment 333, wherein the adjusting the allocated value point of each dialogue step is based on a supply-demand relationship reflected by the received trading information.

345. A digital conversation pricing processor-readable medium embodiment storing processor-issuable instructions to:
retrieve a digital dialogue between an individual target and a dialogue agent;
determine a plurality of parameters associated with the digital dialogue;
allocate a value point to each dialogue step of the digital dialogue;
receive trading information from a trading platform;
adjust the allocated value point of each dialogue step based on the received trading information.

346. The medium of embodiment 345, wherein the dialogue agent comprises an avatar identity on a social platform.

347. The medium of embodiment 345, wherein digital dialogue is saved in a voice XML format.

348. The medium of embodiment 345, wherein the plurality of parameters comprises a pathway of the dialogue.

349. The medium of embodiment 348, wherein the pathway is associated with a starting node and an ending node.

350. The medium of embodiment 345, wherein the plurality of parameters comprises a number of dialogue steps in the dialogue.

351. The medium of embodiment 345, wherein the plurality of parameters comprises an amount of time taken for each dialogue step.

352. The medium of embodiment 345, wherein the value point allocated to each dialogue step is determined based on an outcome of the dialogue.

353. The medium of embodiment 345, wherein the value point comprises a dialogue value metric.

354. The medium of embodiment 345, wherein the value point comprises a dollar value.

355. The medium of embodiment 345, further comprising:
querying for related dialogue on the received trading information of digital assets.

356. The medium of embodiment 345, wherein the adjusting the allocated value point of each dialogue step is based on a supply-demand relationship reflected by the received trading information.

357. A digital conversation management processor-implemented method embodiment, comprising:
initializing a dialogue agent application with an individual target;
receiving a dialogue action from the individual target;
connecting to a search engine for a query based on the dialogue action;
generating a dialogue response comprising a link of search results on the search engine if the search results are available; and
generating a dialogue response comprising a link of related topics if the search results are not available.

358. The method of embodiment 357, wherein the dialogue agent application is initialized on a social media platform.

359. The method of embodiment 357, wherein the dialogue agent application is initialized on a mobile platform.

360. The method of embodiment 357, further comprising:
generating a web service;
creating an avatar identity on the dialogue platform; and
connecting the web-service to the avatar identity.

361. The method of embodiment 357, wherein the dialogue action comprises an inquiry for information.

362. The method of embodiment 357, further comprising:
determining a condition associated with the received dialogue line; and
retrieve an optional dialogue line in response to the determined condition.

363. The method of embodiment 357, further comprising:
determining a pathway of the recorded interactive dialogue; and
determining a plurality of parameters associated with the interactive dialogue.

364. The method of embodiment 357, further comprising:
determining a conversation unit value of the interactive dialogue based on the pathway.

365. The method of embodiment 357, further comprising:
generating a dialogue response comprising a link to another dialogue agent if the search results are not available.

366. The method of embodiment 357, further comprising:
updating a knowledge record with the search results.

367. A digital conversation generating apparatus embodiment, comprising:
a memory;
a processor disposed in communication with said memory, and configured to issue a plurality of processing instructions stored in the memory, wherein the processor issues instructions to:
initialize a dialogue agent application with an individual target;
receive a dialogue action from the individual target;
connect to a search engine for a query based on the dialogue action;
generate a dialogue response comprising a link of search results on the search engine if the search results are available; and generate a dialogue response comprising a link of related topics if the search results are not available.

368. The apparatus of embodiment 367, wherein the dialogue agent application is initialized on a social media platform.

369. The apparatus of embodiment 367, wherein the dialogue agent application is initialized on a mobile platform.

370. The apparatus of embodiment 367, wherein the processor further issues instructions for:
generating a web service;
creating an avatar identity on the dialogue platform; and
connecting the web-service to the avatar identity.

371. The apparatus of embodiment 367, wherein the dialogue action comprises an inquiry for information.

372. The apparatus of embodiment 367, wherein the processor further issues instructions for:
determining a condition associated with the received dialogue line; and
retrieve an optional dialogue line in response to the determined condition.

373. The apparatus of embodiment 367, wherein the processor further issues instructions for:
determining a pathway of the recorded interactive dialogue; and
determining a plurality of parameters associated with the interactive dialogue.

374. The apparatus of embodiment 367, wherein the processor further issues instructions for:
determining a conversation unit value of the interactive dialogue based on the pathway.

375. The apparatus of embodiment 367, wherein the processor further issues instructions for:
generating a dialogue response comprising a link to another dialogue agent if the search results are not available.

376. The apparatus of embodiment 367, wherein the processor further issues instructions for:
updating a knowledge record with the search results.

377. A digital conversation pricing system embodiment, comprising:
means to initialize a dialogue agent application with an individual target;
means to receive a dialogue action from the individual target;
means to connect to a search engine for a query based on the dialogue action;
means to generate a dialogue response comprising a link of search results on the search engine if the search results are available; and
means to generate a dialogue response comprising a link of related topics if the search results are not available 378. The system of embodiment 377, wherein the dialogue agent application is initialized on a social media platform.

379. The system of embodiment 377, wherein the dialogue agent application is initialized on a mobile platform.

380. The system of embodiment 377, further comprising means for:
generating a web service;
creating an avatar identity on the dialogue platform; and
connecting the web-service to the avatar identity.

381. The system of embodiment 377, wherein the dialogue action comprises an inquiry for information.

382. The system of embodiment 377, further comprising means for:
determining a condition associated with the received dialogue line; and
retrieve an optional dialogue line in response to the determined condition.

383. The system of embodiment 377, further comprising means for:
determining a pathway of the recorded interactive dialogue; and
determining a plurality of parameters associated with the interactive dialogue.

384. The system of embodiment 377, further comprising means for:
determining a conversation unit value of the interactive dialogue based on the pathway.

385. The system of embodiment 377, further comprising means for:
generating a dialogue response comprising a link to another dialogue agent if the search results are not available.

386. The system of embodiment 377, further comprising means for:
updating a knowledge record with the search results.

387. A digital conversation pricing processor-readable medium embodiment storing processor-issuable instructions to:
initialize a dialogue agent application with an individual target;
receive a dialogue action from the individual target;
connect to a search engine for a query based on the dialogue action;
generate a dialogue response comprising a link of search results on the search engine if the search results are available; and
generate a dialogue response comprising a link of related topics if the search results are not available.

388. The medium of embodiment 387, wherein the dialogue agent application is initialized on a social media platform.

389. The medium of embodiment 387, wherein the dialogue agent application is initialized on a mobile platform.

390. The medium of embodiment 387, further storing instructions for:
generating a web service;
creating an avatar identity on the dialogue platform; and
connecting the web-service to the avatar identity.

391. The medium of embodiment 387, wherein the dialogue action comprises an inquiry for information.

392. The medium of embodiment 387, further storing instructions for:
determining a condition associated with the received dialogue line; and
retrieve an optional dialogue line in response to the determined condition.

393. The medium of embodiment 387, further storing instructions for:
determining a pathway of the recorded interactive dialogue; and
determining a plurality of parameters associated with the interactive dialogue.

394. The medium of embodiment 387, further storing instructions for:
determining a conversation unit value of the interactive dialogue based on the pathway.

395. The medium of embodiment 387, further storing instructions for:
generating a dialogue response comprising a link to another dialogue agent if the search results are not available.

396. The medium of embodiment 387, further storing instructions for:
updating a knowledge record with the search results.

397. A digital conversation management processor-implemented method embodiment, comprising:

initializing a dialogue with a dialogue agent on a dialogue platform;
submitting a dialogue action comprising an inquiry;
receiving a dialogue response comprising a link of search results on the search engine if the search results are available; and
receiving a dialogue response comprising a link of related topics if the search results are not available.

398. The method of embodiment 397, wherein dialogue agent application is initialized on a social media platform.

399. The method of embodiment 397, wherein the dialogue agent application is initialized on a mobile platform.

400. The method of embodiment 397, further comprising:
connecting to a web service;
associating an avatar identity on the dialogue platform; and
connecting the web-service to the avatar identity.

401. The method of embodiment 397, wherein the dialogue action comprises an inquiry for information.

402. A digital conversation management apparatus embodiment, comprising:
a memory;
a processor disposed in communication with said memory, and configured to issue a plurality of processing instructions stored in the memory, wherein the processor issues instructions to:
initialize a dialogue with a dialogue agent on a dialogue platform;
submit a dialogue action comprising an inquiry;
receive a dialogue response comprising a link of search results on the search engine if the search results are available; and
receive a dialogue response comprising a link of related topics if the search results are not available.

403. The apparatus of embodiment 402, wherein dialogue agent application is initialized on a social media platform.

404. The apparatus of embodiment 402, wherein the dialogue agent application is initialized on a mobile platform.

405. The apparatus of embodiment 402, further comprising:
connecting to a web service;
associating an avatar identity on the dialogue platform; and
connecting the web-service to the avatar identity.

406. The apparatus of embodiment 402, wherein the dialogue action comprises an inquiry for information.

407. A digital conversation pricing system embodiment, comprising:
means to initialize a dialogue with a dialogue agent on a dialogue platform;
means to submit a dialogue action comprising an inquiry;
means to receive a dialogue response comprising a link of search results on the search engine if the search results are available; and
means to receive a dialogue response comprising a link of related topics if the search results are not available.

408. The system of embodiment 407, wherein dialogue agent application is initialized on a social media platform.

409. The system of embodiment 407, wherein the dialogue agent application is initialized on a mobile platform.

410. The system of embodiment 407, further comprising:
connecting to a web service;
associating an avatar identity on the dialogue platform; and
connecting the web-service to the avatar identity.

411. The system of embodiment 407, wherein the dialogue action comprises an inquiry for information.

412. A digital conversation management processor-readable medium embodiment storing processor-issuable instructions to:
initialize a dialogue with a dialogue agent on a dialogue platform;
submit a dialogue action comprising an inquiry;
receive a dialogue response comprising a link of search results on the search engine if the search results are available; and
receive a dialogue response comprising a link of related topics if the search results are not available.

413. The medium of embodiment 412, wherein dialogue agent application is initialized on a social media platform.

414. The medium of embodiment 412, wherein the dialogue agent application is initialized on a mobile platform.

415. The medium of embodiment 412, further comprising:
connecting to a web service;
associating an avatar identity on the dialogue platform; and
connecting the web-service to the avatar identity.

416. The medium of embodiment 412, wherein the dialogue action comprises an inquiry for information.

417. A digital conversation management processor-implemented method comprising:
initializing an dialogue agent application on a dialogue platform;
capturing a search request from the dialogue agent, the search request comprising a key word;
retrieving previously stored information related to the key word;
receiving a list of search results linked to a search engine based on the key word; and
incorporating information from the list of search results in a record related to the key word.

418. The method of embodiment 417, further comprising:
populating the dialogue agent application on social media; and
implement the dialogue agent to capture interactive dialogue actions.

419. The method of embodiment 417, further comprising:
generating a web service;
connecting the web-service to an avatar front end; and
completing dialogue agent application.

420. The method of embodiment 417, further comprising dialogue cloud with key words for search engines.

421. The method of embodiment 417, further comprising:
populating on a social media platform;
generating links accessible from Internet and smart phone applications; and
updating wrapper description identifications.

422. The method of embodiment 417, wherein the dialogue agent is an avatar on a social media platform.

423. The method of embodiment 417, further comprising:
registering the conversation on a virtual asset exchange platform.

424. The method of embodiment 417, further comprising:
registering the conversation on a financial trading platform.

425. The method of embodiment 417, further comprising:
initiating a search to obtain information for the conversation; and
generating a hyperlink outcome based on the search results.

426. The method of embodiment 425, wherein the search comprises a key word based Google search.

427. The method of embodiment 417, further comprising:
providing alternate questions to the individual target to obtain further information if the search fails; and
generating a dialogue line based on partial key word search and the obtained information.

428. The method of embodiment 417, further comprising:
capturing updated product information from the Internet; and
requesting a client provide updated product information.

429. The method of embodiment 417, further comprising:
initiating dialogue analytics to drive individual-agent interactions;
determining a dialogue pathway of a dialogue; and
determining dialogue parameters based on the dialogue pathway.

430. The method of embodiment 417, further comprising:
receiving information from another dialogue agent; and
incorporating information from the other dialogue agent in a record related to the key word 431. A digital conversation management apparatus embodiment, comprising:
a memory;
a processor disposed in communication with said memory, and configured to issue a plurality of processing instructions stored in the memory, wherein the processor issues instructions to:
initialize an dialogue agent application on a dialogue platform;
capture a search request from the dialogue agent, the search request comprising a key word;
retrieve previously stored information related to the key word;
receive a list of search results linked to a search engine based on the key word; and
incorporate information from the list of search results in a record related to the key word.

432. The apparatus of embodiment 431, wherein the processor further issues instructions for:
populating the dialogue agent application on social media; and
implement the dialogue agent to capture interactive dialogue actions.

433. The apparatus of embodiment 431, wherein the processor further issues instructions for:
generating a web service;
connecting the web-service to an avatar front end; and
completing dialogue agent application.

434. The apparatus of embodiment 431, wherein the processor further issues instructions for dialogue cloud with key words for search engines.

435. The apparatus of embodiment 431, wherein the processor further issues instructions for:
populating on a social media platform;
generating links accessible from Internet and smart phone applications; and
updating wrapper description identifications.

436. The apparatus of embodiment 431, wherein the dialogue agent is an avatar on a social media platform.

437. The apparatus of embodiment 431, wherein the processor further issues instructions for:
registering the conversation on a virtual asset exchange platform.

438. The apparatus of embodiment 431, wherein the processor further issues instructions for:
registering the conversation on a financial trading platform.

439. The apparatus of embodiment 431, wherein the processor further issues instructions for:
initiating a search to obtain information for the conversation; and
generating a hyperlink outcome based on the search results.

440. The apparatus of embodiment 439, wherein the search comprises a key word based Google search.

441. The apparatus of embodiment 431, wherein the processor further issues instructions for:
providing alternate questions to the individual target to obtain further information if the search fails; and
generating a dialogue line based on partial key word search and the obtained information.

442. The apparatus of embodiment 431, wherein the processor further issues instructions for:
capturing updated product information from the Internet; and
requesting a client provide updated product information.

443. The apparatus of embodiment 431, wherein the processor further issues instructions for:
initiating dialogue analytics to drive individual-agent interactions;
determining a dialogue pathway of a dialogue; and
determining dialogue parameters based on the dialogue pathway.

444. The apparatus of embodiment 431, wherein the processor further issues instructions for:
receiving information from another dialogue agent; and
incorporating information from the other dialogue agent in a record related to the key word 445. A digital conversation management system embodiment, comprising:
means to initialize an dialogue agent application on a dialogue platform;
means to capture a search request from the dialogue agent, the search request comprising a key word;
means to retrieve previously stored information related to the key word;
means to receive a list of search results linked to a search engine based on the key word; and
means to incorporate information from the list of search results in a record related to the key word.

446. The system of embodiment 445, further comprising means for:
populating the dialogue agent application on social media; and
implement the dialogue agent to capture interactive dialogue actions.

447. The system of embodiment 445, further comprising means for:
generating a web service;
connecting the web-service to an avatar front end; and
completing dialogue agent application.

448. The system of embodiment 445, further comprising means for dialogue cloud with key words for search engines.

449. The system of embodiment 445, further comprising means for:
populating on a social media platform;
generating links accessible from Internet and smart phone applications; and
updating wrapper description identifications.

450. The system of embodiment 445, wherein the dialogue agent is an avatar on a social media platform.

451. The system of embodiment 445, further comprising means for:
registering the conversation on a virtual asset exchange platform.

452. The system of embodiment 445, further comprising means for:
registering the conversation on a financial trading platform.

453. The system of embodiment 445, further comprising means for:

initiating a search to obtain information for the conversation; and generating a hyperlink outcome based on the search results.

454. The system of embodiment 453, wherein the search comprises a key word based Google search.

455. The system of embodiment 445, further comprising means for:

providing alternate questions to the individual target to obtain further information if the search fails; and generating a dialogue line based on partial key word search and the obtained information.

456. The system of embodiment 445, further comprising means for:

capturing updated product information from the Internet; and requesting a client provide updated product information.

457. The system of embodiment 445, further comprising means for:

initiating dialogue analytics to drive individual-agent interactions;

determining a dialogue pathway of a dialogue; and determining dialogue parameters based on the dialogue pathway.

458. The system of embodiment 445, further comprising means for:

receiving information from another dialogue agent; and incorporating information from the other dialogue agent in a record related to the key word.

459. A digital conversation management processor-readable medium embodiment storing processor-issuable instructions to:

initialize an dialogue agent application on a dialogue platform;

capture a search request from the dialogue agent, the search request comprising a key word;

retrieve previously stored information related to the key word;

receive a list of search results linked to a search engine based on the key word; and incorporate information from the list of search results in a record related to the key word.

460. The medium of embodiment 459, further storing instructions for:

populating the dialogue agent application on social media; and implement the dialogue agent to capture interactive dialogue actions.

461. The medium of embodiment 459, further storing instructions for:

generating a web service;

connecting the web-service to an avatar front end; and completing dialogue agent application.

462. The medium of embodiment 459, further storing instructions for dialogue cloud with key words for search engines.

463. The medium of embodiment 459, further storing instructions for:

populating on a social media platform;

generating links accessible from Internet and smart phone applications; and updating wrapper description identifications.

464. The medium of embodiment 459, wherein the dialogue agent is an avatar on a social media platform.

465. The medium of embodiment 459, further storing instructions for:

registering the conversation on a virtual asset exchange platform.

466. The medium of embodiment 459, further storing instructions for:

registering the conversation on a financial trading platform.

467. The medium of embodiment 459, further storing instructions for:

initiating a search to obtain information for the conversation; and generating a hyperlink outcome based on the search results.

468. The medium of embodiment 467, wherein the search comprises a key word based Google search.

469. The medium of embodiment 459, further storing instructions for:

providing alternate questions to the individual target to obtain further information if the search fails; and generating a dialogue line based on partial key word search and the obtained information.

470. The medium of embodiment 459, further storing instructions for:

capturing updated product information from the Internet; and requesting a client provide updated product information.

471. The medium of embodiment 459, further storing instructions for:

initiating dialogue analytics to drive individual-agent interactions;

determining a dialogue pathway of a dialogue; and determining dialogue parameters based on the dialogue pathway.

472. The medium of embodiment 459, further storing instructions for:

receiving information from another dialogue agent; and incorporating information from the other dialogue agent in a record related to the key word.

473. A digital conversation generating processor-implemented method embodiment, comprising:

initializing a dialogue agent application developer user interface;

launching a dialogue tree application and a dialogue script generating panel;

retrieving a dialogue node in the dialogue tree;

determining a plurality of conditions associated with the dialogue node;

generating a dialogue tree by connecting the dialogue node to a different dialogue node based on each condition; and completing the dialogue tree by connecting all available dialogue nodes.

474. The method of embodiment 473, wherein the dialogue agent application is initialized by a developer.

475. The method of embodiment 473, wherein the dialogue tree application and the dialogue script generating panel are launched in a slit screen via the user interface.

476. The method of embodiment 473, wherein the dialogue tree comprises a plurality of connected dialogue nodes.

477. The method of embodiment 473, wherein the dialogue node denotes a dialogue action.

478. The method of embodiment 473, wherein the dialogue node denotes a dialogue outcome.

479. The method of embodiment 473, further comprising generating a decision tree.

480. The method of embodiment 479, wherein the decision tree is determined by a pathway on the dialogue tree via a conditional logic.

481. The method of embodiment 473, further comprising:
    initiating dialogue analytics to drive individual-agent interactions;
    determining a dialogue pathway of a dialogue; and
    determining dialogue parameters based on the dialogue pathway.

482. The method of embodiment 473, further comprising:
    initiating a search to obtain information for the conversation; and
    generating a hyperlink outcome based on the search results.

483. The method of embodiment 473, further comprising:
    dialogue cloud with key words for search engines.

484. The method of embodiment 473, further comprising:
    connecting to a web service;
    associating an avatar identity on the dialogue platform; and
    connecting the web-service to the avatar identity.

485. A digital conversation generating apparatus embodiment, comprising:
    a memory;
    a processor disposed in communication with said memory, and configured to issue a plurality of processing instructions stored in the memory, wherein the processor issues instructions to:
    initialize a dialogue agent application developer user interface;
    launch a dialogue tree application and a dialogue script generating panel;
    retrieve a dialogue node in the dialogue tree;
    determine a plurality of conditions associated with the dialogue node;
    generate a dialogue tree by connecting the dialogue node to a different dialogue node based on each condition; and
    complete the dialogue tree by connecting all available dialogue nodes.

486. The apparatus of embodiment 485, wherein the dialogue agent application is initialized by a developer.

487. The apparatus of embodiment 485, wherein the dialogue tree application and the dialogue script generating panel are launched in a slit screen via the user interface.

488. The apparatus of embodiment 485, wherein the dialogue tree comprises a plurality of connected dialogue nodes.

489. The apparatus of embodiment 485, wherein the dialogue node denotes a dialogue action.

490. The apparatus of embodiment 485, wherein the dialogue node denotes a dialogue outcome.

491. The apparatus of embodiment 485, wherein the processor further issues instructions for generating a decision tree.

492. The apparatus of embodiment 491, wherein the decision tree is determined by a pathway on the dialogue tree via a conditional logic.

493. The apparatus of embodiment 485, wherein the processor further issues instructions for:
    initiating dialogue analytics to drive individual-agent interactions;
    determining a dialogue pathway of a dialogue; and
    determining dialogue parameters based on the dialogue pathway.

494. The apparatus of embodiment 485, wherein the processor further issues instructions for:
    initiating a search to obtain information for the conversation; and
    generating a hyperlink outcome based on the search results.

495. The apparatus of embodiment 485, wherein the processor further issues instructions for:
    dialogue cloud with key words for search engines.

496. The apparatus of embodiment 485, wherein the processor further issues instructions for:
    connecting to a web service;
    associating an avatar identity on the dialogue platform; and
    connecting the web-service to the avatar identity.

497. A digital conversation generating system embodiment, comprising:
    means to initialize a dialogue agent application developer user interface;
    means to launch a dialogue tree application and a dialogue script generating panel;
    means to retrieve a dialogue node in the dialogue tree;
    means to determine a plurality of conditions associated with the dialogue node;
    means to generate a dialogue tree by connecting the dialogue node to a different dialogue node based on each condition; and
    means to complete the dialogue tree by connecting all available dialogue nodes.

498. The system of embodiment 497, wherein the dialogue agent application is initialized by a developer.

499. The system of embodiment 497, wherein the dialogue tree application and the dialogue script generating panel are launched in a slit screen via the user interface.

500. The system of embodiment 497, wherein the dialogue tree comprises a plurality of connected dialogue nodes.

501. The system of embodiment 497, wherein the dialogue node denotes a dialogue action.

502. The system of embodiment 497, wherein the dialogue node denotes a dialogue outcome.

503. The system of embodiment 497, further comprising means for generating a decision tree.

504. The system of embodiment 503, wherein the decision tree is determined by a pathway on the dialogue tree via a conditional logic.

505. The system of embodiment 497, further comprising means for:
    initiating dialogue analytics to drive individual-agent interactions;
    determining a dialogue pathway of a dialogue; and
    determining dialogue parameters based on the dialogue pathway.

506. The system of embodiment 497, further comprising means for:
    initiating a search to obtain information for the conversation; and
    generating a hyperlink outcome based on the search results.

507. The system of embodiment 497, further comprising means for:
    dialogue cloud with key words for search engines.

508. The system of embodiment 497, further comprising means for:
    connecting to a web service;
    associating an avatar identity on the dialogue platform; and
    connecting the web-service to the avatar identity.

509. A digital conversation generating processor-readable medium embodiment storing processor-issuable instructions to:
    initialize a dialogue agent application developer user interface;
    launch a dialogue tree application and a dialogue script generating panel;
    retrieve a dialogue node in the dialogue tree;

determine a plurality of conditions associated with the dialogue node;

generate a dialogue tree by connecting the dialogue node to a different dialogue node based on each condition; and complete the dialogue tree by connecting all available dialogue nodes.

510. The medium of embodiment 509, wherein the dialogue agent application is initialized by a developer.

511. The medium of embodiment 509, wherein the dialogue tree application and the dialogue script generating panel are launched in a slit screen via the user interface.

512. The medium of embodiment 509, wherein the dialogue tree comprises a plurality of connected dialogue nodes.

513. The medium of embodiment 509, wherein the dialogue node denotes a dialogue action.

514. The medium of embodiment 509, wherein the dialogue node denotes a dialogue outcome.

515. The medium of embodiment 509, wherein the processor further issues instructions for generating a decision tree.

516. The medium of embodiment 515, wherein the decision tree is determined by a pathway on the dialogue tree via a conditional logic.

517. The medium of embodiment 509, wherein the processor further issues instructions for:

initiating dialogue analytics to drive individual-agent interactions;

determining a dialogue pathway of a dialogue; and determining dialogue parameters based on the dialogue pathway.

518. The medium of embodiment 509, wherein the processor further issues instructions for:

initiating a search to obtain information for the conversation; and generating a hyperlink outcome based on the search results.

519. The medium of embodiment 509, wherein the processor further issues instructions for:

dialogue cloud with key words for search engines.

520. The medium of embodiment 509, wherein the processor further issues instructions for:

connecting to a web service;

associating an avatar identity on the dialogue platform; and connecting the web-service to the avatar identity.

521. A digital conversation generating processor-readable method embodiment, comprising:

obtaining an initial prompt for use in an artificial intelligence agent dialogue;

obtaining a plurality of agent dialogue conditions;

specifying a condition trigger for the plurality of agent dialogue conditions;

providing a subsequent prompt for each triggered conditional dialogue branch;

obtaining a search link for each triggered conditional dialogue branch; and sending the obtained initial prompt, the plurality of agent dialogue conditions, each specified condition trigger, the subsequent prompt for each triggered conditional dialogue branch, the search link to a server for dialogue agent registration.

522. The method of embodiment 521, wherein the initial prompt is received from a user.

523. The method of embodiment 521, wherein the initial prompt is obtained from Wiki submission from a plurality of users.

524. The method of embodiment 521, wherein the search link is generated by a query on a search engine.

525. A digital conversation generating apparatus embodiment, comprising:

a memory;

a processor disposed in communication with said memory, and configured to issue a plurality of processing instructions stored in the memory, wherein the processor issues instructions to:

obtaining an initial prompt for use in an artificial intelligence agent dialogue;

obtaining a plurality of agent dialogue conditions;

obtaining a specified condition trigger for the plurality of agent dialogue conditions;

obtaining a subsequent prompt for each triggered conditional dialogue branch;

obtaining a search link for each triggered conditional dialogue branch; and sending the obtained initial prompt, the plurality of agent dialogue conditions, each specified condition trigger, the subsequent prompt for each triggered conditional dialogue branch, the search link to a server for dialogue agent registration.

526. The apparatus of embodiment 525, wherein the initial prompt is received from a user.

527. The apparatus of embodiment 525, wherein the initial prompt is obtained from Wiki submission from a plurality of users.

528. The apparatus of embodiment 525, wherein the search link is generated by a query on a search engine.

529. A digital conversation generating system embodiment, comprising:

means to obtain an initial prompt for use in an artificial intelligence agent dialogue;

means to obtain a plurality of agent dialogue conditions;

means to obtain a specified condition trigger for the plurality of agent dialogue conditions;

means to obtain a subsequent prompt for each triggered conditional dialogue branch;

means to obtain a search link for each triggered conditional dialogue branch; and means to send the obtained initial prompt, the plurality of agent dialogue conditions, each specified condition trigger, the subsequent prompt for each triggered conditional dialogue branch, the search link to a server for dialogue agent registration.

530. The system of embodiment 529, wherein the initial prompt is received from a user.

531. The system of embodiment 529, wherein the initial prompt is obtained from Wiki submission from a plurality of users.

532. The system of embodiment 529, wherein the search link is generated by a query on a search engine.

533. A digital conversation generating processor-readable medium embodiment storing processor-issuable instructions to:

obtain an initial prompt for use in an artificial intelligence agent dialogue;

obtain a plurality of agent dialogue conditions;

obtain a specified condition trigger for the plurality of agent dialogue conditions;

obtain a subsequent prompt for each triggered conditional dialogue branch;

obtain a search link for each triggered conditional dialogue branch; and send the obtained initial prompt, the plurality of agent dialogue conditions, each specified condition trigger, the subsequent prompt for each triggered conditional dialogue branch, the search link to a server for dialogue agent registration.

534. The medium of embodiment 533, wherein the initial prompt is received from a user.

535. The medium of embodiment 533, wherein the initial prompt is obtained from Wiki submission from a plurality of users.

536. The medium of embodiment 533, wherein the search link is generated by a query on a search engine.

537. A digital conversation generating processor-readable method embodiment, comprising:
  receiving a dialogue agent registration request;
  receiving a series of dialogue steps, including:
    an initial prompt for use in an artificial intelligence agent dialogue,
    a plurality of agent dialogue conditions,
    a condition trigger for the plurality of agent dialogue conditions,
    a subsequent prompt for each triggered conditional dialogue branch, and
    a search link for each triggered conditional dialogue branch; and
  registering the dialogue agent associated with the artificial intelligence agent dialogue.

538. A digital conversation generating apparatus embodiment, comprising:
  a memory;
  a processor disposed in communication with said memory, and configured to issue a plurality of processing instructions stored in the memory, wherein the processor issues instructions to:
    receive a dialogue agent registration request;
    receive a series of dialogue steps, including:
      an initial prompt for use in an artificial intelligence agent dialogue,
      a plurality of agent dialogue conditions,
      a condition trigger for the plurality of agent dialogue conditions,
      a subsequent prompt for each triggered conditional dialogue branch, and
      a search link for each triggered conditional dialogue branch; and
    register the dialogue agent associated with the artificial intelligence agent dialogue.

539. A digital conversation generating system embodiment, comprising:
  means to receive a dialogue agent registration request;
  means to receive a series of dialogue steps, including:
    an initial prompt for use in an artificial intelligence agent dialogue,
    a plurality of agent dialogue conditions,
    a condition trigger for the plurality of agent dialogue conditions,
    a subsequent prompt for each triggered conditional dialogue branch, and
    a search link for each triggered conditional dialogue branch; and
  means to register the dialogue agent associated with the artificial intelligence agent dialogue.

540. A digital conversation generating processor-readable medium embodiment storing processor-issuable instructions to:
  receive a dialogue agent registration request;
  receive a series of dialogue steps, including:
    an initial prompt for use in an artificial intelligence agent dialogue,
    a plurality of agent dialogue conditions,
    a condition trigger for the plurality of agent dialogue conditions,
    a subsequent prompt for each triggered conditional dialogue branch, and
    a search link for each triggered conditional dialogue branch; and
  register the dialogue agent associated with the artificial intelligence agent dialogue.

541. A digital conversation generating processor-readable method embodiment, comprising:
  instantiating a dialogue agent loader in a search engine interface;
  obtaining a search engine query on the dialogue agent database for matching dialogue search agents;
  providing matching agents in a search engine query result;
  instantiating a selected dialogue search agent;
  providing a dialogue agent prompt via the instantiated dialogue search agent;
  obtaining responses to the dialogue agent prompt;
  updating the search engine query result based on the obtained responses by using dialogue search agent search links.

542. The method of embodiment 541, wherein the search engine query is based on a key word submitted by a user.

543. The method of embodiment 542, wherein the key word specifies a topic for dialogue search agents.

544. The method of embodiment 541, wherein the updating the search engine query result based on the obtained responses further comprises refining the search engine query based on related key words from the obtained responses.

545. The method of embodiment 542, further comprising increasing a charge to a dialogue search agent sponsor for each obtained dialogue response.

546. A digital conversation generating apparatus embodiment, comprising:
  a memory;
  a processor disposed in communication with said memory, and configured to issue a plurality of processing instructions stored in the memory, wherein the processor issues instructions to:
    instantiate a dialogue agent loader in a search engine interface;
    obtain a search engine query on the dialogue agent database for matching dialogue search agents;
    provide matching agents in a search engine query result;
    instantiate a selected dialogue search agent;
    provide a dialogue agent prompt via the instantiated dialogue search agent;
    obtain user dialogue responses to dialogue agent prompt;
    update the search engine query result based on the obtained responses by using dialogue search agent search links.

547. The apparatus of embodiment 546, wherein the search engine query is based on a key word submitted by a user.

548. The apparatus of embodiment 547, wherein the key word specifies a topic for dialogue search agents.

549. The apparatus of embodiment 546, wherein the updating the search engine query result based on the obtained responses further comprises refining the search engine query based on related key words from the obtained responses.

550. The apparatus of embodiment 547, further comprising increasing a charge to a dialogue search agent sponsor for each obtained dialogue response.

551. A digital conversation generating system embodiment, comprising:
  means to instantiate a dialogue agent loader in a search engine interface;

means to obtain a search engine query on the dialogue agent database for matching dialogue search agents;

means to provide matching agents in a search engine query result;

means to instantiate a selected dialogue search agent;

means to provide a dialogue agent prompt via the instantiated dialogue search agent;

means to obtain user dialogue responses to the dialogue agent prompt;

means to update the search engine query result based on the obtained user dialogue responses by using dialogue search agent search links.

552. The system of embodiment 551, wherein the search engine query is based on a key word submitted by a user.

553. The system of embodiment 552, wherein the key word specifies a topic for dialogue search agents.

554. The system of embodiment 551, wherein the updating the search engine query result based on the obtained responses further comprises refining the search engine query based on related key words from the obtained responses.

555. The system of embodiment 552, further comprising means for increasing a charge to a dialogue search agent sponsor for each obtained dialogue response.

556. A digital conversation generating processor-readable medium embodiment storing processor-issuable instructions to:

instantiate a dialogue agent loader in a search engine interface;

obtain a search engine query on the dialogue agent database for matching dialogue search agents;

provide matching agents in a search engine query result;

instantiate a selected dialogue search agent;

provide a dialogue agent prompt via the instantiated dialogue search agent;

obtain user dialogue responses to the dialogue agent prompt;

update the search engine query result based on the obtained user dialogue responses by using dialogue search agent search links.

557. The medium of embodiment 556, wherein the dialogue agent loader instantiate the dialogue search agent.

558. The medium of embodiment 556, wherein the dialogue agent loader is triggered by a user selection.

559. The medium of embodiment 556, wherein the search engine query is based on a key word submitted by a user.

560. The medium of embodiment 559, wherein the key word specifies a topic for dialogue search agents.

561. The medium of embodiment 556, wherein the updating the search engine query result based on the obtained responses further comprises refining the search engine query based on related key words from the obtained responses.

562. The medium of embodiment 559, further storing instructions for increasing a charge to a dialogue search agent sponsor for each obtained dialogue response.

In order to address various issues and advance the art, the entirety of this application for APPARATUSES, METHODS AND SYSTEMS FOR A DIGITAL CONVERSATION MANAGEMENT PLATFORM (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DCM-Platform individual and/or enterprise user, database configuration and/or relational model, data type, data transmission and/or network framework, syntax structure, and/or the like, various embodiments of the DCM-Platform, may be implemented that enable a great deal of flexibility and customization. For example, aspects of the DCM-Platform may be adapted for virtual commodities packetizing and pricing. While various embodiments and discussions of the DCM-Platform have been directed to artificial intelligence asset management, however, it is to be understood that the embodiments described herein may be readily configured and/or customized for a wide variety of other applications and/or implementations.

What is claimed is:

1. A digital conversation generation processor-implemented method, comprising:

creating a dialogue agent;

populating the created dialogue agent application on a dialogue platform;

receiving a dialogue action from an individual target via the dialogue platform;

generating a dialogue line in response to the received dialogue action via the dialogue agent;
recording an interactive dialogue comprising the dialogue action and the generated dialogue line;
retrieving the recorded interactive dialogue between the individual target and the dialogue agent;
determining a plurality of parameters associated with the interactive dialogue;
allocating a value point to each dialogue element of the interactive dialogue;
receiving pricing information from an exchange;
adjusting the allocated value point of each dialogue element based on the received pricing information;
creating a digital asset comprising at least the retrieved interactive dialogue associated with the allocated value point to each dialogue element of the interactive dialogue;
receiving information indicating a demand for a digital conversation asset;
determining a type of the demanded digital conversation asset;
initializing an exchange procedure for the determined type of the demanded digital conversation asset;
obtaining information required by the exchange procedure for the determined type of the demanded digital conversation asset; and
determining a value for the demanded digital conversation asset at least based on the obtained information for the determined type of the demanded digital conversation asset and the allocated value point to each dialogue element of the interactive dialogue;
instantiating the created digital asset;
generating a tradable financial instrument based on the instantiated digital asset;
determining a price for the tradable financial instrument; and
facilitate a transaction of the financial instrument between an owner of the digital asset and a participant.

2. The method of claim 1, wherein the dialogue agent is created based on an advertising client request.

3. The method of claim 1, wherein the creating the dialogue agent comprises:
generating a network-based platform;
connecting the network-based platform to a dialogue agent front end; and
completing dialogue agent application.

4. The method of claim 3, wherein the dialogue agent application further comprises dialogue cloud with key words for search engines, and the populating the created dialogue agent application comprises:
populating on a social media platform;
generating links accessible from Internet and smart phone applications; and
updating wrapper description identifications.

5. The method of claim 1, wherein the interactive dialogue is saved in a voice xml format.

6. The method of claim 1, wherein the dialogue action comprises an inquiry for information from any of a human being and a system.

7. The method of claim 1, wherein the dialogue line comprises any of a hyperlink connected to a search engine and a hyperlink connected to another dialogue agent application.

8. The method of claim 1, wherein the dialogue action is recorded with a first time and date stamp, and the generated dialogue line is recorded with a second time and date stamp.

9. The method of claim 1, wherein the value point to each dialogue element of the interactive dialogue is determined based on a conversation unit value associated with a dialogue pathway of the interactive dialogue.

10. The method of claim 1, further comprising:
creating a digital asset wrapper comprising the captured interactive dialogue.

11. The method of claim 1, wherein the dialogue line may include any of textual contents, audio contents, pictures, video contents, multimedia contents, appointments, advertisements, an engageable reference to a transaction and engageable references to interactive applications.

12. The method of claim 1, further comprising:
obtaining a cash stream from the recorded interactive dialogue,
said cash stream comprising a commission made by the dialogue agent for any of presenting, converting digital service to individual targets, and obtaining individualized information,
wherein the cash stream is obtained from making dialogue agents available through an advertising network.

13. The method of claim 1, further comprising:
receiving a client request to purchase dialogue agent service;
determining a plurality of dialogue agent parameters based on the client request;
creating a dialogue agent application;
populating the created dialogue agent application on a dialogue platform; and
implementing the dialogue agent application on the dialogue platform with an individual target.

14. The method of claim 13, wherein the client request comprises a subscription request.

15. The method of claim 1, further comprising:
retrieving a digital dialogue between the individual target and the dialogue agent;
determining a plurality of parameters associated with the digital dialogue;
allocating a value point to each dialogue element of the digital dialogue;
receiving trading information from a trading platform;
adjusting the allocated value point of each dialogue element based on the received trading information.

16. The method of claim 1, wherein the dialogue action comprises a search request associated with a key word.

17. The method of claim 16, wherein the dialogue line in response to the received dialogue action comprises a list of search results linked to a search engine based on the key word, and information from the list of search results in a record related to the key word is incorporated in a record.

18. The method of claim 1, wherein the dialogue agent comprises an ad agent.

19. The method of claim 1, wherein the exchange comprises an ad exchange.

20. The method of claim 1, further comprising:
obtaining a cash stream from the recorded interactive dialogue,
said cash stream generated by the dialogue agent for providing any of a contextual advertisement, a purchase transaction option, and a subscription, to individual targets.

21. The method of claim 1, further comprising:
obtaining a cash stream from the recorded interactive dialogue,
said cash stream comprising a commission made by the dialogue agent for any of presenting, converting digital service to individual targets, and obtaining individualized information.

22. The method of claim 1, further comprising:
obtaining a cash stream from the recorded interactive dialogue,
  said cash stream generated by the dialogue agent for providing any of a contextual advertisement, a purchase transaction option, and a subscription.

\* \* \* \* \*